(12) United States Patent
Schneewind et al.

(10) Patent No.: US 12,514,914 B2
(45) Date of Patent: Jan. 6, 2026

(54) **METHODS AND COMPOSITIONS COMPRISING *STAPHYLOCOCCUS* PROTEIN A (SpA) VARIANTS**

(71) Applicant: The University of Chicago, Chicago, IL (US)

(72) Inventors: Olaf Schneewind, Chicago, IL (US); Dominique Missiakas, Chicago, IL (US); Yan Sun, Chicago, IL (US); Hwan Keun Kim, Chicago, IL (US); Miaomiao Shi, Chicago, IL (US); Xinhai Chen, Chicago, IL (US)

(73) Assignee: The University of Chicago, Chicago, IL (US)

(*) Notice: Subject to any disclaimer, the term of this patent is extended or adjusted under 35 U.S.C. 154(b) by 985 days.

(21) Appl. No.: 17/595,252

(22) PCT Filed: May 13, 2020

(86) PCT No.: PCT/US2020/070048
§ 371 (c)(1),
(2) Date: Nov. 12, 2021

(87) PCT Pub. No.: WO2020/232471
PCT Pub. Date: Nov. 19, 2020

(65) Prior Publication Data
US 2022/0323563 A1   Oct. 13, 2022

Related U.S. Application Data

(60) Provisional application No. 62/847,832, filed on May 14, 2019.

(51) Int. Cl.
| | | |
|---|---|---|
| *A61K 39/085* | (2006.01) | |
| *A61K 39/00* | (2006.01) | |
| *A61K 47/42* | (2017.01) | |
| *C07K 14/31* | (2006.01) | |

(52) U.S. Cl.
CPC ............ *A61K 39/085* (2013.01); *A61K 47/42* (2013.01); *C07K 14/31* (2013.01); *A61K 2039/545* (2013.01); *A61K 2039/55* (2013.01)

(58) Field of Classification Search
None
See application file for complete search history.

(56) References Cited

U.S. PATENT DOCUMENTS

| | | |
|---|---|---|
| 3,791,932 A | 2/1974 | Schuurs et al. |
| 3,949,064 A | 4/1976 | Bornstein et al. |
| 4,027,010 A | 5/1977 | Kiselev et al. |
| 4,174,384 A | 11/1979 | Ullman et al. |
| 4,327,082 A | 4/1982 | Armitage |
| 4,338,298 A | 7/1982 | Myers |
| 4,356,170 A | 10/1982 | Jennings et al. |
| 4,367,110 A | 1/1983 | Yoshikawa |
| 4,372,945 A | 2/1983 | Likhite |
| 4,452,901 A | 6/1984 | Gordon et al. |
| 4,474,757 A | 10/1984 | Arnon et al. |
| 4,554,101 A | 11/1985 | Hopp |
| 4,578,770 A | 3/1986 | Mitani |
| 4,596,792 A | 6/1986 | Vyas |
| 4,599,230 A | 7/1986 | Milich et al. |
| 4,599,231 A | 7/1986 | Milich et al. |
| 4,601,903 A | 7/1986 | Frasch |
| 4,608,251 A | 8/1986 | Mia |
| 4,683,195 A | 7/1987 | Mullis et al. |
| 4,683,202 A | 7/1987 | Mullis |
| 4,684,611 A | 8/1987 | Schilperoort et al. |
| 4,690,915 A | 9/1987 | Rosenberg |
| 4,748,018 A | 5/1988 | Stolle et al. |
| 4,800,159 A | 1/1989 | Mullis et al. |
| 4,879,236 A | 11/1989 | Smith et al. |
| 4,902,616 A | 2/1990 | Fournier et al. |
| 4,952,500 A | 8/1990 | Finnerty et al. |
| 5,084,269 A | 1/1992 | Kullenberg |
| 5,151,350 A | 9/1992 | Colbert et al. |
| 5,189,015 A | 2/1993 | Hook et al. |
| 5,199,942 A | 4/1993 | Gillis |
| 5,221,605 A | 6/1993 | Bard et al. |
| 5,238,808 A | 8/1993 | Bard et al. |
| 5,294,177 A | 3/1994 | Rasnick et al. |
| 5,302,523 A | 4/1994 | Coffee et al. |
| 5,310,687 A | 5/1994 | Bard et al. |

(Continued)

FOREIGN PATENT DOCUMENTS

| | | |
|---|---|---|
| CN | 103037885 | 8/2015 |
| EP | 0594610 | 9/1998 |

(Continued)

OTHER PUBLICATIONS

Berenguer et al., "Tetrahydroisoquinolines as dopaminergic ligands: 1-Butyl-7-chloro-6 hydroxy-tetrahydroisoquinoline, a new compound with antidepressant-like activity in mice." Bioorganic and Medicinal Chemistry 2009, 17(14), 4968-4980.

DuMont et al., "Identification of a Crucial Residue Required for *Staphylococcus aureus* LukAB Cytotoxicity and Receptor Recognition" Infection and Immunity 2014, 82(3), 1268-1276.

International Search Report issued in Corresponding PCT Application No. PCT/US2020/054047, dated Jan. 11, 2021.

International Search Report issued in Corresponding PCT Application No. PCT/US2021/52418, dated Mar. 18, 2022.

International Search Report issued in Corresponding PCT Application No. PCT/US2022/22773, dated Aug. 30, 2022.

(Continued)

*Primary Examiner* — Jana A Hines
*Assistant Examiner* — Khatol S Shahnan Shah
(74) *Attorney, Agent, or Firm* — Norton Rose Fulbright US LLP

(57) ABSTRACT

Embodiments concern methods and composition for preventing or treating a bacterial infection, particularly infection by a *Staphylococcus* bacterium. The embodiments concern improved non-toxigenic Protein A (SpA) variant.

9 Claims, 26 Drawing Sheets

Specification includes a Sequence Listing.

(56) References Cited

U.S. PATENT DOCUMENTS

| | | |
|---|---|---|
| 5,320,951 A | 6/1994 | Hook et al. |
| 5,322,783 A | 6/1994 | Tomes et al. |
| 5,384,253 A | 1/1995 | Krzyzek et al. |
| 5,464,765 A | 11/1995 | Coffee et al. |
| 5,512,282 A | 4/1996 | Krivan et al. |
| 5,538,877 A | 7/1996 | Lundquist et al. |
| 5,538,880 A | 7/1996 | Lundquist et al. |
| 5,548,066 A | 8/1996 | Leneau et al. |
| 5,563,055 A | 10/1996 | Townsend et al. |
| 5,580,859 A | 12/1996 | Felgner et al. |
| 5,589,466 A | 12/1996 | Felgner et al. |
| 5,591,616 A | 1/1997 | Hiei et al. |
| 5,610,042 A | 3/1997 | Chang et al. |
| 5,620,896 A | 4/1997 | Herrmann et al. |
| 5,648,240 A | 7/1997 | Hook et al. |
| 5,656,610 A | 8/1997 | Shuler et al. |
| 5,702,932 A | 12/1997 | Hoy et al. |
| 5,736,524 A | 4/1998 | Content et al. |
| 5,780,448 A | 7/1998 | Davis |
| 5,789,215 A | 8/1998 | Berns et al. |
| 5,801,234 A | 9/1998 | Hodgson et al. |
| 5,840,846 A | 11/1998 | Hook et al. |
| 5,843,650 A | 12/1998 | Segev |
| 5,846,709 A | 12/1998 | Segev |
| 5,846,783 A | 12/1998 | Wu et al. |
| 5,849,497 A | 12/1998 | Steinman |
| 5,849,546 A | 12/1998 | Sousa et al. |
| 5,849,547 A | 12/1998 | Cleuziat et al. |
| 5,858,652 A | 1/1999 | Laffler et al. |
| 5,866,366 A | 2/1999 | Kallender |
| 5,871,986 A | 2/1999 | Boyce |
| 5,916,776 A | 6/1999 | Kumar |
| 5,922,574 A | 7/1999 | Minter |
| 5,925,565 A | 7/1999 | Berlioz et al. |
| 5,928,905 A | 7/1999 | Stemmer et al. |
| 5,928,906 A | 7/1999 | Koster et al. |
| 5,932,451 A | 8/1999 | Wang et al. |
| 5,935,819 A | 8/1999 | Eichner et al. |
| 5,935,825 A | 8/1999 | Nishimura et al. |
| 5,939,291 A | 8/1999 | Loewy et al. |
| 5,942,391 A | 8/1999 | Zhang et al. |
| 5,945,100 A | 8/1999 | Fick |
| 5,958,895 A | 9/1999 | Pachuk et al. |
| 5,981,274 A | 11/1999 | Tyrrell et al. |
| 5,994,624 A | 11/1999 | Trolinder et al. |
| 6,008,341 A | 12/1999 | Foster et al. |
| 6,013,763 A | 1/2000 | Braisted et al. |
| 6,197,927 B1 | 3/2001 | Braisted et al. |
| 6,288,214 B1 | 9/2001 | Hook et al. |
| 6,294,177 B1 | 9/2001 | Fattom |
| 6,299,879 B1 | 10/2001 | Wastfalt et al. |
| 6,340,571 B1 | 1/2002 | Merlin et al. |
| 6,403,337 B1 | 6/2002 | Bailey et al. |
| 6,593,114 B1 | 7/2003 | Kunsch et al. |
| 6,635,473 B1 | 10/2003 | Foster et al. |
| 6,651,655 B1 | 11/2003 | Licalsi et al. |
| 6,656,462 B2 | 12/2003 | Dondero et al. |
| 6,680,195 B1 | 1/2004 | Patti et al. |
| 6,692,739 B1 | 2/2004 | Patti et al. |
| 6,703,025 B1 | 3/2004 | Patti et al. |
| 6,703,492 B1 | 3/2004 | Kimmerly |
| 6,733,754 B2 | 5/2004 | Roberts et al. |
| 6,737,248 B2 | 5/2004 | Kunsch et al. |
| 6,753,149 B2 | 6/2004 | Bailey et al. |
| 6,756,361 B1 | 6/2004 | Fattom et al. |
| 6,770,278 B1 | 8/2004 | Skelly |
| 6,793,923 B2 | 9/2004 | Brown et al. |
| 6,814,971 B2 | 11/2004 | Roberts et al. |
| 6,833,253 B2 | 12/2004 | Choi |
| 6,841,154 B2 | 1/2005 | Foster et al. |
| 6,936,258 B1 | 8/2005 | Pavliak et al. |
| 6,984,381 B2 | 1/2006 | Guidry et al. |
| 7,045,131 B2 | 5/2006 | Patti et al. |
| 7,115,264 B2 | 10/2006 | Patti et al. |
| 7,125,554 B2 | 10/2006 | Forsberg et al. |
| 7,195,763 B2 | 3/2007 | Xu et al. |
| 7,488,807 B2 | 2/2009 | Mach et al. |
| 7,875,280 B2 | 1/2011 | Schneewind et al. |
| 8,758,765 B2 | 6/2014 | Missiakas et al. |
| 8,808,699 B2 | 8/2014 | Schneewind et al. |
| 8,821,894 B2 | 9/2014 | Schneewind et al. |
| 8,945,588 B2 | 2/2015 | Schneewind et al. |
| 9,095,540 B2 | 8/2015 | Schneewind et al. |
| 9,181,329 B2 | 11/2015 | Bubeck-Wardenburg et al. |
| 9,315,554 B2 | 4/2016 | Schneewind et al. |
| 9,556,281 B2 | 1/2017 | Schneewind et al. |
| 9,567,379 B2 | 2/2017 | Schneewind et al. |
| 9,701,738 B2 | 7/2017 | Missiakas et al. |
| 9,968,668 B2 | 5/2018 | Missiakas et al. |
| 10,464,971 B2 | 11/2019 | Schneewind et al. |
| 11,214,600 B2 | 1/2022 | Missiakas |
| 2002/0169288 A1 | 11/2002 | Hook et al. |
| 2003/0087864 A1 | 5/2003 | Talbot et al. |
| 2003/0113350 A1 | 6/2003 | Fattom et al. |
| 2003/0153022 A1 | 8/2003 | Patti et al. |
| 2003/0228345 A1 | 12/2003 | Oppermann et al. |
| 2004/0006209 A1 | 1/2004 | Patti et al. |
| 2004/0014178 A1 | 1/2004 | Guss et al. |
| 2004/0043037 A1 | 3/2004 | Kunsch et al. |
| 2004/0101919 A1 | 5/2004 | Hook et al. |
| 2004/0265962 A1 | 12/2004 | Bailey et al. |
| 2005/0026170 A1 | 2/2005 | Patti et al. |
| 2005/0031625 A1 | 2/2005 | Mohamed et al. |
| 2005/0106597 A1 | 5/2005 | Choi |
| 2005/0106648 A1 | 5/2005 | Foster et al. |
| 2005/0220788 A1 | 10/2005 | Nagy et al. |
| 2005/0255478 A1 | 11/2005 | Kimmerly |
| 2006/0002939 A1 | 1/2006 | Fischer et al. |
| 2006/0051820 A1 | 3/2006 | Horii et al. |
| 2006/0115490 A1 | 6/2006 | Masigani et al. |
| 2006/0117462 A1 | 6/2006 | Wysopal |
| 2006/0134141 A1 | 6/2006 | Fattom et al. |
| 2006/0177162 A1 | 8/2006 | Anderson et al. |
| 2006/0188515 A1 | 8/2006 | Anderson et al. |
| 2006/0205016 A1 | 9/2006 | Silverman |
| 2006/0222651 A1 | 10/2006 | Patti et al. |
| 2006/0228368 A1 | 10/2006 | Fattom et al. |
| 2006/0263792 A1 | 11/2006 | Mohamed et al. |
| 2007/0020746 A1 | 1/2007 | Kunsch et al. |
| 2008/0095792 A1 | 4/2008 | Anderson et al. |
| 2008/0131457 A1 | 6/2008 | Taylor et al. |
| 2008/0160089 A1 | 7/2008 | Vitiello et al. |
| 2008/0311146 A1 | 12/2008 | Castado et al. |
| 2009/0053235 A1 | 2/2009 | Taylor et al. |
| 2009/0162902 A1 | 6/2009 | Mach |
| 2009/0317421 A1 | 12/2009 | Missiakas et al. |
| 2010/0272743 A1 | 10/2010 | Kimmerly |
| 2011/0027265 A1 | 2/2011 | Bubeck-Wardenburg |
| 2011/0059085 A1 | 3/2011 | Kim |
| 2011/0206676 A1 | 8/2011 | Missiakas |
| 2011/0262477 A1 | 10/2011 | Cheng et al. |
| 2011/0274693 A1 | 11/2011 | Torres et al. |
| 2012/0009182 A1 | 1/2012 | Yeung et al. |
| 2012/0107327 A1 | 5/2012 | Anderson et al. |
| 2012/0114686 A1 | 5/2012 | Schneewind |
| 2012/0282247 A1 | 11/2012 | Schneewind |
| 2013/0095115 A1 | 4/2013 | Torres et al. |
| 2013/0096276 A1 | 4/2013 | Yoshida et al. |
| 2013/0136746 A1 | 5/2013 | Schneewind |
| 2013/0189249 A1 | 7/2013 | Bubeck-Wardenburg |
| 2013/0230550 A1 | 9/2013 | Schneewind |
| 2013/0236419 A1 | 9/2013 | Schneewind et al. |
| 2014/0037650 A1 | 2/2014 | Kim et al. |
| 2014/0107315 A1 | 4/2014 | Yoshida et al. |
| 2014/0271649 A1 | 9/2014 | Schneewind et al. |
| 2014/0302084 A1 | 10/2014 | Schneewind et al. |
| 2015/0246024 A1 | 9/2015 | Richter et al. |
| 2016/0074497 A1* | 3/2016 | Falugi .................. C07K 14/31 424/190.1 |
| 2016/0194363 A1 | 7/2016 | Schneewind et al. |

(56) References Cited

U.S. PATENT DOCUMENTS

| | | |
|---|---|---|
| 2017/0334954 A1 | 11/2017 | Rodrigo et al. |
| 2020/0317759 A1 | 10/2020 | Kort et al. |

FOREIGN PATENT DOCUMENTS

| | | |
|---|---|---|
| EP | 0786519 | 10/1998 |
| EP | 1829892 | 9/2007 |
| EP | 2157099 | 2/2010 |
| JP | 2005520853 | 7/2005 |
| JP | 2008518947 | 6/2008 |
| WO | WO 1989/009284 | 10/1989 |
| WO | WO 94/09699 | 5/1994 |
| WO | WO 95/06128 | 3/1995 |
| WO | WO 95/08348 | 3/1995 |
| WO | WO 98/57994 | 12/1998 |
| WO | WO 99/027109 | 6/1999 |
| WO | WO 00/02523 | 1/2000 |
| WO | WO 00/012131 | 3/2000 |
| WO | WO 00/012132 | 3/2000 |
| WO | WO 00/012678 | 3/2000 |
| WO | WO 00/12689 | 3/2000 |
| WO | WO 00/15238 | 3/2000 |
| WO | WO 00/064925 | 11/2000 |
| WO | WO 00/69457 | 11/2000 |
| WO | WO 00/071585 | 11/2000 |
| WO | WO 01/34809 | 5/2001 |
| WO | WO 01/60852 | 8/2001 |
| WO | WO 01/070267 | 9/2001 |
| WO | WO 01/070955 | 9/2001 |
| WO | WO 01/98499 | 12/2001 |
| WO | WO 02/059148 | 8/2002 |
| WO | WO 02/094868 | 11/2002 |
| WO | WO 02/102829 | 12/2002 |
| WO | WO 03/011899 | 2/2003 |
| WO | WO 03/041726 | 5/2003 |
| WO | WO 03/053462 | 7/2003 |
| WO | WO 03/076470 | 9/2003 |
| WO | WO 03/080106 | 10/2003 |
| WO | WO 2004/025416 | 3/2004 |
| WO | WO 2004/030699 | 4/2004 |
| WO | WO 2004/043407 | 5/2004 |
| WO | WO 2004/094600 | 11/2004 |
| WO | WO 2005/009378 | 2/2005 |
| WO | WO 2005/009379 | 2/2005 |
| WO | WO 2005/079315 | 9/2005 |
| WO | WO 2006/032472 | 3/2006 |
| WO | WO 2006/032475 | 3/2006 |
| WO | WO 2006/032500 | 3/2006 |
| WO | WO 2006/050291 | 5/2006 |
| WO | WO 2006/059247 | 6/2006 |
| WO | WO 2006/078213 | 7/2006 |
| WO | WO 2007/001361 | 1/2007 |
| WO | WO 2007/010413 | 1/2007 |
| WO | WO 2007/071692 | 6/2007 |
| WO | WO 2007/089470 | 8/2007 |
| WO | WO 2007/095057 | 8/2007 |
| WO | WO 2007/100580 | 9/2007 |
| WO | WO 2007/113222 | 10/2007 |
| WO | WO 2007/113223 | 10/2007 |
| WO | WO 2007/145689 | 12/2007 |
| WO | WO 2008/019162 | 2/2008 |
| WO | WO 2008/081014 | 7/2008 |
| WO | WO 2008/140487 | 11/2008 |
| WO | WO 2008/140570 | 11/2008 |
| WO | WO 2008/143697 | 11/2008 |
| WO | WO 2008/152447 | 12/2008 |
| WO | WO 2009/029132 | 3/2009 |
| WO | WO 2009/140236 | 11/2009 |
| WO | WO 2011/005341 | 1/2011 |
| WO | WO 2011/127032 | 10/2011 |
| WO | WO 2012/122533 | 9/2012 |
| WO | WO 2013/143249 | 10/2013 |
| WO | WO 2014/179744 B1 | 11/2014 |
| WO | WO 2015/144653 | 10/2015 |
| WO | WO 2016/166221 | 10/2016 |
| WO | WO 2016/197071 | 12/2016 |
| WO | WO 2018/232014 | 12/2018 |

OTHER PUBLICATIONS

Kailasan et al., "Rational Design of Toxoid Vaccine Candidates for *Staphylococcus aureus* Leukocidin AB (LukAB)" Toxins 2019, 11(6), 21 pages.

Vlaeminck et al., "Exploring Virulence Factors and Alternative Therapies against *Staphylococcus aureus* Pneumonia." Toxins 2020, 12(11), 13 pages.

Yang et al., "A novel bivalent fusion vaccine induces broad immunoprotection against *Staphylococcus aureus* infection in different murine models" Clinical Immunology 2018, 188, pp. 85-93.

Extended European Search Report issued in European Patent Application No. 20805312.4, dated Sep. 21, 2023.

Yoshida et al., "Rational design and engineering of protein A to obtain the controlled elution profile in monoclonal antibody purification," Chem-Bio Informatics Journal, 12:1-13, 2012.

Buehlmann M. et al. "Highly effective regimen for decolonization of methicillin-resistant *Staphylococcus aureus* carriers", *Infect Control Hosp Epidemiol* vol. 29 pp. 510-516, 2008.

Forsgren A, et al. "Protein A from *S. aureus*. I. Pseudo-immune reaction with human gamma-globulin", *J Immunol*, vol. 97, pp. 822-827, 1966.

Grov A. "Antigenicity of human IgM in relation to interaction with staphylococcal protein A. Acta path microbiol scand", *Sect C* vol. 83, 1975.

Grov A. "Human colostral IgA interacting with staphylococcal protein A. Acta path microbiol scand", *Sect C* 84, 1976.

Gustafson, GT et al. "Protein A from *Staphylococcus aureus*. II. Arthus-like reaction produced in rabbits by interaction of protein A and human gamma-globulin", *J Immunol*, vol. 98, pp. 1178-1181, 1967.

Inganäs M, et al. "Interaction of human polyclonal IgE and IgG from different species with protein A from *Staphylococcus aureus*: demonstration of protein-A-reactive sites located in the Fab'2 fragment of human IgG", *Scand J Immunol*, vol. 12, pp. 23-31, 1980.

Inganäs M. "Comparison of mechanisms of interaction between protein A from *Staphylococcus aureus* and human monoclonal IgG, IgA and IgM in relation to the classical FC gamma and the alternative F(ab')2 epsilon protein A interactions", *Scand J Immunol*, vol. 13 pp. 343-352, 1981.

Laky M, et al. "Mutual inhibition of the binding of Clq and protein A to rabbit IgG immune complexes", *Mol Immunol*, vol. 22 ,pp. 1297-1302, 1985.

Lind I, et al. , "Protein A reactivity of two distinct groups of human monoclonal IgM", *Scand J Immunol* vol. 4, 1975.

Lindmark R, et al. "Binding of immunoglobulins to protein A and immunoglobulin levels in mammalian sera", *J Immunol Meth*, vol. 62, pp. 1-13, 1983.

Lipsky BA, "Predicting bacteremia among patients hospitalized for skin and skin-structure infections: derivation and validation of a risk score", *Infect Control Hosp Epidemiol*,vol. 31, pp. 828-837, 2010.

Ljungberg UK, et al. "The interaction between different domains of staphylococcal protein A and human polyclonal IgG, IgA, IgM and F(ab')2: separation of affinity from specificity", *Mol Immunol*, vol. 30, pp. 279-1285, 1993.

Office Action issued in corresponding Chinese Application No. 202080051512, dated Aug. 8, 2023.

Patrick CC., et al. "Differential binding of IgA proteins of different subclasses and allotypes to staphylococcal protein A", *Z Immunitaetsforsch*, vol. 153, 1977.

Peterson PK, et al. "Effect of protein A on staphylococcal opsonization", *Infect Immun*, vol. 15, pp. 760-764, 1977.

Shi et al., "A protein A based *Staphylococcus aureus* vaccine with improved safety", *Vaccine*, vol. 39, pp. 3907-3915, 2021.

Skvaril F. "The question of specificity in binding human IgG subclasses to protein A-sepharose", *Immunochemistry*, vol. 13, pp. 871, 1976.

(56) References Cited

OTHER PUBLICATIONS

Van Kamp G. et al., IgA contamination of IgG prepared on a protein A column, *J. Immunol. Meth* vol. 27, 1979.
Van Loghem E., et al."Genetic markers of immunoglobulins in Japanese families. Inheritance of associated markers belonging to one IgA and three IgG subclasses", *Ann Human Genet Lond*, vol. 33, 1970.
Van Loghem E., et al. "Immunoglobulin alloytpes in African populations. Gm-Am haplotypes in a Nigerian population", *J Immunogenet* vol. 5, 1978.
Vidal MA, et al. "Binding of human immunoglobulin M to *Staphylococcus aureus* bearing protein A", *Immunol Lett*, vol. 4 pp. 311-315, 1982.
Weinstein HJ., "The relation between nasal-staphylococcal-carrier state and the incidence of postoperative complications", *N Engl J Med* vol. 260, pp. 1303-1308, 1959.
"Policy Responsed to the Growing Threat of Antibiotic Resistance: A Shot Against MRSA?" Extending the Cure (http://www.extendingthecure.org), Policy Brief7, available online at http://www.extendingthecure.org/sites/default/files/Po1icyBriet7 I.pdf, Mar. 2009.
Abdallah "A specific secretion system mediates PPE41 transport in pathogenic mycobacteria," et al., Mo!. Microbial., 62, 667-679, 2006.
Abdallah et al., "Type VII secretion—mycobacteria show the way," Nat. Rev. Microbial., 5, 883-891, 2007.
Adlam et al., "Effect of immunization with highly purified alpha- and beta-toxins on staphylococcal mastitis in rabbits," Infect. Immun., 17(2):250-6, 1977.
Albus et al., "Virulence of *Staphylococcus aureus* mutants altered in type 5 capsule production," Infect. Immun., 59: 1008-1014, 1991.
Allen et al., "HtaA is an iron-regulated hemin binding protein involved in the utilization of heme iron in Corynebacterium diphtheriae," J. Bacterial., 191:2638-2648, 2009.
Andersen et al., "Recall oflong-lived immunity to *Mycobacterium tuberculosis* infection in mice," J. Immunol., 154:3359-3372, 1995.
Archer, "*Staphylococcus aureus*: A Well-Armed Pathogen," Clin. Infect. Dis., 26: 1179-1181, 1998.
Athanasopoulos et al., "The extracellular adherence protein (Eap) of *Staphylococcus aureus* inhibits wound healing by interfering with host defense and repair mechanisms," Blood., 107(7):2720-2727, 2006.
Baba et al., "Genome sequence of *Staphylococcus aureus* strain Newman and comparative analysis of staphylococcal genomes." *J Bacterial* 2007, 190:300-310.
Bae et al., "*Staphylococcus aureus* virulence genes identified by bursa aurealis mutagensis and nematode killing," Proc. Natl. Acad. Sci. USA, 101:12312-12317, 2004.
Bae et al., "Allelic replacement in *Staphylococcus aureus* with inducible counter-selection." *Plasmid* 2005, 55:58-63.
Becker et al., "Release of protein A from the cell wall envelope of *Staphylococcus aureus*." *Proc Natl Acad Sci USA* 2014, 111: 1574-1579.
Bhakdi and Tranum-Jensen, "Alpha-toxin of *Staphylococcus aureus*, " Microbial. Rev., 55 (4): 733-751, 1991.
Bhakdi et al. "Functionally inactive *S. aureus* alpha-toxin containing a single amino acid subsitution: potential usefulness as a vaccine," Behring Inst. Mitt., (5):80-4, 1994. (English abstract).
Bjerketorp et al., "A novel von Willebrand factor binding protein expressed by *Staphylococcus aureus*," Microbiology, 148:2037-2044, 2002.
Bjerketorp et al., "The von Willebrand factor-binding protein (vWbp) of *Staphylococcus aueus* is a coagulase," FEMS Microbial. Lett., 234:309-314, 2004.
Boucher and Corey, "Epidemiology of Methicillin-Resistant *Staphylococcus aureus*," Clin. Infect. Dis., 46:S344-S349, 2008.
Brady et al., "Osteomyelitis and the role of biofilms in chronic infection," FEMS Immunol. Med. Microbial., 52: 13-22, 2008.
Brodin et al., "ESAT-6 proteins: protective antigens and virulence factors?" Trends in Microbiology, 12 (11): 500-508, 2004.

Brodin et al., "Functional analysis of early secreted antigenic target-6, the dominant T-cell antigen of *Mycobacterium tuberculosis*, reveals key residues involved in secretion, complex formation, virulence, and immunogenicity," J. of Biol. Chem., 280 (40): 33953-33959, 2005.
Brown et al., "A study of the interactions between an IgG-binding domain based on the B domain of staphylococcal protein A and rabbit IgG," Molecular Biotechnology, 10:9-16, 1998.
Brown et al., "Determining protein-protein interactions by oxidative cross-linking of a glycine-glycine-histidine fusion protein," Biochemistry, 37:4397-4406, 1998.
Bubeck Wardenburg et al., "Surface proteins and exotoxins are required for the pathogenesis of *Staphylococcus aureus* pneumonia," Infection and Immunity, 75(2): 1040-1044, 2007.
Bubeck Wardenburg et al., "Vaccine protection against *Staphylococcus aureus* pneumonia," Journal of Experimental Medicine, 205(2):287-294, 2008.
Burts et al., "EsaC: A new secretion substrate of the staphylococcal ESAT-6 secretion pathway," Abstracts of the General Meeting of the American Society for Microbiology, 107:102-103, 2007.
Burts et al., "EsxA and EsxB are secreted by an ESAT-6-like system that is required for the pathogenesis of *Staphylococcus aureus* infections," PNAS, 102 ( 4): 1169-1174, 2005.
Burts, "EsaC substrate for the ESA T-6 secretion pathway and its role in persistent infections of *Staphylococcus aures*," Mo!. Microbial., 69(3):736-746, 2008.
Campo et al., "Subcellular sites for bacterial protein export," Mo!. Microbial., 53 (6): 1583-1599, 2004.
Cedergren et al., "Mutational analysis of the interaction between staphylococcal protein A and human IgG1 ," Protein Eng., 6:441-448, 1993.
Cespedes et al., "The clonality of *Staphylococcus aureus* nasal carriage," J. Infect. Dis., 191 (3):444-52, 2005.
Chavakis et al., "*Staphylococcus aureus* interactions with the endothelium," Thromb. Haemost., 94:278-85, 2005.
Chen et al., "*Staphylococcus aureus* decolonization of mice with monoclonal antibody neutralizing protein A" *J Infect Dis* 2019, 219: 884-888.
Cheng et al., "Genetic requirements for *Staphylococcus aureus* abscess formation and persistence in host tissues," FASEB J., 23(10):3393-404, 2009.
Cheng et al., "Contribution of coagulases towards *Staphylococcus aureus* disease and protective immunity." *PLoS Pathog* 2010, 6:el001036, 18 pages.
Cheng et al., "The giant protein Ebh is a cross wall determinant of *Staphylococcus aureus* cell size and complement resistance." *J Bacterial* 2014, 196:971-981.
Cheung et al., "Cloning, expression, and nucleotide sequence of a *Staphylococcus aureus* gene (tbpA) encoding a fibrinogen-binding protein," Infection and Immunity, 63(5): 1914-1920, 1995.
Cheung et al., "Diminished virulence of a sar-/agr-mutant of *Staphylococcus aureus* in the rabbit model of endocarditis," J. Clin. Invest., 94 (5): 1815-1822, 1994.
Chhatwal, "Anchorless adhesins and invasins of Gram-positive bacteria: a new class of virulence factors," Trends Microbial., 10 (5): 205-208, 2002.
Clarke et al., "Surface adhesins of *Staphylococcus aureus*," Adv. Microb. Physiol., 51: 187-224, 2006.
Colman et al., "Effects of amino acid sequence changes on antibody-antigen interactions," Research in Immunology, 145:33-36, 1994.
Craven et al., "*Staphylococcus aureus* alpha-hemolysin activatest he NLRP3-inflammasome in human and mouse monocytic cells," PLoS ONE, 4(10):e7746, 11 pages, 2009.
Dalbey and Wickner, "Leader peptidase catalyzes the release of exported proteins from the outer surface of the *Escherichia coli* plasma membrane," J. Biol. Chem., 260: 15925-15931, 1985.
DeBord et al., "Immunogenicity and protective immunity against bubonic plague and pneumonic plague by immunization of mice with the recombinant V10 antigen, a variant of LcrV," Infect. Immun., 74(8):4910-4914, 2006.
DeDent et al., "Signal peptides direct surface proteins to two distinct envelope locations of *Staphylococcus aureus*," EMBO J., 27:2656-2668, 2008.

(56) References Cited

OTHER PUBLICATIONS

DeDent et al., "Distribution of protein A on the surface of *Staphylococcus aureus.*" *J Bacterial* 2007, 189:4473-4484.
Deisenhofer, "Crystallographic refinement and atomic models of a human Fe fragment and its complex with fragment B of protein A from Staphylococcus aureus at 2.9- and 2.8-A resolution," Biochemistry 20(9):2361-2370, 1981.
Diep et al., "Complete genome sequence of USA300, an epidemic clone of community-acquired meticillin-resistant *Staphylococcus aureus*," Lancet., 367(9512):731-739, 2006.
Diep et al., "Roles of 34 virulence genes in the evolution of hospital- and community-associated strains of methicillin-resistant *Staphylococcus aureus*," J. Infect. Dis., 193(11 ): 1495-1503, 2006.
Dinges et al., "Exotoxins of *Staphylococcus aureus*," Clin. Microbial. Rev., 13:16-34, 2000.
Dry la et al., "Identification of a novel iron regulated staphylococcal surface protein with haptoglobin-haemoglobin binding activity," Mo!. Microbial., 49:37-53, 2003.
Dryla et al., "High-affinity binding of the staphylococcal HarA protein to haptoglobin and hemoglobin involoves a domain with an antiparallel eight-stranded beta-barrel fold," J. Bacterial., 189:254-264, 2007.
Emori and Gaynes, "An overview of nosocomial infections, including the role of the microbiology laboratory," Clin. Microbial. Rev., 6(4):428-442, 1993.
Etz et al., Identification of in vivo expressed vaccine candidate antigens from *Staphyloccus aureus*, PNAS, 99(10):6573-6578, 2002.
Falugi et al. "Role of Protein A in the Evasion of Host Adaptive Immune Responses by *Staphylococcus aureus,*" American Society for Microbiology 2013, 4(5), 1-9.
Fattom et al., "Development of Staph VAX, a polysaccharide conjugate vaccine against *S. aureus* infection: from the lab bench to phase III clinical trials," Vaccine, 880-887, 2004.
Fortune et al., "Mutually dependent secretion of proteins required for mycobacterial virulence," Proc Natl. A cad. Sci. USA, I 02(30): I 0676-10681, 2005.
Foster, "Immune evasion by staphylococci," Nat. Rev. Microbial., 3:948-958, 2005.
Frankel et al., "Determinants of murein hydrolase targeting to cross-wall of *Staphylococcus aureus* peptidoglycan." *J Biol Chem* 2012, 287:10460-10471.
Frankel et al., "LytN, a murein hydrolase in the cross-wall compartment of *Staphylococcus aureus*, is involved in proper bacterial growth and envelope assembly." *J Biol Chem* 2012, 286:32593-32605.
Friedrich et al., "Staphylocoagulase is a prototype for the mechanism of cofactor-induced zymogen activation," Nature, 425:535-539, 2003.
Galan and Collmer, "Type III secretion machines: bacterial devices for protein delivery into host cells," Science, 284: 1322-1333, 1999.
Garcia-Lara et al., "*Staphylococcus aureus*: the search for novel targets," Drug Discovery Today, 10:643-651, 2005.
Gen bank Accession No. Q99WU4, "RecName:Full= Virulence Factor esxA," 2001.
GenBank Accession No. AY032850, "*Staphylococcus aureus* secreted von Willebrand factor-binding protein (vwb) gene, complete eds," 2002.
GenBank Accession No. AAA26498 (gi52953), "EryG [Saccharopolyspora erythraea NRRL 2338]," 1991.
GenBank Accession No. AAK52333, "Secreted von Willebrand factor-binding protein [*Staphylococcus aureus* subsp. *Aureus* str. Newman]," 2001.
GenBank Accession No. AJ249487, "*Staphylococcus epidermidis* aap gene for accumulation-associated protein, strain RP62A," 1999.
GenBank Accession No. CAC80837, "Autolysin [*Staphylococcus aureus*]," 2003.
GenBank Accession No. CAC80837, "*Staphylococcus aureus*," 2003.

GenBank Accession No. COL (YP 186036. I) (gi57650272), "Alpha-hemolysin precursor [*Staphylococcus aureaus* subsp. *Aureus* COL]," 2005.
GenBank Accession No. DD088871 "A Method for identification, isolation and production of antigens to a specific pathogen," Oct. 14, 2004.
GenBank Accession No. DD120800, "*Staphylococcus aureus* Proteins and Nucleic Acids," Jan. 27, 2005.
GenBank Accession No. DD120801, "*Staphylococcus aureus* Proteins and Nucleic Acids," Jan. 27, 2005.
GenBank Accession No. JH1 (YP 001316387.1) (gi50393712), "beta-channel forming cytolysin [*Staphylococcus aureaus* subsp. *Aureus* JH1 ,]" 2007.
GenBank Accession No. JH9 (YP 001246598.1) (gi148267655), "beta-channel forming cytolysin [*Staphylococcus aureus* subsp. *aureus* JH9]," 2007.
GenBank Accession No. MSSA476 (YP 043222.1) (gi49486001), "alpha-hemolysin precursor [*Staphylococcus aureus* subsp. *aureus* MSSA476],".2004.
GenBank Accession No. Mu50 (NP 371687.1) (gi5924153), "alpha-hemolysin precursor [*Staphylococcus aureus* subsp. *aureus* Mu50]," 2001.
GenBank Accession No. MW2 (NP_645861.1) (gi21282773), "alpha-hemolysin [*Staphylococcus aureus* subsp. *aureus* MW2]," 2002.
GenBank Accession No. N315 (NP_374279.1) (gi 150393712), "alpha-hemolysin [*Staphylococcus aureus* subsp. *aureus* N315]," 2001.
GenBank Accession No. NCTC8325 (YP 499665 .1) (gi88194865), "alpha-hemolysin precursor [*Staphylococcus aureus* subsp. *aureus* NCTC 8325]," 2006.
GenBank Accession No. Newman (YP 001332107.1) (gil 151221285), "alpha-hemolysin precursor [*Staphylococcus aureus* subsp. *aureus* str. Newman]," 2007.
Genbank Accession No. NP_371654, "Cell surface protein [*Staphylococcus aureus* subsp. *Aureus* Mu50] ," 2001.
GenBank Accession No. NP_372518, "Anti repressor [*Staphylococcus aureus* subsp. *Aureus* Mu50]," 2001.
Genbank Accession No. NP 371653, "Iron-regulated cell wall-anchored protein SirH [*Staphylococcus aureus* subsp. *Aureus* Mu50]," 2001.
Genbank Accession No. NP 373773, "Ser-Asp rich fibrinogen binding, bone sialoprotein-binding protein [*Staphylococcus aureus* subsp. *Aureus* N315]," 2001.
Genbank Accession No. NP 373774, "Ser-Asp rich fibrinogen binding, bone sialoprotein-binding protein [*Staphylococcus aureus* subsp. *Aureus* N315]," 2001.
Genbank Accession No. Q99WT7, "RecName:Full= Virulence Factor esxB," 2001.
GenBank Accession No. USA300 (YP 493756.1) (gi 151221285), "alpha-hemolysin precursor [*Staphylococcus aureus* subsp. *aureus* USA300_FPR3757]," 2006.
Gomez et al., "*Staphylococcus aureus* protein A activates TACE through EGFR-dependent signaling," EMBO J., 26(3):701-709, 2007.
Gomez et al., "*Staphylococcus aureus* protein A activates TNFRI signaling through conserved IgG binding domains," J. Biol. Chem., 281:20190-20196, 2006.
Gomez et al., "*Staphylococcus aureus* protein A induces airway epithelial inflammatory responses by activating TNFRI," Nature Med. 10:842-8, 2004.
Goodyear and Silverman, "Staphylococcal toxin induced preferential and prolonged in vivo deletion of innate-like B lymphocytes," Proc. Nat. Acad. Sci. USA, 101(31):11392-11397, 2004.
Goodyear and Silverman,, "Death by a B cell superantigen: In vivo VH-targeted apoptotic supraclonal B cell deletion by a Staphylococcal Toxin," J. Exp. Med., 197(9): 1125-1139, 2003.
Gouaux et al., "alpha-Hemolysin, gamma-hemolysin, and leukocidin from *Staphylococcus aureus*: distant in sequence but similar in structure," Protein Sci., 6:2631-2635, 1997.
Gouaux, "alpha-Hemolysin from *Staphylococcus aureus*: An archetype of beta-barrel, channel-forming toxins," Journal of Structural Biology, 121:110-122, 1998.

(56) References Cited

OTHER PUBLICATIONS

Gouda et al., "Three-dimensional solution structure of the B domain of staphylococcal protein A: comparisons of the solution and crystal structures," *Biochemistry*, 31(40):9665-72, 1992.
Gouda et al., "NMR study of the interaction between the B domain of staphylococcal protein A and the Fe pmtion ofimmunoglobulin G," Biochemistry, 37:129-36, 1998.
Graille et al., "Crystal structure of a *Staphylococcus aureus* protein A domain complexed with the Fab fragment of a human IgM antibody: structural basis for recognition of B-cell receptors and superantigen activity," *Proc. Nat. Acad. Sci. USA* 97:5399-5404, 2000.
Greenspan and Di Cera, "Defining epitopes: It's not as easy as it seems," *Nature Biotechnology*, 17:936-937, 1999.
Grigg et al., "Haem recognition by a *Staphylococcus aureus* NEAT domain," *Mol. Microbiol.*, 63:139-149, 2007.
Guinn et al., "Individual RD1-region genes are required for export of ESAT-6/CFP-10 and for virulence of *Mycobacterium tuberculosis*," *Mol. Microbiol.*, 51 (2): 359-370, 2004.
Guss et al., "Region X, the cell-wall-attachment part of staphylococcal protein A," *Eur. J. Biochem.* 138:413-420, 1984.
Harboe et al., "Evidence for occurrence of the ESAT-6 protein in *Mycobacterium tuberculosis* and virulent *Mycobacterium bovis* and for its absence in *Mycobacterium bovis* BCG," *Infect. Immun.*, 64: 16-22, 1996.
Harlow and Lane, in: Antibodies, A Laboratory Manual, Cold Spring Harbor Laboratory Press, Inc., pp. 23-25 and 27-33, 1988.
Hartleib et al., "Protein A is the von Willebrand factor binding protein on *Staphylococcus aureus*," *Blood*, 96(6):2149-2156, 2000.
Hasegawa and Clemente, "Virulence and immunity of *Staphylococcus aureus* BB and certain deficient mutants," *Infection and Immunity*, 22(2):473-479, 1978.
Hauck et al., "Sticky connections: extracellular matrix protein recognition and integrin-mediated cellular invasion by *Staphylococcus aureus*," *Curr. Opinion Microbiol.*, 9:5-11, 2006.
Hoffman et al., "Chicken anti-protein A prevents *Staphylococcus aureus* protein A from binding to human and rabbit IgG in immunoassays and eliminates most false positive results," *J. Immunol. Methods*, 198(1):67-77, 1996. (Abstract only).
Holtfreter et al., "Human immune proteome in experimental colonization with *Staphylococcus aureus*," 16(11):1607-1614, 2009.
Hougten et al., "Relative importance of position and individual amino acid residues in peptide antigen-antibody interactions: Implications in the mechanism of antigenic drift and antigenic shift," In: New Approaches to Immunization, Vaccines 86, Cold Spring Harbor Laboratory Press, Inc. pp. 21-25, 1986.
Hsu et al., "Repeated neonatal handling with maternal separation permanently alters hippocampal GABAA receptors and behavioral stress responses," *PNAS*, 100:12420-12425, 2003.
Hume et al., "Immunization with alpha-toxin toxoid protects the cornea against tissue damage during experimental *Staphylococcus aureus* keratitis," Infect. Immun . . . , 68(10):6052-6055, 2000.
Iaschenko et al., "Changes in the peripheral blood lymphocytes after immunication and its effects on the course of experimenal inflammatory process in the lung" *Zh Mikrobiol Epidemiol Immunobiol.*, 4:88-92, 1978. (English Abstract).
International Search Report and Written Opinion issued in Corresponding PCT Application No. PCT /US2020/070048, dated Nov. 19, 2020.
Jansson et al., "All individual domains of staphylococcal protein A show Fab binding," *FEMS Immunol. Med. Microbiol.*, 20(1):69-78 1998.
Jensen, "A normally occurring *Staphylococcus* antibody in human serum," *Acta Path. Microbiol. Scandin.*, 44:421-428, 1958.
Johnson et al., "Iron-regulated biofilm formation in *Staphylococcus aureus* Newman requires ica and the secreted protein Emp," *Infect. Immun.*, 76(4):1756-65, 2008.
Jonsson et al., "Virulence of *Staphylococcus aureus* in a mouse mastitis model: studies of alpha hemolysin, coagulase, and protein A as possible virulence determinants with protoplast fusion and gene cloning," *Infection and Immunity*, 49(3):765-769, 1985.
Josefsson et al., "Protection against experimental *Staphylococcus aureus* arthritis by vaccination with clumping factor A, a novel virulence determinant," *J. Infect. Dis.*, 184 (2): 1572-1580, 2001.
Jursch et al., "Histidine residues near the N terminus of staphylococcal alpha-toxin as reporters of regions that are critical for oligomerization and pore formation," *Infection and Immunity*, 62(6): 2249-2256, 1994.
Kelly, "Immunotherapy against antibiotic-resistant bacteria: the Russian experience with an antistaphyloccal hyperimmune plasma and immunoglobulin," *Microbes and Infection*, 2:1383-1392, 2000.
Kennedy et al., "Epidemic community-associated methicillin-resistant *Staphylococcus aureus*: recent clonal expansion and diversification," *Proc. Natl. Acad. Sci. USA*, 105:1327-1332, 2008.
Kennedy et al., "Targeting of alpha-hemolysin by active or passive immunization decreases severity of USA300 skin infections in a mouse model," *J. Infect. Dis.*, 202(7):1050-1058, 2010.
Kim et al., "IsdA and IsdB antibodies protect mice against *Staphylococcus aureus* abscess formation and lethal challenge," *Vaccine*, 28(38):6382-6392, 2010.
Kim et al., "Nontoxigenic protein A vaccine for methicillin-resistant *Staphylococcus aureus* infections in mice." *J Exp Med* 2010, 207: 1863-1870.
Kim et al., "Peptidoglycan-linked protein A promotes T-cell dependent antibody expansion during *Staphylococcus aureus* infection." *Proc Natl Acad Sci USA* 2016, 113:5718-5723.
Kim et al., "Protein A suppresses immune responses during *Staphylococcus aureus* bloodstream infection in guinea pigs." *mBio* 2015, 6:e02369-02314.
Kim et al., "Protein A-Specific Monoclonal Antibodies and Prevention of *Staphylococcus aureus* Disease in Mice." *Infect Immun* 2012, 80:3460-3470.
Kim et al., "Recurrent infections and immune evasion strategies of *Staphylococcus aureus*." *Curr Opin Microbial* 2012, 15:92-99.
Klevens et al., "Invasive methicillin-resistant *Staphylococcus aureus* infections in the United States," *JAMA*, 298:1763-1771, 2007.
Krishnasastry et al., "Surface labeling of key residues during assembly of the transmembrane pore formed by staphylococcal alpha-hemolysin," *FEBS Letters*, 356:66-71, 1994.
Kuklin et al., "A novel *Staphylococcus aureus* vaccine: iron surface determinant B induces rapid antibody response in rhesus macaques and specific increased survival in a murine *S. aureus* sepsis model," *Infect. Immun.*, 74:2215-2223, 2006.
Kuroda et al., "Whole Genome sequencing of meticillin-resistant *Staphylococcus aureus*," *Lancet*, 357 (9264): 1225-1240, 2001.
Lagergard et al., "Determination of neutralizing antibodies and specific immunoglobulin isotype levels in infants after vaccination against diphtheria," *Eur. J. Clin. Microbiol. Infect. Dis.*, 11(4):341-5, 1992.
Lam et al., "Abscess-forming factor(s) produced by *Staphylococcus aureus*. II. Abscess formation and immunity by a *Staphylococcus* and its mutants," *J. Bacteriol.*, 86:87-91, 1963.
Lancefield, "Current knowledge of type-specific M antigens of group A streptococci," *J. Immunol.*, 89:307-313, 1962.
Lancefield, "The antigenic complex of *Streptococcuss haemolyticus*. I. Demonstration of a type-specific substance in extracts of *Streptococcus hemolyticus*," *J. Exp. Med.*, 47:91-103, 1928.
Lee et al., "Development of antistaphylococcal vaccines," *Current Infectious Disease Reports*, 3:517-524, 2001.
Lee, "The prospects for developing a vaccine against *Staphylococcus aureus*," *Trends in Microbiology*, 4(4):162-166, 1996.
Lee, Jean C., Harvard Medical School "*S. aureus* vaccine development," available online at www.ischemo.org/pdf/Lee.pdf, accessed Aug. 13, 2010.
Lindsay et al., "Microarrays reveal that each of the ten dominant lineages of *Staphylococcus aureus* has a unique combination of surface-associated and regulatory genes," *J. Bacteriol.*, 188:669-676, 2006.
Liu et al., "Direct hemin transfer from IsdA to IsdC in the iron-regulated surface determinant (Isd) heme acquisition system of *Staphylococcus aureus*," *J. Biol. Chem.*, 283:6668-6676, 2008.

(56) References Cited

OTHER PUBLICATIONS

Lowy, "*Staphylococcus aureus* infections," *New Eng. J. Med.*, 339(8):520-532, 1998.
Lua et al. "Role of the IgE variable heavy chain in FcεRIα and superantigen binding in allergy and immunotherapy," *Journal of Allergy and Clinical Immunology* 2019, 144(2), 514-523.
MacGurn et al., "A non-RD1 gene cluster is required for Snm secretion in *Mycobacterium tuberculosis*," *Mol. Microbiol.*, 57:1653-1663, 2005.
Madden et al., "Cytolysin-mediated translocation (CMT): a functional equivalent of type III secretion in gram-positive bacteria," *Cell*, 104 (1): 143-152, 2001.
Mahairas et al., "Molecular analysis of genetic differences between *Mycobacterium bovis* BCG and virulent *M. bovis*," *J. Bacteriol.*, 178 (5): 1274-1282, 1996.
Maione et al., "Identification of a universal Group B streptococcus vaccine by multiple genome screen," *Science*, 309 (5731):148-150, 2005.
Maira-Litran et al., "Comparative opsonic and protective activities of *Staphylococcus aureus* conjugate vaccines containing native or deacetylated Staphylococcal Poly-N-acetyl-beta-(1-6)-glucosamine," *Infect. Immun.* 73 (10): 6762, 2005.
Mamo et al., "Vaccination against *Staphylococcus aureus* mastitis: immunological response of mice vaccinated with fibronectin-binding protein (FnBP-A) to challenge with *S. aureus*," *Vaccine*, 12:988-992, 1994.
Manolova et al., "The creation of specific immunity to staphylococcal infection in newborn infacts by the intranasal administration of absorbed staphyloccal anatoxin," *Zh Mikrobiol Epidemiol Immunobiol.*, 8:64-7, 1989. (Russian Publication. English Abstract).
Marraffini and Schneewind, "Anchor structure of staphylococcal surface proteins. V. Anchor structure of the sortase B substate IsdC," *J. Biol. Chem.*, 280:16263-16271, 2005.
Mazmanian et al., "An iron-regulated sortase-enzyme anchors a class of surface protein during *Staphylococcus aureus* pathogenesis," *Proc. Natl. Acad. Sci. USA*, 99:2293-2298, 2002.
Mazmanian et al., "Passage of heme-iron across the envelope of *Staphylococcus aureus.*" *Science* 2003, 299:906-909.
Mazmanian et al., "Sortase-catalyzed anchoring of surface proteins to the cell wall of *Staphylococcus aureus.*" *Mol Microbial* 2001, 40: 1049-1057.
Mazmanian et al., "*Staphylococcus aureus* mutants defective in the display of surface proteins and in the pathogenesis of animal infections." *Proc Natl Acad Sci USA* 2000, 97:5510-5515.
Mazmanian et al., "*Staphylococcus aureus* sortase, an enzyme that anchors surface proteins to the cell wall." *Science* 1999, 285:760-763.
McElroy et al., "Alpha-toxin damages the air-blood barrier of the lung ni a rat model of *Staphylococcus aureaus*-induced pneumonia," *Infect. Immun.*, 67(10):5541-5544, 1999.
McLaughlin et al., "A *Mycobacterium* ESX-1-secreted virulence factor with unique requirements for export," *PLoS Pathog.*, 3:e105, 2007.
Mendoza et al., "Identification of *Staphylococcus* species by 16S-23S rDNA intergenic spacer PCR analysis," *International Journal of Systematic Bactriology*, 48:1049-1055, 1998.
Menestrina et al., "Mode of action of beta-barrel pore-forming toxins of the staphylococcal alpha-hemolysin family," *Toxicon*, 39:1661-1672, 2001.
Menzies and Kernodle, "Passive immunization with antiserum to a nontoxic alpha-toxin mutant from *Staphylococcus aureus* is protective in a murine model," *Infection and Immunity*, 64(5): 1839-1841, 1996.
Menzies and Kernodle, "Site-directed mutagenesis of the alpha-toxin gene of *Staphylococcus aureus*: Role of histidines in toxin activity in vitro and in a murine model," *Infection and Immunity*, 62(5)1843-1847, 1994.
Mills et al., "Yersinia enterocolitica induces apoptosis in macrophages by a process requiring functional type III secretion and translocation mechanisms and involving YopP, presumably acting as an effector protein," *PNAS*, 94 (23): 12638-12643, 1997.
Missiakas et al., "*Staphylococcus aureus* vaccines: deviating from the carol." *J Exp Med* 2016, 231: 1645-1653.
Moreillon et al., "Role of *Staphylococcus aureus* coagulase and clumping factor in pathogenesis of experimental endocarditis," *Infect. Immun.*, 63:4738-4743, 1995.
Muryoi et al., "Demonstration of the iron-regulated surface determinant (Isd) heme transfer pathway in *Staphylococcus aureus*," *J. Biol. Chem.*, 283:28125-28136S, 2008.
Navarre et al., "Multiple enzymatic activities of the murein hydrolase from staphylococcal phage phi11. Identification of a D-alanyl-glycine endopeptidase activity," *J. Biol. Chem.*, 274:15847-15856, 1999.
Ní Eidhin et al., "Clumping factor B (ClfB), a new surface-located fibrinogen-binding adhesin of *Staphylococcus aureus*," *Mol. Microbiol.*, 30 (2): 245-257, 1998.
Nitsche-Smitz et al., "Invasion mechanisms of Gram-positive pathogenic cocc1," *Thrombosis and Haemostasis*, 98(3):488-496, 2007.
Nordhaug et al., "A field trial with an experimental vaccine against *Staphylococcus aureus* mastitis in cattle. 2. Antibody response," *J. Dairy Sci.*, 77:1276-1284, 1994.
Novick, "Autoinduction and signal transduction in the regulation of staphylococcal virulence," *Mol. Microbiol.*, 48 (6): 1429-1449, 2003.
O'Brien et al., "Multiple mechanisms for the activation of human platelet aggregation by *Staphylococcus aureus*: roles for the clumping factors ClfA and ClfB, the serine-aspartate repeat protein SdrE and protein A," *Mol. Microbiol.*, 44:1033-1044, 2002.
O'Seaghdha et al., "*Staphylococcus aureus* protein A binding to von Willebrand factor A1 domain is mediated by conserved IgG binding regions," *FEBS J.*, 273:4831-4841, 2006.
O'Reilly et al., "Cryptic alpha-toxin gene in toxic shock syndrome and septicaemia strains of *Staphylococcus aureus*," *Mol. Microbiol.*, 4:1947-1955, 1990.
O'Reilly et al., "Inactivation of the alpha-haemolysin gene of *Staphylococcus aureus* 8325-4 by site-directed mutagenesis and studies on the expression of its haemolysins," *Microb. Pathog.*, 1:125-138, 1986.
Overheim et al., "LcrV plague vaccine with altered immunomodulatory properties," *Infect. Immun.*, 73:5152-5159, 2005.
Pal et al., "Design of potent, non-toxic antimicrobial agents based upon the structure of the frog skin peotide, pseudin-2," *Regul. Pept.*, 129(1-3):85-91, 2005.
Pallen et al., "The ESAT-6/WXG100 superfamily—and a new Gram-positive secretion system," *Trends Microbiol.*, 10 (5): 209-212, 2002.
Palmqvist et al., "Bacterial cell wall-expressed protein A triggers supraclonal B-cell responses upon in vivo infection with *Staphylococcus aureus*," *Microbes. Infect.*, 7:1501-11, 2005.
Pancholi and Fischetti, "A major surface protein on group A streptococci is a glyceraldehyde-3-phosphate-dehydrogenase with multiple binding activity," *J. Exp. Med.*, 176 (2): 415-426, 1992.
Panizzi et al., "Fibrinogen substrate recognition by *Staphylocoagulase*. (pro)*thrombin* complexes," *J. Biol. Chem.*, 281:1179-1187, 2006.
Pankey et al., "Evaluation of Protein A and a Commercial Bacterin as Vaccines Against *Staphylococcus aureus* Mastitis by Experimental Challenge", *J. Dairy Sci.* 1985, 68:726-731.
Park et al., "Immunogenicity of alpha-toxin, capsular polysaccharide (CPS) and recombinant fibronection-binding protein (r-FnBP) of *Staphylococcus aureus* in rabbit," *J. Vet. Med. Sci.*, 61(9):995-1000, 1999.
Pauli et al., "*Staphylococcus aureus* infection induces protein A-mediated immune evasion in humans." *J Exp Med* 2014, 211 :2331-2339.
PCT International Search Report and Written Opinion issued in International application No. PCT/US11/42845, dated Feb. 10, 2012.
PCT International Search Report and Written Opinion issued in International application No. PCT/US10/29959, dated Apr. 11, 2011.

(56) References Cited

OTHER PUBLICATIONS

Perry et al., "Anchoring of surface proteins to the cell wall of *Staphylococcus aureus*. 111. Lipid II is an in vivo peptidoglycan substrate for sortase-catalyzed surface protein anchoring" *J Biol Chem* 2002, 277: 16241-16248.
Philipp et al., "Physical mapping of *Mycobacterium bovis* BCG Pasteur reveals differences from the genome map of *Mycobacterium tuberulosis* H37Rv and from *M. bovis,*" *Microbiology*, 142: 3135-3145, 2003.
Phonimdaeng et al., "The coagulase of *Staphylococcus aureus* 8325-4. Sequence analysis and virulence of site-specific coagulase-deficient mutants," *Molecular Microbiology*, 4(3):393-404, 1990.
Pilpa et al., "Functionally distinct NEAT (NEAr Transporter) domains within the *Staphylococcus aureus* IsdH/HarA protein extract heme from methemoglobin," *J. Biol. Chem.*, 284:1166-1176, 2009.
Pilpa et al., "Solution structure of the NEAT (NEAr Transporter) domain from ISdH/HarA: the human hemoglobin receptor in *Staphylococcus aureus,*" *J. Mol. Biol.*, 360:435-447, 2006.
Poole-Warren et al., "Vaccination for prevention of CAPD associated staphylococcal infection: results of a prospective multicenter clinical trial," *Clin. Nephrol.*, 35(5):198-206, 1991.
Projan et al., "Staphylococcal vaccines and immunotherapy: to dream the impossible dream?" *Curr. Opin. Pharmacol.*, 6:473-479, 2006.
Pym et al., "Loss of RD1 contributed to the attenuation of the live tuberculosis vaccines *Mycobacterium bovis* BCG and *Mycobacterium microti,*" *Molecular Microbiology*, 46 (3): 709-717, 2002.
Pym et al., "Recombinant BCF exporting ESAT-6 confers enhanced protection against tuberculosis," *Nature Medicine*, 9 (5): 533-539, 2003.
Raedler et al., "Serologic assay to quantify human immunoglobulin antibodies to *Staphylococcus aureus* iron surface determinant B antigen," *Clin. Vaccine Immunol.*, 16(5):739-48, 2009.
Ragle and Wardenburg, "Anti-alpha-hemolysin monoclonal antibodies mediate protection against *Staphylococcus aureus* pneumonia," *Infection and Immunity*, 77(7):2712-2718, 2009.
Ragle et al., "Prevention and treatment of *Staphylococcus aureus* pneumonia with a beta-cyclodextrin derivative," *Antimicrobial Agents and Chemotherapy*, 54(1):298-304, 2010.
Renshaw et al., "Conclusive evidence that the major T-cell antigens of the *Mycobacterium tuberculosis* complex ESAT-6 and CFP=10 form a tight, 1:1 complex and characterization of the structural properties of ESAT-6, CFP-10, and the ESAT-6CFP-10 complex. Implications for pathogenesis and virulence," *J. of Biol. Chem.*, 277 (24): 21598-21603, 2002.
Renshaw et al., "Structure and function of the complex formed by the tuberculosis virulence factors CFP-10 and ESAT-6," *Embo Journal*,24 (14): 2491-2498, 2005.
Rivera et al., "Fibrinogen-binding proteins of gram-positive bacteria," *Thromb. Haemost.*, 98:503-511, 2007.
Roben et al., "VH3 family antibodies bind domain D of staphylococcal protein A," *J. Immunol.*, 154:6437-6445, 1995.
Rosch and Caparon, "A microdomain for protein secretion in Gram-positive bacteria," *Science*, 304: 1513-1515, 2004.
Rose et al., "Mediator generation and signaling events in alveolar epithelial cells attacked by *S. aureus* alpha-toxin," *Am. J. Physiol. Lung Cell Mol. Physiol.*, 282:L207-L214, 2002.
Salid-Salim et al., "Community-acquired methicillin-resistant *Staphylococcus aureus*: an emerging pathogen," *Infect. Control Hosp. Epidemiol.* 24(6):451-455, 2003.
Schaffer et al., "Immunization with *Staphylococcus aureus* clumping factor B, a major determinant in nasal carriage, reduces nasal colonization in a murine model," *Infect. Immun.*, 74 (4): 2145-2153, 2006.
Schneewind et al., "Cell wall sorting signals in surface proteins of gram-positive bacteria," *EMBO*, 12(12):4803-4811, 1993.
Schneewind et al., "Sorting of protein A to the staphylococcal cell wall." *Cell* 1992, 70:267-281.
Schneewind et al., "Structure of the cell wall anchor of surface proteins in *Staphylococcus aureus.*" *Science* 1995, 268:103-106.

Scriba et al., "The *Staphylococcus aureus* Eap protein activates expression of proinflammatory cytokines," *Infect. Immun.*, 76(5):2164-2168, 2008.
Seeger et al., "Staphylococcal alpha-toxin elicits hypertension in isolated rabbit lungs. Evidence for thromboxane formation and the role of extracellular calcium," *J. Clin. Invest.*, 74, 849-858, 1984.
Seeger et al., "Staphylococcal alpha-toxin-induced vascular leakage in isolated perfused rabbit lungs," *Lab. Invest.*, 63:341-349, 1990.
Sequence 2913 from Patent EP 1829892, NCBI accession No. CS710373, Sep. 5, 2007.
Sequence 2913 from Patent WO02094868, NCBI accession No. AX619950, Nov. 28, 2002.
Sequence 2915 from Patent EP1829892, NCBI accession No. CS710375, Sep. 5, 2007.
Sequence 2915 from Patent WO02094868, NCBI accession No. AX619952, Nov. 28, 2002.
Sequence 42 from Patent EP1616876, NCBI accession No. CS252757, Jan. 18, 2006.
Sequence 42 from Patent EP1630172, NCBI accession No. CS274094, Mar. 1, 2006.
Sequence 42 from Patent WO02059148, NCBI accession No. AX583665, Aug. 1, 2002.
Sequence 785 from patent U.S. Pat. No. 6,593,114, NCBI accession No. AR354667, Jul. 15, 2003.
Sequence 785 from patent U.S. Pat. No. 6,737,248, NCBI accession No. AR536223, May 18, 2004.
Sequence 94 from patent U.S. Pat. No. 6,348,582, NCBI accession No. AR194545, Feb. 19, 2002.
Sharp et al., "Crystal structure of the heme-IsdC complex, the central conduit of the Isd iron/heme uptake system in *Staphylococcus aureus,*" *J. Biol. Chem.*, 282:10625-10631, 2007.
Shaw et al., "The role and regulation of the extracellular proteases of *Staphylococcus aureus,*" *Microbiology*, 150:217-228, 2004.
Sheagren, "*Staphylococcus aureus*. The persistent pathogen (first of two parts)," *N. Engl. J. Med.*, 310:1368-1373, 1984.
Shopsin et al., "Evaluation of protein A gene polymorphic region DNA sequencing for typing of *Staphylococcus aureus* strains," *J. Clin. Microbiol.*, 37(11):3556-63, 1999.
Sibbald et al., "Mapping the Pathways to Staphylococcal Pathogenesis by Comparative Secretomics," *Microbiol. Mol. Biol. Rev.*, 70:755-788, 2006.
Silverman and Goodyear, "Confounding B-cell defences: lessons form a staphylococcal superantigen," *Nat. Rev. Immunol.*, 6(6):465-75, 2006.
Sjoquist et al., "Protein A isolated from *Staphylococcus aureus* after digestion with lysostaphin," *Eur. J. Biochem.*, 29:572-578, 1972.
Skaar et al., "Iron-regulated surface determinants (Isd) of *Staphylococcus aureus*: stealing iron from heme," *Microbes Infect.*, 6:390-397, 2004.
Skaar et al., "Iron-source preference of *Staphylococcus aureus* infections," *Science*, 305:1626-1628, 2004.
Skaar et al., "IsdG and Isdl, heme degrading enzymes in the cytoplasm of *Staphylococcus aureus,*" *J. Biol. Chem.*, 279:436-443, 2004.
Skolnick et al., "From genes to protein structure and function: novel applications of computational approaches in the genomic era" *Trends in Biotechnology* 2000, 18:34-39.
Song et al., "Structure of staphylococcal alpha-hemolysin, a heptameric transmembrane pore," *Science*, 274:1859-1866, 1996.
Sorenson et al., "Purification and characterization of a low-molecular-mass T-cell antigen secreted by *Mycobacterium tuberculosis,*" *Infect. Immun.*, 63 (5): 1710-1717, 1995.
Stanley et al., "Acute infection and macrophage subversion by *Mycobacterium tuberculosis* require a specialized secretion system," *PNAS*, 100 (2): 13001-13006, 2003.
Stranger-Jones et al., "Vaccine assembly from surface proteins of *Staphylococcus aureus,*" *Proc. Natl. Acad. Sci. USA*, 103:16942-16947, 2006.
Studier et al., "Use of T7 RNA polymerase to direct expression of cloned genes," *Methods Enzymol.* 185:60-89 1990.

(56) References Cited

OTHER PUBLICATIONS

Stugard et al., "A 101-kilodalton heme-binding protein associated with congo red binding and virulence of *Shigella flexneri* and enteroinfasive *Eschrichia coli* strains," *Infect. Immun.*, 57:3534-3539, 1989.
Sun et al., "Staphylococcal protein A is required for persistent colonization of mice with *Staphylococcus aureus*" *J Bacterial* 2018, 200:e00735-I 7.
Suttorp and Habben, "Effect of staphylococcal alpha-toxin on intracellular Ca2+ in polymorphonuclear leukocytes," *Infect. Immun.*, 56:2228-34, 1988.
Tenover et al., "Characterization of a strain of community-associated methicillin-resistant *Staphylococcus aureus* widely disseminated in the United States," *J. Clin. Microbiol.*, 44:108-118, 2006.
Thammavongsa et al., "*Staphylococcus aureus* synthesizes adenosince to escape host immune responses," *J. Exp. Med.*, 206(11):2417-2427, 2009.
Thammavongsa et al., "Staphylococcal manipulation of host immune responses." *Nat Rev Microbial* 2015, 13:529-543.
Thomer et al., "N-acetylglucosaminylation of serine-aspartate repeat proteins promotes *Staphylococcus aureus* bloodstream infection.". *J Biol Chem* 2014, 289:3478-3486.
Tiedemann et al., "Isolation of HLA-DR1.(staphylococcal enterotoxin A)2 trimers in solution," *PNAS*, 92(26):12156-9, 1995.
Tollersrud et al., "Antibody responses in sheep vaccinated against *Staphylococcus aureus* mastitis: A comparison of two experimental vaccines containing different adjuvants," *Veterinary Research Communications*, 26:587-600, 2002.
Ton-That et al., "Fatigue characterization of a hydroxyapatite-reinforced polyethylene composite. II. Biaxial fatigue," *J. Biomed. Matter Res.*, 51 (3): 461-468, 2000.
Ton-That et al., "Purification and characterization of sortase, the transpeptidase that cleaves surface proteins of *Staphylococcus aureus* at the LPXTG motif" *Proc Natl Acad Sci USA* 1999, 96: 12424-12429.
Torres et al., "*Staphylococcus aureus* IsdB is a hemoglobin receptor required for heme-iron utilization," *J. Bacteriol.*, 188:8421-8429, 2006.
Uhlen et al., "Complete sequence of the staphylococcal gene encoding protein A. A gene evolved through multiple duplications," *J. Biol. Chem*. 259:1695-1702 and 13628 (Corr.) 1984.
Valeva et al., "Staphyloccal alpha-toxin: Formation of the heptameric pore is partially cooperative and proceeds through multiple intermediate stages," *Biochemistry*, 36:13298-13304, 1997.
Van Wely et al., "Translocation of proteins across the cell envelope of Gram-positive bacteria," *FEMS Microbiol. Rev.*, 25:437-454, 2001.
Verkaik et al., "Immunogenicity of toxins using *Staphylococcus aureus* infections," *Clinical Infectious Diseases*, 50:61-8, 2010.
Villareal et al., "The IsdC protein from *Staphylococus aureus* uses a flexible binding pocket to capture heme," *J. Biol. Chem.*, 283:31591-31600, 2008.
Walker and Bayley, "Key residues for membrane binding, oligomerization, and pore forming activity of staphyloccal alpha-hemolysin identified by cysteine scanning mutagenesis and targeted chemical modification," *The Journal of Biological Chemistry*, 270(39):23065-23071, 1995.
Walker and Bayley, "Restoration of pore-forming activity in staphyloccal alpha-hemolysin by targeted covalent modification," *Protein Engineering*, 8(5):491-495, 1995.
Walker et al., "An intermediate in the assembly of a pore-forming protein trapped with a genetically-engineered switch," *Chemistry & Biology*, 2:99-105, 1995.
Wardenburg et al., "Poring over pores: alpha-hemolysin and Panton-Valentine leukocidin in *Staphylococcus aureus* pneumonia," *Nature Medicine*, 13(12):1405-1406, 2007.
Wardenburg et al., "Vaccines for *Staphylococcus aureus* infections," In: New Generation Vaccines, $4^{th}$ edition, Dr. Myron Levine, Ed., Informa Healthcare, Chapter 67, 2009.
Weichhart et al., "Functional selection of vaccine candidate peptides from *Staphylococcus aureus* whole-genome expression libraries in vitro," *Infect. Immun.*, (8): 4633-4641, 2003.
Wilke and Wardenburg, "Role of a disintegrin and metalloprotease 10 in *Staphylococcus aureus* alpha-hemolysin-mediated cellular injury," *PNAS*, 107(30):13473-8. Epub Jul. 12, 2010.
Wleklinski et al., "Protective effects of active immunization against alpha hemolysin of *Staphylococcus aureus*," *Zentralbl. Veterinarmed B* . . . , 29(8):596-603, 1982. (German Publication. English summary).
Wu et al., "*Staphylococcus aureus* IsdG and Isdl, heme degrading enzymes with structural similarity to monooxygenases," *J. Biol. Chem.*, 2004.
Xie et al., "Suppression of experimental autoimmune encephalomyelitis by extracellular adherence protein of *Staphylococcus aureus*," *J Exp. Med.*, 203(4):985-94, 2006.
Xu et al., "A unique *Mycobacterium* ESX-1 protein co-secretes with CFP-10/ESAT-6 and is necessary for inhibiting phagosome maturation," *Mol. Microbiol.*, 66(3):787-800, 2007.
Yanagisawa et al., "Neutralization of staphylococcal exotoxins in vitro by human-origin intravenous immunoglobulin," *J. Infect. Chemother.*, 13:368-372, 2007.
Yoshida et al., "Induction of resistance with heat-killed compact-type strains of *Staphylococcus aureus* against challenge with the diffuse variant of the Smith strain of *Staphylococcus aureus*," *Infection and Immunity*, 12(5):939-942, 1975.
Yu et al., "Septal secretion of protein A in *Staphylococcus aureus* requires SecA and lipoteichoic acid synthesis" *Elife* 2018, 7:e34092.
Zhang et al., "Construction and expression of fused gene vaccine esat6-cfp 10 of *Mycobacterium tuberculosis*," *Disi Junyi Daxue Xuebao*, 26(3):193-195, 2005. (Chinese publication. English abstract).
Zhou et al., "An immunogenicity study of a newly fusion protein Cna-FnBP vaccinated against *Staphylococcus aureus* infections in a mice model," *Vaccine*, 24 (22): 4830-4837, 2006.
Zhu et al., "Pathway for heme uptake from human methemoglobin by the iron-regulated surface determinants system of *Staphylococcus aureus*," *J. Biol. Chem.*, 283:18450-18460, 2008.

* cited by examiner

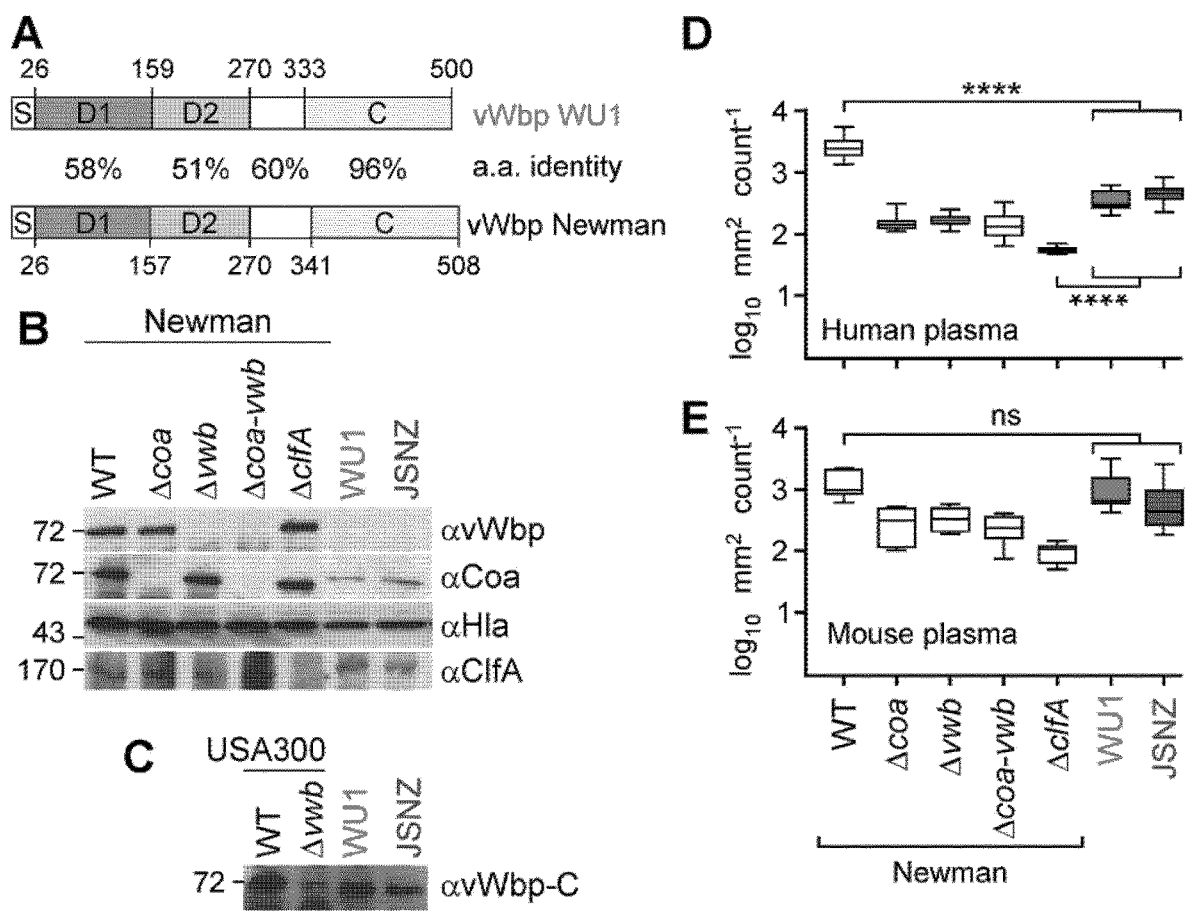
FIG. 1A-E

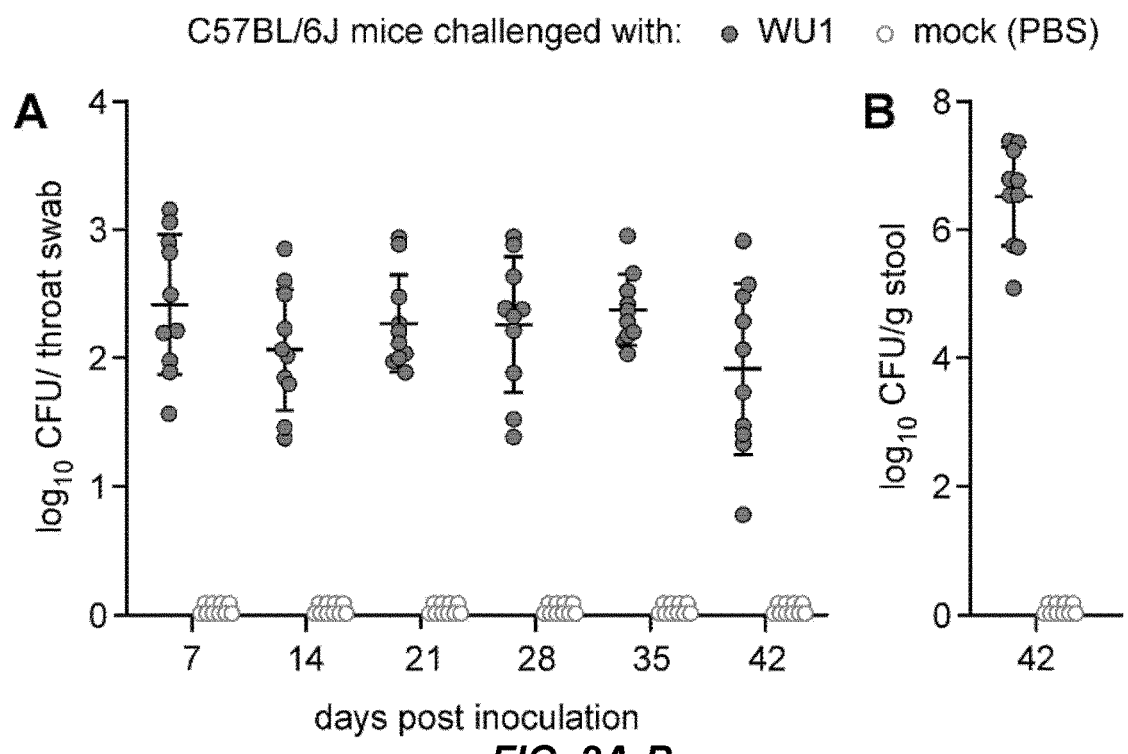
FIG. 2A-B
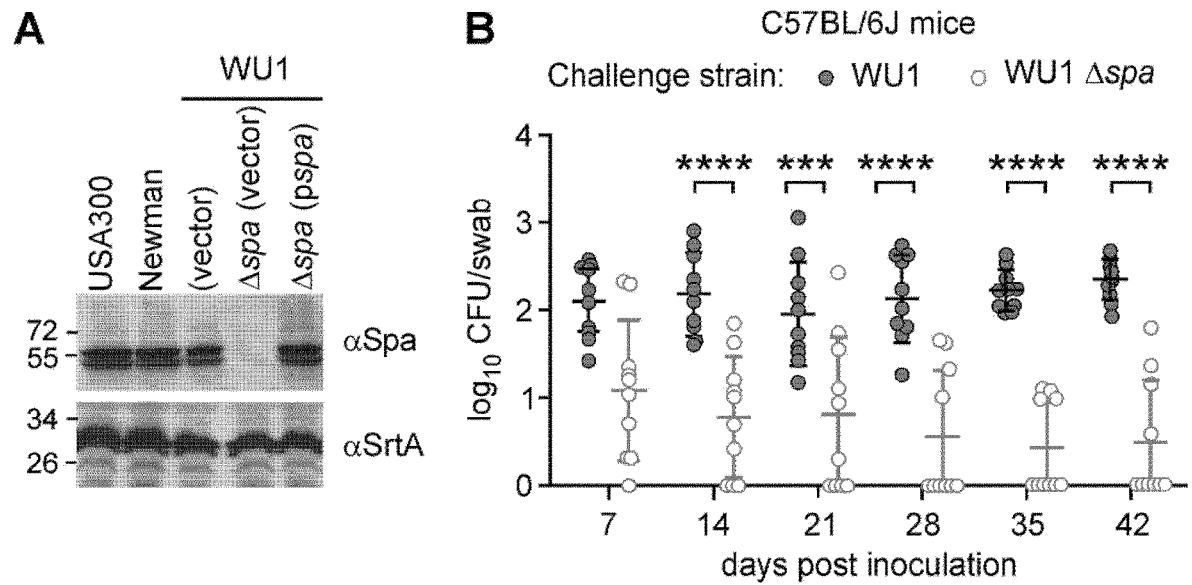
FIG. 3A-B

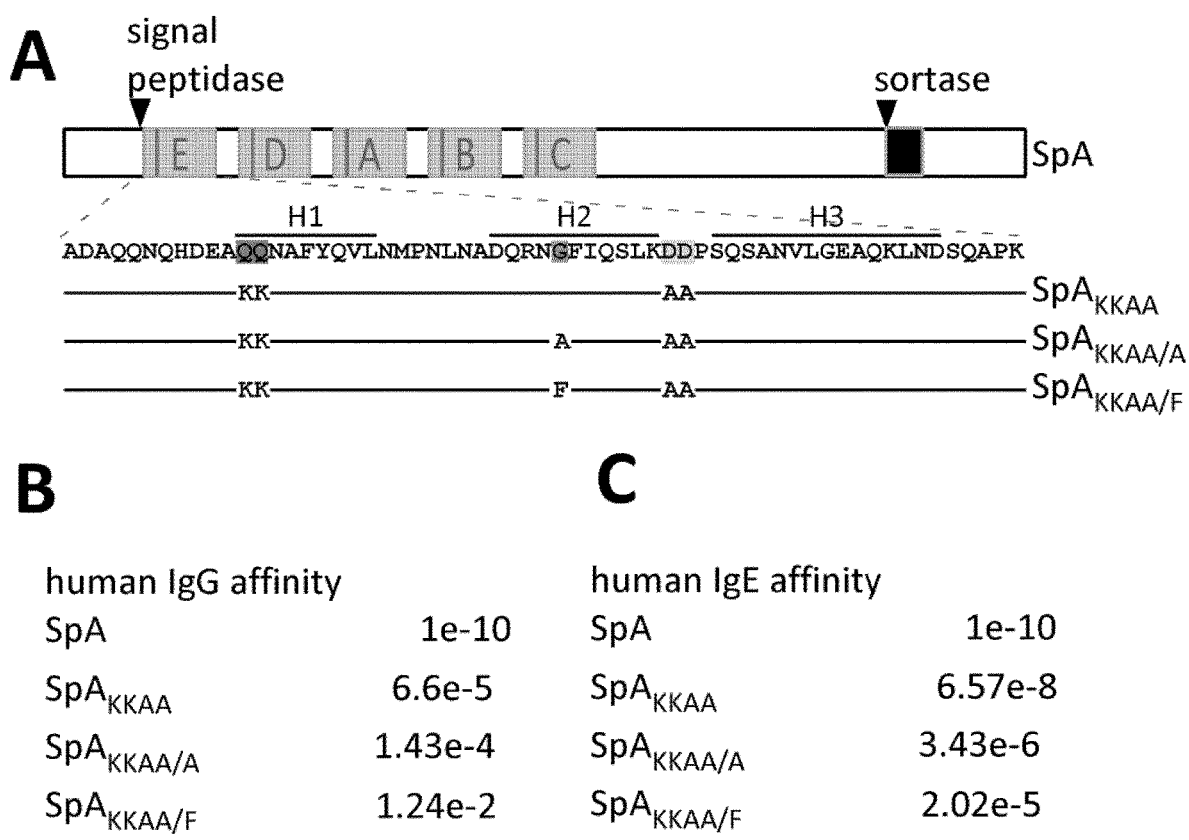
FIG. 7A-C

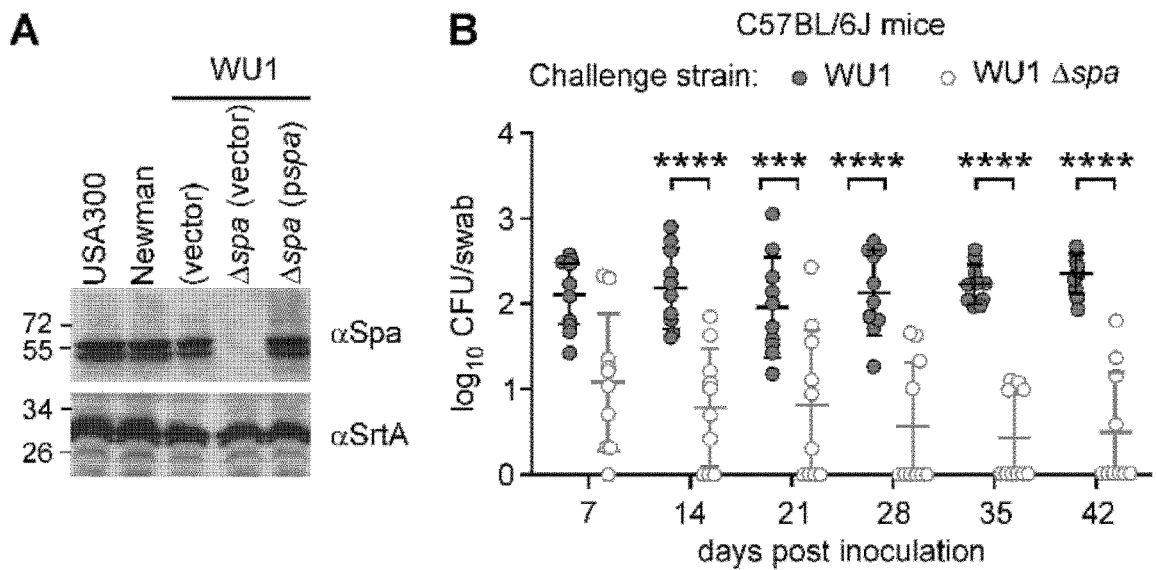
FIG. 9A-B
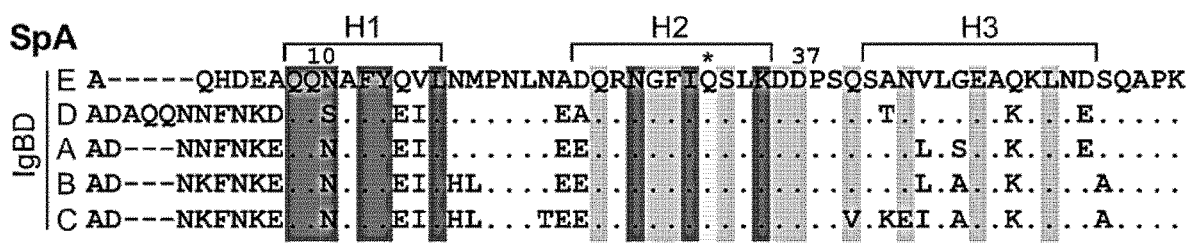
FIG. 10

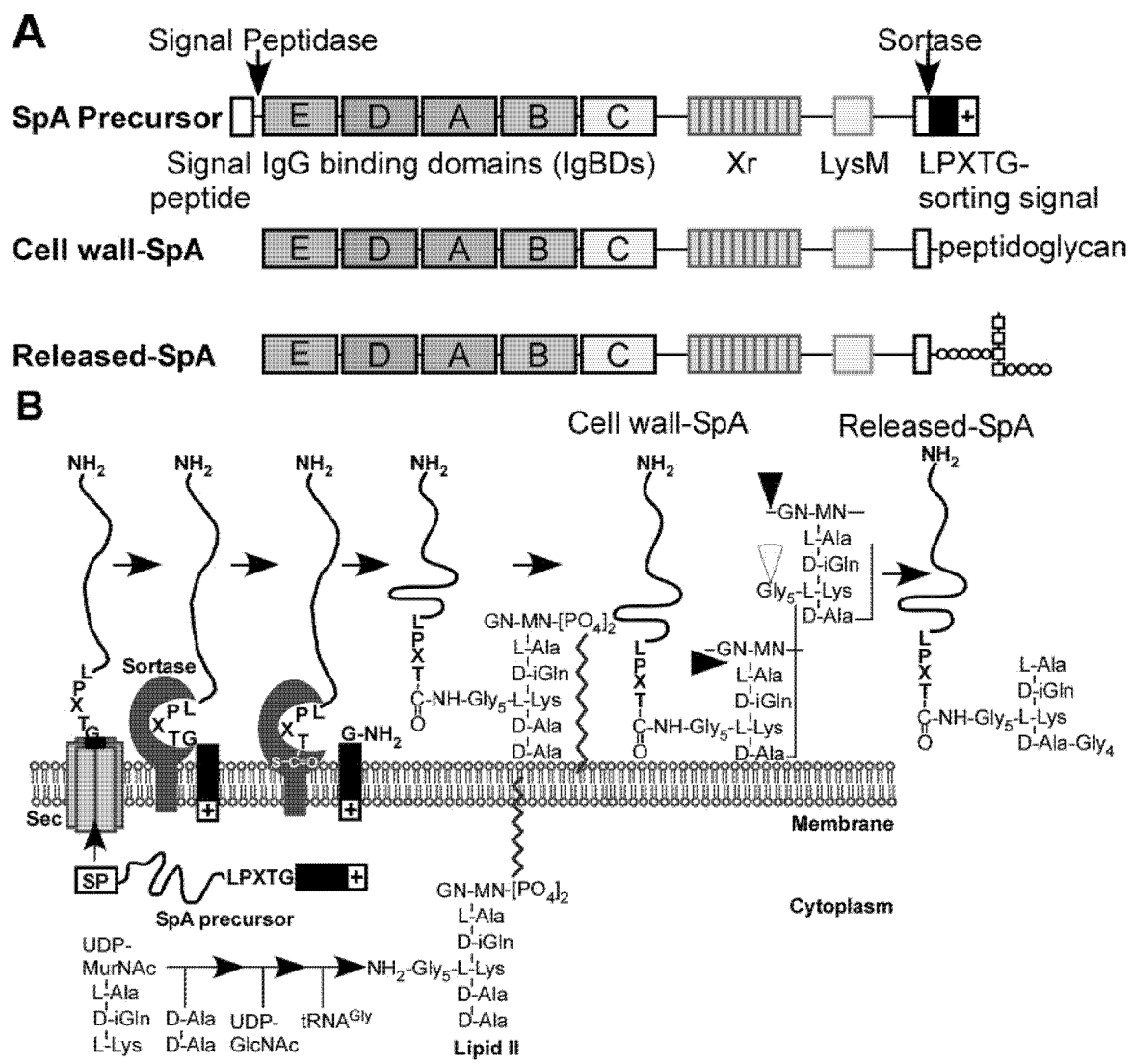
FIG. 17A-B

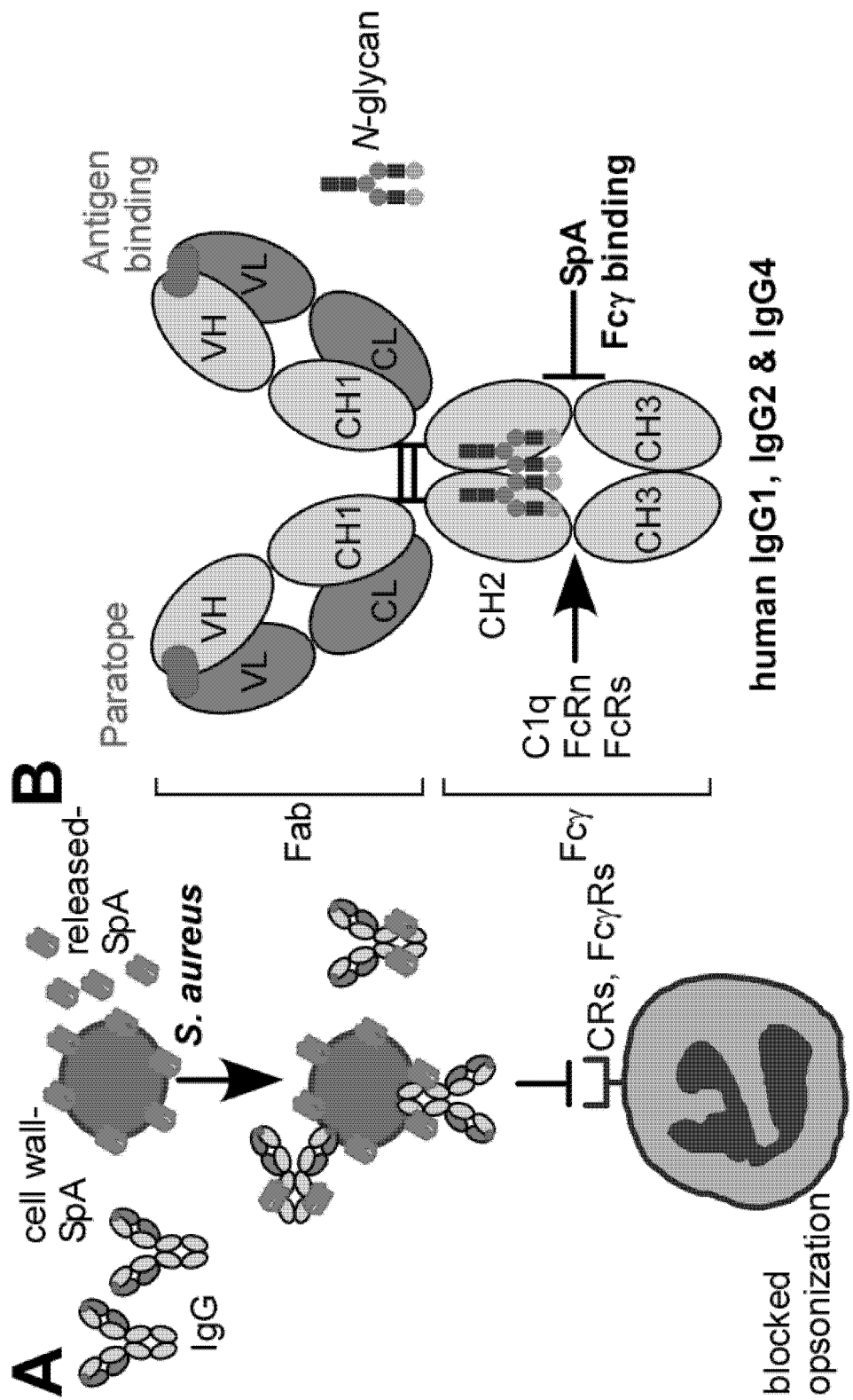
FIG. 18A-B

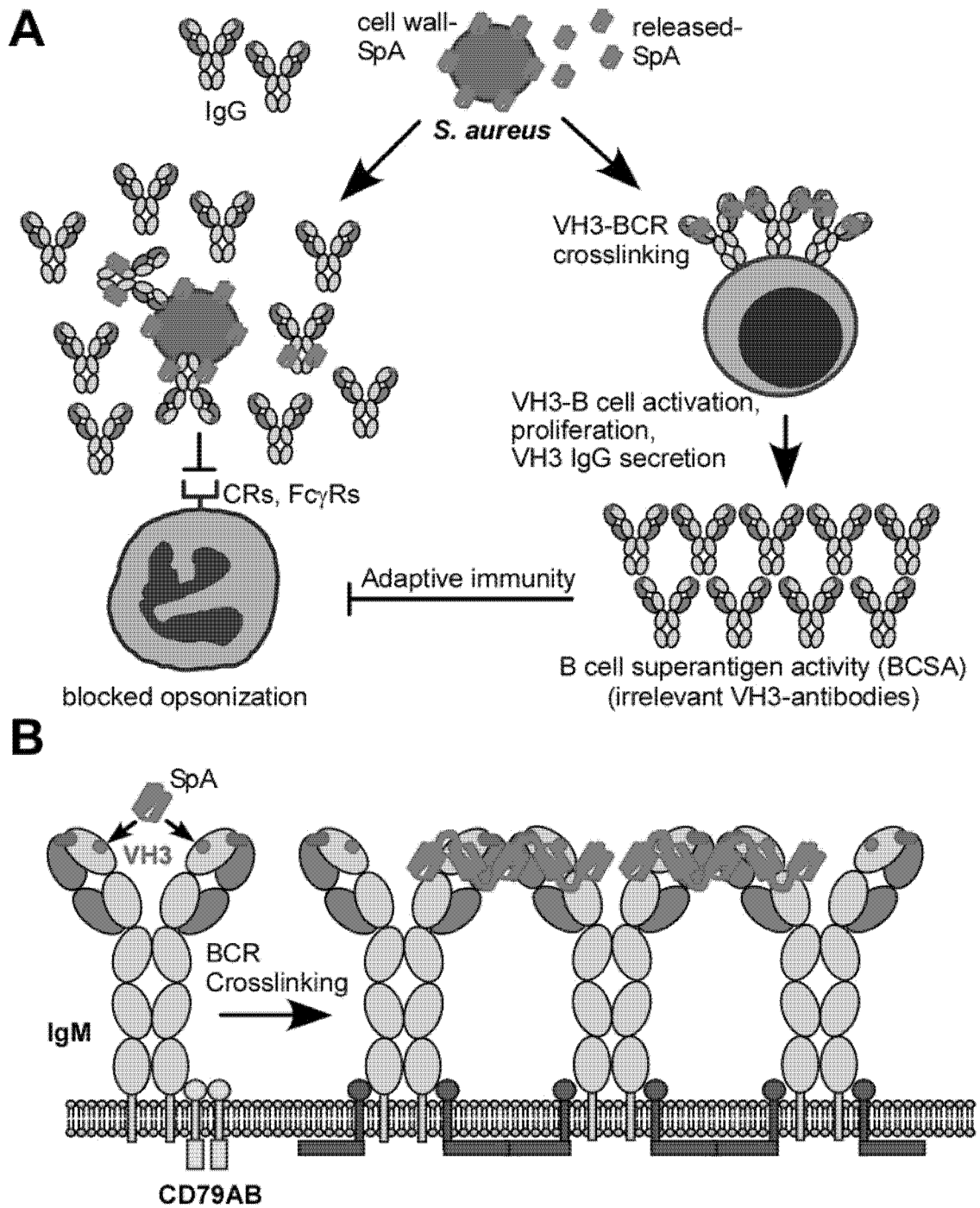
FIG. 19A-B

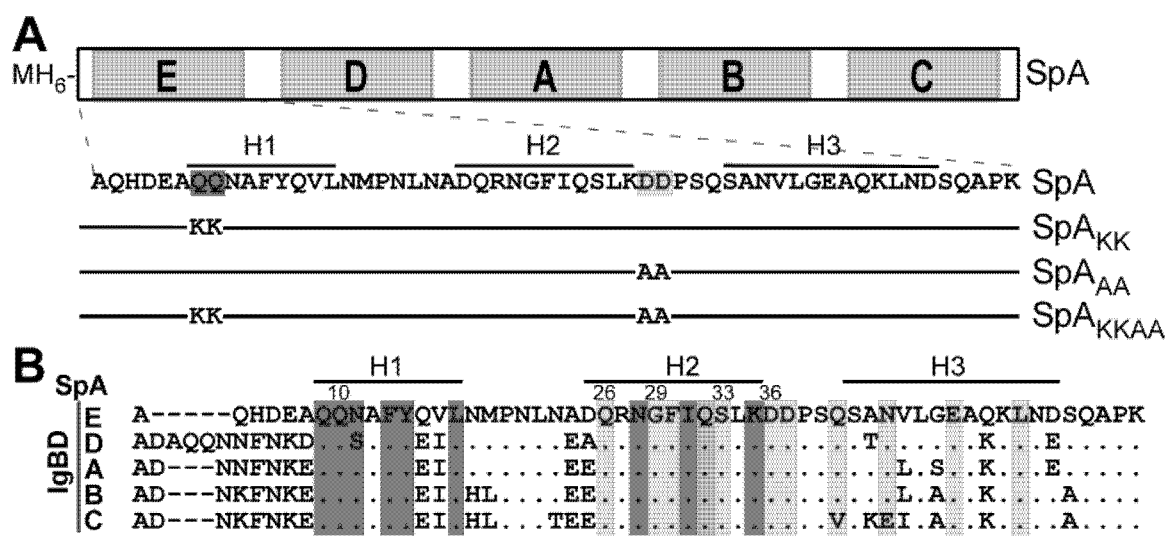
FIG. 20A-B

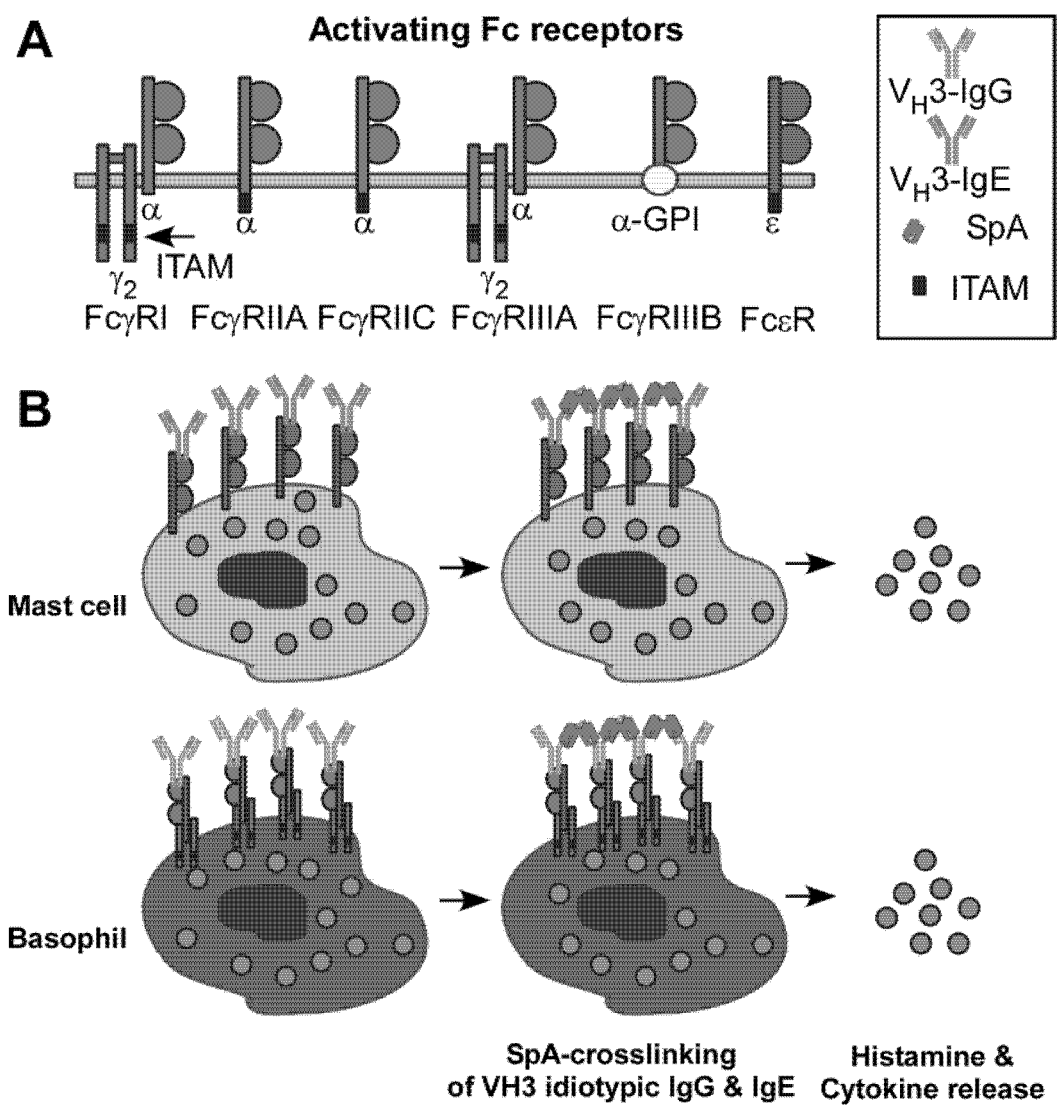
FIG. 21A-B

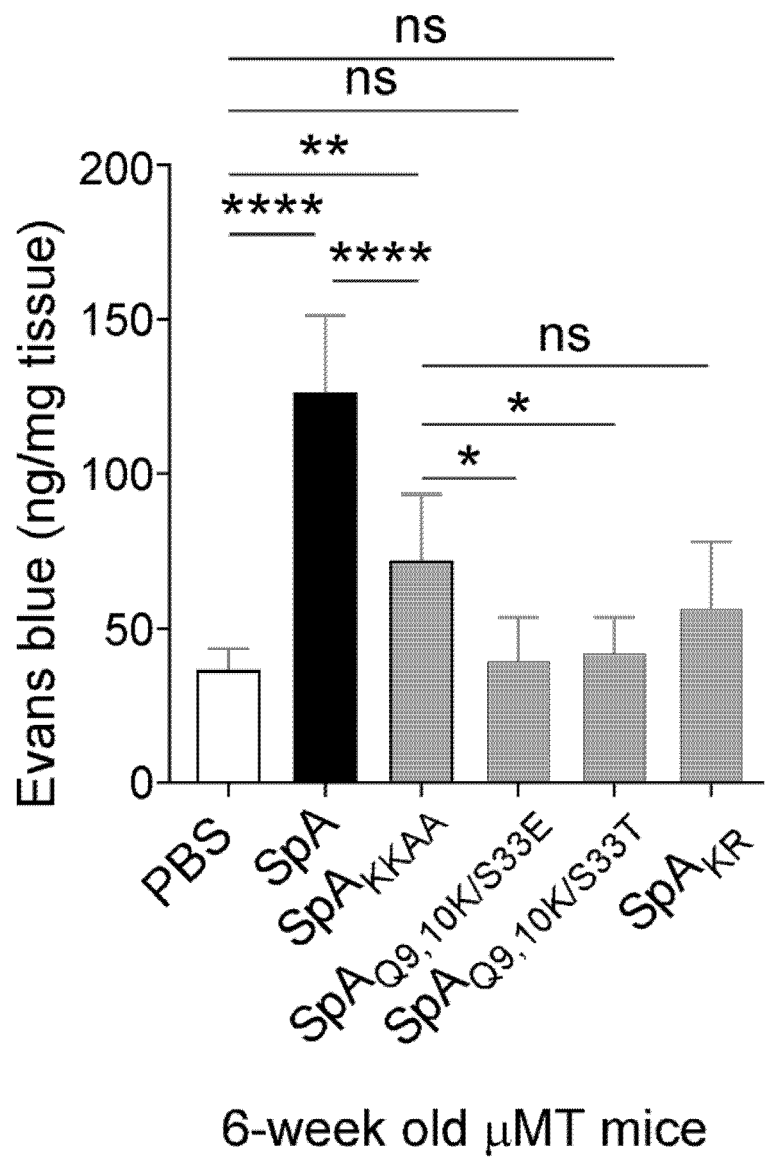
FIG. 22A-B

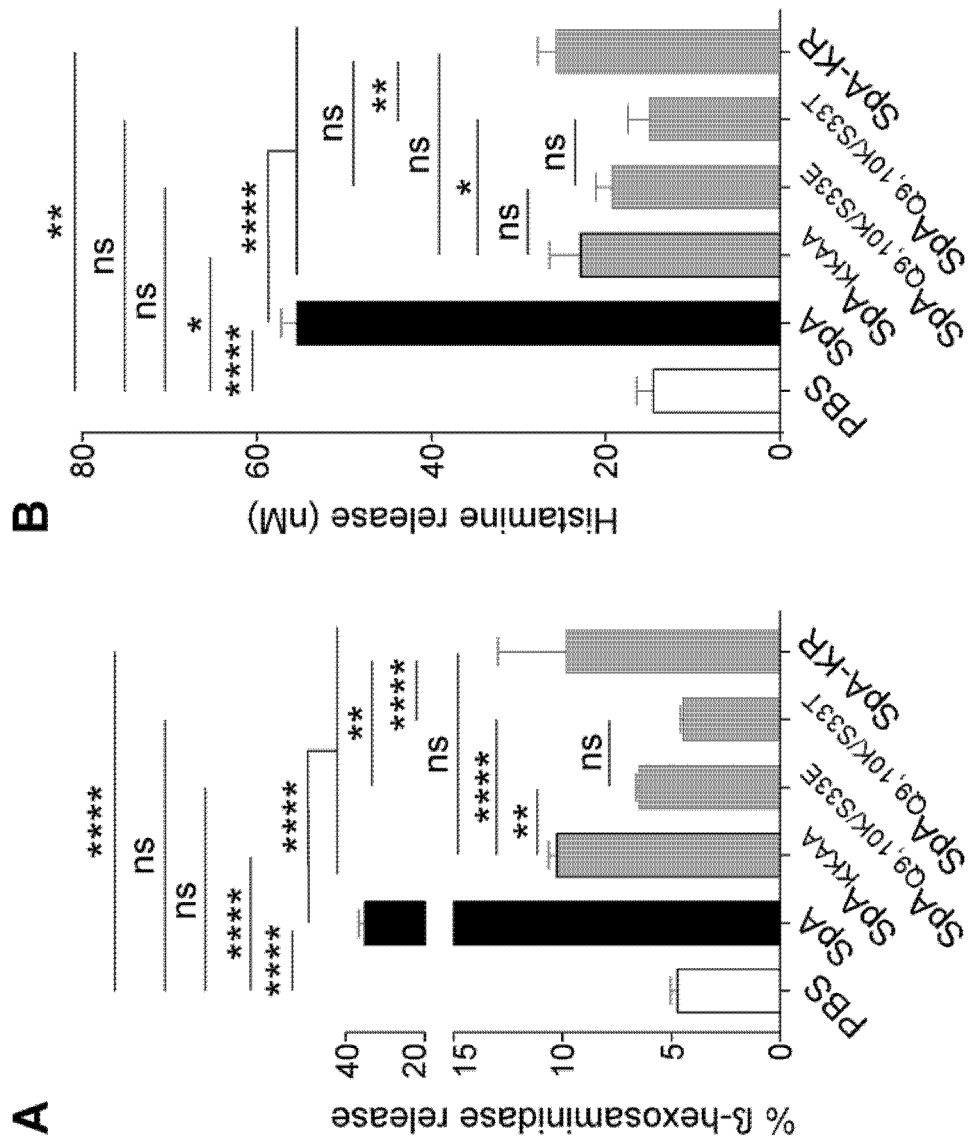
FIG. 23A-B

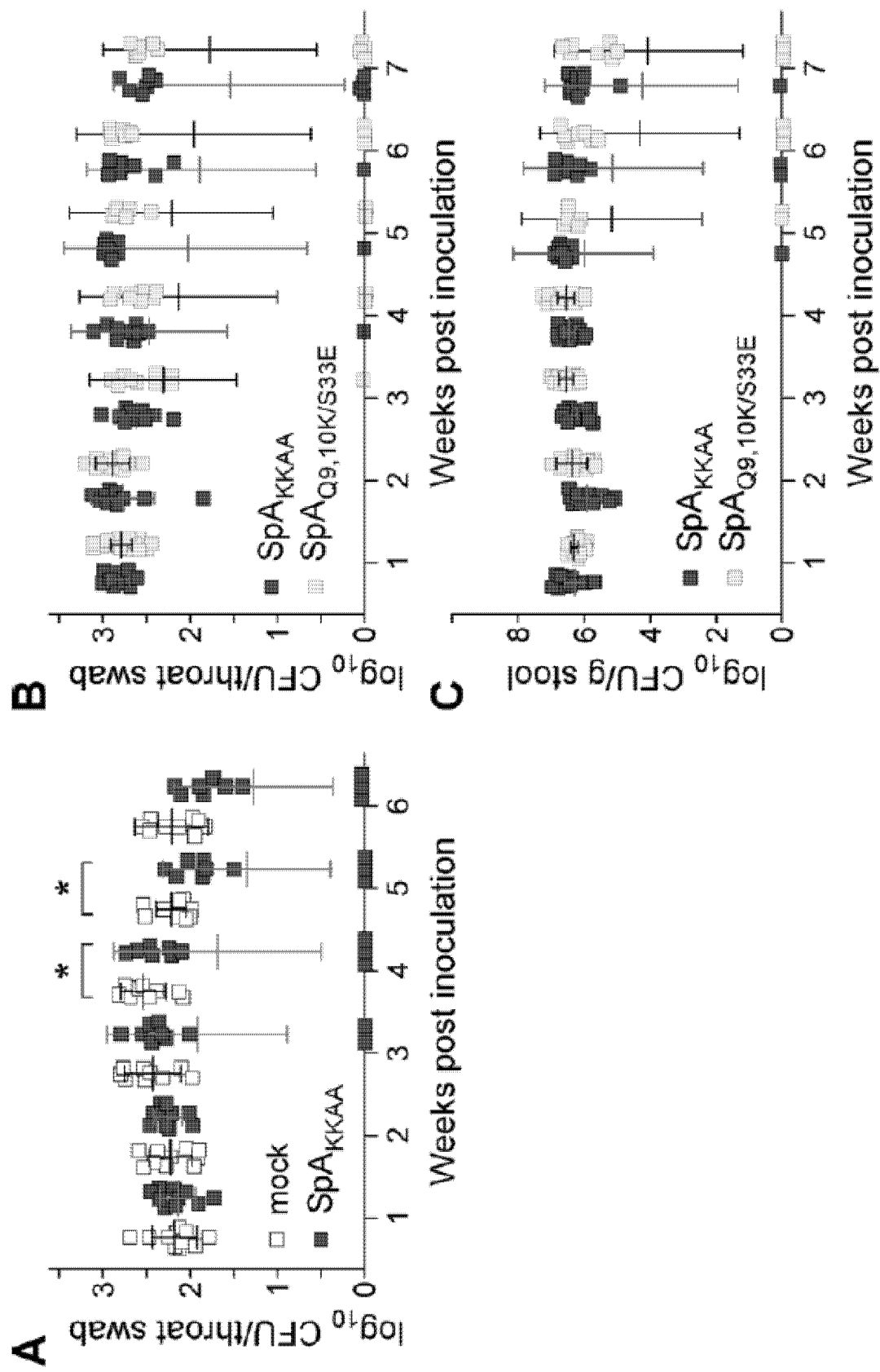
FIG. 24A-C

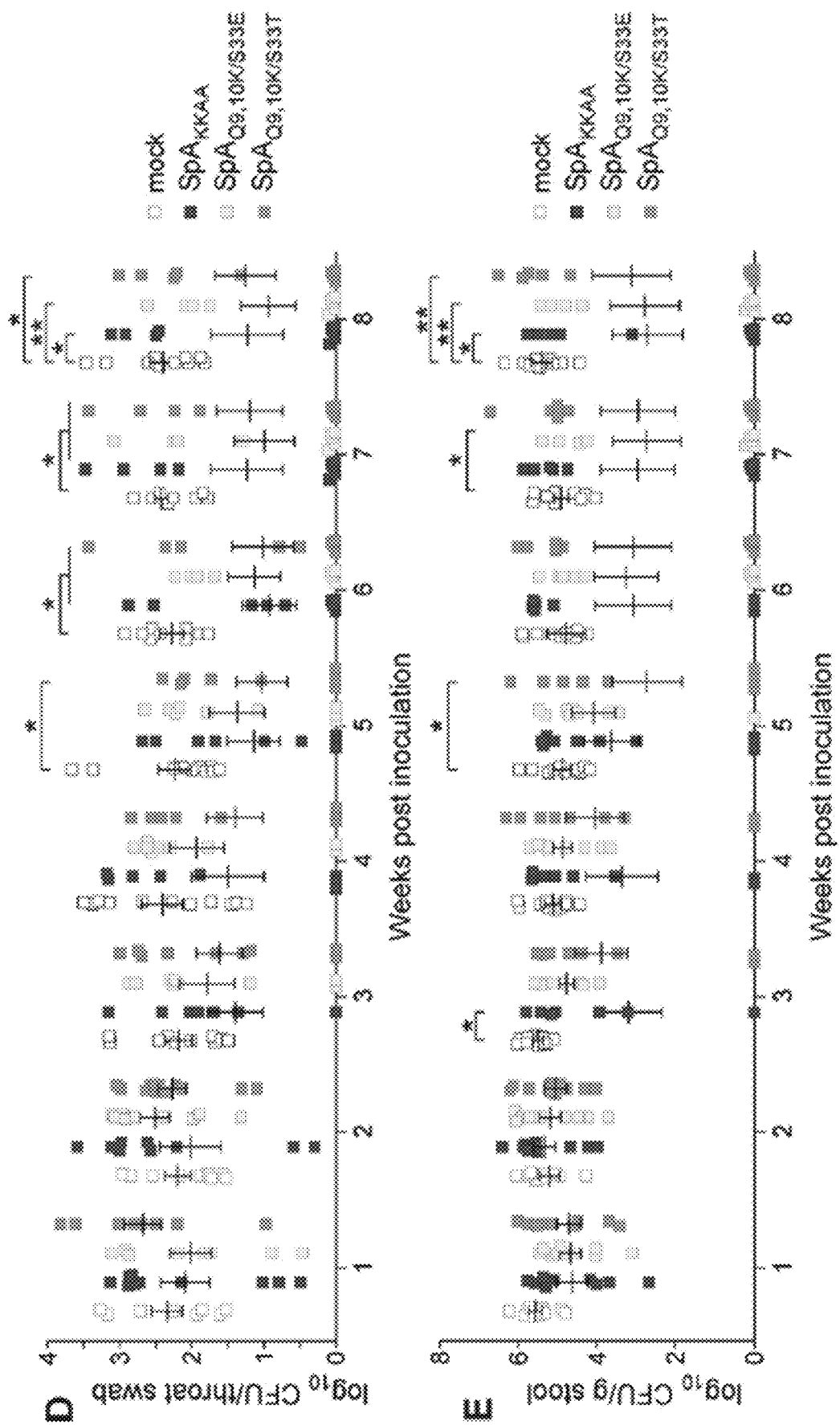
FIG. 24D-E

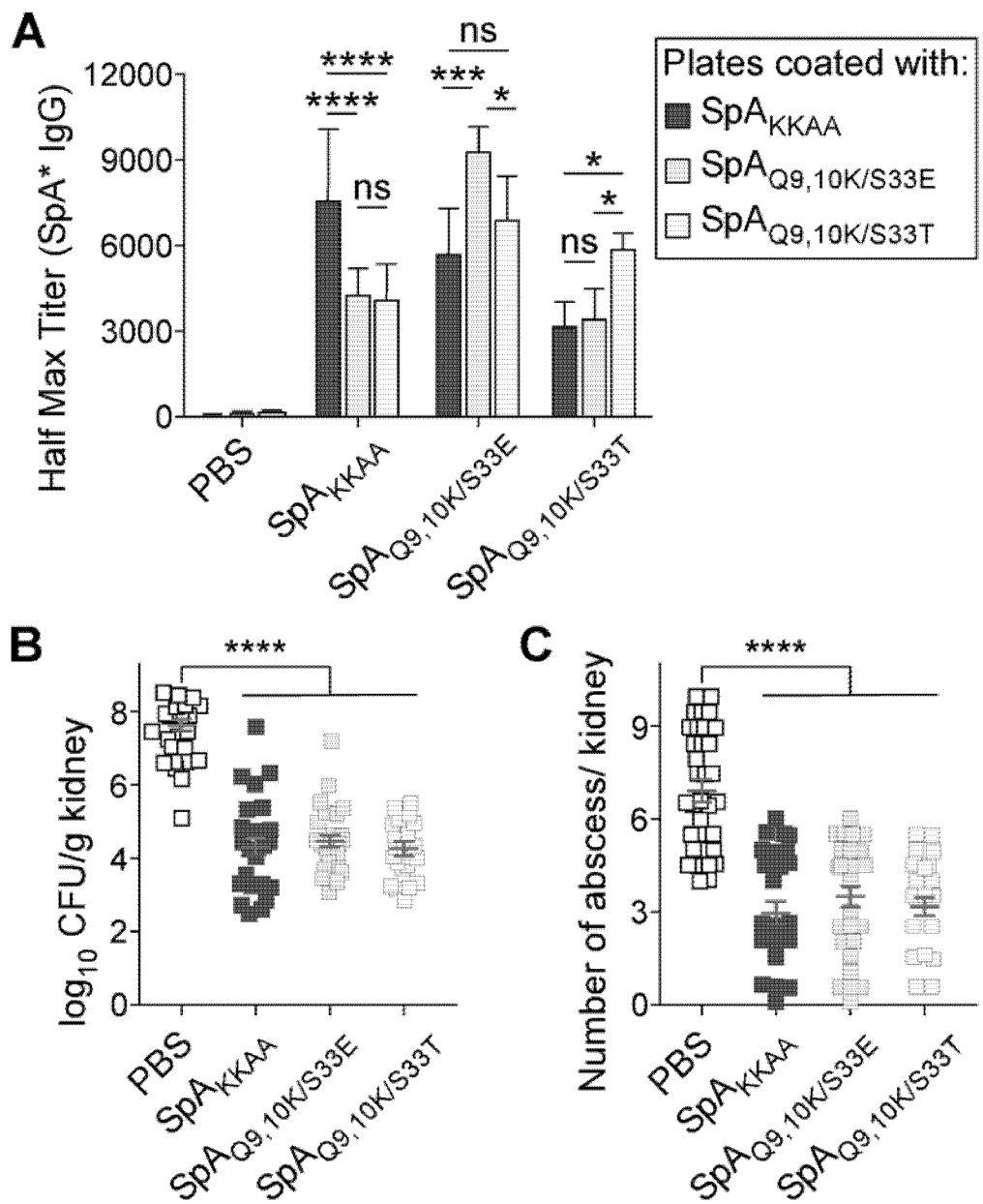
FIG. 25A-C

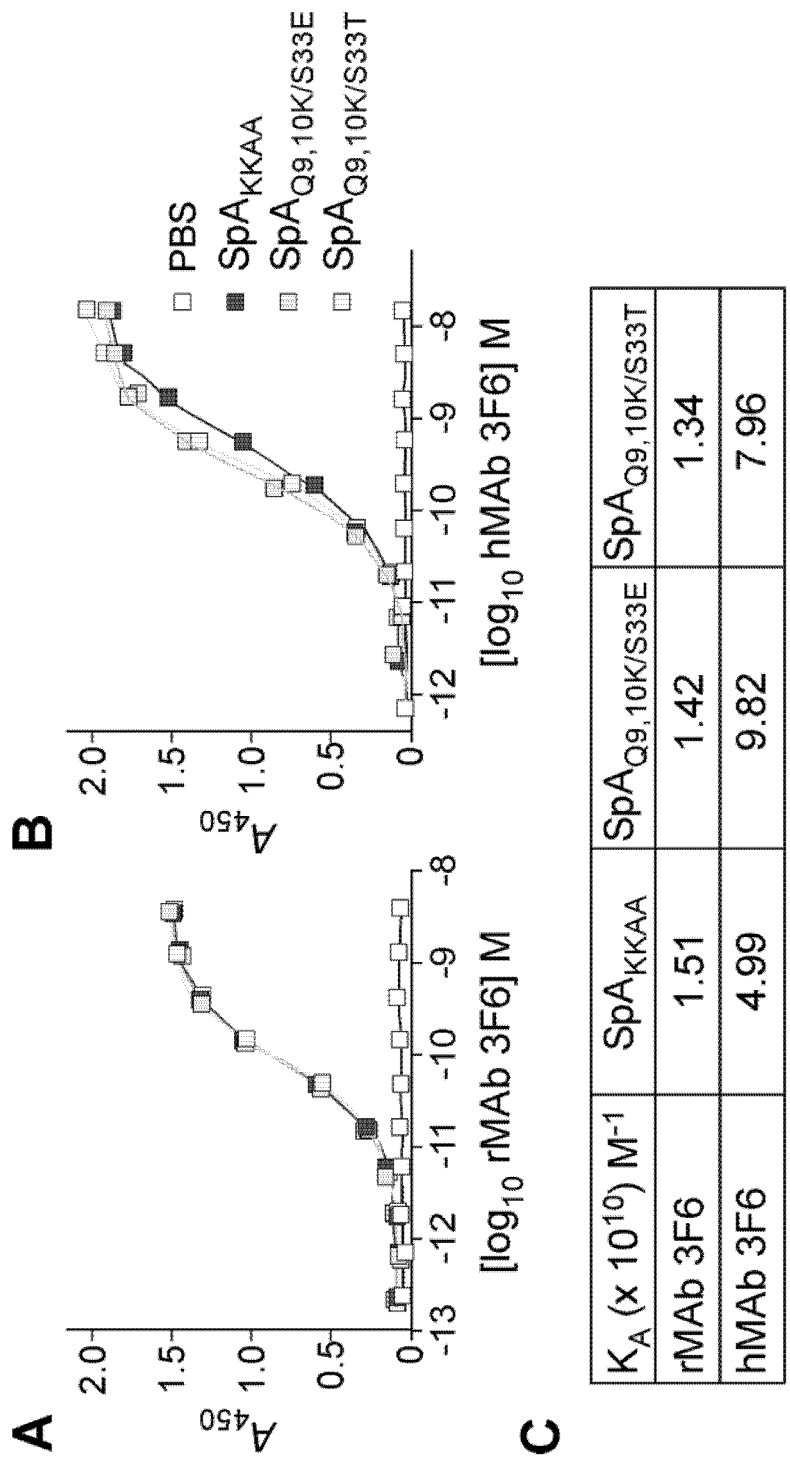
FIG. 26A-C

SEQUENCE LISTING

<160> NUMBER OF SEQ ID NOS: 60

<210> SEQ ID NO 1
<211> LENGTH: 512
<212> TYPE: PRT
<213> ORGANISM: Staphylococcus aureus

<400> SEQUENCE: 1

```
Met Leu Thr Leu Gln Ile His Thr Gly Gly Ile Asn Leu Lys Lys Lys
1               5                  10                  15

Asn Ile Tyr Ser Ile Arg Lys Leu Gly Val Gly Ile Ala Ser Val Thr
            20                  25                  30

Leu Gly Thr Leu Leu Ile Ser Gly Gly Val Thr Pro Ala Ala Asn Ala
        35                  40                  45

Ala Gln His Asp Glu Ala Gln Gln Asn Ala Phe Tyr Gln Val Leu Asn
    50                  55                  60

Met Pro Asn Leu Asn Ala Asp Gln Arg Asn Gly Phe Ile Gln Ser Leu
65                  70                  75                  80

Lys Asp Asp Pro Ser Gln Ser Ala Asn Val Leu Gly Glu Ala Gln Lys
                85                  90                  95

Leu Asn Asp Ser Gln Ala Pro Lys Ala Asp Ala Gln Gln Asn Asn Phe
            100                 105                 110
```

```
Asn Lys Asp Gln Gln Ser Ala Phe Tyr Glu Ile Leu Asn Met Pro Asn
            115                 120                 125

Leu Asn Glu Ala Gln Arg Asn Gly Phe Ile Gln Ser Leu Lys Asp Asp
        130                 135                 140

Pro Ser Gln Ser Thr Asn Val Leu Gly Glu Ala Lys Lys Leu Asn Glu
145                 150                 155                 160

Ser Gln Ala Pro Lys Ala Asp Asn Asn Phe Asn Lys Glu Gln Gln Asn
                165                 170                 175

Ala Phe Tyr Glu Ile Leu Asn Met Pro Asn Leu Asn Glu Glu Gln Arg
            180                 185                 190

Asn Gly Phe Ile Gln Ser Leu Lys Asp Asp Pro Ser Gln Ser Ala Asn
        195                 200                 205

Leu Leu Ser Glu Ala Lys Lys Leu Asn Glu Ser Gln Ala Pro Lys Ala
    210                 215                 220

Asp Asn Lys Phe Asn Lys Glu Gln Gln Asn Ala Phe Tyr Glu Ile Leu
225                 230                 235                 240

His Leu Pro Asn Leu Asn Glu Glu Gln Arg Asn Gly Phe Ile Gln Ser
                245                 250                 255

Leu Lys Asp Asp Pro Ser Gln Ser Ala Asn Leu Leu Ala Glu Ala Lys
        260                 265                 270

Lys Leu Asn Asp Ala Gln Ala Pro Lys Ala Asp Asn Lys Phe Asn Lys
    275                 280                 285

Glu Gln Gln Asn Ala Phe Tyr Glu Ile Leu His Leu Pro Asn Leu Thr
290                 295                 300

Glu Glu Gln Arg Asn Gly Phe Ile Gln Ser Leu Lys Asp Asp Pro Ser
305                 310                 315                 320

Val Ser Lys Glu Ile Leu Ala Glu Ala Lys Lys Leu Asn Asp Ala Gln
                325                 330                 335

Ala Pro Lys Glu Glu Asp Asn Asn Lys Pro Gly Lys Glu Asp Gly Asn
        340                 345                 350

Lys Pro Gly Lys Glu Asp Asn Asn Lys Pro Gly Lys Glu Asp Asn Lys
    355                 360                 365

Lys Pro Gly Lys Glu Asp Asn Asn Lys Pro Gly Lys Glu Asp Asn Asn
370                 375                 380

Lys Pro Gly Lys Glu Asp Gly Asn Lys Pro Gly Lys Glu Asp Asn Lys
385                 390                 395                 400

Lys Pro Gly Lys Glu Asp Asn Asn Lys Pro Gly Lys Glu Asp Gly Asn
                405                 410                 415

Lys Pro Gly Lys Glu Asp Gly Asn Gly Val His Val Val Lys Pro Gly
        420                 425                 430

Asp Thr Val Asn Asp Ile Ala Lys Ala Asn Gly Thr Thr Ala Asp Lys
    435                 440                 445

Ile Ala Ala Asp Asn Lys Leu Ala Asp Lys Asn Met Ile Lys Pro Gly
450                 455                 460

Gln Glu Leu Val Val Asp Lys Lys Gln Pro Ala Asn His Ala Asp Ala
465                 470                 475                 480

Asn Lys Ala Gln Ala Leu Pro Glu Thr Gly Glu Glu Asn Pro Phe Ile
                485                 490                 495

Gly Thr Thr Val Phe Gly Gly Leu Ser Leu Ala Leu Gly Ala Ala Leu
        500                 505                 510

<210> SEQ ID NO 2
<211> LENGTH: 54
<212> TYPE: PRT
```

```
<213> ORGANISM: Staphylococcus aureus

<400> SEQUENCE: 2

Gln Gln Asn Asn Phe Asn Lys Asp Gln Gln Ser Ala Phe Tyr Glu Ile
1               5                   10                  15
Leu Asn Met Pro Asn Leu Asn Glu Ala Gln Arg Asn Gly Phe Ile Gln
            20                  25                  30
Ser Leu Lys Asp Asp Pro Ser Gln Ser Thr Asn Val Leu Gly Glu Ala
        35                  40                  45
Lys Lys Leu Asn Glu Ser
        50

<210> SEQ ID NO 3
<211> LENGTH: 51
<212> TYPE: PRT
<213> ORGANISM: Staphylococcus aureus

<400> SEQUENCE: 3

Gln His Asp Glu Ala Gln Gln Asn Ala Phe Tyr Gln Val Leu Asn Met
1               5                   10                  15
Pro Asn Leu Asn Ala Asp Gln Arg Asn Gly Phe Ile Gln Ser Leu Lys
            20                  25                  30
Asp Asp Pro Ser Gln Ser Ala Asn Val Leu Gly Glu Ala Gln Lys Leu
        35                  40                  45
Asn Asp Ser
    50

<210> SEQ ID NO 4
<211> LENGTH: 52
<212> TYPE: PRT
<213> ORGANISM: Staphylococcus aureus

<400> SEQUENCE: 4

Asn Asn Phe Asn Lys Glu Gln Gln Asn Ala Phe Tyr Glu Ile Leu Asn
1               5                   10                  15
Met Pro Asn Leu Asn Glu Glu Gln Arg Asn Gly Phe Ile Gln Ser Leu
            20                  25                  30
Lys Asp Asp Pro Ser Gln Ser Ala Asn Leu Leu Ser Glu Ala Lys Lys
        35                  40                  45
Leu Asn Glu Ser
    50

<210> SEQ ID NO 5
<211> LENGTH: 52
<212> TYPE: PRT
<213> ORGANISM: Staphylococcus aureus

<400> SEQUENCE: 5

Asn Lys Phe Asn Lys Glu Gln Gln Asn Ala Phe Tyr Glu Ile Leu His
1               5                   10                  15
Leu Pro Asn Leu Thr Glu Glu Gln Arg Asn Gly Phe Ile Gln Ser Leu
            20                  25                  30
Lys Asp Asp Pro Ser Val Ser Lys Glu Ile Leu Ala Glu Ala Lys Lys
        35                  40                  45
Leu Asn Asp Ala
    50

<210> SEQ ID NO 6
<211> LENGTH: 52
```

```
<212> TYPE: PRT
<213> ORGANISM: Staphylococcus aureus

<400> SEQUENCE: 6

Asn Lys Phe Asn Lys Glu Gln Gln Asn Ala Phe Tyr Glu Ile Leu His
1               5                   10                  15

Leu Pro Asn Leu Asn Glu Glu Gln Arg Asn Gly Phe Ile Gln Ser Leu
            20                  25                  30

Lys Asp Asp Pro Ser Gln Ser Ala Asn Leu Leu Ala Glu Ala Lys Lys
        35                  40                  45

Leu Asn Asp Ala
        50

<210> SEQ ID NO 7
<211> LENGTH: 61
<212> TYPE: PRT
<213> ORGANISM: Staphylococcus aureus

<400> SEQUENCE: 7

Ala Asp Ala Gln Gln Asn Gln His Asp Glu Ala Gln Gln Asn Ala Phe
1               5                   10                  15

Tyr Gln Val Leu Asn Met Pro Asn Leu Asn Ala Asp Gln Arg Asn Gly
            20                  25                  30

Phe Ile Gln Ser Leu Lys Asp Asp Pro Ser Gln Ser Ala Asn Val Leu
        35                  40                  45

Gly Glu Ala Gln Lys Leu Asn Asp Ser Gln Ala Pro Lys
    50                  55                  60

<210> SEQ ID NO 8
<211> LENGTH: 61
<212> TYPE: PRT
<213> ORGANISM: Staphylococcus aureus

<400> SEQUENCE: 8

Ala Asp Ala Gln Gln Asn Gln His Asp Glu Ala Lys Lys Asn Ala Phe
1               5                   10                  15

Tyr Gln Val Leu Asn Met Pro Asn Leu Asn Ala Asp Gln Arg Asn Gly
            20                  25                  30

Phe Ile Gln Ser Leu Lys Ala Ala Pro Ser Gln Ser Ala Asn Val Leu
        35                  40                  45

Gly Glu Ala Gln Lys Leu Asn Asp Ser Gln Ala Pro Lys
    50                  55                  60

<210> SEQ ID NO 9
<211> LENGTH: 61
<212> TYPE: PRT
<213> ORGANISM: Staphylococcus aureus

<400> SEQUENCE: 9

Ala Asp Ala Gln Gln Asn Gln His Asp Glu Ala Lys Lys Asn Ala Phe
1               5                   10                  15

Tyr Gln Val Leu Asn Met Pro Asn Leu Asn Ala Asp Gln Arg Asn Ala
            20                  25                  30

Phe Ile Gln Ser Leu Lys Ala Ala Pro Ser Gln Ser Ala Asn Val Leu
        35                  40                  45

Gly Glu Ala Gln Lys Leu Asn Asp Ser Gln Ala Pro Lys
    50                  55                  60

<210> SEQ ID NO 10
```

```
<211> LENGTH: 61
<212> TYPE: PRT
<213> ORGANISM: Staphylococcus aureus

<400> SEQUENCE: 10

Ala Asp Ala Gln Gln Asn Gln His Asp Glu Ala Lys Lys Asn Ala Phe
1               5                   10                  15

Tyr Gln Val Leu Asn Met Pro Asn Leu Asn Ala Asp Gln Arg Asn Phe
            20                  25                  30

Phe Ile Gln Ser Leu Lys Ala Ala Pro Ser Gln Ser Ala Asn Val Leu
        35                  40                  45

Gly Glu Ala Gln Lys Leu Asn Asp Ser Gln Ala Pro Lys
    50                  55                  60

<210> SEQ ID NO 11
<211> LENGTH: 56
<212> TYPE: PRT
<213> ORGANISM: Staphylococcus aureus

<400> SEQUENCE: 11

Ala Gln His Asp Glu Ala Gln Gln Asn Ala Phe Tyr Gln Val Leu Asn
1               5                   10                  15

Met Pro Asn Leu Asn Ala Asp Gln Arg Asn Gly Phe Ile Gln Ser Leu
            20                  25                  30

Lys Asp Asp Pro Ser Gln Ser Ala Asn Val Leu Gly Glu Ala Gln Lys
        35                  40                  45

Leu Asn Asp Ser Gln Ala Pro Lys
    50                  55

<210> SEQ ID NO 12
<211> LENGTH: 61
<212> TYPE: PRT
<213> ORGANISM: Staphylococcus aureus

<400> SEQUENCE: 12

Ala Asp Ala Gln Gln Asn Asn Phe Asn Lys Asp Gln Gln Ser Ala Phe
1               5                   10                  15

Tyr Glu Ile Leu Asn Met Pro Asn Leu Asn Glu Ala Gln Arg Asn Gly
            20                  25                  30

Phe Ile Gln Ser Leu Lys Asp Asp Pro Ser Gln Ser Thr Asn Val Leu
        35                  40                  45

Gly Glu Ala Lys Lys Leu Asn Glu Ser Gln Ala Pro Lys
    50                  55                  60

<210> SEQ ID NO 13
<211> LENGTH: 58
<212> TYPE: PRT
<213> ORGANISM: Staphylococcus aureus

<400> SEQUENCE: 13

Ala Asp Asn Asn Phe Asn Lys Glu Gln Gln Asn Ala Phe Tyr Glu Ile
1               5                   10                  15

Leu Asn Met Pro Asn Leu Asn Glu Glu Gln Arg Asn Gly Phe Ile Gln
            20                  25                  30

Ser Leu Lys Asp Asp Pro Ser Gln Ser Ala Asn Leu Leu Ser Glu Ala
        35                  40                  45

Lys Lys Leu Asn Glu Ser Gln Ala Pro Lys
    50                  55
```

```
<210> SEQ ID NO 14
<211> LENGTH: 58
<212> TYPE: PRT
<213> ORGANISM: Staphylococcus aureus

<400> SEQUENCE: 14

Ala Asp Asn Lys Phe Asn Lys Glu Gln Gln Asn Ala Phe Tyr Glu Ile
1               5                   10                  15

Leu His Leu Pro Asn Leu Asn Glu Glu Gln Arg Asn Gly Phe Ile Gln
            20                  25                  30

Ser Leu Lys Asp Asp Pro Ser Gln Ser Ala Asn Leu Leu Ala Glu Ala
        35                  40                  45

Lys Lys Leu Asn Asp Ala Gln Ala Pro Lys
    50                  55

<210> SEQ ID NO 15
<211> LENGTH: 58
<212> TYPE: PRT
<213> ORGANISM: Staphylococcus aureus

<400> SEQUENCE: 15

Ala Asp Asn Lys Phe Asn Lys Glu Gln Gln Asn Ala Phe Tyr Glu Ile
1               5                   10                  15

Leu His Leu Pro Asn Leu Thr Glu Glu Gln Arg Asn Gly Phe Ile Gln
            20                  25                  30

Ser Leu Lys Asp Asp Pro Ser Val Ser Lys Glu Ile Leu Ala Glu Ala
        35                  40                  45

Lys Lys Leu Asn Asp Ala Gln Ala Pro Lys
    50                  55

<210> SEQ ID NO 16
<211> LENGTH: 61
<212> TYPE: PRT
<213> ORGANISM: Staphylococcus aureus

<400> SEQUENCE: 16

Ala Asp Ala Gln Gln Asn Asn Phe Asn Lys Asp Gln Gln Ser Ala Phe
1               5                   10                  15

Tyr Glu Ile Leu Asn Met Pro Asn Leu Asn Glu Ala Gln Arg Asn Gly
            20                  25                  30

Phe Ile Gln Ser Leu Lys Asp Asp Pro Ser Gln Ser Thr Asn Val Leu
        35                  40                  45

Gly Glu Ala Lys Lys Leu Asn Glu Ser Gln Ala Pro Lys
    50                  55                  60

<210> SEQ ID NO 17
<211> LENGTH: 61
<212> TYPE: PRT
<213> ORGANISM: Staphylococcus aureus

<400> SEQUENCE: 17

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Ala
            20                  25                  30

Phe Ile Gln Ser Leu Lys Asp Asp Pro Ser Gln Ser Thr Asn Val Leu
        35                  40                  45

Gly Glu Ala Lys Lys Leu Asn Glu Ser Gln Ala Pro Lys
    50                  55                  60
```

<210> SEQ ID NO 18
<211> LENGTH: 61
<212> TYPE: PRT
<213> ORGANISM: Staphylococcus aureus

<400> SEQUENCE: 18

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Leu
            20                  25                  30

Phe Ile Gln Ser Leu Lys Asp Asp Pro Ser Gln Ser Thr Asn Val Leu
        35                  40                  45

Gly Glu Ala Lys Lys Leu Asn Glu Ser Gln Ala Pro Lys
    50                  55                  60

<210> SEQ ID NO 19
<211> LENGTH: 61
<212> TYPE: PRT
<213> ORGANISM: Staphylococcus aureus

<400> SEQUENCE: 19

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Pro
            20                  25                  30

Phe Ile Gln Ser Leu Lys Asp Asp Pro Ser Gln Ser Thr Asn Val Leu
        35                  40                  45

Gly Glu Ala Lys Lys Leu Asn Glu Ser Gln Ala Pro Lys
    50                  55                  60

<210> SEQ ID NO 20
<211> LENGTH: 61
<212> TYPE: PRT
<213> ORGANISM: Staphylococcus aureus

<400> SEQUENCE: 20

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Phe
            20                  25                  30

Phe Ile Gln Ser Leu Lys Asp Asp Pro Ser Gln Ser Thr Asn Val Leu
        35                  40                  45

Gly Glu Ala Lys Lys Leu Asn Glu Ser Gln Ala Pro Lys
    50                  55                  60

<210> SEQ ID NO 21
<211> LENGTH: 61
<212> TYPE: PRT
<213> ORGANISM: Staphylococcus aureus

<400> SEQUENCE: 21

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Glu
            20                  25                  30

Phe Ile Gln Ser Leu Lys Asp Asp Pro Ser Gln Ser Thr Asn Val Leu
        35                  40                  45

Gly Glu Ala Lys Lys Leu Asn Glu Ser Gln Ala Pro Lys
    50                  55                  60

<210> SEQ ID NO 22
<211> LENGTH: 61
<212> TYPE: PRT
<213> ORGANISM: Staphylococcus aureus

<400> SEQUENCE: 22

Ala Asp Ala Gln Gln Asn Asn Phe Asn Lys Asp Lys Ser Ala Phe
1               5                   10                  15

Tyr Glu Ile Leu Asn Met Pro Asn Leu Asn Glu Ala Gln Arg Asn Arg
                20                  25                  30

Phe Ile Gln Ser Leu Lys Asp Asp Pro Ser Gln Ser Thr Asn Val Leu
            35                  40                  45

Gly Glu Ala Lys Lys Leu Asn Glu Ser Gln Ala Pro Lys
    50                  55                  60

<210> SEQ ID NO 23
<211> LENGTH: 61
<212> TYPE: PRT
<213> ORGANISM: Staphylococcus aureus

<400> SEQUENCE: 23

Ala Asp Ala Gln Gln Asn Asn Phe Asn Lys Asp Lys Ser Ala Phe
1               5                   10                  15

Tyr Glu Ile Leu Asn Met Pro Asn Leu Asn Glu Ala Gln Arg Asn Lys
                20                  25                  30

Phe Ile Gln Ser Leu Lys Asp Asp Pro Ser Gln Ser Thr Asn Val Leu
            35                  40                  45

Gly Glu Ala Lys Lys Leu Asn Glu Ser Gln Ala Pro Lys
    50                  55                  60

<210> SEQ ID NO 24
<211> LENGTH: 61
<212> TYPE: PRT
<213> ORGANISM: Staphylococcus aureus

<400> SEQUENCE: 24

Ala Asp Ala Gln Gln Asn Asn Phe Asn Lys Asp Lys Ser Ala Phe
1               5                   10                  15

Tyr Glu Ile Leu Asn Met Pro Asn Leu Asn Glu Ala Gln Arg Asn Ser
                20                  25                  30

Phe Ile Gln Ser Leu Lys Asp Asp Pro Ser Gln Ser Thr Asn Val Leu
            35                  40                  45

Gly Glu Ala Lys Lys Leu Asn Glu Ser Gln Ala Pro Lys
    50                  55                  60

<210> SEQ ID NO 25
<211> LENGTH: 61
<212> TYPE: PRT
<213> ORGANISM: Staphylococcus aureus

<400> SEQUENCE: 25

Ala Asp Ala Gln Gln Asn Asn Phe Asn Lys Asp Lys Ser Ala Phe
1               5                   10                  15

Tyr Glu Ile Leu Asn Met Pro Asn Leu Asn Glu Ala Gln Arg Asn Thr
                20                  25                  30

Phe Ile Gln Ser Leu Lys Asp Asp Pro Ser Gln Ser Thr Asn Val Leu
            35                  40                  45

Gly Glu Ala Lys Lys Leu Asn Glu Ser Gln Ala Pro Lys 50 55 60

<210> SEQ ID NO 26
<211> LENGTH: 61
<212> TYPE: PRT
<213> ORGANISM: Staphylococcus aureus

<400> SEQUENCE: 26

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Gln
            20                  25                  30

Phe Ile Gln Ser Leu Lys Asp Asp Pro Ser Gln Ser Thr Asn Val Leu
        35                  40                  45

Gly Glu Ala Lys Lys Leu Asn Glu Ser Gln Ala Pro Lys
50                  55                  60

<210> SEQ ID NO 27
<211> LENGTH: 61
<212> TYPE: PRT
<213> ORGANISM: Staphylococcus aureus

<400> SEQUENCE: 27

Ala Asp Ala Gln Gln Asn Asn Phe Asn Lys Asp Gln Gln Ser Ala Phe
1               5                   10                  15

Tyr Glu Ile Leu Asn Met Pro Asn Leu Asn Glu Ala Gln Arg Asn Gly
            20                  25                  30

Phe Ile Gln Ser Leu Lys Asp Asp Pro Ser Gln Ser Thr Asn Val Leu
        35                  40                  45

Gly Glu Ala Lys Lys Leu Asn Glu Ser Gln Ala Pro Lys
50                  55                  60

<210> SEQ ID NO 28
<211> LENGTH: 61
<212> TYPE: PRT
<213> ORGANISM: Staphylococcus aureus

<400> SEQUENCE: 28

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Gly
            20                  25                  30

Phe Ile Gln Ala Leu Lys Asp Asp Pro Ser Gln Ser Thr Asn Val Leu
        35                  40                  45

Gly Glu Ala Lys Lys Leu Asn Glu Ser Gln Ala Pro Lys
50                  55                  60

<210> SEQ ID NO 29
<211> LENGTH: 61
<212> TYPE: PRT
<213> ORGANISM: Staphylococcus aureus

<400> SEQUENCE: 29

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Gly
            20                  25                  30

Phe Ile Gln Phe Leu Lys Asp Asp Pro Ser Gln Ser Thr Asn Val Leu
        35                  40                  45

Gly Glu Ala Lys Lys Leu Asn Glu Ser Gln Ala Pro Lys
            50                  55                  60

<210> SEQ ID NO 30
<211> LENGTH: 61
<212> TYPE: PRT
<213> ORGANISM: Staphylococcus aureus

<400> SEQUENCE: 30

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Gly
            20                  25                  30

Phe Ile Gln Glu Leu Lys Asp Asp Pro Ser Gln Ser Thr Asn Val Leu
        35                  40                  45

Gly Glu Ala Lys Lys Leu Asn Glu Ser Gln Ala Pro Lys
            50                  55                  60

<210> SEQ ID NO 31
<211> LENGTH: 61
<212> TYPE: PRT
<213> ORGANISM: Staphylococcus aureus

<400> SEQUENCE: 31

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Gly
            20                  25                  30

Phe Ile Gln Lys Leu Lys Asp Asp Pro Ser Gln Ser Thr Asn Val Leu
        35                  40                  45

Gly Glu Ala Lys Lys Leu Asn Glu Ser Gln Ala Pro Lys
            50                  55                  60

<210> SEQ ID NO 32
<211> LENGTH: 61
<212> TYPE: PRT
<213> ORGANISM: Staphylococcus aureus

<400> SEQUENCE: 32

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Gly
            20                  25                  30

Phe Ile Gln Gln Leu Lys Asp Asp Pro Ser Gln Ser Thr Asn Val Leu
        35                  40                  45

Gly Glu Ala Lys Lys Leu Asn Glu Ser Gln Ala Pro Lys
            50                  55                  60

<210> SEQ ID NO 33
<211> LENGTH: 61
<212> TYPE: PRT
<213> ORGANISM: Staphylococcus aureus

<400> SEQUENCE: 33

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Gly
            20                  25                  30

Phe Ile Gln Ala Leu Lys Ala Ala Pro Ser Gln Ser Thr Asn Val Leu
        35                  40                  45

Gly Glu Ala Lys Lys Leu Asn Glu Ser Gln Ala Pro Lys
            50                  55                  60

<210> SEQ ID NO 34
<211> LENGTH: 61
<212> TYPE: PRT
<213> ORGANISM: Staphylococcus aureus

<400> SEQUENCE: 34

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Gly
            20                  25                  30

Phe Ile Gln Phe Leu Lys Ala Ala Pro Ser Gln Ser Thr Asn Val Leu
        35                  40                  45

Gly Glu Ala Lys Lys Leu Asn Glu Ser Gln Ala Pro Lys
    50                  55                  60

<210> SEQ ID NO 35
<211> LENGTH: 61
<212> TYPE: PRT
<213> ORGANISM: Staphylococcus aureus

<400> SEQUENCE: 35

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Gly
            20                  25                  30

Phe Ile Gln Glu Leu Lys Ala Ala Pro Ser Gln Ser Thr Asn Val Leu
        35                  40                  45

Gly Glu Ala Lys Lys Leu Asn Glu Ser Gln Ala Pro Lys
    50                  55                  60

<210> SEQ ID NO 36
<211> LENGTH: 61
<212> TYPE: PRT
<213> ORGANISM: Staphylococcus aureus

<400> SEQUENCE: 36

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Gly
            20                  25                  30

Phe Ile Gln Lys Leu Lys Ala Ala Pro Ser Gln Ser Thr Asn Val Leu
        35                  40                  45

Gly Glu Ala Lys Lys Leu Asn Glu Ser Gln Ala Pro Lys
    50                  55                  60

<210> SEQ ID NO 37
<211> LENGTH: 61
<212> TYPE: PRT
<213> ORGANISM: Staphylococcus aureus

<400> SEQUENCE: 37

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Gly
            20                  25                  30

Phe Ile Gln Gln Leu Lys Ala Ala Pro Ser Gln Ser Thr Asn Val Leu 35                  40                  45

Gly Glu Ala Lys Lys Leu Asn Glu Ser Gln Ala Pro Lys
 50                  55                  60

<210> SEQ ID NO 38
<211> LENGTH: 61
<212> TYPE: PRT
<213> ORGANISM: Staphylococcus aureus

<400> SEQUENCE: 38

Ala Asp Ala Gln Gln Asn Asn Phe Asn Lys Asp Gln Gln Ser Ala Phe
 1               5                  10                  15

Tyr Glu Ile Leu Asn Met Pro Asn Leu Asn Glu Ala Gln Arg Asn Gly
                20                  25                  30

Phe Ile Gln Ser Leu Lys Asp Asp Pro Ser Gln Ser Thr Asn Val Leu
            35                  40                  45

Gly Glu Ala Lys Lys Leu Asn Glu Ser Gln Ala Pro Lys
 50                  55                  60

<210> SEQ ID NO 39
<211> LENGTH: 61
<212> TYPE: PRT
<213> ORGANISM: Staphylococcus aureus

<400> SEQUENCE: 39

Ala Asp Ala Gln Gln Asn Asn Phe Asn Lys Asp Lys Lys Ser Ala Phe
 1               5                  10                  15

Tyr Glu Ile Leu Asn Met Pro Asn Leu Asn Glu Ala Gln Arg Asn Ala
                20                  25                  30

Phe Ile Gln Phe Leu Lys Asp Asp Pro Ser Gln Ser Thr Asn Val Leu
            35                  40                  45

Gly Glu Ala Lys Lys Leu Asn Glu Ser Gln Ala Pro Lys
 50                  55                  60

<210> SEQ ID NO 40
<211> LENGTH: 61
<212> TYPE: PRT
<213> ORGANISM: Staphylococcus aureus

<400> SEQUENCE: 40

Ala Asp Ala Gln Gln Asn Asn Phe Asn Lys Asp Lys Lys Ser Ala Phe
 1               5                  10                  15

Tyr Glu Ile Leu Asn Met Pro Asn Leu Asn Glu Ala Gln Arg Asn Ala
                20                  25                  30

Phe Ile Gln Glu Leu Lys Asp Asp Pro Ser Gln Ser Thr Asn Val Leu
            35                  40                  45

Gly Glu Ala Lys Lys Leu Asn Glu Ser Gln Ala Pro Lys
 50                  55                  60

<210> SEQ ID NO 41
<211> LENGTH: 61
<212> TYPE: PRT
<213> ORGANISM: Staphylococcus aureus

<400> SEQUENCE: 41

Ala Asp Ala Gln Gln Asn Asn Phe Asn Lys Asp Lys Lys Ser Ala Phe
 1               5                  10                  15

Tyr Glu Ile Leu Asn Met Pro Asn Leu Asn Glu Ala Gln Arg Asn Ala
                20                  25                  30

Phe Ile Gln Gln Leu Lys Asp Asp Pro Ser Gln Ser Thr Asn Val Leu
            35                  40                  45

Gly Glu Ala Lys Lys Leu Asn Glu Ser Gln Ala Pro Lys
        50                  55                  60

<210> SEQ ID NO 42
<211> LENGTH: 61
<212> TYPE: PRT
<213> ORGANISM: Staphylococcus aureus

<400> SEQUENCE: 42

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Phe
            20                  25                  30

Phe Ile Gln Phe Leu Lys Asp Asp Pro Ser Gln Ser Thr Asn Val Leu
            35                  40                  45

Gly Glu Ala Lys Lys Leu Asn Glu Ser Gln Ala Pro Lys
        50                  55                  60

<210> SEQ ID NO 43
<211> LENGTH: 61
<212> TYPE: PRT
<213> ORGANISM: Staphylococcus aureus

<400> SEQUENCE: 43

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Phe
            20                  25                  30

Phe Ile Gln Glu Leu Lys Asp Asp Pro Ser Gln Ser Thr Asn Val Leu
            35                  40                  45

Gly Glu Ala Lys Lys Leu Asn Glu Ser Gln Ala Pro Lys
        50                  55                  60

<210> SEQ ID NO 44
<211> LENGTH: 61
<212> TYPE: PRT
<213> ORGANISM: Staphylococcus aureus

<400> SEQUENCE: 44

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Phe
            20                  25                  30

Phe Ile Gln Gln Leu Lys Asp Asp Pro Ser Gln Ser Thr Asn Val Leu
            35                  40                  45

Gly Glu Ala Lys Lys Leu Asn Glu Ser Gln Ala Pro Lys
        50                  55                  60

<210> SEQ ID NO 45
<211> LENGTH: 61
<212> TYPE: PRT
<213> ORGANISM: Staphylococcus aureus

<400> SEQUENCE: 45

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Arg
            20                  25                  30

-continued

Phe Ile Gln Phe Leu Lys Asp Asp Pro Ser Gln Ser Thr Asn Val Leu
            35                  40                  45

Gly Glu Ala Lys Lys Leu Asn Glu Ser Gln Ala Pro Lys
    50                  55                  60

<210> SEQ ID NO 46
<211> LENGTH: 61
<212> TYPE: PRT
<213> ORGANISM: Staphylococcus aureus

<400> SEQUENCE: 46

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Arg
            20                  25                  30

Phe Ile Gln Glu Leu Lys Asp Asp Pro Ser Gln Ser Thr Asn Val Leu
            35                  40                  45

Gly Glu Ala Lys Lys Leu Asn Glu Ser Gln Ala Pro Lys
    50                  55                  60

<210> SEQ ID NO 47
<211> LENGTH: 61
<212> TYPE: PRT
<213> ORGANISM: Staphylococcus aureus

<400> SEQUENCE: 47

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Arg
            20                  25                  30

Phe Ile Gln Gln Leu Lys Asp Asp Pro Ser Gln Ser Thr Asn Val Leu
            35                  40                  45

Gly Glu Ala Lys Lys Leu Asn Glu Ser Gln Ala Pro Lys
    50                  55                  60

<210> SEQ ID NO 48
<211> LENGTH: 61
<212> TYPE: PRT
<213> ORGANISM: Staphylococcus aureus

<400> SEQUENCE: 48

Ala Asp Ala Gln Gln Asn Asn Phe Asn Lys Asp Gln Gln Ser Ala Phe
1               5                   10                  15

Tyr Glu Ile Leu Asn Met Pro Asn Leu Asn Glu Ala Gln Arg Asn Gly
            20                  25                  30

Phe Ile Gln Ser Leu Lys Asp Asp Pro Ser Gln Ser Thr Asn Val Leu
            35                  40                  45

Gly Glu Ala Lys Lys Leu Asn Glu Ser Gln Ala Pro Lys
    50                  55                  60

<210> SEQ ID NO 49
<211> LENGTH: 61
<212> TYPE: PRT
<213> ORGANISM: Staphylococcus aureus

<400> SEQUENCE: 49

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Ala 20                  25                  30

Phe Ile Gln Ser Leu Lys Ala Ala Pro Ser Gln Ser Thr Asn Val Leu
            35                  40                  45

Gly Glu Ala Lys Lys Leu Asn Glu Ser Gln Ala Pro Lys
        50                  55                  60

<210> SEQ ID NO 50
<211> LENGTH: 61
<212> TYPE: PRT
<213> ORGANISM: Staphylococcus aureus

<400> SEQUENCE: 50

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Phe
            20                  25                  30

Phe Ile Gln Ser Leu Lys Ala Ala Pro Ser Gln Ser Thr Asn Val Leu
            35                  40                  45

Gly Glu Ala Lys Lys Leu Asn Glu Ser Gln Ala Pro Lys
        50                  55                  60

<210> SEQ ID NO 51
<211> LENGTH: 61
<212> TYPE: PRT
<213> ORGANISM: Staphylococcus aureus

<400> SEQUENCE: 51

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Arg
            20                  25                  30

Phe Ile Gln Ser Leu Lys Ala Ala Pro Ser Gln Ser Thr Asn Val Leu
            35                  40                  45

Gly Glu Ala Lys Lys Leu Asn Glu Ser Gln Ala Pro Lys
        50                  55                  60

<210> SEQ ID NO 52
<211> LENGTH: 61
<212> TYPE: PRT
<213> ORGANISM: Staphylococcus aureus

<400> SEQUENCE: 52

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Ala
            20                  25                  30

Phe Ile Gln Phe Leu Lys Ala Ala Pro Ser Gln Ser Thr Asn Val Leu
            35                  40                  45

Gly Glu Ala Lys Lys Leu Asn Glu Ser Gln Ala Pro Lys
        50                  55                  60

<210> SEQ ID NO 53
<211> LENGTH: 61
<212> TYPE: PRT
<213> ORGANISM: Staphylococcus aureus

<400> SEQUENCE: 53

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Ala
                20                  25                  30

Phe Ile Gln Glu Leu Lys Ala Ala Pro Ser Gln Ser Thr Asn Val Leu
            35                  40                  45

Gly Glu Ala Lys Lys Leu Asn Glu Ser Gln Ala Pro Lys
    50                  55                  60

<210> SEQ ID NO 54
<211> LENGTH: 61
<212> TYPE: PRT
<213> ORGANISM: Staphylococcus aureus

<400> SEQUENCE: 54

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Ala
                20                  25                  30

Phe Ile Gln Gln Leu Lys Ala Ala Pro Ser Gln Ser Thr Asn Val Leu
            35                  40                  45

Gly Glu Ala Lys Lys Leu Asn Glu Ser Gln Ala Pro Lys
    50                  55                  60

<210> SEQ ID NO 55
<211> LENGTH: 61
<212> TYPE: PRT
<213> ORGANISM: Staphylococcus aureus

<400> SEQUENCE: 55

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Phe
                20                  25                  30

Phe Ile Gln Phe Leu Lys Ala Ala Pro Ser Gln Ser Thr Asn Val Leu
            35                  40                  45

Gly Glu Ala Lys Lys Leu Asn Glu Ser Gln Ala Pro Lys
    50                  55                  60

<210> SEQ ID NO 56
<211> LENGTH: 61
<212> TYPE: PRT
<213> ORGANISM: Staphylococcus aureus

<400> SEQUENCE: 56

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Phe
                20                  25                  30

Phe Ile Gln Glu Leu Lys Ala Ala Pro Ser Gln Ser Thr Asn Val Leu
            35                  40                  45

Gly Glu Ala Lys Lys Leu Asn Glu Ser Gln Ala Pro Lys
    50                  55                  60

<210> SEQ ID NO 57
<211> LENGTH: 61
<212> TYPE: PRT
<213> ORGANISM: Staphylococcus aureus

<400> SEQUENCE: 57

Ala Asp Ala Gln Gln Asn Asn Phe Asn Lys Asp Lys Lys Ser Ala Phe
1               5                   10                  15

```
Tyr Glu Ile Leu Asn Met Pro Asn Leu Asn Glu Ala Gln Arg Asn Phe
            20                  25                  30

Phe Ile Gln Gln Leu Lys Ala Ala Pro Ser Gln Ser Thr Asn Val Leu
        35                  40                  45

Gly Glu Ala Lys Lys Leu Asn Glu Ser Gln Ala Pro Lys
    50                  55                  60

<210> SEQ ID NO 58
<211> LENGTH: 61
<212> TYPE: PRT
<213> ORGANISM: Staphylococcus aureus

<400> SEQUENCE: 58

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Arg
            20                  25                  30

Phe Ile Gln Phe Leu Lys Ala Ala Pro Ser Gln Ser Thr Asn Val Leu
        35                  40                  45

Gly Glu Ala Lys Lys Leu Asn Glu Ser Gln Ala Pro Lys
    50                  55                  60

<210> SEQ ID NO 59
<211> LENGTH: 61
<212> TYPE: PRT
<213> ORGANISM: Staphylococcus aureus

<400> SEQUENCE: 59

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Arg
            20                  25                  30

Phe Ile Gln Glu Leu Lys Ala Ala Pro Ser Gln Ser Thr Asn Val Leu
        35                  40                  45

Gly Glu Ala Lys Lys Leu Asn Glu Ser Gln Ala Pro Lys
    50                  55                  60

<210> SEQ ID NO 60
<211> LENGTH: 61
<212> TYPE: PRT
<213> ORGANISM: Staphylococcus aureus

<400> SEQUENCE: 60

Ala Asp Ala Gln Gln Asn Asn Phe Asn Lys Asp Lys Lys Ser Ala Phe
1               5                   10                  15

Tyr Glu Ile Leu Asn Met Pro Asn Leu Asn Glu Ala Gln Arg Asn Arg
            20                  25                  30

Phe Ile Gln Gln Leu Lys Ala Ala Pro Ser Gln Ser Thr Asn Val Leu
        35                  40                  45

Gly Glu Ala Lys Lys Leu Asn Glu Ser Gln Ala Pro Lys
    50                  55                  60
```

METHODS AND COMPOSITIONS COMPRISING *STAPHYLOCOCCUS* PROTEIN A (SpA) VARIANTS

CROSS-REFERENCE TO RELATED APPLICATIONS

This application is a national phase application under 35 U.S.C. § 371 of International Application No. PCT/US2020/070048 filed May 13, 2020, which claims the benefit of priority of U.S. Provisional Patent Application No. 62/847,832 filed May 14, 2019, which are hereby incorporated by reference in their entirety.

This invention was made with government support under grant numbers AI038897 and AI052474 awarded by the National Institutes of Health. The Government has certain rights in the invention.

BACKGROUND

I. Field of the Invention

The present invention relates generally to the fields of immunology, microbiology, and pathology. More particularly, it concerns methods and compositions involving bacterial Protein A variants, which can be used to invoke an immune response against the bacteria.

II. Background

The number of both community acquired and hospital acquired infections have increased over recent years with the increased use of intravascular devices. Hospital acquired (nosocomial) infections are a major cause of morbidity and mortality, more particularly in the United States, where it affects more than 2 million patients annually. The most frequent infections are urinary tract infections (33% of the infections), followed by pneumonia (15.5%), surgical site infections (14.8%) and primary bloodstream infections (13%) (Emorl and Gaynes, 1993).

The major nosocomial pathogens include *Staphylococcus aureus*, coagulase-negative Staphylococci (mostly *Staphylococcus epidermidis*), enterococcus spp., *Escherichia coli* and *Pseudomonas aeruginosa*. Although these pathogens cause approximately the same number of infections, the severity of the disorders they can produce combined with the frequency of antibiotic resistant isolates balance this ranking towards *S. aureus* and *S. epidermidis* as being the most significant nosocomial pathogens.

Staphylococci can cause a wide variety of diseases in humans and other animals through either toxin production or invasion. Staphylococcal toxins are also a common cause of food poisoning, as the bacteria can grow in improperly-stored food.

*Staphylococcus epidermidis* is a normal skin commensal which is also an important opportunistic pathogen responsible for infections of impaired medical devices and infections at sites of surgery. Medical devices infected by *S. epidermidis* include cardiac pacemakers, cerebrospinal fluid shunts, continuous ambulatory peritoneal dialysis catheters, orthopedic devices and prosthetic heart valves.

*Staphylococcus aureus* is the most common cause of nosocomial infections with a significant morbidity and mortality. It is the cause of some cases of osteomyelitis, endocarditis, septic arthritis, pneumonia, abscesses, and toxic shock syndrome. *S. aureus* can survive on dry surfaces, increasing the chance of transmission. Any *S. aureus* infection can cause the staphylococcal scalded skin syndrome, a cutaneous reaction to exotoxin absorbed into the bloodstream. It can also cause a type of septicemia called pyaemia that can be life-threatening. Problematically, Methicillin-resistant *Staphylococcus aureus* (MRSA) has become a major cause of hospital-acquired infections.

*S. aureus* and *S. epidermidis* infections are typically treated with antibiotics, with penicillin being the drug of choice, whereas vancomycin is used for methicillin resistant isolates. The percentage of staphylococcal strains exhibiting wide-spectrum resistance to antibiotics has become increasingly prevalent, posing a threat for effective antimicrobial therapy. In addition, the recent emergence of vancomycin resistant *S. aureus* strain has aroused fear that MRSA strains are emerging and spreading for which no effective therapy is available.

An alternative to antibiotic treatment for staphylococcal infections is under investigation that uses antibodies directed against staphylococcal antigens. This therapy involves administration of polyclonal antisera (WO00/15238, WO00/12132) or treatment with monoclonal antibodies against lipoteichoic acid (WO98/57994).

An alternative approach would be the use of active vaccination to generate an immune response against staphylococci. The *S. aureus* genome has been sequenced and many of the coding sequences have been identified (WO02/094868, EP0786519), which can lead to the identification of potential antigens. The same is true for *S. epidermidis* (WO01/34809). As a refinement of this approach, others have identified proteins that are recognized by hyperimmune sera from patients who have suffered staphylococcal infection (WO01/98499, WO02/059148).

*S. aureus* secretes a plethora of virulence factors into the extracellular milieu (Archer, 1998; Dinges et al., 2000; Foster, 2005; Shaw et al., 2004; Sibbald et al., 2006). Like most secreted proteins, these virulence factors are translocated by the Sec machinery across the plasma membrane. Proteins secreted by the Sec machinery bear an N-terminal leader peptide that is removed by leader peptidase once the pre-protein is engaged in the Sec translocon (Dalbey and Wickner, 1985; van Wely et al., 2001). Recent genome analysis suggests that Actinobacteria and members of the Firmicutes encode an additional secretion system that recognizes a subset of proteins in a Sec-independent manner (Pallen, 2002). ESAT-6 (early secreted antigen target 6 kDa) and CFP-10 (culture filtrate antigen 10 kDa) of *Mycobacterium tuberculosis* represent the first substrates of this novel secretion system termed ESX-1 or Snm in *M tuberculosis* (Andersen et al., 1995; Hsu et al., 2003; Pym et al., 2003; Stanley et al., 2003). In *S. aureus*, two ESAT-6 like factors designated EsxA and EsxB are secreted by the Ess pathway (ESAT-6 secretion system) (Burts et al., 2005).

The first generation of vaccines targeted against *S. aureus* or against the exoproteins it produces have met with limited success (Lee, 1996). There remains a need to develop effective vaccines against staphylococcal infections. Additional compositions for treating staphylococcal infections are also needed.

Throughout this application, the term "about" is used according to its plain and ordinary meaning in the area of cell and molecular biology to indicate that a value includes the standard deviation of error for the device or method being employed to determine the value.

The use of the word "a" or "an" when used in conjunction with the term "comprising" may mean "one," but it is also consistent with the meaning of "one or more," "at least one," and "one or more than one."

As used herein, the terms "or" and "and/or" are utilized to describe multiple components in combination or exclusive of one another. For example, "x, y, and/or z" can refer to "x" alone, "y" alone, "z" alone, "x, y, and z," "(x and y) or z," "x or (y and z)," or "x or y or z." It is specifically contemplated that x, y, or z may be specifically excluded from an embodiment.

The words "comprising" (and any form of comprising, such as "comprise" and "comprises"), "having" (and any form of having, such as "have" and "has"), "including" (and any form of including, such as "includes" and "include"), "characterized by" (and any form of including, such as "characterized as"), or "containing" (and any form of containing, such as "contains" and "contain") are inclusive or open-ended and do not exclude additional, unrecited elements or method steps.

The compositions and methods for their use can "comprise," "consist essentially of," or "consist of" any of the ingredients or steps disclosed throughout the specification. The phrase "consisting of" excludes any element, step, or ingredient not specified. The phrase "consisting essentially of" limits the scope of described subject matter to the specified materials or steps and those that do not materially affect its basic and novel characteristics. It is contemplated that embodiments described in the context of the term "comprising" may also be implemented in the context of the term "consisting of" or "consisting essentially of."

It is specifically contemplated that any limitation discussed with respect to one embodiment of the invention may apply to any other embodiment of the invention. Furthermore, any composition of the invention may be used in any method of the invention, and any method of the invention may be used to produce or to utilize any composition of the invention. Aspects of an embodiment set forth in the Examples are also embodiments that may be implemented in the context of embodiments discussed elsewhere in a different Example or elsewhere in the application, such as in the Summary of Invention, Detailed Description of the Embodiments, Claims, and description of Figure Legends.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

SUMMARY OF THE INVENTION

Compositions and methods are provided for improved Protein A variants with reduced binding to VH3 of immunoglobulins to reduce their toxigenicty yet stimulate humoral immune responses that protect against staphylococcal disease. In certain embodiments the improved Protein A variant stimulates humoral immune responses that can (i) prevent colonization and (ii) lead to decolonization of actively colonized individuals.

In some embodiments, compositions and methods involve an isolated polypeptide comprising a variant Protein A (SpA) having (i) lysine substitutions for glutamine residues in each of domains A-E corresponding to positions 9 and 10 in domain D and (ii) glutamate substitutions in each of domains A-E corresponding to position 33 in domain D, wherein the polypeptide does not, relative to a negative control, detectably crosslink IgG and IgE in blood or activate basophils or mast cells. The variant SpA region, in some embodiments, is contemplated as not crosslinking IgG and/or IgE in blood and/or activate basophils so as to pose a significant safety or toxicity issue to human patients or to pose a significant risk of anaphylactic shock in a human patient. In some embodiments, the $K_A$ binding affinity for VH3 from human IgG is reduced as compared to a SpA variant consisting of lysine substitutions for glutamine residues in each of domains A-E corresponding to position 9 and 10 in domain D and alanine substitutions for aspartic acid in domains A-E corresponding to position 36 and 37 of domain D ($SpA_{KKAA}$). In some embodiments, a SpA variant has a $K_A$ binding affinity for VH3 from human IgG that is reduced by at least 2-fold as compared to $SpA_{KKAA}$. In some embodiments, KA binding affinity may be measured by any method disclosed herein. In some embodiments, the SpA variant has a $K_A$ binding affinity for VH3 from human IgG that is reduced by at least 1.2-, 1.3-, 1.4-, 1.5-, 1.6-, 1.7-, 1.8-, 1.9-, 2, 2.1-, 2.2-, 2.3-, 2.4-, 2.5-, 2.6-, 2.7-, 2.8-, 2.9-, 3-fold or more (or any range derivable therein) as compared to $SpA_{KKAA}$. In some embodiments, the SpA variant has a $K_A$ binding affinity for VH3 from human IgG that is reduced by at least 10, 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300% or more (or any range derivable therein) as compared to $SpA_{KKAA}$. Of course it will be understand that the comparison is done using the same or comparable assays. In some embodiments, the SpA variant has a $K_A$ binding affinity for VH3 from human IgG that is less than about $1 \times 10^5$ M$^{-1}$. In some embodiments, the SpA variant has a $K_A$ binding affinity for human IgG VH3 that is less than about 3, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, $0.1 \times 10^5$ M$^{-1}$ (or any arrange derivable therein). In some embodiments, the isolated polypeptide comprising the SpA variant does not have substitutions in any of the domains A-E corresponding to positions 36 and 37 in domain D. In some embodiments, the only substitutions in the SpA variant are (i) lysine substitutions for glutamine residues in each of domains A-E corresponding to positions 9 and 10 in domain D and (ii) glutamate substitutions in each of domains A-E corresponding to position 33 in domain D (referred to as $SpA_{Q9,10K/S33E}$). In some embodiments, the isolated polypeptide consists of the SpA variant. In some embodiments, the isolated polypeptide consists of $SpA_{Q9,10K/S33E}$.

In some embodiments, there is an isolated polypeptide comprising a variant Protein A (SpA) having (i) lysine substitutions for glutamine residues in each of domains A-E corresponding to positions 9 and 10 in domain D and (ii) threonine substitutions in each of domains A-E corresponding to position 33 in domain D, wherein the polypeptide does not, relative to a negative control, detectably crosslink IgG and IgE in blood or activate basophils or mast cells. The variant SpA region, in some embodiments, is contemplated as not crosslinking IgG and/or IgE in blood and/or activate basophils so as to pose a significant safety or toxicity issue to human patients or to pose a significant risk of anaphylactic shock in a human patient. In some embodiments, the KA binding affinity for VH3 from human IgG is reduced as compared to a SpA variant consisting of lysine substitutions for glutamine residues in each of domains A-E corresponding to position 9 and 10 in domain D and alanine substitutions for aspartic acid in domains A-E corresponding to position 36 and 37 of domain D ($SpA_{KKAA}$). In some embodiments, a SpA variant has a $K_A$ binding affinity for VH3 from human IgG that is reduced by at least 2-fold as compared to SpA$_{KKAA}$. In some embodiments, KA binding affinity may be measured by any method disclosed herein. In some embodiments, the SpA variant has a K$_A$ binding affinity for VH3 from human IgG that is reduced by at least 1.2-, 1.3-, 1.4-, 1.5-, 1.6-, 1.7-, 1.8-, 1.9-, 2, 2.1-, 2.2-, 2.3-, 2.4-, 2.5-, 2.6-, 2.7-, 2.8-, 2.9-, 3-fold or more (or any range derivable therein) as compared to SpA$_{KKAA}$. In some embodiments, the SpA variant has a K$_A$ binding affinity for VH3 from human IgG that is reduced by at least 10, 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300% or more (or any range derivable therein) as compared to SpA$_{KKAA}$. Of course it will be understand that the comparison is done using the same or comparable assays. In some embodiments, the SpA variant has a K$_A$ binding affinity for VH3 from human IgG that is less than about $1 \times 10^5$ M$^{-1}$. In some embodiments, the SpA variant has a K$_A$ binding affinity for human IgG VH3 that is less than about 3, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1.0, 0.9, 0.8, 0.7, 0.6, 0.5, 0.4, 0.3, 0.2, $0.1 \times 10^5$ M$^{-1}$ (or any arrange derivable therein). In some embodiments, the isolated polypeptide comprising the SpA variant does not have substitutions in any of the domains A-E corresponding to positions 36 and 37 in domain D. In some embodiments, the only substitutions in the SpA variant are (i) lysine substitutions for glutamine residues in each of domains A-E corresponding to positions 9 and 10 in domain D and (ii) threonine substitutions in each of domains A-E corresponding to position 33 in domain D (referred to as SpA$_{Q9,10K/S33T}$). In some embodiments, the isolated polypeptide consists of the SpA variant. In some embodiments, the isolated polypeptide consists of SpA$_{Q9,10K/S33T}$.

In some embodiments, compositions and methods involve SpA$_{Q9,10K/S33E}$. Any embodiment discussed below in the context of a SpA variant can be implemented specifically with SpA$_{Q9,10K/S33E}$, which has the critical advantage of reduced activity that is associated with toxicity and/or anaphylactic shock. In some embodiments, there are methods for eliciting a safe immune response against a *Staphylococcus* bacteria in a human patient comprising administering to the human patient an effective amount of a composition comprising SpA$_{Q9,10K/S33E}$. In some embodiments, there are methods for eliciting a safe immune response against a *Staphylococcus* bacteria in a subject comprising administering to the subject an effective amount of a composition comprising SpA$_{Q9,10K/S33E}$. The subject may be a laboratory animal, or industrial animal such as cow, pig, sheep goat or any other animal grown for human consumption and that may suffer Staph infections such as mastitis.

In some embodiments, compositions and methods involve SpA$_{Q9,10K/S33E}$. Any embodiment discussed below in the context of a SpA variant can be implemented specifically with SpA$_{Q9,10K/S33T}$, which has the critical advantage of reduced activity that is associated with toxicity and/or anaphylactic shock. In some embodiments, there are methods for eliciting a safe immune response against a *Staphylococcus* bacteria in a human patient comprising administering to the human patient an effective amount of a composition comprising SpA$_{Q9,10K/S33T}$.

In some embodiments, compositions and methods involve an isolated polypeptide comprising a variant Protein A (SpA) having (i) lysine substitutions for glutamine residues corresponding to positions 9 and 10 in each of domains A-E and (ii) at least one other amino acid substitution corresponding to position 29 and/or 33 in SEQ ID NO:2 in each of domains A-E, wherein the SpA variant has a K$_D$ binding affinity for VH3 from human IgG that is greater than $1.0 \times 10^{-4}$ M. In the same or additional embodiments, the SpA variant has K$_D$ binding affinity for VH3 from human IgE that is greater than $1.0 \times 10^{-6}$ M.

Embodiments include the generation of protein A variants that are safe for use in humans, specifically variants that cannot bind to crosslink the variant heavy chains of VH3 idiotypic IgG and IgE molecules bound to Fc receptors on the surface of immune cells, which are capable of releasing immune mediators such as histamine that trigger vascular leakage and anaphylactic reactions.

Amino acids substitutions are made in each of domains A, B, C, D. and E (Domains A-E) of a variant SpA meaning the amino acids corresponding to the glutamine residues at positions 9 and 10 as they are numbered in Domain D, which is SEQ ID NO:2, are substituted; the same amino acid substitutions are made to the corresponding amino acids in Domains A, B, C, and E. Embodiments concern a SpA in which lysine residues have been substituted in each of Domains A-E for the glutaminic acid residues corresponding to positions 9 and 10 in Domain D.

In certain embodiments, a SpA variant has a K$_D$ binding affinity for VH3 from human IgG that is greater than about $1.0 \times 10^{-4}$ M, $5.0 \times 10^{-4}$ M, $1.0 \times 10^{-3}$ M, $5.0 \times 10^{-3}$ M, $1.0 \times 10^{-2}$ M, $5.0 \times 10^{-2}$ M, $1.0 \times 10^{-1}$ M, $5.0 \times 10^{-1}$ M (or any range derivable therein). In some embodiments, the binding affinity for VH3 from human IgG is greater than about $1.0 \times 10^{-2}$ M or $5.0 \times 10^{-2}$ M. In the same or additional embodiments, the SpA variant has K$_D$ binding affinity for VH3 from human IgE that is greater than about about $1.0 \times 10^{-6}$ M, $5.0 \times 10^{-6}$ M, $1.0 \times 10^{-5}$ M, $5.0 \times 10^{-5}$ M, $1.0 \times 10^{-4}$ M, $5.0 \times 10^{-4}$ M, $1.0 \times 10^{-3}$ M, $5.0 \times 10^{-3}$ M, $1.0 \times 10^{-2}$ M, $5.0 \times 10^{-2}$ M, $1.0 \times 10^{-1}$ M, or $5.0 \times 10^{-1}$ M (or any range derivable therein). Affinity of SpA and its variant to IgG may be measured with purified human IgG (from pooled serum) and with purified human monoclonal antibodies (trastuzumab human IgG1 VH3 clonal antibody and IgE trastuzumab). The assays used may be ELISA and/or surface plasmon resonance.

In specific embodiments, the variant SpA comprises an amino acid substitution corresponding to position 29 in SEQ ID NO:2 in each of domains A-E. In some cases, the substitution of the amino acid corresponding to position 29 is alanine, leucine, proline, phenylalanine, glutamic acid, arginine, lysine, serine, threonine or glutamine. In some embodiments, the variant SpA comprises a substitution of the amino acid corresponding to position 29 that is alanine, phenylalanine, or arginine. In other embodiments, the substitution is not with one of the following: leucine, proline, glutamic acid, lysine, serine, threonine, or glutamine. In some embodiments, a variant SpA comprises an amino acid substitution corresponding to position 33 in SEQ ID NO:2 in each of domains A-E. In specific embodiments, the substitution of the amino acid corresponding to position 33 is with alanine, phenylalanine, glutamic acid, lysine, or glutamine. In particular cases the substitution is with phenylalanine, glutamic acid, or glutamine. In other embodiments, the substitution is not with alanine or lysine. In some SpA variants, there are substitutions described herein corresponding to positions 29 and 33 in SEQ ID NO:2 in each of domains A-E. These may or may not be combined with an amino acid substitution corresponding to one or both of positions 36 and 37 in SEQ ID NO:2 in each of domains A-E. In some cases, there are substitutions at both positions 36 and 37. In some cases, the amino acid substitutions corresponding to positions 36 and 37 are alanine residues for aspartic acid residues.

In some embodiments, a variant SpA polypeptide comprises variant A-E domains (meaning a polypeptide with a variant Domain A, a variant Domain B, a variant Domain C, a variant Domain D, and a variant Domain E) and the variant Domains are each at least 70%, 75%, 80%, 85%, 90%, 95%, or 96%, identical to a Protein A domain D polypeptide (SEQ ID NO:2), domain E (SEQ ID NO:3), domain A (SEQ ID NO:4), domain C (SEQ ID NO:5), domain B (SEQ ID NO:6). Alternatively, a variant SpA polypeptide comprises variant A-E domains (meaning a polypeptide with a variant Domain A, a variant Domain B, a variant Domain C, a variant Domain D, and a variant Domain E) and the variant Domains are each at least 70%, 75%, 80%, 85%, 90%, 95%, 96%, 97%, 98%, 99%, or 100% identical to a Protein A domain D polypeptide (SEQ ID NO:2), domain E (SEQ ID NO:3), domain A (SEQ ID NO:4), domain C (SEQ ID NO:5), domain B (SEQ ID NO:6) with respect to amino acids other than those specifically articulated as having an amino acid substitution. In other words, a SpA variant with substitutions at positions 9, 10 and 29 may have Domains A-E otherwise 100% identical to the non-variant sequences. In some embodiments, for example, a variant SpaA comprises variant A-E domains that do not comprise any amino acid substitutions in SEQ ID NO:2 except at corresponding positions 9, 10, 29, 33, 36, and/or 37.

In particular embodiments, the variant SpaA comprises variant A-E domains consisting only of amino acid substitutions corresponding to positions 9, 10, and 29 in SEQ ID NO:2. In certain other embodiments, the variant SpaA comprises variant A-E domains consisting only of amino acid substitutions corresponding to positions 9, 10, and 33 in SEQ ID NO:2. In additional embodiments, the variant SpaA comprises variant A-E domains consisting only of amino acid substitutions corresponding to positions 9, 10, 29, and 33 in SEQ ID NO:2. Additionally, other embodiments concern a variant SpaA that comprises variant A-E domains consisting only of amino acid substitutions corresponding to positions 9, 10, 29, 36, and 37 in SEQ ID NO:2. In further embodiments, a variant SpaA comprises variant A-E domains consisting only of amino acid substitutions corresponding to positions 9, 10, 33, 36, and 37 in SEQ ID NO:2. In other embodiments, a variant SpaA comprises variant A-E domains consisting only of amino acid substitutions corresponding to positions 9, 10, 29, 33, 36, and 37 in SEQ ID NO:2.

In additional embodiments, a variant SpA is part of an isolated polypeptide. The isolated polypeptide may or may not include a region that is not from Protein A. In some cases, the non-Protein A segment is a second antigen segment, which may or may not be a staphylococcal antigen segment. In some embodiments, the segment may comprise an Emp, EsxA, EsxB, EsaC, Eap, Ebh, EsaB, Coa, vWbp, vWh, Hla, SdrC, SdrD, SdrE, IsdA, IsdB, IsdC, ClfA, ClfB, and/or SasF segment.

Embodiments include the use of Protein A variants in methods and compositions for the treatment of bacterial and/or staphylococcal infection. This application also provides an immunogenic composition comprising a Protein A variant or immunogenic fragment thereof. In certain aspects, the immunogenic fragment is a Protein A domain D segment. Furthermore, the present invention provides methods and compositions that can be used to treat (e.g., limiting staphylococcal abscess formation and/or persistence in a subject) or prevent bacterial infection. In some cases, methods for stimulating an immune response involve administering to the subject an effective amount of a composition including or encoding all or part of a Protein A variant polypeptide or antigen, and in certain aspects other bacterial proteins. Other bacterial proteins include, but are not limited to (i) a secreted virulence factor, and/or a cell surface protein or peptide, or (ii) a recombinant nucleic acid molecule encoding a secreted virulence factor, and/or a cell surface protein or peptide.

In some embodiments, there are methods involving a SpA variant. Methods include methods for treating a staphylococcal infection in a subject, eliciting an immune response against a *Staphylococcus bacterium* in a subject, preventing a staphylococcal infection in a subject, preventing colonization or re-colonization of *Staphylococcus bacterium* in a subject, reducing colonization or re-colonization of *Staphylococcus bacterium* in a subject, treating a staphylococcal infection in a subject without significant toxicity, and/or inducing killing of staphylococcal bacteria in a subject. Steps may include administering an effective amount of a SpA variant or a composition comprising a SpA variant to a subject. The subject may be in need to the treatment or prevention because of an existing infection or a risk of infection.

In some embodiments, the subject does not exhibit any signs of toxicity from the isolated polypeptide or composition. In further embodiments, the subject does not exhibit any signs of anaphylactic shock from the isolated polypeptide or composition. In some embodiments, the subject is evaluated for signs of toxicity, which may include signs of anaphylactic shock.

The polypeptide can be formulated in a pharmaceutically acceptable composition. The composition can further comprise one or more of at least or at most 1, 2, 3, 4, 5, 6, 7, 8, 9, 10, 11, 12, 13, 14, 15, 16, 17, 18, or 19 additional staphylococcal antigen or immunogenic fragment thereof (e.g., Eap, Ebh, Emp, EsaB, EsaC, EsxA, EsxB, SdrC, SdrD, SdrE, IsdA, IsdB, ClfA, ClfB, Coa, Hla (e.g., H35 mutants), IsdC, SasF, vWbp, or vWh). Additional staphylococcal antigens that can be used in combination with a Protein A variant include, but are not limited to 52 kDa vitronectin binding protein (WO 01/60852), Aaa (GenBank CAC80837), Aap (GenBank accession AJ249487), Ant (GenBank accession NP_372518), autolysin glucosaminidase, autolysin amidase, Cna, collagen binding protein (U.S. Pat. No. 6,288,214), EFB (FIB), Elastin binding protein (EbpS), EPB, FbpA, fibrinogen binding protein (U.S. Pat. No. 6,008,341), Fibronectin binding protein (U.S. Pat. No. 5,840,846), FnbA, FnbB, GehD (US 2002/0169288), HarA, HBP, Immunodominant ABC transporter, IsaA/PisA, laminin receptor, Lipase GehD, MAP, Mg2+ transporter, MHC II analogue (U.S. Pat. No. 5,648,240), MRPII, Npase, RNA III activating protein (RAP), SasA, SasB, SasC, SasD, SasK, SBI, SdrF(WO 00/12689), SdrG/Fig (WO 00/12689), SdrH (WO 00/12689), SEA exotoxins (WO 00/02523), SEB exotoxins (WO 00/02523), SitC and Ni ABC transporter, SitC/MntC/saliva binding protein (U.S. Pat. No. 5,801,234), SsaA, SSP-1, SSP-2, and/or Vitronectin binding protein (see PCT publications WO2007/113222, WO2007/113223, WO2006/032472, WO2006/032475, WO2006/032500, each of which is incorporated herein by reference in their entirety). The staphylococcal antigen or immunogenic fragment can be administered concurrently with the Protein A variant. The staphylococcal antigen or immunogenic fragment and the Protein A variant can be administered in the same composition. The Protein A variant can also be a recombinant nucleic acid molecule encoding a Protein A variant. A recombinant nucleic acid molecule can encode the Protein A variant and at least one staphylococcal antigen or immunogenic fragment thereof. As used herein, the term "modulate" or "modulation" encompasses the meanings of the words "enhance," or "inhibit." "Modulation" of activity may be either an increase or a decrease in activity. As used herein, the term "modulator" refers to compounds that effect the function of a moiety, including up-regulation, induction, stimulation, potentiation, inhibition, down-regulation, or suppression of a protein, nucleic acid, gene, organism or the like.

In certain embodiments the methods and compositions use or include or encode all or part of the Protein A variant or antigen. In other aspects, the Protein A variant may be used in combination with secreted factors or surface antigens including, but not limited to one or more of an isolated Eap, Ebh, Emp, EsaB, EsaC, EsxA, EsxB, SdrC, SdrD, SdrE, IsdA, IsdB, ClfA, ClfB, Coa, Hla, IsdC, SasF, vWbp, or vWh polypeptide or immunogenic segment thereof. Additional staphylococcal antigens that can be used in combination with a Protein A variant include, but are not limited to 52 kDa vitronectin binding protein (WO 01/60852), Aaa, Aap, Ant, autolysin glucosaminidase, autolysin amidase, Cna, collagen binding protein (U.S. Pat. No. 6,288,214), EFB (FIB), Elastin binding protein (EbpS), EPB, FbpA, fibrinogen binding protein (U.S. Pat. No. 6,008,341), Fibronectin binding protein (U.S. Pat. No. 5,840,846), FnbA, FnbB, GehD (US 2002/0169288), HarA, HBP, Immunodominant ABC transporter, IsaA/PisA, laminin receptor, Lipase GehD, MAP, Mg2+ transporter, MHC II analogue (U.S. Pat. No. 5,648,240), MRPII, Npase, RNA III activating protein (RAP), SasA, SasB, SasC, SasD, SasK, SBI, SdrF(WO 00/12689), SdrG/Fig (WO 00/12689), SdrH (WO 00/12689), SEA exotoxins (WO 00/02523), SEB exotoxins (WO 00/02523), SitC and Ni ABC transporter, SitC/MntC/saliva binding protein (U.S. Pat. No. 5,801,234), SsaA, SSP-1, SSP-2, and/or Vitronectin binding protein. In certain embodiments, 1, 2, 3, 4, 5, 6, 7, 8, 9, 10 or more of Eap, Ebh, Emp, EsaB, EsaC, EsxA, EsxB, SdrC, SdrD, SdrE, IsdA, IsdB, ClfA, ClfB, Coa, Hla, IsdC, SasF, vWbp, vWh, 52 kDa vitronectin binding protein (WO 01/60852), Aaa, Aap, Ant, autolysin glucosaminidase, autolysin amidase, Cna, collagen binding protein (U.S. Pat. No. 6,288,214), EFB (FIB), Elastin binding protein (EbpS), EPB, FbpA, fibrinogen binding protein (U.S. Pat. No. 6,008,341), Fibronectin binding protein (U.S. Pat. No. 5,840,846), FnbA, FnbB, GehD (US 2002/0169288), HarA, HBP, Immunodominant ABC transporter, IsaA/PisA, laminin receptor, Lipase GehD, MAP, Mg2+ transporter, MHC II analogue (U.S. Pat. No. 5,648,240), MRPII, Npase, RNA III activating protein (RAP), SasA, SasB, SasC, SasD, SasK, SBI, SdrF(WO 00/12689), SdrG/Fig (WO 00/12689), SdrH (WO 00/12689), SEA exotoxins (WO 00/02523), SEB exotoxins (WO 00/02523), SitC and Ni ABC transporter, SitC/MntC/saliva binding protein (U.S. Pat. No. 5,801,234), SsaA, SSP-1, SSP-2, and/or Vitronectin binding protein. can be specifically excluded from a formulation.

In still further aspects, the isolated Protein A variant is multimerized, e.g., dimerized or a linear fusion of two or more polypeptides or peptide segments. In certain aspects of the invention, a composition comprises multimers or concatamers of 1, 2, 3, 4, 5, 6, 7, 8, 9, 10, 11, 12, 13, 14, 15, 16, 17, 18, 19, 20 or more isolated cell surface proteins or segments thereof. Concatamers are linear polypeptides having one or more repeating peptide units. SpA polypeptides or fragments can be consecutive or separated by a spacer or other peptide sequences, e.g., one or more additional bacterial peptide. In a further aspect, the other polypeptides or peptides contained in the multimer or concatamer can include, but are not limited to 1, 2, 3, 4, 5, 6, 7, 8, 9, 10, 11, 12, 13, 14, 15, 16, 17, 18, 19 of Eap, Ebh, Emp, EsaB, EsaC, EsxA, EsxB, SdrC, SdrD, SdrE, IsdA, IsdB, ClfA, ClfB, Coa, Hla, IsdC, SasF, vWbp, vWh or immunogenic fragments thereof. Additional staphylococcal antigens that can be used in combination with a Protein A variant include, but are not limited to 52 kDa vitronectin binding protein (WO 01/60852), Aaa, Aap, Ant, autolysin glucosaminidase, autolysin amidase, Cna, collagen binding protein (U.S. Pat. No. 6,288,214), EFB (FIB), Elastin binding protein (EbpS), EPB, FbpA, fibrinogen binding protein (U.S. Pat. No. 6,008,341), Fibronectin binding protein (U.S. Pat. No. 5,840,846), FnbA, FnbB, GehD (US 2002/0169288), HarA, HBP, Immunodominant ABC transporter, IsaA/PisA, laminin receptor, Lipase GehD, MAP, Mg2+ transporter, MHC II analogue (U.S. Pat. No. 5,648,240), MRPII, Npase, RNA III activating protein (RAP), SasA, SasB, SasC, SasD, SasK, SBI, SdrF(WO 00/12689), SdrG/Fig (WO 00/12689), SdrH (WO 00/12689), SEA exotoxins (WO 00/02523), SEB exotoxins (WO 00/02523), SitC and Ni ABC transporter, SitC/MntC/saliva binding protein (U.S. Pat. No. 5,801,234), SsaA, SSP-1, SSP-2, and/or Vitronectin binding protein.

The term "Protein A variant" or "SpA variant" refers to polypeptides that include a SpA IgG domain having two or more amino acid substitutions that disrupt binding to Fc and $V_H3$. In certain aspect, a SpA variant includes a variant domain D peptide, as well as variants of SpA polypeptides and segments thereof that are non-toxigenic and stimulate an immune response against Staphylococcus bacteria Protein A and/or bacteria expressing such.

Embodiments also include methods for eliciting an immune response against a Staphylococcus bacterium or staphylococci in a subject comprising providing to the subject an effective amount of a Protein A variant or a segment thereof. In certain aspects, the methods for eliciting an immune response against a Staphylococcus bacterium or staphylococci in a subject comprising providing to the subject an effective amount of 1, 2, 3, 4, 5, 6, 7, 8, 9, 10, 11, 12, 13, 14, 15, 16, 17, 18, 19 or more secreted proteins and/or cell surface proteins or segments/fragments thereof. A secreted protein or cell surface protein includes, but is not limited to Eap, Ebh, Emp, EsaB, EsaC, EsxA, EsxB, SdrC, SdrD, SdrE, IsdA, IsdB, ClfA, ClfB, Coa, Hla, IsdC, SasF, vWbp, and/or vWh proteins and immunogenic fragments thereof. Additional staphylococcal antigens that can be used in combination with a Protein A variant include, but are not limited to 52 kDa vitronectin binding protein (WO 01/60852), Aaa, Aap, Ant, autolysin glucosaminidase, autolysin amidase, Cna, collagen binding protein (U.S. Pat. No. 6,288,214), EFB (FIB), Elastin binding protein (EbpS), EPB, FbpA, fibrinogen binding protein (U.S. Pat. No. 6,008,341), Fibronectin binding protein (U.S. Pat. No. 5,840,846), FnbA, FnbB, GehD (US 2002/0169288), HarA, HBP, Immunodominant ABC transporter, IsaA/PisA, laminin receptor, Lipase GehD, MAP, Mg2+ transporter, MHC II analogue (U.S. Pat. No. 5,648,240), MRPII, Npase, RNA III activating protein (RAP), SasA, SasB, SasC, SasD, SasK, SBI, SdrF(WO 00/12689), SdrG/Fig (WO 00/12689), SdrH (WO 00/12689), SEA exotoxins (WO 00/02523), SEB exotoxins (WO 00/02523), SitC and Ni ABC transporter, SitC/MntC/saliva binding protein (U.S. Pat. No. 5,801,234), SsaA, SSP-1, SSP-2, and/or Vitronectin binding protein.

Embodiments including method, composition, and polypeptide embodiments, include specific embodiments in which the Staphylococcus bacteria comprises the WU1 or JSNZ strain of Staphylococcus aureus. In some embodiments, the Staphylococcus bacteria comprises type ST88 isolate.

In some embodiments, the subject or patient described herein, such as the human patient is a pediatric patient. A pediatric patient is one that is defined as less than 18 years old. In some embodiments, the patient is at least or at most 1, 2, 3, 4, 5, 6, 7, 8, 9, 10, 11, 12, 13, 14, 15, 16, 17, 18, 19, 20, 25, 30, 35, 40, 45, 50, 55, 56, 57, 58, 59, 60, 61, 62, 63, 64, 65, 66, 67, 68, 69, 70, 71, 72, 73, 74, 75, 76, 77, 78, 79, 80, 85, or 90 years old (or any range derivable therein). In some embodiments, the pediatric patient is 2 years old or less. In some embodiments, the pediatric patient is lest than 1 year old. In some embodiments, the pediatric patient is less than 6 months old. In some embodiments, the pediatric patient is 2 months old or less. In some embodiments, the human patient is 65 years old or older. In some embodiments, the human patient is a health care worker. In some embodiments, the patient is one that will receive a surgical procedure.

In some embodiments, the patient the isolated polypeptide of composition is administered in four doses and wherein the interval between doses is at least four weeks. In some embodiments, the isolated polypeptide is given in 4 doses or in exactly 4 doses. In some embodiments, the isolated polypeptide or composition is given in at least, at most, or exactly 1, 2, 3, 4, 5, 6, 7, or 8 doses. In some embodiments, the first dose is administered at 6-8 weeks of age. In some embodiments, all four doses are administered at or before 2 years of age. In some embodiments, the polypeptide or composition is to be administered as a four-dose series at 2, 4, 6, and 12-15 months of age. Dose 1 may be given as early as 6 weeks of age. The interval between dosing may be about 4 to 8 weeks. In some embodiments, the fourth dose is administered at approximately 12-15 months of age, and at least 2 months after the third dose.

Embodiments include compositions that include a polypeptide, peptide, or protein that is or is at least 70%, 75%, 80%, 85%, 90%, 95%, 96%, 97%, 98%, or 99% identical or similar to Protein A, or a second protein or peptide that is a secreted bacterial protein or a bacterial cell surface protein. In a further embodiment a composition may include a polypeptide, peptide, or protein that is or is at least 70%, 75%, 80%, 85%, 90%, 95%, 96%, 97%, 98%, or 99% identical or similar to a Protein A domain D polypeptide (SEQ ID NO:2), domain E (SEQ ID NO:3), domain A (SEQ ID NO:4), domain C (SEQ ID NO:5), domain B (SEQ ID NO:6), or a nucleic acid sequence encoding a Protein A domain D, domain E, domain A, domain C, or domain B polypeptide. In certain aspects a Protein A polypeptide segment will have an amino acid sequence of SEQ ID NO:8. Similarity or identity, with identity being preferred, is known in the art and a number of different programs can be used to identify whether a protein (or nucleic acid) has sequence identity or similarity to a known sequence. Sequence identity and/or similarity is determined using standard techniques known in the art, including, but not limited to, the local sequence identity algorithm of Smith & Waterman (1981), by the sequence identity alignment algorithm of Needleman & Wunsch (1970), by the search for similarity method of Pearson & Lipman (1988), by computerized implementations of these algorithms (GAP, BEST-FIT, FASTA, and TFASTA in the Wisconsin Genetics Software Package, Genetics Computer Group, 575 Science Drive, Madison, Wis.), the Best Fit sequence program described by Devereux et al. (1984), preferably using the default settings, or by inspection. Preferably, percent identity is calculated by using alignment tools known to and readily ascertainable to those of skill in the art. Percent identity is essentially the number of identical amino acids divided by the total number of amino acids compared times one hundred.

Still further embodiments include methods for stimulating in a subject a protective or therapeutic immune response against a *Staphylococcus bacterium* comprising administering to the subject an effective amount of a composition including (i) a SpA variant, e.g., a variant SpA domains A-E polypeptide or peptide thereof; or, (ii) a nucleic acid molecule encoding such a SpA variant polypeptide or peptide thereof, or (iii) administering a SpA variant domain D polypeptide with any combination or permutation of bacterial proteins described herein. In a preferred embodiment the composition is not a *Staphylococcus bacterium*. In certain aspects the subject is a human or a cow or pig or sheep or goat or any other animal grown for human consumption and that may suffer Staph infections such as mastitis. In a further aspect the composition is formulated in a pharmaceutically acceptable formulation. The staphylococci may be *Staphylococcus aureus*.

Yet still further embodiments include vaccines comprising a pharmaceutically acceptable composition having an isolated SpA variant polypeptide, or any other combination or permutation of protein(s) or peptide(s) described herein, wherein the composition is capable of stimulating an immune response against a *Staphylococcus bacterium*. The vaccine may comprise an isolated SpA variant polypeptide, or any other combination or permutation of protein(s) or peptide(s) described. In certain aspects of the invention the isolated SpA variant polypeptide, or any other combination or permutation of protein(s) or peptide(s) described are multimerized, e.g., dimerized or concatamerized. In a further aspect, the vaccine composition is contaminated by less than about 10, 9, 8, 7, 6, 5, 4, 3, 2, 1, 0.5, 0.25, 0.05% (or any range derivable therein) of other Staphylococcal proteins. A composition may further comprise an isolated non-SpA polypeptide. Typically the vaccine comprises an adjuvant. In certain aspects a protein or peptide of the invention is linked (covalently or non-covalently) to the adjuvant, preferably the adjuvant is chemically conjugated to the protein. In some embodiments, the adjuvant comprises alum. In some embodiments, the adjuvant comprises an adjuvant described herein.

In still yet further embodiments, a vaccine composition is a pharmaceutically acceptable composition having a recombinant nucleic acid encoding all or part of a SpA variant polypeptide, or any other combination or permutation of protein(s) or peptide(s) described herein, wherein the composition is capable of stimulating an immune response against a *Staphylococcus* bacteria. The vaccine composition may comprise a recombinant nucleic acid encoding all or part of a SpA variant polypeptide, or any other combination or permutation of protein(s) or peptide(s) described herein. In certain embodiments the recombinant nucleic acid contains a heterologous promoter. Preferably the recombinant nucleic acid is a vector. More preferably the vector is a plasmid or a viral vector. In some aspects the vaccine includes a recombinant, non-*Staphylococcus bacterium* containing the nucleic acid. The recombinant non-staphylococci may be *Salmonella* or another gram-positive bacteria. The vaccine may comprise a pharmaceutically acceptable excipient, more preferably an adjuvant. In some embodiments, the adjuvant comprises alum or an adjuvant described herein.

Still further embodiments include methods for stimulating in a subject a protective or therapeutic immune response against a *Staphylococcus bacterium* comprising administering to the subject an effective amount of a composition of a SpA variant polypeptide or segment/fragment thereof and further comprising one or more of a Eap, Ebh, Emp, EsaB, EsaC, EsxA, EsxB, SdrC, SdrD, SdrE, IsdA, IsdB, ClfA, ClfB, Coa, Hla, IsdC, SasF, vWbp, or vWh protein or peptide thereof. In a preferred embodiment the composition comprises a non-*Staphylococcus bacterium*. In a further aspect the composition is formulated in a pharmaceutically acceptable formulation. The staphylococci for which a subject is being treated may be *Staphylococcus aureus*. Methods of the invention also include SpA variant compositions that contain 1, 2, 3, 4, 5, 6, 7, 8, 9, 10, 11, 12, 13, 14, 15, 16, 17, 18, 19 or more secreted virulence factors and/or cell surface proteins, such as Eap, Ebh, Emp, EsaC, EsxA, EsxB, SdrC, SdrD, SdrE, IsdA, IsdB, ClfA, ClfB, Coa, Hla, IsdC, SasF, vWbp, or vWh in various combinations. In certain aspects a vaccine formulation includes Eap, Ebh, Emp, EsaC, EsxA, EsxB, SdrC, SdrD, SdrE, IsdA, IsdB, ClfA, ClfB, Coa, Hla, IsdC, SasF, vWbp, and vWh. In certain aspects an antigen combination can include (1) a SpA variant and IsdA; (2) SpA variant and ClfB; (3) SpA variant and SdrD; (4) SpA variant and Hla or Hla variant; (5) SpA variant and ClfB, SdrD, and Hla or Hla variant; (6) SpA variant, IsdA, SdrD, and Hla or Hla variant; (7) SpA variant, IsdA, ClfB, and Hla or Hla variant; (8) SpA variant, IsdA, ClfB, and SdrD; (9) SpA variant, IsdA, ClfB, SdrD and Hla or Hla variant; (10) SpA variant, IsdA, ClfB, and SdrD; (11) SpA variant, IsdA, SdrD, and Hla or Hla variant; (12) SpA variant, IsdA, and Hla or Hla variant; (13) SpA variant, IsdA, ClfB, and Hla or Hla variant; (14) SpA variant, ClfB, and SdrD; (15) SpA variant, ClfB, and Hla or Hla variant; or (16) SpA variant, SdrD, and Hla or Hla variant.

In certain aspects, a *bacterium* delivering a composition of the invention will be limited or attenuated with respect to prolonged or persistent growth or abscess formation. In yet a further aspect, SpA variant(s) can be overexpressed in an attenuated *bacterium* to further enhance or supplement an immune response or vaccine formulation.

The term "EsxA protein" refers to a protein that includes isolated wild-type EsxA polypeptides from *Staphylococcus* bacteria and segments thereof, as well as variants that stimulate an immune response against *Staphylococcus* bacteria EsxA proteins.

The term "EsxB protein" refers to a protein that includes isolated wild-type EsxB polypeptides from *Staphylococcus* bacteria and segments thereof, as well as variants that stimulate an immune response against *Staphylococcus* bacteria EsxB proteins.

The term "SdrD protein" refers to a protein that includes isolated wild-type SdrD polypeptides from *Staphylococcus* bacteria and segments thereof, as well as variants that stimulate an immune response against *Staphylococcus* bacteria SdrD proteins.

The term "SdrE protein" refers to a protein that includes isolated wild-type SdrE polypeptides from *Staphylococcus* bacteria and segments thereof, as well as variants that stimulate an immune response against *Staphylococcus* bacteria SdrE proteins.

The term "IsdA protein" refers to a protein that includes isolated wild-type IsdA polypeptides from *Staphylococcus* bacteria and segments thereof, as well as variants that stimulate an immune response against *Staphylococcus* bacteria IsdA proteins.

The term "IsdB protein" refers to a protein that includes isolated wild-type IsdB polypeptides from *Staphylococcus* bacteria and segments thereof, as well as variants that stimulate an immune response against *Staphylococcus* bacteria IsdB proteins.

The term "Eap protein" refers to a protein that includes isolated wild-type Eap polypeptides from *Staphylococcus* bacteria and segments thereof, as well as variants that stimulate an immune response against *Staphylococcus* bacteria Eap proteins.

The term "Ebh protein" refers to a protein that includes isolated wild-type Ebh polypeptides from *Staphylococcus* bacteria and segments thereof, as well as variants that stimulate an immune response against *Staphylococcus* bacteria Ebh proteins.

The term "Emp protein" refers to a protein that includes isolated wild-type Emp polypeptides from *Staphylococcus* bacteria and segments thereof, as well as variants that stimulate an immune response against *Staphylococcus* bacteria Emp proteins.

The term "EsaB protein" refers to a protein that includes isolated wild-type EsaB polypeptides from *Staphylococcus* bacteria and segments thereof, as well as variants that stimulate an immune response against *Staphylococcus* bacteria EsaB proteins.

The term "EsaC protein" refers to a protein that includes isolated wild-type EsaC polypeptides from *Staphylococcus* bacteria and segments thereof, as well as variants that stimulate an immune response against *Staphylococcus* bacteria EsaC proteins.

The term "SdrC protein" refers to a protein that includes isolated wild-type SdrC polypeptides from *Staphylococcus* bacteria and segments thereof, as well as variants that stimulate an immune response against *Staphylococcus* bacteria SdrC proteins.

The term "ClfA protein" refers to a protein that includes isolated wild-type ClfA polypeptides from *Staphylococcus* bacteria and segments thereof, as well as variants that stimulate an immune response against *Staphylococcus* bacteria ClfA proteins.

The term "ClfB protein" refers to a protein that includes isolated wild-type ClfB polypeptides from *Staphylococcus* bacteria and segments thereof, as well as variants that stimulate an immune response against *Staphylococcus* bacteria ClfB proteins.

The term "Coa protein" refers to a protein that includes isolated wild-type Coa polypeptides from *Staphylococcus* bacteria and segments thereof, as well as variants that stimulate an immune response against *Staphylococcus* bacteria Coa proteins.

The term "Hla protein" refers to a protein that includes isolated wild-type Hla polypeptides from *Staphylococcus* bacteria and segments thereof, as well as variants that stimulate an immune response against *Staphylococcus* bacteria Hla proteins.

The term "IsdC protein" refers to a protein that includes isolated wild-type IsdC polypeptides from *Staphylococcus* bacteria and segments thereof, as well as variants that stimulate an immune response against *Staphylococcus* bacteria IsdC proteins.

The term "SasF protein" refers to a protein that includes isolated wild-type SasF polypeptides from *Staphylococcus* bacteria and segments thereof, as well as variants that stimulate an immune response against *Staphylococcus* bacteria SasF proteins.

The term "vWbp protein" refers to a protein that includes isolated wild-type vWbp (von Willebrand factor binding protein) polypeptides from *Staphylococcus* bacteria and segments thereof, as well as variants that stimulate an immune response against *Staphylococcus* bacteria vWbp proteins.

The term "vWh protein" refers to a protein that includes isolated wild-type vWh (von Willebrand factor binding protein homolog) polypeptides from *Staphylococcus* bacteria and segments thereof, as well as variants that stimulate an immune response against *Staphylococcus* bacteria vWh proteins.

An immune response refers to a humoral response, a cellular response, or both a humoral and cellular response in an organism. An immune response can be measured by assays that include, but are not limited to, assays measuring the presence or amount of antibodies that specifically recognize a protein or cell surface protein, assays measuring T-cell activation or proliferation, and/or assays that measure modulation in terms of activity or expression of one or more cytokines.

In certain aspects, a polypeptide or segment/fragment can have a sequence that is at least 85%, at least 90%, at least 95%, at least 98%, or at least 99% or more identical to the amino acid sequence of the reference polypeptide. The term "similarity" refers to a polypeptide that has a sequence that has a certain percentage of amino acids that are either identical with the reference polypeptide or constitute conservative substitutions with the reference polypeptides.

The polypeptides described herein may include or exclude amino acids at positions 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 300, 400, 500, 550, 1000 or more contiguous amino acids, or any range derivable therein, of SEQ ID NOs:1-6.

A polypeptide segment as described herein may include 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 300, 400, 500, 550, 1000 or more contiguous amino acids, or any range derivable therein, of SEQ ID NOs:1-6.

The compositions may be formulated in a pharmaceutically acceptable composition. In certain aspects of the invention the *Staphylococcus bacterium* is an *S. aureus bacterium*.

In further aspects, a composition may be administered more than one time to the subject, and may be administered 1, 2, 3, 4, 5, 6, 7, 8, 9, 10, 15, 20 or more times. The administration of the compositions include, but is not limited to oral, parenteral, subcutaneous, intramuscular, intravenous, or various combinations thereof, including inhalation or aspiration.

In still further embodiments, a composition comprises a recombinant nucleic acid molecule encoding a polypeptide described herein or segments/fragments thereof. Typically a recombinant nucleic acid molecule encoding a polypeptide described herein contains a heterologous promoter. In certain aspects, a recombinant nucleic acid molecule of the invention is a vector, in still other aspects the vector is a plasmid. In certain embodiments the vector is a viral vector. In certain aspects a composition includes a recombinant, non-*Staphylococcus bacterium* containing or expressing a polypeptide described herein. In particular aspects the recombinant non-*Staphylococcus* bacteria is *Salmonella* or another gram-positive bacteria. A composition is typically administered to mammals, such as human subjects, but administration to other animals that are capable of eliciting an immune response is contemplated. In further aspects the *Staphylococcus bacterium* containing or expressing the polypeptide is *Staphylococcus aureus*. In further embodiments the immune response is a protective immune response.

In further embodiments a composition comprises a recombinant nucleic acid molecule encoding all or part of one or more of a Eap, Ebh, Emp, EsaB, EsaC, EsxA, EsxB, SdrC, SdrD, SdrE, IsdA, IsdB, ClfA, ClfB, Coa, Hla, IsdC, SasF, SpA, vWbp, or vWh protein or peptide or variant thereof. Additional staphylococcal antigens that can be used in combination with the polypeptides described herein include, but are not limited to 52 kDa vitronectin binding protein (WO 01/60852), Aaa, Aap, Ant, autolysin glucosaminidase, autolysin amidase, Cna, collagen binding protein (U.S. Pat. No. 6,288,214), EFB (FIB), Elastin binding protein (EbpS), EPB, FbpA, fibrinogen binding protein (U.S. Pat. No. 6,008,341), Fibronectin binding protein (U.S. Pat. No. 5,840,846), FnbA, FnbB, GehD (US 2002/0169288), HarA, HBP, Immunodominant ABC transporter, IsaA/PisA, laminin receptor, Lipase GehD, MAP, Mg2+ transporter, MHC II analogue (U.S. Pat. No. 5,648,240), MRPII, Npase, RNA III activating protein (RAP), SasA, SasB, SasC, SasD, SasK, SBI, SdrF(WO 00/12689), SdrG/Fig (WO 00/12689), SdrH (WO 00/12689), SEA exotoxins (WO 00/02523), SEB exotoxins (WO 00/02523), SitC and Ni ABC transporter, SitC/MntC/saliva binding protein (U.S. Pat. No. 5,801,234), SsaA, SSP-1, SSP-2, and/or Vitronectin binding protein. In particular aspects, a bacteria is a recombinant non-*Staphylococcus* bacteria, such as a *Salmonella* or other gram-positive bacteria.

Compositions of the invention are typically administered to human subjects, but administration to other animals that are capable of eliciting an immune response to a *Staphylococcus bacterium* is contemplated, particularly cattle, horses, goats, sheep and other domestic animals, i.e., mammals.

In certain aspects the *Staphylococcus bacterium* is a *Staphylococcus aureus*. In further embodiments the immune response is a protective immune response. In still further aspects, the methods and compositions of the invention can be used to prevent, ameliorate, reduce, or treat infection of tissues or glands, e.g., mammary glands, particularly mastitis and other infections. Other methods include, but are not limited to prophylactically reducing bacterial burden in a subject not exhibiting signs of infection, particularly those subjects suspected of or at risk of being colonized by a target bacteria, e.g., patients that are or will be at risk or susceptible to infection during a hospital stay, treatment, and/or recovery.

Any embodiment discussed with respect to one aspect of the invention applies to other aspects of the invention as well. In particular, any embodiment discussed in the context of a SpA variant polypeptide or peptide or nucleic acid may be implemented with respect to other antigens, such as Eap, Ebh, Emp, EsaC, EsxA, EsxB, SdrC, SdrD, SdrE, IsdA, IsdB, ClfA, CHB, Coa, Hla, IsdC, SasF, vWbp, vWh, 52 kDa vitronectin binding protein (WO 01/60852), Aaa, Aap, Ant, autolysin glucosaminidase, autolysin amidase, Cna, collagen binding protein (U.S. Pat. No. 6,288,214), EFB (FIB), Elastin binding protein (EbpS), EPB, FbpA, fibrinogen binding protein (U.S. Pat. No. 6,008,341), Fibronectin binding protein (U.S. Pat. No. 5,840,846), FnbA, FnbB, GehD (US 2002/0169288), HarA, HBP, Immunodominant ABC transporter, IsaA/PisA, laminin receptor, Lipase GehD, MAP, Mg2+ transporter, MHC II analogue (U.S. Pat. No. 5,648,240), MRPII, Npase, RNA III activating protein (RAP), SasA, SasB, SasC, SasD, SasK, SBI, SdrF(WO 00/12689), SdrG/Fig (WO 00/12689), SdrH (WO 00/12689), SEA exotoxins (WO 00/02523), SEB exotoxins (WO 00/02523), SitC and Ni ABC transporter, SitC/MntC/saliva binding protein (U.S. Pat. No. 5,801,234), SsaA, SSP-1, SSP-2, and/or Vitronectin binding protein (or nucleic acids), and vice versa. It is also understood that any one or more of Eap, Ebh, Emp, EsaC, EsxA, EsxB, SdrC, SdrD, SdrE, IsdA, IsdB, ClfA, ClfB, Coa, Hla, IsdC, SasF, vWbp, vWh, 52 kDa vitronectin binding protein (WO 01/60852), Aaa, Aap, Ant, autolysin glucosaminidase, autolysin amidase, Cna, collagen binding protein (U.S. Pat. No. 6,288,214), EFB (FIB), Elastin binding protein (EbpS), EPB, FbpA, fibrinogen binding protein (U.S. Pat. No. 6,008,341), Fibronectin binding protein (U.S. Pat. No. 5,840,846), FnbA, FnbB, GehD (US 2002/0169288), HarA, HBP, Immunodominant ABC transporter, IsaA/PisA, laminin receptor, Lipase GehD, MAP, Mg2+ transporter, MHC II analogue (U.S. Pat. No. 5,648,240), MRPII, Npase, RNA III activating protein (RAP), SasA, SasB, SasC, SasD, SasK, SBI, SdrF(WO 00/12689), SdrG/Fig (WO 00/12689), SdrH (WO 00/12689), SEA exotoxins (WO 00/02523), SEB exotoxins (WO 00/02523), SitC and Ni ABC transporter, SitC/MntC/saliva binding protein (U.S. Pat. No. 5,801,234), SsaA, SSP-1, SSP-2, and/or Vitronectin binding protein can be specifically excluded from a claimed composition.

Embodiments of the invention include compositions that contain or do not contain a *bacterium*. A composition may or may not include an attenuated or viable or intact staphylococcal *bacterium*. In certain aspects, the composition comprises a *bacterium* that is not a staphylococcal *bacterium* or does not contain staphylococcal bacteria. In certain embodiments a bacterial composition comprises an isolated or recombinantly expressed staphylococcal Protein A variant or a nucleotide encoding the same. The composition may be or include a recombinantly engineered *Staphylococcus bacterium* that has been altered in a way that comprises specifically altering the *bacterium* with respect to a secreted virulence factor or cell surface protein. For example, the bacteria may be recombinantly modified to express more of the virulence factor or cell surface protein than it would express if unmodified.

The term "isolated" can refer to a nucleic acid or polypeptide that is substantially free of cellular material, bacterial material, viral material, or culture medium (when produced by recombinant DNA techniques) of their source of origin, or chemical precursors or other chemicals (when chemically synthesized). Moreover, an isolated compound refers to one that can be administered to a subject as an isolated compound; in other words, the compound may not simply be considered "isolated" if it is adhered to a column or embedded in an agarose gel. Moreover, an "isolated nucleic acid fragment" or "isolated peptide" is a nucleic acid or protein fragment that is not naturally occurring as a fragment and/or is not typically in the functional state.

Moieties of the invention, such as polypeptides, peptides, antigens, or immunogens, may be conjugated or linked covalently or noncovalently to other moieties such as adjuvants, proteins, peptides, supports, fluorescence moieties, or labels. The term "conjugate" or "immunoconjugate" is broadly used to define the operative association of one moiety with another agent and is not intended to refer solely to any type of operative association, and is particularly not limited to chemical "conjugation." Recombinant fusion proteins are particularly contemplated. Compositions of the invention may further comprise an adjuvant or a pharmaceutically acceptable excipient. In some embodiments, the adjuvant comprises alum or an adjuvant described herein. An adjuvant may be covalently or non-covalently coupled to a polypeptide or peptide of the invention. In certain aspects, the adjuvant is chemically conjugated to a protein, polypeptide, or peptide.

The term "providing" is used according to its ordinary meaning to indicate "to supply or furnish for use." In some embodiments, the protein is provided directly by administering the protein, while in other embodiments, the protein is effectively provided by administering a nucleic acid that encodes the protein. In certain aspects the invention contemplates compositions comprising various combinations of nucleic acid, antigens, peptides, and/or epitopes.

The subject will have (e.g., are diagnosed with a staphylococcal infection), will be suspected of having, or will be at risk of developing a staphylococcal infection. Compositions of the present invention include immunogenic compositions wherein the antigen(s) or epitope(s) are contained in an amount effective to achieve the intended purpose. More specifically, an effective amount means an amount of active ingredients necessary to stimulate or elicit an immune response, or provide resistance to, amelioration of, or mitigation of infection. In more specific aspects, an effective amount prevents, alleviates or ameliorates symptoms of disease or infection, or prolongs the survival of the subject being treated. Determination of the effective amount is well within the capability of those skilled in the art, especially in light of the detailed disclosure provided herein. For any preparation used in the methods of the invention, an effective amount or dose can be estimated initially from in vitro studies, cell culture, and/or animal model assays. For example, a dose can be formulated in animal models to achieve a desired immune response or circulating antibody concentration or titer. Such information can be used to more accurately determine useful doses in humans.

In some embodiments, the polypeptide of the disclosure (SpA variant) provides a histamine release of less than or equal to 20, 19.5, 19, 18.5, 18, 17.5, 17, 16.5, 16, 15.5, 15, 14.5, 14, 13.5, 13, 12.5, 12, 11.5, 11, 10.5, 10, 9.5, 9, 8.5, 8, 7.5, 7, 6.5, 6, 5.5, 5, 4.5, 4, 3.5, 3, 2.5, 2, 1.5, 1, 0.5, 0.4, 0.3, 0.2, 0.1, or 0% (or any derivable range therein) in a basophil histamine release assay.

The embodiments in the Example section are understood to be embodiments of the invention that are applicable to all aspects of the invention.

The use of the term "or" in the claims is used to mean "and/or" unless explicitly indicated to refer to alternatives only or the alternatives are mutually exclusive, although the disclosure supports a definition that refers to only alternatives and "and/or." It is also contemplated that anything listed using the term "or" may also be specifically excluded.

Throughout this application, the term "about" is used to indicate that a value includes the standard deviation of error for the device or method being employed to determine the value.

Following long-standing patent law, the words "a" and "an," when used in conjunction with the word "comprising" in the claims or specification, denotes one or more, unless specifically noted.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DESCRIPTION OF THE DRAWINGS

So that the matter in which the above-recited features, advantages and objects of the invention as well as others which will become clear are attained and can be understood in detail, more particular descriptions and certain embodiments of the invention briefly summarized above are illustrated in the appended drawings. These drawings form a part of the specification. It is to be noted, however, that the appended drawings illustrate certain embodiments of the invention and therefore are not to be considered limiting in their scope.

FIGS. 1A-E. *Staphylococcus aureus* ST88 isolate WU1, a mouse pathogen. (A) Domain structure and sequence homology of the vwb gene products from *S. aureus* WU1 and *S. aureus* Newman, a human clinical isolate. The percent amino acid (a.a.) identity of vWbp for its signal peptide (S), D1 and D2 domains (responsible for binding and activation of host prothrombin), linker (white box) and C-terminal fibrinogen binding domain (C) is displayed. (B) Immunoblot of *S. aureus* whole culture samples of strains Newman (WT, wild-type) as well as its Δcoa, Δvwb, Δcoa-vwb, and ΔclfA variants, strains WU1, JSNZ, USA300 LAC and its Δvwb variant were analyzed for the production of vWbp (αvWbp), Coa (αCoa), Hla (αHla), and ClfA (αClfA) using polyclonal rabbit antibodies. (C) Polyclonal antibodies against the vWbp-C domain identify the vWbp allelic variant from strains JSNZ and WU1 as well as vWbp from strain USA300 LAC. (D-E) Agglutination of Syto-9 stained *S. aureus* strains in human (D) or mouse (E) plasma was measured as average size and standard error of the means of clumped bacteria in 12 fields of microscopic view and statistical significance was assessed in pairwise comparison with WT using two-way ANOVA with Sidak multiple comparison tests. ****, p<0.0001.

FIG. 2A-B. *S. aureus* WU1 persistently colonizes the nasopharynx of C57BL/6 mice. Cohorts of C57BL/6 mice (n=10) mice were inoculated intra-nasally with $1\times10^8$ CFU of indicated *S. aureus* WU1 or PBS control and were swabbed in the throat weekly to enumerate the bacterial load. Each dot indicates the number of CFU per mouse. The median and standard deviation for each group of animals on a given day are indicated by the horizontal line and error bar.

FIG. 3A-B. *S. aureus* WU1 expression of staphylococcal protein A (SpA) is required for persistent colonization of C57BL/6 mice. (A) Immunoblot of *S. aureus* lysates derived from strains USA300 LAC, Newman, WU1, the Δspa variant of WU1 without and with a plasmid for spa expression (pspa) were probed with SpA- (αSpA) and sortase A-specific antibodies (αSrtA). (B) Cohorts of C57BL/6 mice (n=10) were inoculated intra-nasally with $1\times10^8$ CFU of *S. aureus* WU1 or its Δspa variant and the oropharynx of animals was swabbed in weekly intervals to enumerate the bacterial load. Each dot indicates the number of CFU per mouse. The median and standard deviation for each group of animals on a given day are indicated by the horizontal line and error bar. Bacterial colonization data sets were analyzed with two-way ANOVA and Sidak multiple comparison tests; statistically significant differences (* p=0.0003; ** p<0.0001) between the two groups of animals are indicated by asterisks.

FIG. 7A-C. Improved SpA vaccine. A: Depiction of the SpA$_{KKAA}$, SpA$_{KKAA/A}$, and SpA$_{KKAA/F}$ variants. B: Binding affinity of the variants to human IgG. C: Binding affinity of the variants to human IgE.

FIG. 9A-B. Protein A is required for S. aureus persistent nasal colonization of mice.

FIG. 10. Protein A amino acid sequence alignment. Dark Grey: Amino acids interacting with human Fcγ fragment; Light Grey: Amino acids interacting with human Fab fragment; Asterisk denotes amino acid interacting with both human Fcγ and Fab fragments Red: Amino acids interacting with human Fcγ fragment FIG. 11. Surface plasmon resonance (SPR) analysis demonstrating that Z domain (G29A in SpA B domain) fails to bind F(ab)2 fragment.

FIG. 12A-B New SpA* variants targeting G29.

FIG. 13. New SpA* variants targeting G29.

FIG. 14. New SpA* variants targeting G29.

FIG. 15. New SpA* variants targeting G29.

FIG. 16. Depiction of a a basil histamine release assay further described in Example 2.

FIG. 17A-B Staphylococcal protein A (SpA). (A) Diagram illustrating the primary structure of the SpA precursor (with N-terminal signal peptide cleaved by signal peptidase, five immunoglobulin binding domains (IgBDs—designated E, D, A, B, C), the cell wall spanning domain designated region Xr, the LysM domain for peptidoglycan binding, and the C-terminal LPXTG sorting signal that is cleaved by sortase A), of cell wall-SpA, which is displayed on the bacterial surface, and of the released-SpA molecules that are liberated from the cell wall envelope and released into host tissues. (B) Secretion and sortase A-mediated cell wall anchoring of SpA and release of peptidoglycan-linked SpA by *S. aureus*.

FIG. 18A-B Binding of SpA to the Fcγ domain of human IgG blocks the effector functions of antibodies (engagement of Fc and complement receptors) and opsonophagocytic killing of *S. aureus* by phagocytes. Immune evasive attributes of staphylococcal protein A. (A) Cell wall-anchored SpA, on the surface of *S. aureus* binds Fcγ of human IgG (IgG1, IgG2 and IgG4) and blocks the effector functions of antibodies to trigger opsonophagocytic killing of bacteria. (B) Diagram illustrating the primary structure of human IgG, its antigen-binding paratope (purple) effector (C1q, FcγRs, FcRn) and SpA binding sites.

FIG. 19A-B Immune evasive attributes of staphylococcal protein A. (A) Immune evasive functions of SpA during *S. aureus* infection. Cell wall-anchored SpA, on the surface of *S. aureus*, binds Fcγ of human IgG and blocks the effector functions of antibodies to trigger opsonophagocytic killing of bacteria. Released-SpA crosslinks $V_H3$-idiotypic variant heavy chains of human IgG and IgM (B cell receptors) to activate B cell proliferation, class switching, somatic hypermutation and secretion of $V_H3$-idiotypic antibodies that can be crosslinked by SpA but that do not recognize *S. aureus* antigens, thereby blocking the development of adaptive immune responses against *S. aureus* and the establishment of protective immunity. (B) Diagram illustrating SpA-binding to and crosslinking of $V_H3$-idiotypic B cell receptors (IgM) and the activation of CD79AB signaling.

FIG. 20A-B Immunoglobulin-binding domains (IgBDs) of recombinant SpA, $SpA_{KKAA}$, $SpA_{AA}$, and $SpA_{KKAA}$. (A) Diagram illustrating the primary structure of the IgBDs of recombinant SpA with an N-terminal polyhistidine tag for purification via affinity chromatography on Ni-NTA from the cytoplasm of *E. coli*. The amino acid sequence of the IgBD-E domain is displayed below. Positions of three α-helices for each IgBD (H1, H2, and H3) are indicated. $SpA_{KK}$ and $SpA_{KKAA}$ harbor amino acid substitutions at $Q^{9,10}K$ ($Gln^{9,10}Lys$). $SpA_{KK}$ and $SpA_{KKAA}$ harbor amino acid substitutions at $D^{36,37}A$ ($Asp^{36,37}Lys$). Numbering refers to the position of amino acids in the B-IgBD. (B) Amino acid sequence alignment of the five IgBDs of SpA. Conserved amino acids are indicated by a period (.). Gaps in alignment are indicated by a dash (–). Non-conserved amino acids are listed in the single letter code. As reported by Graille et al. (138), SpA residues involved in IgG Fcγ binding are highlighted in red. SpA residues responsible for $V_H3$-heavy chain binding are highlighted in green. The pink residue ($Q^{32}$) contributes both to Fcγ and $V_H3$ binding.

FIG. 21A-B SpA associated $V_H3$-crosslinking activity and anaphylaxis. (A) Diagram illustrating the structure of human activating Fcγ and Fcε receptors as well as their $V_H3$-idiotypic IgG and IgE ligands. (B) SpA crosslinking of $V_H3$-idiotypic IgG or IgE that engage FcγR and FcεR receptors, respectively, on basophils or mast cells triggers the release of histamine, of inflammatory mediators and of cytokines that promote anaphylactic reactions, vasodilation and shock. Although not depicted in (B), both mast cells and basophils express FcγR and FcεR receptors and respond to SpA-crosslinking of $V_H3$-idiotypic IgG bound to FcγR or to SpA-crosslinking of $V_H3$-idiotypic IgE bound to FcεR receptors with the release of histamine, pro-inflammatory mediators and cytokines.

FIG. 22 Anaphylactic activity of SpA vaccine candidates in mice. μMT mice (n=5) were sensitized with VH3 IgG by intradermal injection in the ear. Candidate vaccine antigens or PBS control were injected intravenously 24 hours later followed by Evans blue injection. Extravasation of the dye was quantified following extraction from ear tissues after 30 minutes, by spectrophotometric measurement at 620 nm. Data were obtained from three independent experiments. One-way ANOVA with Bonferroni's Multiple Comparison Test was performed for statistical analysis of the data. Symbols: ns, not significant; *, $P<0.05$; , $P<0.01$; *, $P<0.001$; ****, $P<0.0001$.

FIG. 23A-B Degranulation of mast cells. Cultured human mast cells (LAD2) were sensitized overnight with VH3 IgE, washed, and either left untreated (PBS) or exposed for 1 hour to SpA as a positive control or test articles $SpA_{KKAA}$, $SpA_{Q9,10K/S33E}$, $SpA_{Q9,10K/S33T}$, or SpA-KR. β-Hexosaminidase and histamine levels were measured in cell pellets, as well as in supernatants. The percentage of β-hexosaminidase (A) and amount of histamine (B) release are shown. One-way ANOVA with Bonferroni's Multiple Comparison Test was performed for statistical analysis of the data. Symbols: ns, not significant; *, $P<0.05$; , $P<0.01$; *, $P<0.001$; ****, $P<0.0001$.

FIG. 24A-E Immunization with $SpA_{KKAA}$ or $SpA_{Q9,10K/S33E}$ or $SpA_{Q9,10K/S33T}$ promotes progressive decolonization. Cohorts of C57BL/6 mice (n=10) were inoculated intranasally with $1\times10^8$ CFU of *S. aureus* WU1. (A, B, D) Mice were swabbed in the throat weekly to

Figure 4:
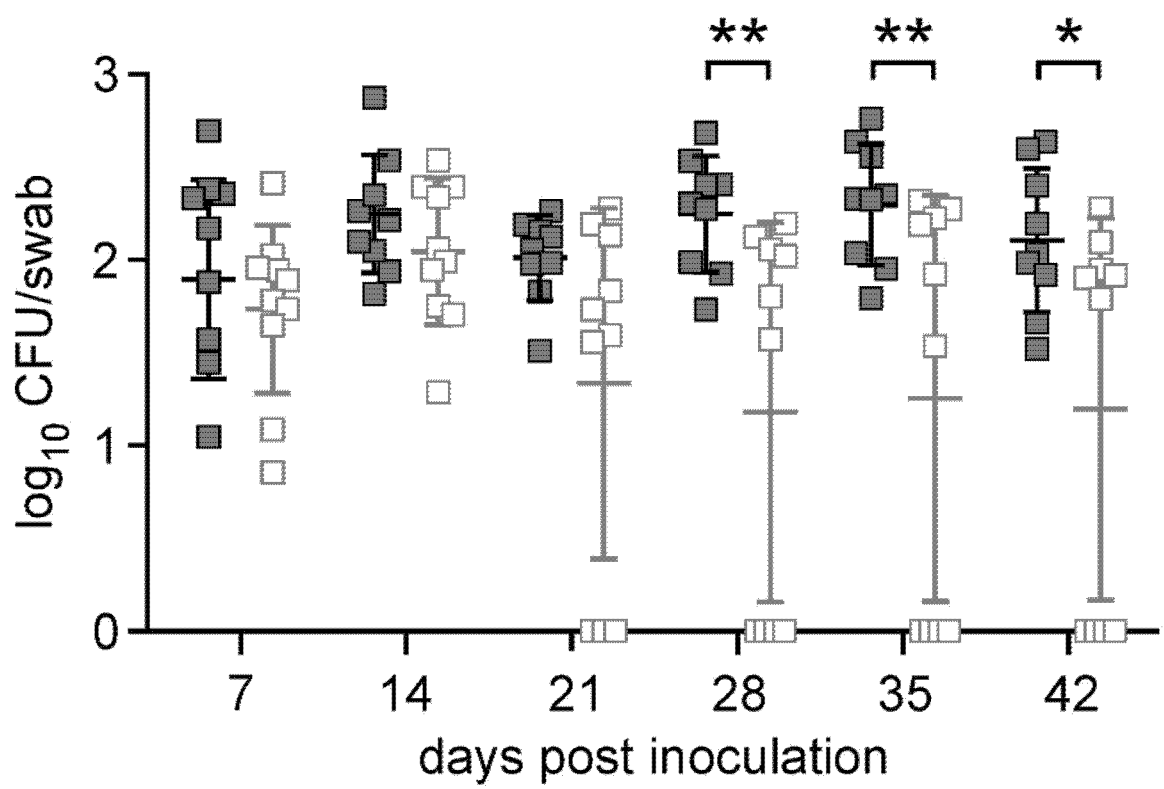
FIG. 4. Immunization of C57BL/6 mice with SpA$_{KKAA}$ promotes decolonization of *S. aureus* WU1. C57BL/6 mice were immunized with 50 µg of purified recombinant SpA$_{KKAA}$ emulsified with CFA or PBS-mock in CFA, and boosted after 11 days with 50 µg of recombinant SpA$_{KKAA}$ emulsified with IFA or PBS-mock in IFA. On day 0 of the colonization experiment, cohorts of C57BL/6 mice (n=10) mice were inoculated intra-nasally with $1\times10^8$ CFU of *S. aureus* WU1. The oropharynx of animals was swabbed in weekly intervals to enumerate the bacterial load. Each dot indicates the number of CFU per mouse. The median and standard deviation for each group of animals on a given day are indicated by the horizontal line and error bar. Bacterial colonization data sets were analyzed with two-way ANOVA and Sidak multiple comparison tests; statistically significant differences (*p<0.05; **p<0.01) between the two groups of animals are indicated by asterisks.

enumerate the bacterial load. (C, E) Stool samples were collected weekly following inoculation to enumerate the bacterial load. In panel (A), animals were immunized with adjuvant-PBS or -SpA$_{KKAA}$. In panels (B-C), animals were immunized with adjuvant-SpA$_{KKAA}$ or -SpA$_{Q9,10K/S33E}$; the same cohorts of animals were monitored for bacterial loads in the throat (B) and stool samples (C). In panels (D-E), animals were immunized with adjuvant-PBS or -SpA$_{KKAA}$, or -SpA$_{Q9,10K/S33E}$ or -SpA$_{Q9,10K/S33T}$; the same cohorts of animals were monitored for bacterial loads in the throat (D) and stool samples (E). Each square indicates the number of CFU per milliliter per throat swab or per gram of stool. The median and standard deviation for each group of animals on a given day are indicated by the horizontal lines and error bars. The data was examined with the two-way analysis of variance with Sidak multiple-comparison tests (*, P<0.05). In panels (D-E), each group of data (each of 1-8) represents data from mock, SpA$_{KKAA}$, SpA$_{Q9,10K/S33E}$, or SpA$_{Q9,10K/S33T}$, respectively. No statistical differences were noted between the two groups in panels B and C.

FIG. 25A-C Protective activity of SpA vaccine candidates in the mouse model of bloodstream infection. Three-week-old BALB/c mice (n=15) were immunized with SpA$_{KKAA}$ or SpA$_{Q9,10K/S33E}$ or SpA$_{Q9,10K/S33T}$ or PBS control. Mock or booster immunizations occurred on day 11. On day 20, mice were bled to evaluate serum half-maximal antibody titers to vaccine candidates, denoted as SpA* on the y axis. Each group of three bars represents, from left to right, SpA$_{KKAA}$, SpA$_{Q9,10K/S33E}$, and SpA$_{Q9,10K/S33T}$. (A). On day 21, mice were challenged with 5×10$^6$ CFU of *S. aureus* USA300 (LAC) into the periorbital venous sinus of the right eye. Fifteen days post-challenge, animals were euthanized to enumerate staphylococcal loads in kidneys (B) and to enumerate abscess lesions (C). One-way ANOVA with Bonferroni's Multiple Comparison Test was performed for statistical analysis of the data. Symbols: ns, not significant; *, P<0.05; , P<0.01; *, P<0.001; ****, P<0.0001.

FIG. 26A-C Interaction between SpA vaccine candidates and SpA-neutralizing monoclonal antibody 3F6. 3F6 antibodies, recombinant rMAb 3F6 from HEK293 F cells (A, rMAb 3F6) or mouse hybridoma monoclonal antibody (B, hMAb 3F6) were serially diluted across enzyme-linked immunosorbent assay plates coated with either SpA$_{KKAA}$ or SpA$_{Q9,10K/S33E}$ or SpA$_{Q9,10K/S33T}$ or PBS control. (C) Association constants calculated using GraphPad Prism software.

DETAILED DESCRIPTION

*Staphylococcus aureus* is a commensal of the human skin and nares, and the leading cause of bloodstream, skin and soft tissue infections (Klevens et al., 2007). Recent dramatic increases in the mortality of staphylococcal diseases are attributed to the spread of methicillin-resistant *S. aureus* (MRSA) strains often not susceptible to antibiotics (Kennedy et al., 2008). In a large retrospective study, the incidence of MRSA infections was 4.6% of all hospital admissions in the United States (Klevens et al., 2007). The annual health care costs for 94,300 MRSA infected individuals in the United States exceed $2.4 billion (Klevens et al., 2007). The current MRSA epidemic has precipitated a public health crisis that needs to be addressed by development of a preventive vaccine (Boucher and Corey, 2008). To date, an FDA licensed vaccine that prevents *S. aureus* diseases is not available.

The inventors describe here the use of Protein A, a cell wall anchored surface protein of staphylococci, for the generation of variants that can serve as subunit vaccines.

The pathogenesis of staphylococcal infections is initiated as bacteria invade the skin or blood stream via trauma, surgical wounds, or medical devices (Lowy, 1998). Although the invading pathogen may be phagocytosed and killed, staphylococci can also escape innate immune defenses and seed infections in organ tissues, inducing inflammatory responses that attract macrophages, neutrophils, and other phagocytes (Lowy, 1998). The responsive invasion of immune cells to the site of infection is accompanied by liquefaction necrosis as the host seeks to prevent staphylococcal spread and allow for removal of necrotic tissue debris (Lam et al., 1963). Such lesions can be observed by microscopy as hypercellular areas containing necrotic tissue, leukocytes, and a central nidus of bacteria (Lam et al., 1963). Unless staphylococcal abscesses are surgically drained and treated with antibiotics, disseminated infection and septicemia produce a lethal outcome (Sheagren, 1984).

II. STAPHYLOCOCCAL ANTIGENS

A. Staphylcoccal Protein A (SpA)

Staphylococcal protein A (SpA) binds immunoglobulin, thereby enabling *S. aureus* evasion from host immune responses. SpA binding to Fcγ blocks the effector functions of IgG antibodies and opsonophagocytic killing of staphylococci by immune cells. SpA crosslinking of the variant heavy chains of V$_H$3-idiotypic IgM triggers B cell proliferation and the secretion of V$_H$3-clonal antibodies that cannot bind to the antigenic determinants of *S. aureus*. Furthermore, SpA crosslinking of V$_H$3-idiotypic IgG and IgE on mast cells and basophils promotes histamine release and anaphylaxis. Earlier work developed SpA$_{KKAA}$ with defects in Fcγ and variant heavy chain binding. When tested as a vaccine in preclinical studies, SpA$_{KKAA}$ elicits SpA-neutralizing antibodies and protects animals against *S. aureus* colonization and invasive disease. The Examples below show that SpA$_{KKAA}$ retains crosslinking activity for V$_H$3-idiotypic IgG and IgE, and triggers anaphylaxis, suggesting it is not safe for use in humans. We demonstrate that SpA variants that lack V$_H$3-heavy chain crosslinking and anaphylactic activities elicit SpA-neutralizing antibodies and protect animals from *S. aureus* colonization and bloodstream infection. Thus, SpA variants unable to crosslink V$_H$3-idiotypic immunoglobulin can be used to prevent *S. aureus* colonization and invasive disease in humans.

B. Colonization and Disease Caused by *Staphylococcus aureus*

*Staphylococcus aureus* colonizes the human nasopharynx and gastrointestinal tract and is found as a persistent colonizer in approximately one third of the human population (14). The remainder of the human population is colonized by *S. aureus* intermittently (14). Virtually all humans develop antibodies against some of the molecular determinants of *S. aureus* during childhood (99). However, these immune responses do not affect *S. aureus* colonization or protect against invasive disease (99). Colonization is the key risk factor for *S. aureus* community- or hospital-acquired invasive diseases, including soft tissue, wound, lung, skeletal, bloodstream and surgical site infections (14, 100, 58, 6). In the United States, 3.4 million cases of *S. aureus* community-acquired infections (CAI) and 340,000 cases of hospital-acquired infections (HAI) require antibiotic and/or surgical therapy (49-51). Infections with antibiotic-resistant *S. aureus* strains, designated MRSA (methicillin-resistant *S.*

*aureus*), occur in 7% of CAI and 22% of HAI and are associated with treatment failures and poor disease outcomes, including death (85). Hallmarks of all *S. aureus* disease are its recurrence, i.e. in 4 out of 5 cases recurrent infection is caused by the same strain, and the inability of infected hosts to establish protective immunity (16). The development of a staphylococcal vaccine that can block colonization and prevent invasive disease represents an urgent, unmet clinical need. Although several vaccine candidates have been subjected to clinical efficacy testing, the products were not able to achieve their clinical endpoints (59-60, 101).

C. Staphylococcal Protein a (SpA) is a Key Immune Evasion Determinant

Staphylococcal protein A (SpA), a sortase A-anchored surface protein, serves as a key immune evasion determinant that prevents the development of protective immunity during *S. aureus* colonization and infection (75, 33, 102, 48). All clinical *S. aureus* isolates harbor the gene for staphylococcal protein A (spa), which generates a precursor product comprised of an N-terminal YSIRK/GxxS signal peptide, followed by 4-5 immunoglobulin binding domains, the region X repeats (Xr), the LysM domain, and the LPXTG sorting signal (29, 32, 103)(FIG. 17A). SpA precursor resides in the bacterial cytoplasm and enters the secretory pathway at septal membranes via its N-terminal YSIRK/GxxS signal peptide (68, 104). Once translocated across the septal membranes, the C-terminal LPXTG sorting signal is cleaved by sortase A, which forms a thioester intermediate between its active site cysteine residue and the carboxyl group of threonine (T) in the LPXTG motif (105-108)(FIG. 17B). The thioester intermediate is resolved by the nucleophilic attack of the amino group (NH2-) in lipid II [C55-(PO4)2-MurNAc(L-Ala-D-iGlu-L-Lys(NH2-Gly5)-D-Ala-D-Ala)-GlcNAc], generating an amide bond between the C-terminal threonine and the pentaglycine crossbridge (107, 109). The SpA-lipid II intermediate is then incorporated into cross-wall peptidoglycan and displayed on the bacterial surface (108, 70).

Cell wall-anchored SpA on the bacterial surface binds to the Fcγ-domain of IgG and disables the effector functions of antibodies, thereby protecting staphylococci from opsonophagocytic killing (OPK) by host immune cells (48, 76)(FIG. 18). During replication, staphylococci release a portion of their peptidoglycan and peptidoglycan-linked SpA (here designated released protein A or released-SpA) into the host environment, owing to muralytic enzyme activities that degrade cross-wall in the vicinity of septal membranes (110, 111)(FIG. 17B). Released-SpA is tethered to wall peptide with the structure L-Ala-D-iGln-L-Lys(SpA-LPET-Gly5)-D-Ala-Gly4 (46). Released-SpA activates VH3 idiotype B cell receptors (BCRs or IgM), thereby promoting B cell proliferation as well as secretion of VH3-idiotypic IgG, IgA, IgD, IgE and IgM via the generation of activated plasmablasts (75, 33)(FIG. 19).

D. Immunoglobulin Binding and Toxicity Attributes of SpA

The N-terminal immunoglobulin-binding domains (IgBDs) of SpA (134-137, 72 amino acid residue triple-helical folds designated E, D, A, B, and C) each bind to the Fcγ-domains of human IgG1, IgG2, and IgG4 (112-116, 71)(FIG. 20). SpA does not bind to the Fcγ-domain of human IgG3, the only IgG subclass with short plasma half-life (113, 117). Each of the five IgBDs also bind to the variant heavy chains of VH3 clonal human immunoglobulin, including IgM (BCRs), IgG, IgE, IgD and IgA (75, 48, 76, 118-135, 43)(FIG. 19). The binding sites of IgBDs are non-overlapping, allowing each SpA module to simultaneously bind Fcγ and VH3-heavy chains of antibodies (48) (FIG. 20). A key attribute of SpA is its ability to interfere with the effector functions (Fcγ) of antibodies, including the binding sites for Fcγ receptors (FcγR) and C1q, which are required for OPK by immune cells (71, 72, 136, 137)(FIG. 18B). In the human immune system, 54% of IgM (which lacks Fcγ) and peripheral blood B cells interact with SpA (75, 73, 74). SpA binding is restricted to variant heavy chain products of the VH3 gene family, which comprises 22 genes, as compared to other major and minor VH genes with fewer genes: VH1 [11 genes], VH2 [2 genes], VH4 [11 genes], VH5 [2 genes], VH6 [1 gene] and VH7 [1 gene](138). During colonization and invasive disease, released SpA crosslinks VH3 clonal B cell receptors and triggers the secretion of antibodies (IgG, IgA, IgD, and IgE) that, while adapted via somatic hypermutation for improved binding of variant heavy chains to SpA, are unable to recognize staphylococcal determinants as antigens (15)(FIG. 19). This B cell superantigen activity (BCSA, i.e. the VH3-binding activity of released SpA) is responsible for preventing the development of protective immunity against *S. aureus* during colonization or invasive disease (102, 48, 139)(FIG. 19).

The immunoglobulin-binding attributes of SpA are also associated with toxicity when the purified protein is injected into humans or animals. For example, 20-30% of guinea pig IgM interact with SpA via their variant heavy chains (VH3-idiotype) (76); injection of purified SpA (500 μg) into the bloodstream of guinea pigs produces anaphylactic shock, including restlessness, respiratory distress and death (140). Even at a dose of 0.01 μg, SpA causes vascular leakage in guinea pigs (140). In mice, only 5-10% of IgM interact with SpA via their variant heavy chains (VH3-idiotype)(76). Mice are resistant to SpA-induced anaphylaxis, however these animals, when treated with intravenous injection of human IgG, can be converted and succumb to SpA injection via histamine release from activated basophils and mast cells (141, 142)(FIG. 21). SpA-induced anaphylactic shock is prevented by pre-treatment of animals with mepyramine, a H1 receptor histamine antagonist (140). Intravenous injection of purified SpA into humans (0.3-0.45 μg/kg) is associated with serious adverse events such as headache, nausea, myalgia, chest pain, pyrexia, acute lymphopenia and leukopenia (143). Thus, purified SpA represents a bacterial toxin and is not considered safe for use in humans (143, 144). The toxic activity of SpA is linked to its VH3-crosslinking activity for human IgG and IgE bound to its cognate receptors on basophils and mast cells, thereby triggering histamine and cytokine release, vasodilation, vascular leakage and shock (140, 142, 144, 145)(FIG. 21).

E. SpA$_{KKAA}$

When adjuvanted with aluminum hydroxide or Freund's adjuvant and injected into mice or guinea pigs, purified SpA does not elicit antibody responses in animals that are directed against its five IgBDs (76, 43). Similarly, *S. aureus* colonization or invasive disease is not associated with the development of SpA IgBD-specific antibodies in mice, guinea pigs, or humans (75, 102, 48, 43). Earlier studies developed recombinant SpA variants by first analyzing the D immunoglobulin-binding domain of SpA. Kim and co-workers substituted glutamine (Q or Gln) 9 and 10 with lysine (K or Lys), as well as aspartate (D or Asp) 36 and 37 with alanine (A or Ala), to disrupt the association of SpA-D with immunoglobulin (43). Substitutions Q9K, Q10K, D36A, and D37A were introduced into the recombinant polyhistidine-tagged SpA-D to generate SpA-D$_{KKAA}$. The ability of SpA-D or SpA-D$_{KKAA}$ that had been purified and retained on nickel-nitrilotriacetic acid-agarose (Ni-NTA) to bind and subsequently co-elute with human IgG or IgM was finally analyzed by ELISA. As expected, SpA-D retained human IgG and human IgM on Ni-NTA. In comparison with SpA-D, SpA-D$_{KKAA}$ captured 5.6 (±0.6) % (P<0.0001) of the human IgG and 75.6 (±4.6) % (P=0.008) of the human IgM (numbers in parenthesis represent the standard error of the means; statistically significant differences were calculated with the unpaired Student's t-test)(43). Introducing Q9K, Q10K, D36A, and D37A into each of the five IgBDs of recombinant, polyhistidine-tagged SpA (lacking the signal peptide, Xr, LysM and LPXTG sorting signal of full-length SpA precursor) generated SpA$_{KKAA}$ (FIG. 19)(42). When analyzed in comparison with polyhistidine-tagged, recombinant SpA, SpA$_{KKAA}$ captured 2.3 (±0.1) % of human IgG (P=0.0001), 2.2 (±0.1) % of the Fcγ fragment of human IgG (Fcγ binding activity, P<0.0001), 4.4 (±1.0) % of the F(ab) fragment of human IgG (VH3 binding activity, P<0.0001), and 4.2 (±0.1) % of human IgM (VH3 binding activity, P<0.0001) on Ni-NTA column (43). Thus, SpA$_{KKAA}$ exhibits defects for the two binding activities of SpA with human immunoglobulin, i.e. its association with the Fcγ domain of IgG (IgG1, IgG2 and IgG4) and the variant heavy chains of VH3-idiotypic immunoglobulin.

F. SpA$_{KKAA}$ as a Vaccine Antigen

Polyhistidine tagged, recombinant SpA and SpA$_{KKAA}$ were purified by immobilized-metal affinity chromatography (IMAC) on Ni-NTA (43). Eluate was dialyzed with PBS, Triton X-114 extracted to remove endotoxin, dialyzed, protein concentration determined (BCA assay) and purity (>90%) verified by Coomassie-stained SDS-PAGE and HPLC (43). SpA as well as SpA$_{KKAA}$ could be adsorbed to either aluminum hydroxide [SpA$_{KKAA}$ Al(OH)3] or were emulsified with Freund's adjuvant, either complete [SpA$_{KKAA}$ CFA] or incomplete [SpA$_{KKAA}$ IFA](43). Prime-booster (11-day interval) immunization of C57BL/6 and BALB/c mice with 50 μg SpA$_{KKAA}$ CFA/IFA elicits high-titer serum IgG antibodies [9.2 μg/ml (±1.1); 1:6,000 ELISA half-maximal titer] against SpA$_{KKAA}$ antigen (43). Prime-booster immunization of C57BL/6 and BALB/c mice with 50 μg SpA$_{KKAA}$ Al(OH)3 generates low-titer antibodies [1:500, half-maximal titer]; higher titer IgG is observed in CD1 mice immunized with SpA$_{KKAA}$ Al(OH)3 [1:4,000 half-maximal titer](76). Immunization of guinea pigs with a prime-2 booster regimen (14-day intervals) and 100 μg SpA$_{KKAA}$ Al(OH)3 results in high titer serum IgG against SpA$_{KKAA}$ [1:50,000 half-maximal titer](76). SpA$_{KKAA}$-specific mouse and guinea pig IgG bind to each of the five IgBDs of SpA and neutralize its ability to bind mouse, guinea pig or human IgG via Fcγ or VH3-idiotype heavy chains (76). Further, SpA$_{KKAA}$-specific mouse and guinea pig IgG neutralize SpA binding to immunoglobulin on the bacterial surface and promote S. aureus Newman and MRSA USA300 LAC OPK in anti-coagulated mouse, guinea pig and human blood (48, 76, 43). Immunization of mice and guinea pigs with SpA$_{KKAA}$ protects animals against S. aureus bloodstream infection (76, 43). Protection is based on SpA-neutralizing antibodies, as intraperitoneal or intravenous administration of purified polyclonal or monoclonal antibodies (mouse monoclonal antibody 3F6) directed against SpA IgBDs are sufficient to protect against S. aureus bloodstream infection (increased survival, reduced bacterial load in organ tissues and reduced abscess formation)(76, 84, 146, 147). Further, by neutralizing the BCSA of SpA (VH3-crosslinking activity), SpA-IgBD specific antibodies boost mouse and guinea pig IgG responses to secreted antigens during S. aureus bloodstream infection, enabling SpA$_{KKAA}$-immunized animals to clear bacterial evaders and establish protective immunity against recurrent disease (48, 76, 43, 147). In contrast, naïve or SpA-immunized animals cannot establish protective immunity against S. aureus (48, 43).

G. Role of SpA During S. aureus Colonization

Measuring bacterial adherence to human desquamated nasal epithelial cells and in vivo colonization of mice, earlier work sought to identify S. aureus factors that contribute to colonization (17, 18, 20). These include D-Ala and GlcNAc modifications of wall teichoic acids (WTA) that bind type F scavenger receptor (SREC-I) of nasal epithelia (18, 27, 28). Further, clumping factor B (ClfB) promotes staphylococcal adherence to loricrin and cytokeratin-10 in nasal epithelia (21). Compared with wild-type S. aureus, an isogenic clfB mutant exhibited diminished adherence to nasal epithelia of human volunteers (7). Iron-regulated surface determinant A (IsdA) contributes to iron-scavenging from host hemoproteins and binds lactoferrin, inhibiting the anti-staphylococcal activity of lactoferrin in nasal secretions (23, 24). S. aureus surface protein G (SasG) mediates zinc-dependent adhesion between bacterial cells during biofilm formation on nasal tissues (25, 26). Thus, several factors are required for staphylococcal adherence to nasopharyngeal tissues, biofilm formation and colonization (78). Importantly, nasal colonization of mice with human clinical isolates requires prior antibiotic treatment of animals to deplete resident microbiota and provide selection for antibiotic-resistant S. aureus (19). Thus, mice are not persistently colonized by human clinical S. aureus isolates (20). The role of staphylococcal protein A (SpA) during S. aureus nasal colonization has been enigmatic (29). When analyzed for 6,110 individuals in Oxfordshire (UK), all colonizing S. aureus strains express spa (32, 31). Although the tandem repeat structure of the spa gene promotes high frequency recombination, human colonization selects for spa alleles whose products maintain 5 IgBDs, which endows staphylococci with potent BCSA (33, 32). When analyzed with human volunteers that had been cleared of nasal carriage via mupirocin treatment, S. aureus spa expression was not required for bacterial adherence to human nasal tissue (34).

S. aureus WU1, a member of the multi-locus sequence type ST88 clade, was isolated from an outbreak of preputial gland abscesses among male C57BL/6 mice (102). Unlike human clinical isolates, S. aureus WU1 persistently colonizes the nasopharynx of C57BL/6 and BALB/c mice without antibiotic selection and is passed from dams to persistently colonize their offspring (102). Compared with wild-type S. aureus WU1, the ΔsrtA mutant, which cannot anchor any surface protein to the bacterial envelope, is unable to colonize the nasopharynx of C57BL/6 mice (102)(unpublished observation). In contrast, the Δspa mutant does not exhibit a defect in the initial colonization of mice (102). Nevertheless, the Δspa mutant cannot persist and is cleared from the nasopharynx of mice beginning three weeks after the initial colonization (102). Decolonization is associated with increased serum IgG against ClfB, IsdA, SasG and other staphylococcal surface proteins (102). Immunization of mice with purified SpA$_{KKAA}$ generates SpA-neutralizing antibodies that increase pathogen-specific IgG (including anti-ClfB, -IsdA, -SasG, -FnbA, -FnbB, -Coa), thereby promoting decolonization of *S. aureus* WU1 (102). Similarly, intraperitoneal administration of SpA-IgBD neutralizing mouse monoclonal antibody 3F6 promotes pathogen-specific increases in IgG and secretory IgA as well as *S. aureus* clearance from the nasopharynx and gastrointestinal tract (146). Together these data suggest that *S. aureus* colonization is associated with the release of SpA into host tissues and with the diversion of B cell responses, thereby enabling the pathogen's persistence on mucosal surfaces (102). SpA$_{KKAA}$-vaccine induced anti-SpA antibodies thwart this mechanism by promoting IgG responses against many different secreted staphylococcal antigens that together diminish *S. aureus* colonization (102).

H. Engineering SpA for Affinity Chromatography of Immunoglobulins and Monoclonal Antibodies (MAbs)

Recombinant SpA, full length or individual domains (E,D, A, B, C), have been used extensively as a ligand for affinity chromatography purification of monoclonal antibodies (MAbs)(147, 148). Many human MAbs developed for clinical use belong to the class of $V_H3$-idiotypic IgG1. Recombinant SpA can bind such antibodies via both the $V_H3$ variant framework and Fcγ (FIGS. 18 and 19), thereby requiring lower pH (pH 3.1) for MAb elution from SpA affinity resin (for example MabSelect™ which encompasses all five IgBDs E,D,A,B,C). Using lower pH for MAb elution is associated with antibody unfolding and aggregation (149). Further, recombinant wild-type SpA is sensitive to alkaline cleavage at Asn-Gly residues, which limits the usefulness of SpA affinity columns during cleaning-in-place protocols with alkali (≥0.1 M NaOH), which removes contaminating proteins and lipids and kills contaminating microorganisms (147, 149). The Z domain is a synthetic, engineered (idealized sequence derived from all five IgBDs of SpA) B domain that carries two amino acid substitutions, Ala$^1$Val and Gly$^{29}$Ala (148, 150, 151). The latter amino acid substitution removes the alkali-sensitive Asn$^{28}$-Gly$^{29}$ peptide bond (151, 152). Tandem repeats of two (ZZ), five (ZV) and ten (ZX) Z domains have been shown to bind antibodies and used for purification of MAbs (130, 150). The Gly$^{29}$Ala substitution also diminishes the binding of Z, ZZ and ZZZZ (MabSelectSure™) to the $V_H3$ framework of IgG1 antibodies and thereby diminishes the pH required for IgG1 elution (pH 3.7) (148, 151, 152). The alkali-sensitive Asn$^{28}$-Gly$^{29}$ bond is absent in the IgBD-C domain (Thr$^{28}$-Gly$^{29}$), which is inherently resistant to alkali (151). Computational analysis of free energy changes (ΔG) of folded, native versus unfolded IgBD-C variants (with one of eight amino acid substitutions at position Ser33 or Asp36) were hypothesized to correlate with changes in thermostability, however this conjecture was not experimentally validated (149). In silico reduced ΔG was further hypothesized to identify reduced binding to VH3 variant heavy chains; this conjecture was also not experimentally validated (149). Further, the assumptions that in silico predictions can identify amino acid substitutions with the weakest binding and greatest stability could also not be validated (149). Nevertheless, one mutant each, Ser$^{33}$Glu and Asp$^{36}$Arg, with intermediate changes in ΔG, was selected for experimental study by generating tandem repeats of five IgBD-C domains, each with a single amino acid substitution Gly29Ala, Ser$^{33}$Glu and Asp$^{36}$Arg, thereby yielding C-G29A.5d, C-S33A.5d and C-D36A.5d (149). All three proteins, C-G29A.5d, C-S33E.5d and C-D36A.5d bound to human IgG with association constants $K_a$ of 3-5×10$^8$ M$^{-1}$ (149). The association constant of wild-type protein A for human IgG is $K_a$ 1.4×10$^8$ M$^{-1}$ (153). To measure binding to VH3-idiotypic IgG, Yoshida et al. used papain treatment to generate Fab fragments from trastuzumab, a VH3-idiotypic IgG1 MAb produced in Chinese hamster ovary (CHO) cells that binds Her2 on some breast cancer cells (149). The affinity of C-G29A.5d for trastuzumab Fab was measured $K_a$ 4.4×10$^5$ M$^{-1}$; C-S33E.5d and C-D36A.5d exhibited nearly a 100-fold reduction in affinity ($K_a$ 5×10$^3$ M$^{-1}$), values that are in agreement with non-specific binding (149).

Here the inventors sought to improve SpA$_{KKAA}$ vaccine safety for future clinical testing, specifically by eliminating its VH3-crosslinking activity. SpA IgBD residues Gly29, Ser33, and Asp36 are located along a rim of helix 2 that contacts VH3 framework residues on human immunoglobulin heavy chains and establishes key bonds, thereby cross-linking VH3-idiotypic B cell receptors (138, 154). Earlier work already examined Asp$^{36,37}$Ala amino acid substitutions while developing the SpA$_{KKAA}$ vaccine antigen (43, 154). The inventors therefore focused on a systematic analysis of amino acids at positions Gly$^{29}$ and Ser$^{33}$ in each of the five IgBDs of SpA and studied their contributions to binding human immunoglobulin in the context of Gln$^9$Lys and Gln$^{10}$Lys, amino acid substitutions that are known to reduce SpA binding to Fcγ (48, 43). The ability of such SpA vaccine constructs to elicit SpA-specific antibodies and to generate protection against *S. aureus* colonization and invasive disease was explored. To evaluate safety, the inventors analyzed SpA vaccine candidates in vitro and with an in vivo preclinical model for their potency of inciting anaphylaxis in the presence of human $V_H3$-idiotypic IgG.

I. Staphylococcal Coagulases

Coagulases are enzymes produced by *Staphylococcus* bacteria that convert fibrinogen to fibrin. Coa and vW$_h$ activate prothrombin without proteolysis (Friedrich et al., 2003). The coagulaseprothrombin complex recognizes fibrinogen as a specific substrate, converting it directly into fibrin. The crystal structure of the active complex revealed binding of the D1 and D2 domains to prothrombin and insertion of its Ile1-Val$^2$ N-terminus into the Ile$^{16}$ pocket, inducing a functional active site in the zymogen through conformational change (Friedrich et al., 2003). Exosite I of α-thrombin, the fibrinogen recognition site, and proexosite I on prothrombin are blocked by the D2 of Coa (Friedrich et al., 2003). Nevertheless, association of the tetrameric (Coa.prothrombin)$_2$ complex binds fibrinogen at a new site with high affinity (Panizzi et al., 2006). This model explains the coagulant properties and efficient fibrinogen conversion by coagulase (Panizzi et al., 2006).

Fibrinogen is a large glycoprotein (Mr ~340,000), formed by three pairs of Aa-, IV-, and γ-chains covalently linked to form a "dimer of trimers," where A and B designate the fibrinopeptides released by thrombin cleavage (Panizzi et al., 2006). The elongated molecule folds into three separate domains, a central fragment E that contains the N-termini of all six chains and two flanking fragments D formed mainly by the C-termini of the IV- and γ-chains. These globular domains are connected by long triple-helical structures. Coagulase-prothrombin complexes, which convert human fibrinogen to the self-polymerizing fibrin, are not targeted by circulating thrombin inhibitors (Panizzi et al., 2006). Thus, staphylococcal coagulases bypass the physiological blood coagulation pathway.

All *S. aureus* strains secrete coagulase and vWbp (Bjerketorp et al., 2004; Field and Smith, 1945). Although early work reported important contributions of coagulase to the pathogenesis of staphylococcal infections (Ekstedt and Yotis, 1960; Smith et al., 1947), more recent investigations with molecular genetics tools challenged this view by observing no virulence phenotypes with endocarditis, skin abscess and mastitis models in mice (Moreillon et al., 1995; Phonimdaeng et al., 1990). Generating isogenic variants of *S. aureus* Newman, a fully virulent clinical isolate (Duthie et al., 1952), it is described herein that coa mutants indeed display virulence defects in a lethal bacteremia and renal abscess model in mice. In the inventors experience, *S. aureus* 8325-4 is not fully virulent and it is presumed that mutational lesions in this strain may not be able to reveal virulence defects in vivo. Moreover, antibodies raised against Coa or vWbp perturb the pathogenesis of *S. aureus* Newman infections to a degree mirroring the impact of gene deletions. Coa and vWbp contribute to staphylococcal abscess formation and lethal bacteremia and may also function as protective antigens in subunit vaccines.

Biochemical studies document the biological value of antibodies against Coa and vWbp. By binding to antigen and blocking its association with clotting factors, the antibodies prevent the formation of Coa.prothrombin and vWbp.prothrombin complexes. Passive transfer studies revealed protection of experimental animals against staphylococcal abscess formation and lethal challenge by Coa and vWbp antibodies. Thus, Coa and vWbp neutralizing antibodies generate immune protection against staphylococcal disease.

Earlier studies revealed a requirement of coagulase for resisting phagocytosis in blood (Smith et al., 1947) and the inventors observed a similar phenotype for Δcoa mutants in lepirudin-treated mouse blood (see Example 3 below). As vWbp displays higher affinity for human prothrombin than the mouse counterpart, it is suspected the same may be true for ΔvWbp variants in human blood. Further, expression of Coa and vWbp in abscess lesions as well as their striking distribution in the eosinophilic pseudocapsule surrounding (staphylococcal abscess communities (SACs) or the peripheral fibrin wall, suggest that secreted coagulases contribute to the establishment of these lesions. This hypothesis was tested and, indeed, Δcoa mutants were defective in the establishment of abscesses. A corresponding test, blocking Coa function with specific antibodies, produced the same effect. Consequently, it is proposed that the clotting of fibrin is a critical event in the establishment of staphylococcal abscesses that can be targeted for the development of protective vaccines. Due to their overlapping function on human prothrombin, both Coa and vWbp are considered excellent candidates for vaccine development.

J. Other Staphylococcal Antigens

Research over the past several decades identified *S. aureus* exotoxins, surface proteins and regulatory molecules as important virulence factors (Foster, 2005; Mazmanian et al., 2001; Novick, 2003). Much progress has been achieved regarding the regulation of these genes. For example, staphylococci perform a bacterial census via the secretion of auto-inducing peptides that bind to a cognate receptor at threshold concentration, thereby activating phospho-relay reactions and transcriptional activation of many of the exotoxin genes (Novick, 2003). The pathogenesis of staphylococcal infections relies on these virulence factors (secreted exotoxins, exopolysaccharides, and surface adhesins). The development of staphylococcal vaccines is hindered by the multifaceted nature of staphylococcal invasion mechanisms. It is well established that live attenuated micro-organisms are highly effective vaccines; immune responses elicited by such vaccines are often of greater magnitude and of longer duration than those produced by non-replicating immunogens. One explanation for this may be that live attenuated strains establish limited infections in the host and mimic the early stages of natural infection. Embodiments of the invention are directed to compositions and methods including variant SpA polypeptides and peptides, as well as other immunogenic extracellular proteins, polypeptides, and peptides (including both secreted and cell surface proteins or peptides) of gram positive bacteria for the use in mitigating or immunizing against infection. In particular embodiments the bacteria is a *Staphylococcus* bacteria. Extracellular proteins, polypeptides, or peptides include, but are not limited to secreted and cell surface proteins of the targeted bacteria.

The human pathogen *S. aureus* secretes EsxA and EsxB, two ESAT-6 like proteins, across the bacterial envelope (Burts et al., 2005, which is incorporated herein by reference). Staphylococcal esxA and esxB are clustered with six other genes in the order of transcription: esxA esaA essA esaB essB essC esaC esxB. The acronyms esa, ess, and esx stand for ESAT-6 secretion accessory, system, and extracellular, respectively, depending whether the encoded proteins play an accessory (esa) or direct (ess) role for secretion, or are secreted (esx) in the extracellular milieu. The entire cluster of eight genes is herein referred to as the Ess cluster. EsxA, esxB, essA, essB, and essC are all required for synthesis or secretion of EsxA and EsxB. Mutants that fail to produce EsxA, EsxB, and EssC display defects in the pathogenesis of *S. aureus* murine abscesses, suggesting that this specialized secretion system may be a general strategy of human bacterial pathogenesis. Secretion of non-WXG100 substrates by the ESX-1 pathway has been reported for several antigens including EspA, EspB, Rv3483c, and Rv3615c (Fortune et al., 2005; MacGurn et al., 2005; McLaughlin et al., 2007; Xu et al., 2007). The alternate ESX-5 pathway has also been shown to secrete both WXG100 and non-WXG100 proteins in pathogenic mycobacteria (Abdallah et al., 2007; Abdallah et al., 2006).

The *Staphylococcus aureus* Ess pathway can be viewed as a secretion module equipped with specialized transport components (Ess), accessory factors (Esa) and cognate secretion substrates (Esx). EssA, EssB and EssC are required for EsxA and EsxB secretion. Because EssA, EssB and EssC are predicted to be transmembrane proteins, it is contemplated that these proteins form a secretion apparatus. Some of the proteins in the ess gene cluster may actively transport secreted substrates (acting as motor) while others may regulate transport (regulator). Regulation may be achieved, but need not be limited to, transcriptional or post-translational mechanisms for secreted polypeptides, sorting of specific substrates to defined locations (e.g., extracellular medium or host cells), or timing of secretion events during infection. At this point, it is unclear whether all secreted Esx proteins function as toxins or contribute indirectly to pathogenesis.

Staphylococci rely on surface protein mediated-adhesion to host cells or invasion of tissues as a strategy for escape from immune defenses. Furthermore, *S. aureus* utilize surface proteins to sequester iron from the host during infection. The majority of surface proteins involved in staphylococcal pathogenesis carry C-terminal sorting signals, i.e., they are covalently linked to the cell wall envelope by sortase. Further, staphylococcal strains lacking the genes required for surface protein anchoring, i.e., sortase A and B, display a dramatic defect in the virulence in several different mouse models of disease. Thus, surface protein antigens represent a validated vaccine target as the corresponding genes are essential for the development of staphylococcal disease and can be exploited in various embodiments of the invention. The sortase enzyme superfamily are Gram-positive transpeptidases responsible for anchoring surface protein virulence factors to the peptidoglycan cell wall layer. Two sortase isoforms have been identified in *Staphylococcus aureus*, SrtA and SrtB. These enzymes have been shown to recognize a LPXTG motif in substrate proteins. The SrtB isoform appears to be important in heme iron acquisition and iron homeostasis, whereas the SrtA isoform plays a critical role in the pathogenesis of Gram-positive bacteria by modulating the ability of the *bacterium* to adhere to host tissue via the covalent anchoring of adhesins and other proteins to the cell wall peptidoglycan. In certain embodiments the SpA variants described herein can be used in combination with other staphylococcal proteins such as Coa, Eap, Ebh, Emp, EsaC, EsaB, EsxA, EsxB, Hla, SdrC, SdrD, SdrE, IsdA, IsdB, ClfA, ClfB, IsdC, SasF, vWbp, and/or vWh proteins.

Certain aspects of the invention include methods and compositions concerning proteinaceous compositions including polypeptides, peptides, or nucleic acid encoding SpA variant(s) and other staphylococcal antigens such as other proteins transported by the Ess pathway, or sortase substrates. These proteins may be modified by deletion, insertion, and/or substitution.

The Esx polypeptides include the amino acid sequence of Esx proteins from bacteria in the *Staphylococcus* genus. The Esx sequence may be from a particular *Staphylococcus* species, such as *Staphylococcus aureus*, and may be from a particular strain, such as Newman. In certain embodiments, the EsxA sequence is SAV0282 from strain Mu50 (which is the same amino acid sequence for Newman) and can be accessed using Genbank Accession Number Q99WU4 (gi|68565539), which is hereby incorporated by reference. In other embodiments, the EsxB sequence is SAV0290 from strain Mu50 (which is the same amino acid sequence for Newman) and can be accessed using Genbank Accession Number Q99WT7 (gi|68565532), which is hereby incorporated by reference. In further embodiments, other polypeptides transported by the Ess pathway may be used, the sequences of which may be identified by one of skill in the art using databases and internet accessible resources.

The sortase substrate polypeptides include, but are not limited to the amino acid sequence of SdrC, SdrD, SdrE, IsdA, IsdB, ClfA, ClfB, IsdC or SasF proteins from bacteria in the *Staphylococcus* genus. The sortase substrate polypeptide sequence may be from a particular *Staphylococcus* species, such as *Staphylococcus aureus*, and may be from a particular strain, such as Newman. In certain embodiments, the SdrD sequence is from strain N315 and can be accessed using Genbank Accession Number NP_373773.1 (gi|15926240), which is incorporated by reference. In other embodiments, the SdrE sequence is from strain N315 and can be accessed using Genbank Accession Number NP_373774.1 (gi|15926241), which is incorporated by reference. In other embodiments, the IsdA sequence is SAV1130 from strain Mu50 (which is the same amino acid sequence for Newman) and can be accessed using Genbank Accession Number NP_371654.1 (gi|15924120), which is incorporated by reference. In other embodiments, the IsdB sequence is SAV1129 from strain Mu50 (which is the same amino acid sequence for Newman) and can be accessed using Genbank Accession Number NP_371653.1 (gi|15924119), which is incorporated by reference. In further embodiments, other polypeptides transported by the Ess pathway or processed by sortase may be used, the sequences of which may be identified by one of skill in the art using databases and internet accessible resources.

Examples of various proteins that can be used in the context of the present invention can be identified by analysis of database submissions of bacterial genomes, including but not limited to accession numbers NC_002951 (GI:57650036 and GenBank CP000046), NC_002758 (GI:57634611 and GenBank BA000017), NC_002745 (GI:29165615 and GenBank BA000018), NC_003923 (GI:21281729 and GenBank BA000033), NC_002952 (GI:49482253 and GenBank BX571856), NC_002953 (GI:49484912 and GenBank BX571857), NC_007793 (GI:87125858 and GenBank CP000255), NC_007795 (GI:87201381 and GenBank CP000253) each of which are incorporated by reference.

As used herein, a "protein" or "polypeptide" refers to a molecule comprising at least ten amino acid residues. In some embodiments, a wild-type version of a protein or polypeptide are employed, however, in many embodiments of the invention, a modified protein or polypeptide is employed to generate an immune response. The terms described above may be used interchangeably. A "modified protein" or "modified polypeptide" or a "variant" refers to a protein or polypeptide whose chemical structure, particularly its amino acid sequence, is altered with respect to the wild-type protein or polypeptide. In some embodiments, a modified/variant protein or polypeptide has at least one modified activity or function (recognizing that proteins or polypeptides may have multiple activities or functions). It is specifically contemplated that a modified/variant protein or polypeptide may be altered with respect to one activity or function yet retain a wild-type activity or function in other respects, such as immunogenicity.

In certain embodiments the size of a protein or polypeptide (wild-type or modified) may comprise, but is not limited to, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 110, 120, 130, 140, 150, 160, 170, 180, 190, 200, 210, 220, 230, 240, 250, 275, 300, 325, 350, 375, 400, 425, 450, 475, 500, 525, 550, 575, 600, 625, 650, 675, 700, 725, 750, 775, 800, 825, 850, 875, 900, 925, 950, 975, 1000, 1100, 1200, 1300, 1400, 1500, 1750, 2000, 2250, 2500 amino molecules or greater, and any range derivable therein, or derivative of a corresponding amino sequence described or referenced herein. It is contemplated that polypeptides may be mutated by truncation, rendering them shorter than their corresponding wild-type form, but also they might be altered by fusing or conjugating a heterologous protein sequence with a particular function (e.g., for targeting or localization, for enhanced immunogenicity, for purification purposes, etc.).

As used herein, an "amino molecule" refers to any amino acid, amino acid derivative, or amino acid mimic known in the art. In certain embodiments, the residues of the proteinaceous molecule are sequential, without any non-amino molecule interrupting the sequence of amino molecule residues. In other embodiments, the sequence may comprise one or more non-amino molecule moieties. In particular embodiments, the sequence of residues of the proteinaceous molecule may be interrupted by one or more non-amino molecule moieties.

Accordingly, the term "proteinaceous composition" encompasses amino molecule sequences comprising at least one of the 20 common amino acids in naturally synthesized proteins, or at least one modified or unusual amino acid.

Proteinaceous compositions may be made by any technique known to those of skill in the art, including (i) the expression of proteins, polypeptides, or peptides through standard molecular biological techniques, (ii) the isolation of proteinaceous compounds from natural sources, or (iii) the chemical synthesis of proteinaceous materials. The nucleotide as well as the protein, polypeptide, and peptide sequences for various genes have been previously disclosed, and may be found in the recognized computerized databases. One such database is the National Center for Biotechnology Information's Genbank and GenPept databases (on the World Wide Web at ncbi.nlm.nih.gov/). The coding regions for these genes may be amplified and/or expressed using the techniques disclosed herein or as would be known to those of ordinary skill in the art.

Amino acid sequence variants of SpA, coagulases and other polypeptides of the invention can be substitutional, insertional, or deletion variants. A variation in a polypeptide of the invention may affect 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, or more non-contiguous or contiguous amino acids of the polypeptide, as compared to wild-type. A variant can comprise an amino acid sequence that is at least 50%, 60%, 70%, 80%, or 90%, including all values and ranges there between, identical to any sequence provided or referenced herein, e.g., SEQ ID NO:2-8 or SEQ ID NO:11-30, A variant can include 2, 3, 4, 5, 6, 7, 8, 9, 10, 11, 12, 13, 14, 15, 16, 17, 18, 19, 20, or more substitute amino acids. A polypeptide processed or secreted by the Ess pathway or other surface proteins (see Table 1) or sortase substrates from any *Staphylococcus* species and strain are contemplated for use in compositions and methods described herein.

Deletion variants typically lack one or more residues of the native or wild-type protein. Individual residues can be deleted or a number of contiguous amino acids can be deleted. A stop codon may be introduced (by substitution or insertion) into an encoding nucleic acid sequence to generate a truncated protein. Insertional mutants typically involve the addition of material at a non-terminal point in the polypeptide. This may include the insertion of one or more residues. Terminal additions, called fusion proteins, may also be generated. These fusion proteins include multimers or concatamers of one or more peptide or polypeptide described or referenced herein.

Substitutional variants typically contain the exchange of one amino acid for another at one or more sites within the protein, and may be designed to modulate one or more properties of the polypeptide, with or without the loss of other functions or properties. Substitutions may be conservative, that is, one amino acid is replaced with one of similar shape and charge. Conservative substitutions are well known in the art and include, for example, the changes of: alanine to serine; arginine to lysine; asparagine to glutamine or histidine; aspartate to glutamate; cysteine to serine; glutamine to asparagine; glutamate to aspartate; glycine to proline; histidine to asparagine or glutamine; isoleucine to leucine or valine; leucine to valine or isoleucine; lysine to arginine; methionine to leucine or isoleucine; phenylalanine to tyrosine, leucine or methionine; serine to threonine; threonine to serine; tryptophan to tyrosine; tyrosine to tryptophan or phenylalanine; and valine to isoleucine or leucine. Alternatively, substitutions may be non-conservative such that a function or activity of the polypeptide is affected. Non-conservative changes typically involve substituting a residue with one that is chemically dissimilar, such as a polar or charged amino acid for a nonpolar or uncharged amino acid, and vice versa.

TABLE 10

Exemplary surface proteins of *S. aureus* strains.

| SAV# | SA# | Surface | MW2 | Mu50 | N315 | Newman | MRSA252* | MSSA476* |
|---|---|---|---|---|---|---|---|---|
| SAV0111 | SA0107 | Spa | 492 | 450 | 450 | 520 | 516 | 492 |
| SAV2503 | SA2291 | FnBPA | 1015 | 1038 | 1038 | 741 | — | 1015 |
| SAV2502 | SA2290 | FnBPB | 943 | 961 | 961 | 677 | 965 | 957 |
| SAV0811 | SA0742 | ClfA | 946 | 935 | 989 | 933 | 1029 | 928 |
| SAV2630 | SA2423 | ClfB | 907 | 877 | 877 | 913 | 873 | 905 |
| Np | Np | Cna | 1183 | — | — | — | 1183 | 1183 |
| SAV0561 | SA0519 | SdrC | 955 | 953 | 953 | 947 | 906 | 957 |
| SAV0562 | SA0520 | SdrD | 1347 | 1385 | 1385 | 1315 | — | 1365 |
| SAV0563 | SA0521 | SdrE | 1141 | 1141 | 1141 | 1166 | 1137 | 1141 |
| Np | Np | Pls | — | — | — | — | — | — |
| SAV2654 | SA2447 | SasA | 2275 | 2271 | 2271 | 2271 | 1351 | 2275 |
| SAV2160 | SA1964 | SasB | 686 | 2481 | 2481 | 2481 | 2222 | 685 |
|  | SA1577 | SasC | 2186 | 213 | 2186 | 2186 | 2189 | 2186 |
| SAV0134 | SA0129 | SasD | 241 | 241 | 241 | 241 | 221 | 241 |
| SAV1130 | SA0977 | SasE/IsdA | 350 | 350 | 350 | 350 | 354 | 350 |
| SAV2646 | SA2439 | SasF | 635 | 635 | 635 | 635 | 627 | 635 |
| SAV2496 |  | SasG | 1371 | 525 | 927 | — | — | 1371 |
| SAV0023 | SA0022 | SasH | 772 | — | 772 | 772 | 786 | 786 |
| SAV1731 | SA1552 | SasI | 895 | 891 | 891 | 891 | 534 | 895 |
| SAV1129 | SA0976 | SasJ/IsdB | 645 | 645 | 645 | 645 | 652 | 645 |
|  | SA2381 | SasK | 198 | 211 | 211 | — | — | 197 |
| Np |  | SasL | — | 232 | — | — | — | — |
| SAV1131 | SA0978 | IsdC | 227 | 227 | 227 | 227 | 227 | 227 |

Proteins of the invention may be recombinant, or synthesized in vitro. Alternatively, a non-recombinant or recombinant protein may be isolated from bacteria. It is also contemplated that a bacteria containing such a variant may be implemented in compositions and methods of the invention. Consequently, a protein need not be isolated.

The term "functionally equivalent codon" is used herein to refer to codons that encode the same amino acid, such as the six codons for arginine or serine, and also refers to codons that encode biologically equivalent amino acids (see Table 11, below).

TABLE 11

Codon Table

| Amino Acids | | | Codons |
|---|---|---|---|
| Alanine | Ala | A | GCA GCC GCG GCU |
| Cysteine | Cys | C | UGC UGU |
| Aspartic acid | Asp | D | GAC GAU |
| Glutamic acid | Glu | E | GAA GAG |
| Phenylalanine | Phe | F | UUC UUU |
| Glycine | Gly | G | GGA GGC GGG GGU |
| Histidine | His | H | CAC CAU |
| Isoleucine | Ile | I | AUA AUC AUU |
| Lysine | Lys | K | AAA AAG |
| Leucine | Leu | L | UUA UUG CUA CUC CUG CUU |
| Methionine | Met | M | AUG |
| Asparagine | Asn | N | AAC AAU |
| Proline | Pro | P | CCA CCC CCG CCU |
| Glutamine | Gln | Q | CAA CAG |
| Arginine | Arg | R | AGA AGG CGA CGC CGG CGU |
| Serine | Ser | S | AGC AGU UCA UCC UCG UCU |
| Threonine | Thr | T | ACA ACC ACG ACU |
| Valine | Val | V | GUA GUC GUG GUU |
| Tryptophan | Trp | W | UGG |
| Tyrosine | Tyr | Y | UAC UAU |

It also will be understood that amino acid and nucleic acid sequences may include additional residues, such as additional N- or C-terminal amino acids, or 5' or 3' sequences, respectively, and yet still be essentially as set forth in one of the sequences disclosed herein, so long as the sequence meets the criteria set forth above, including the maintenance of biological protein activity (e.g., immunogenicity) where protein expression is concerned. The addition of terminal sequences particularly applies to nucleic acid sequences that may, for example, include various non-coding sequences flanking either of the 5' or 3' portions of the coding region.

The following is a discussion based upon changing of the amino acids of a protein to create a variant polypeptide or peptide. For example, certain amino acids may be substituted for other amino acids in a protein structure with or without appreciable loss of interactive binding capacity with structures such as, for example, antigen-binding regions of antibodies or binding sites on substrate molecules. Since it is the interactive capacity and nature of a protein that defines that protein's functional activity, certain amino acid substitutions can be made in a protein sequence, and in its underlying DNA coding sequence, and nevertheless produce a protein with a desirable property. It is thus contemplated by the inventors that various changes may be made in the DNA sequences of genes.

It is contemplated that in compositions of the invention, there is between about 0.001 mg and about 10 mg of total polypeptide, peptide, and/or protein per ml. The concentration of protein in a composition can be about, at least about or at most about 0.001, 0.010, 0.050, 0.1, 0.2, 0.3, 0.4, 0.5, 0.6, 0.7, 0.8, 0.9, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0 mg/ml or more (or any range derivable therein). Of this, about, at least about, or at most about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100% may be an SpA variant or a coagulase, and may be used in combination with other peptides or polypeptides, such as other bacterial peptides and/or antigens.

The present invention contemplates the administration of variant SpA polypeptides or peptides to effect a preventative therapy or therapeutic effect against the development of a disease or condition associated with infection by a *Staphylococcus* pathogen.

In certain aspects, combinations of staphylococcal antigens are used in the production of an immunogenic composition that is effective at treating or preventing staphylococcal infection. Staphylococcal infections progress through several different stages. For example, the staphylococcal life cycle involves commensal colonization, initiation of infection by accessing adjoining tissues or the bloodstream, and/or anaerobic multiplication in the blood. The interplay between *S. aureus* virulence determinants and the host defense mechanisms can induce complications such as endocarditis, metastatic abscess formation, and sepsis syndrome. Different molecules on the surface of the *bacterium* are involved in different steps of the infection cycle. Combinations of certain antigens can elicit an immune response which protects against multiple stages of staphylococcal infection. The effectiveness of the immune response can be measured either in animal model assays and/or using an opsonophagocytic assay.

K. Polypeptides and Polypeptide Production

The present invention describes polypeptides, peptides, and proteins and immunogenic fragments thereof for use in various embodiments of the present invention. For example, specific polypeptides are assayed for or used to elicit an immune response. In specific embodiments, all or part of the proteins of the invention can also be synthesized in solution or on a solid support in accordance with conventional techniques. Various automatic synthesizers are commercially available and can be used in accordance with known protocols. See, for example, Stewart and Young, (1984); Tam et al., (1983); Merrifield, (1986); and Barany and Merrifield (1979), each incorporated herein by reference.

Alternatively, recombinant DNA technology may be employed wherein a nucleotide sequence which encodes a peptide of the invention is inserted into an expression vector, transformed or transfected into an appropriate host cell and cultivated under conditions suitable for expression.

One embodiment of the invention includes the use of gene transfer to cells, including microorganisms, for the production and/or presentation of polypeptides or peptides. The gene for the polypeptide or peptide of interest may be transferred into appropriate host cells followed by culture of cells under the appropriate conditions. The generation of recombinant expression vectors, and the elements included therein, are well known in the art and briefly discussed herein. Alternatively, the protein to be produced may be an endogenous protein normally synthesized by the cell that is isolated and purified.

Another embodiment of the present invention uses autologous B lymphocyte cell lines, which are transfected with a viral vector that expresses an immunogen product, and more specifically, a protein having immunogenic activity. Other examples of mammalian host cell lines include, but are not limited to Vero and HeLa cells, other B- and T-cell lines, such as CEM, 721.221, H9, Jurkat, Raji, as well as cell lines of Chinese hamster ovary, W138, BHK, COS-7, 293, HepG2, 3T3, RIN and MDCK cells. In addition, a host cell strain may be chosen that modulates the expression of the inserted sequences, or that modifies and processes the gene product in the manner desired. Such modifications (e.g., glycosylation) and processing (e.g., cleavage) of protein products may be important for the function of the protein. Different host cells have characteristic and specific mechanisms for the post-translational processing and modification of proteins. Appropriate cell lines or host systems can be chosen to ensure the correct modification and processing of the foreign protein expressed.

A number of selection systems may be used including, but not limited to HSV thymidine kinase, hypoxanthine-guanine phosphoribosyltransferase, and adenine phosphoribosyltransferase genes, in tk–, hgprt– or aprt– cells, respectively. Also, anti-metabolite resistance can be used as the basis of selection: for dhfr, which confers resistance to trimethoprim and methotrexate; gpt, which confers resistance to mycophenolic acid; neo, which confers resistance to the aminoglycoside G418; and hygro, which confers resistance to hygromycin.

Animal cells can be propagated in vitro in two modes: as non-anchorage-dependent cells growing in suspension throughout the bulk of the culture or as anchorage-dependent cells requiring attachment to a solid substrate for their propagation (i.e., a monolayer type of cell growth).

Non-anchorage dependent or suspension cultures from continuous established cell lines are the most widely used means of large scale production of cells and cell products. However, suspension cultured cells have limitations, such as tumorigenic potential and lower protein production than adherent cells.

Where a protein is specifically mentioned herein, it is preferably a reference to a native or recombinant protein or optionally a protein in which any signal sequence has been removed. The protein may be isolated directly from the staphylococcal strain or produced by recombinant DNA techniques. Immunogenic fragments of the protein may be incorporated into the immunogenic composition of the invention. These are fragments comprising at least 10 amino acids, 20 amino acids, 30 amino acids, 40 amino acids, 50 amino acids, or 100 amino acids, including all values and ranges there between, taken contiguously from the amino acid sequence of the protein. In addition, such immunogenic fragments are immunologically reactive with antibodies generated against the Staphylococcal proteins or with antibodies generated by infection of a mammalian host with Staphylococci. Immunogenic fragments also include fragments that when administered at an effective dose, (either alone or as a hapten bound to a carrier), elicit a protective or therapeutic immune response against Staphylococcal infection, in certain aspects it is protective against *S. aureus* and/or *S. epidermidis* infection. Such an immunogenic fragment may include, for example, the protein lacking an N-terminal leader sequence, and/or a transmembrane domain and/or a C-terminal anchor domain. In a preferred aspect the immunogenic fragment according to the invention comprises substantially all of the extracellular domain of a protein which has at least 80% identity, at least 85% identity, at least 90% identity, at least 95% identity, or at least 97-99% identity, including all values and ranges there between, to a sequence selected segment of a polypeptide described or referenced herein.

Also included in immunogenic compositions of the invention are fusion proteins composed of one or more Staphylococcal proteins, or immunogenic fragments of staphylococcal proteins. Such fusion proteins may be made recombinantly and may comprise one portion of at least 1, 2, 3, 4, 5, or 6 staphylococcal proteins or segments. Alternatively, a fusion protein may comprise multiple portions of at least 1, 2, 3, 4 or 5 staphylococcal proteins. These may combine different Staphylococcal proteins and/or multiples of the same protein or protein fragment, or immunogenic fragments in the same protein (forming a multimer or a concatamer). Alternatively, the invention also includes individual fusion proteins of Staphylococcal proteins or immunogenic fragments thereof, as a fusion protein with heterologous sequences such as a provider of T-cell epitopes or purification tags, for example: β-galactosidase, glutathione-S-transferase, green fluorescent proteins (GFP), epitope tags such as FLAG, myc tag, poly histidine, or viral surface proteins such as influenza virus haemagglutinin, or bacterial proteins such as tetanus toxoid, diphtheria toxoid, or CRM197.

II. NUCLEIC ACIDS

In certain embodiments, the present invention concerns recombinant polynucleotides encoding the proteins, polypeptides, peptides of the invention. The nucleic acid sequences for SpA, coagulases and other bacterial proteins are included, all of which are incorporated by reference, and can be used to prepare peptides or polypeptides.

As used in this application, the term "polynucleotide" refers to a nucleic acid molecule that either is recombinant or has been isolated free of total genomic nucleic acid. Included within the term "polynucleotide" are oligonucleotides (nucleic acids of 100 residues or less in length), recombinant vectors, including, for example, plasmids, cosmids, phage, viruses, and the like. Polynucleotides include, in certain aspects, regulatory sequences, isolated substantially away from their naturally occurring genes or protein encoding sequences. Polynucleotides may be single-stranded (coding or antisense) or double-stranded, and may be RNA, DNA (genomic, cDNA or synthetic), analogs thereof, or a combination thereof. Additional coding or non-coding sequences may, but need not, be present within a polynucleotide.

In this respect, the term "gene," "polynucleotide," or "nucleic acid" is used to refer to a nucleic acid that encodes a protein, polypeptide, or peptide (including any sequences required for proper transcription, post-translational modification, or localization). As will be understood by those in the art, this term encompasses genomic sequences, expression cassettes, cDNA sequences, and smaller engineered nucleic acid segments that express, or may be adapted to express, proteins, polypeptides, domains, peptides, fusion proteins, and mutants. A nucleic acid encoding all or part of a polypeptide may contain a contiguous nucleic acid sequence of: 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 441, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, 1095, 1100, 1500, 2000, 2500, 3000, 3500, 4000, 4500, 5000, 5500, 6000, 6500, 7000, 7500, 8000, 9000, 10000, or more nucleotides, nucleosides, or base pairs, including all values and ranges therebetween, of a polynucleotide encoding one or more amino acid sequence described or referenced herein. It also is contemplated that a particular polypeptide may be encoded by nucleic acids containing variations having slightly different nucleic acid sequences but, nonetheless, encode the same or substantially similar protein (see Table 11 above).

In particular embodiments, the invention concerns isolated nucleic acid segments and recombinant vectors incorporating nucleic acid sequences that encode a variant SpA or coagulase. The term "recombinant" may be used in conjunction with a polynucleotide or polypeptide and generally refers to a polypeptide or polynucleotide produced and/or manipulated in vitro or that is a replication product of such a molecule.

In other embodiments, the invention concerns isolated nucleic acid segments and recombinant vectors incorporating nucleic acid sequences that encode a variant SpA or coagulase polypeptide or peptide to generate an immune response in a subject. In various embodiments the nucleic acids of the invention may be used in genetic vaccines.

The nucleic acid segments used in the present invention can be combined with other nucleic acid sequences, such as promoters, polyadenylation signals, additional restriction enzyme sites, multiple cloning sites, other coding segments, and the like, such that their overall length may vary considerably. It is therefore contemplated that a nucleic acid fragment of almost any length may be employed, with the total length preferably being limited by the ease of preparation and use in the intended recombinant nucleic acid protocol. In some cases, a nucleic acid sequence may encode a polypeptide sequence with additional heterologous coding sequences, for example to allow for purification of the polypeptide, transport, secretion, post-translational modification, or for therapeutic benefits such as targeting or efficacy. As discussed above, a tag or other heterologous polypeptide may be added to the modified polypeptide-encoding sequence, wherein "heterologous" refers to a polypeptide that is not the same as the modified polypeptide.

In certain other embodiments, the invention concerns isolated nucleic acid segments and recombinant vectors that include within their sequence a contiguous nucleic acid sequence from SEQ ID NO:2 (SpA domain D) or SEQ ID NO:4 (SpA) or any other nucleic acid sequences encoding coagulases or other secreted virulence factors and/or surface proteins including proteins transported by the Ess pathway, processed by sortase, or proteins incorporated herein by reference.

In certain embodiments, the present invention provides polynucleotide variants having substantial identity to the sequences disclosed herein; those comprising at least 70%, 75%, 80%, 85%, 90%, 95%, 96%, 97%, 98%, or 99% or higher sequence identity, including all values and ranges there between, compared to a polynucleotide sequence of this invention using the methods described herein (e.g., BLAST analysis using standard parameters).

The invention also contemplates the use of polynucleotides which are complementary to all the above described polynucleotides.

A. Vectors

Polypeptides of the invention may be encoded by a nucleic acid molecule comprised in a vector. The term "vector" is used to refer to a carrier nucleic acid molecule into which a heterologous nucleic acid sequence can be inserted for introduction into a cell where it can be replicated and expressed. A nucleic acid sequence can be "heterologous," which means that it is in a context foreign to the cell in which the vector is being introduced or to the nucleic acid in which is incorporated, which includes a sequence homologous to a sequence in the cell or nucleic acid but in a position within the host cell or nucleic acid where it is ordinarily not found. Vectors include DNAs, RNAs, plasmids, cosmids, viruses (bacteriophage, animal viruses, and plant viruses), and artificial chromosomes (e.g., YACs). One of skill in the art would be well equipped to construct a vector through standard recombinant techniques (for example Sambrook et al., 2001; Ausubel et al., 1996, both incorporated herein by reference). In addition to encoding a variant SpA polypeptide the vector can encode other polypeptide sequences such as a one or more other bacterial peptide, a tag, or an immunogenicity enhancing peptide. Useful vectors encoding such fusion proteins include pIN vectors (Inouye et al., 1985), vectors encoding a stretch of histidines, and pGEX vectors, for use in generating glutathione S-transferase (GST) soluble fusion proteins for later purification and separation or cleavage.

The term "expression vector" refers to a vector containing a nucleic acid sequence coding for at least part of a gene product capable of being transcribed. In some cases, RNA molecules are then translated into a protein, polypeptide, or peptide. Expression vectors can contain a variety of "control sequences," which refer to nucleic acid sequences necessary for the transcription and possibly translation of an operably linked coding sequence in a particular host organism. In addition to control sequences that govern transcription and translation, vectors and expression vectors may contain nucleic acid sequences that serve other functions as well and are described herein.

1. Promoters and Enhancers

A "promoter" is a control sequence. The promoter is typically a region of a nucleic acid sequence at which initiation and rate of transcription are controlled. It may contain genetic elements at which regulatory proteins and molecules may bind such as RNA polymerase and other transcription factors. The phrases "operatively positioned," "operatively linked," "under control," and "under transcriptional control" mean that a promoter is in a correct functional location and/or orientation in relation to a nucleic acid sequence to control transcriptional initiation and expression of that sequence. A promoter may or may not be used in conjunction with an "enhancer," which refers to a cis-acting regulatory sequence involved in the transcriptional activation of a nucleic acid sequence.

Naturally, it may be important to employ a promoter and/or enhancer that effectively directs the expression of the DNA segment in the cell type or organism chosen for expression. Those of skill in the art of molecular biology generally know the use of promoters, enhancers, and cell type combinations for protein expression (see Sambrook et al., 2001, incorporated herein by reference). The promoters employed may be constitutive, tissue-specific, or inducible and in certain embodiments may direct high level expression of the introduced DNA segment under specified conditions, such as large-scale production of recombinant proteins or peptides.

Various elements/promoters may be employed in the context of the present invention to regulate the expression of a gene. Examples of such inducible elements, which are regions of a nucleic acid sequence that can be activated in response to a specific stimulus, include but are not limited to Immunoglobulin Heavy Chain (Banerji et al., 1983; Gilles et al., 1983; Grosschedl et al., 1985; Atchinson et al., 1986, 1987; Imler et al., 1987; Weinberger et al., 1984; Kiledjian et al., 1988; Porton et al.; 1990), Immunoglobulin Light Chain (Queen et al., 1983; Picard et al., 1984), T Cell Receptor (Luria et al., 1987; Winoto et al., 1989; Redondo et al.; 1990), HLA DQ α and/or DQ β (Sullivan et al., 1987), β Interferon (Goodbourn et al., 1986; Fujita et al., 1987; Goodbourn et al., 1988), Interleukin-2 (Greene et al., 1989), Interleukin-2 Receptor (Greene et al., 1989; Lin et al., 1990), MHC Class II 5 (Koch et al., 1989), MHC Class II HLA-DRα (Sherman et al., 1989), β-Actin (Kawamoto et al., 1988; Ng et al.; 1989), Muscle Creatine Kinase (MCK) (Jaynes et al., 1988; Horlick et al., 1989; Johnson et al., 1989), Prealbumin (Transthyretin) (Costa et al., 1988), Elastase I (Ornitz et al., 1987), Metallothionein (MTII) (Karin et al., 1987; Culotta et al., 1989), Collagenase (Pinkert et al., 1987; Angel et al., 1987), Albumin (Pinkert et al., 1987; Tronche et al., 1989, 1990), α-Fetoprotein (Godbout et al., 1988; Campere et al., 1989), γ-Globin (Bodine et al., 1987; Perez-Stable et al., 1990), 13-Globin (Trudel et al., 1987), c-fos (Cohen et al., 1987), c-Ha-Ras (Triesman, 1986; Deschamps et al., 1985), Insulin (Edlund et al., 1985), Neural Cell Adhesion Molecule (NCAM) (Hirsh et al., 1990), α1-Antitrypain (Latimer et al., 1990), H2B (TH2B) Histone (Hwang et al., 1990), Mouse and/or Type I Collagen (Ripe et al., 1989), Glucose-Regulated Proteins (GRP94 and GRP78) (Chang et al., 1989), Rat Growth Hormone (Larsen et al., 1986), Human Serum Amyloid A (SAA) (Edbrooke et al., 1989), Troponin I (TN I) (Yutzey et al., 1989), Platelet-Derived Growth Factor (PDGF) (Pech et al., 1989), Duchenne Muscular Dystrophy (Klamut et al., 1990), SV40 (Banerji et al., 1981; Moreau et al., 1981; Sleigh et al., 1985; Firak et al., 1986; Herr et al., 1986; Imbra et al., 1986; Kadesch et al., 1986; Wang et al., 1986; Ondek et al., 1987; Kuhl et al., 1987; Schaffner et al., 1988), Polyoma (Swartzendruber et al., 1975; Vasseur et al., 1980; Katinka et al., 1980, 1981; Tyndell et al., 1981; Dandolo et al., 1983; de Villiers et al., 1984; Hen et al., 1986; Satake et al., 1988; Campbell et al., 1988), Retroviruses (Kriegler et al., 1982, 1983; Levinson et al., 1982; Kriegler et al., 1983, 1984a, b, 1988; Bosze et al., 1986; Miksicek et al., 1986; Celander et al., 1987; Thiesen et al., 1988; Celander et al., 1988; Choi et al., 1988; Reisman et al., 1989), Papilloma Virus (Campo et al., 1983; Lusky et al., 1983; Spandidos and Wilkie, 1983; Spalholz et al., 1985; Lusky et al., 1986; Cripe et al., 1987; Gloss et al., 1987; Hirochika et al., 1987; Stephens et al., 1987), Hepatitis B Virus (Bulla et al., 1986; Jameel et al., 1986; Shaul et al., 1987; Spandau et al., 1988; Vannice et al., 1988), Human Immunodeficiency Virus (Muesing et al., 1987; Hauber et al., 1988; Jakobovits et al., 1988; Feng et al., 1988; Takebe et al., 1988; Rosen et al., 1988; Berkhout et al., 1989; Laspia et al., 1989; Sharp et al., 1989; Braddock et al., 1989), Cytomegalovirus (CMV) IE (Weber et al., 1984; Boshart et al., 1985; Foecking et al., 1986), Gibbon Ape Leukemia Virus (Holbrook et al., 1987; Quinn et al., 1989).

Inducible elements include, but are not limited to MT II—Phorbol Ester (TFA)/Heavy metals (Palmiter et al., 1982; Haslinger et al., 1985; Searle et al., 1985; Stuart et al., 1985; Imagawa et al., 1987, Karin et al., 1987; Angel et al., 1987b; McNeall et al., 1989); MMTV (mouse mammary tumor virus)—Glucocorticoids (Huang et al., 1981; Lee et al., 1981; Majors et al., 1983; Chandler et al., 1983; Lee et al., 1984; Ponta et al., 1985; Sakai et al., 1988); β-Interferon—poly(rI)x/poly(rc) (Tavernier et al., 1983); Adenovirus 5 E2-ElA (Imperiale et al., 1984); Collagenase—Phorbol Ester (TPA) (Angel et al., 1987a); Stromelysin—Phorbol Ester (TPA) (Angel et al., 1987b); SV40—Phorbol Ester (TPA) (Angel et al., 1987b); Murine MX Gene—Interferon, Newcastle Disease Virus (Hug et al., 1988); GRP78 Gene -A23187 (Resendez et al., 1988); α-2-Macroglobulin—IL-6 (Kunz et al., 1989); Vimentin—Serum (Rittling et al., 1989); MHC Class I Gene H-2κb—Interferon (Blanar et al., 1989); HSP70—ElA/SV40 Large T Antigen (Taylor et al., 1989, 1990a, 1990b); Proliferin—Phorbol Ester/TPA (Mordacq et al., 1989); Tumor Necrosis Factor—PMA (Hensel et al., 1989); and Thyroid Stimulating Hormone α Gene—Thyroid Hormone (Chatterjee et al., 1989).

The particular promoter that is employed to control the expression of peptide or protein encoding polynucleotide of the invention is not believed to be critical, so long as it is capable of expressing the polynucleotide in a targeted cell, preferably a bacterial cell. Where a human cell is targeted, it is preferable to position the polynucleotide coding region adjacent to and under the control of a promoter that is capable of being expressed in a human cell. Generally speaking, such a promoter might include either a bacterial, human or viral promoter.

In embodiments in which a vector is administered to a subject for expression of the protein, it is contemplated that a desirable promoter for use with the vector is one that is not down-regulated by cytokines or one that is strong enough that even if down-regulated, it produces an effective amount of a variant SpA for eliciting an immune response. Non-limiting examples of these are CMV IE and RSV LTR. Tissue specific promoters can be used, particularly if expression is in cells in which expression of an antigen is desirable, such as dendritic cells or macrophages. The mammalian MHC I and MHC II promoters are examples of such tissue-specific promoters.

2. Initiation Signals and Internal Ribosome Binding Sites (IRES)

A specific initiation signal also may be required for efficient translation of coding sequences. These signals include the ATG initiation codon or adjacent sequences. Exogenous translational control signals, including the ATG initiation codon, may need to be provided. One of ordinary skill in the art would readily be capable of determining this and providing the necessary signals.

In certain embodiments of the invention, the use of internal ribosome entry sites (IRES) elements are used to create multigene, or polycistronic, messages. IRES elements are able to bypass the ribosome scanning model of 5' □ methylated Cap dependent translation and begin translation at internal sites (Pelletier and Sonenberg, 1988; Macejak and Sarnow, 1991). IRES elements can be linked to heterologous open reading frames. Multiple open reading frames can be transcribed together, each separated by an IRES, creating polycistronic messages. Multiple genes can be efficiently expressed using a single promoter/enhancer to transcribe a single message (see U.S. Pat. Nos. 5,925,565 and 5,935,819, herein incorporated by reference).

3. Selectable and Screenable Markers

In certain embodiments of the invention, cells containing a nucleic acid construct of the present invention may be identified in vitro or in vivo by encoding a screenable or selectable marker in the expression vector. When transcribed and translated, a marker confers an identifiable change to the cell permitting easy identification of cells containing the expression vector. Generally, a selectable marker is one that confers a property that allows for selection. A positive selectable marker is one in which the presence of the marker allows for its selection, while a negative selectable marker is one in which its presence prevents its selection. An example of a positive selectable marker is a drug resistance marker.

B. Host Cells

As used herein, the terms "cell," "cell line," and "cell culture" may be used interchangeably. All of these terms also include their progeny, which is any and all subsequent generations. It is understood that all progeny may not be identical due to deliberate or inadvertent mutations. In the context of expressing a heterologous nucleic acid sequence, "host cell" refers to a prokaryotic or eukaryotic cell, and it includes any transformable organism that is capable of replicating a vector or expressing a heterologous gene encoded by a vector. A host cell can, and has been, used as a recipient for vectors or viruses. A host cell may be "transfected" or "transformed," which refers to a process by which exogenous nucleic acid, such as a recombinant protein-encoding sequence, is transferred or introduced into the host cell. A transformed cell includes the primary subject cell and its progeny.

Host cells may be derived from prokaryotes or eukaryotes, including bacteria, yeast cells, insect cells, and mammalian cells for replication of the vector or expression of part or all of the nucleic acid sequence(s). Numerous cell lines and cultures are available for use as a host cell, and they can be obtained through the American Type Culture Collection (ATCC), which is an organization that serves as an archive for living cultures and genetic materials (www.atcc.org).

C. Expression Systems

Numerous expression systems exist that comprise at least a part or all of the compositions discussed above. Prokaryote- and/or eukaryote-based systems can be employed for use with the present invention to produce nucleic acid sequences, or their cognate polypeptides, proteins and peptides. Many such systems are commercially and widely available.

The insect cell/baculovirus system can produce a high level of protein expression of a heterologous nucleic acid segment, such as described in U.S. Pat. Nos. 5,871,986, 4,879,236, both herein incorporated by reference, and which can be bought, for example, under the name MAXBAC® 2.0 from INVITROGEN® and BACPACK™ BACULOVIRUS EXPRESSION SYSTEM FROM CLONTECH®.

In addition to the disclosed expression systems of the invention, other examples of expression systems include STRATAGENE®'s COMPLETE CONTROL™ Inducible Mammalian Expression System, which involves a synthetic ecdysone-inducible receptor, or its pET Expression System, an E. coli expression system. Another example of an inducible expression system is available from INVITROGEN®, which carries the T-REX™ (tetracycline-regulated expression) System, an inducible mammalian expression system that uses the full-length CMV promoter. INVITROGEN® also provides a yeast expression system called the Pichia methanolica Expression System, which is designed for high-level production of recombinant proteins in the methylotrophic yeast Pichia methanolica. One of skill in the art would know how to express a vector, such as an expression construct, to produce a nucleic acid sequence or its cognate polypeptide, protein, or peptide.

III. POLYSACCHARIDES

The immunogenic compositions of the invention may further comprise capsular polysaccharides including one or more of PIA (also known as PNAG) and/or S. aureus Type V and/or type VIII capsular polysaccharide and/or S. epidermidis Type I, and/or Type II and/or Type III capsular polysaccharide.

A. PIA (PNAG)

It is now clear that the various forms of staphylococcal surface polysaccharides identified as PS/A, PIA and SAA are the same chemical entity—PNAG (Maira-Litran et al., 2004). Therefore the term PIA or PNAG encompasses all these polysaccharides or oligosaccharides derived from them.

PIA is a polysaccharide intercellular adhesin and is composed of a polymer of (3-(1→6)-linked glucosamine substituted with N-acetyl and O-succinyl constituents. This polysaccharide is present in both S. aureus and S. epidermidis and can be isolated from either source (Joyce et al., 2003; Maira-Litran et al., 2002). For example, PNAG may be isolated from S. aureus strain MN8m (WO04/43407). PIA isolated from S. epidermidis is a integral constituent of biofilm. It is responsible for mediating cell-cell adhesion and probably also functions to shield the growing colony from the host's immune response. The polysaccharide previously known as poly-N-succinyl-β-(1→6)-glucosamine (PNSG) was recently shown not to have the expected structure since the identification of N-succinylation was incorrect (Maira-Litran et al., 2002). Therefore the polysaccharide formally known as PNSG and now found to be PNAG is also encompassed by the term PIA.

PIA (or PNAG) may be of different sizes varying from over 400 kDa to between 75 and 400 kDa to between 10 and 75 kDa to oligosaccharides composed of up to 30 repeat units (of β-(1→6)-linked glucosamine substituted with N-acetyl and O-succinyl constituents). Any size of PIA polysaccharide or oligosaccharide may be use in an immunogenic composition of the invention, in one aspect the polysaccharide is over 40 kDa. Sizing may be achieved by any method known in the art, for instance by microfluidization, ultrasonic irradiation or by chemical cleavage (WO 03/53462, EP497524, EP497525). In certain aspects PIA (PNAG) is at least or at most 40-400 kDa, 40-300 kDa, 50-350 kDa, 60-300 kDa, 50-250 kDa and 60-200 kDa.

PIA (PNAG) can have different degree of acetylation due to substitution on the amino groups by acetate. PIA produced in vitro is almost fully substituted on amino groups (95-100%). Alternatively, a deacetylated PIA (PNAG) can be used having less than 60%, 50%, 40%, 30%, 20%, 10% acetylation. Use of a deacetylated PIA (PNAG) is preferred since non-acetylated epitopes of PNAG are efficient at mediating opsonic killing of Gram positive bacteria, preferably S. aureus and/or S. epidermidis. In certain aspects, the PIA (PNAG) has a size between 40 kDa and 300 kDa and is deacetylated so that less than 60%, 50%, 40%, 30% or 20% of amino groups are acetylated.

The term deacetylated PNAG (dPNAG) refers to a PNAG polysaccharide or oligosaccharide in which less than 60%, 50%, 40%, 30%, 20% or 10% of the amino a groups are acetylated. In certain aspects, PNAG is deaceylated to form dPNAG by chemically treating the native polysaccharide. For example, the native PNAG is treated with a basic solution such that the pH rises to above 10. For instance the PNAG is treated with 0.1-5 M, 0.2-4 M, 0.3-3 M, 0.5-2 M, 0.75-1.5 M or 1 M NaOH, KOH or NH$_4$OH. Treatment is for at least 10 to 30 minutes, or 1, 2, 3, 4, 5, 10, 15 or 20 hours at a temperature of 20-100, 25-80, 30-60 or 30-50 or 35-45° C. dPNAG may be prepared as described in WO 04/43405.

The polysaccharide(s) can be conjugated or unconjugated to a carrier protein.

B. Type 5 and Type 8 Polysaccharides from *S. aureus*

Most strains of *S. aureus* that cause infection in man contain either Type 5 or Type 8 polysaccharides. Approximately 60% of human strains are Type 8 and approximately 30% are Type 5. The structures of Type 5 and Type 8 capsular polysaccharide antigens are described in Moreau et al., (1990) and Fournier et al., (1984). Both have FucNAcp in their repeat unit as well as ManNAcA which can be used to introduce a sulfhydryl group. The structures are:
Type 5
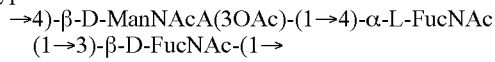
(1→3)-β-D-FucNAc-(1→
Type 8
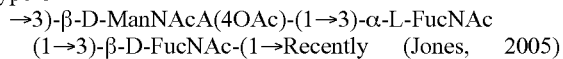
(1→3)-β-D-FucNAc-(1→Recently (Jones, 2005) NMR spectroscopy revised the structures to:
Type 5
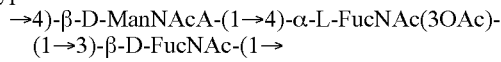
(1→3)-β-D-FucNAc-(1→
Type 8
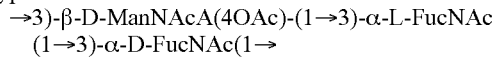
(1→3)-α-D-FucNAc(1→

Polysaccharides may be extracted from the appropriate strain of *S. aureus* using method well known to of skill in the art, See U.S. Pat. No. 6,294,177. For example, ATCC 12902 is a Type 5 *S. aureus* strain and ATCC 12605 is a Type 8 *S. aureus* strain.

Polysaccharides are of native size or alternatively may be sized, for instance by microfluidisation, ultrasonic irradiation, or by chemical treatment. The invention also covers oligosaccharides derived from the type 5 and 8 polysaccharides from *S. aureus*. The type 5 and 8 polysaccharides included in the immunogenic composition of the invention are preferably conjugated to a carrier protein as described below or are alternatively unconjugated. The immunogenic compositions of the invention alternatively contains either type 5 or type 8 polysaccharide.

C. *S. aureus* 336 Antigen

In an embodiment, the immunogenic composition of the invention comprises the *S. aureus* 336 antigen described in U.S. Pat. No. 6,294,177. The 336 antigen comprises β-linked hexosamine, contains no O-acetyl groups, and specifically binds to antibodies to *S. aureus* Type 336 deposited under ATCC 55804. In an embodiment, the 336 antigen is a polysaccharide which is of native size or alternatively may be sized, for instance by microfluidisation, ultrasonic irradiation, or by chemical treatment. The invention also covers oligosaccharides derived from the 336 antigen. The 336 antigen can be unconjugated or conjugated to a carrier protein.

D. Type I, II and III Polysaccharides from *S. epidermidis*

Amongst the problems associated with the use of polysaccharides in vaccination, is the fact that polysaccharides per se are poor immunogens. It is preferred that the polysaccharides utilized in the invention are linked to a protein carrier which provide bystander T-cell help to improve immunogenicity. Examples of such carriers which may be conjugated to polysaccharide immunogens include the Diphtheria and Tetanus toxoids (DT, DT CRM197 and TT respectively), Keyhole Limpet Haemocyanin (KLH), and the purified protein derivative of Tuberculin (PPD), *Pseudomonas aeruginosa* exoprotein A (rEPA), protein D from *Haemophilus influenzae*, pneumolysin or fragments of any of the above. Fragments suitable for use include fragments encompassing T-helper epitopes. In particular the protein D fragment from H. influenza will preferably contain the N-terminal ⅓ of the protein. Protein D is an IgD-binding protein from *Haemophilus influenzae* (EP 0 594 610 B1) and is a potential immunogen. In addition, staphylococcal proteins may be used as a carrier protein in the polysaccharide conjugates of the invention.

A carrier protein that would be particularly advantageous to use in the context of a staphylococcal vaccine is staphylococcal alpha toxoid. The native form may be conjugated to a polysaccharide since the process of conjugation reduces toxicity. Preferably genetically detoxified alpha toxins such as the His35Leu or His35Arg variants are used as carriers since residual toxicity is lower. Alternatively the alpha toxin is chemically detoxified by treatment with a cross-linking reagent, formaldehyde or glutaraldehyde. A genetically detoxified alpha toxin is optionally chemically detoxified, preferably by treatment with a cross-linking reagent, formaldehyde or glutaraldehyde to further reduce toxicity.

The polysaccharides may be linked to the carrier protein(s) by any known method (for example those methods described in U.S. Pat. Nos. 4,372,945, 4,474,757, and 4,356,170). Preferably, CDAP conjugation chemistry is carried out (see WO95/08348). In CDAP, the cyanylating reagent 1-cyano-dimethylaminopyridinium tetrafluoroborate (CDAP) is preferably used for the synthesis of polysaccharide-protein conjugates. The cyanilation reaction can be performed under relatively mild conditions, which avoids hydrolysis of the alkaline sensitive polysaccharides. This synthesis allows direct coupling to a carrier protein.

Conjugation preferably involves producing a direct linkage between the carrier protein and polysaccharide. Optionally a spacer (such as adipic dihydride (ADH)) may be introduced between the carrier protein and the polysaccharide.

IV. IMMUNE RESPONSE AND ASSAYS

As discussed above, the invention concerns evoking or inducing an immune response in a subject against a variant SpA or coagulase peptide. In one embodiment, the immune response can protect against or treat a subject having, suspected of having, or at risk of developing an infection or related disease, particularly those related to staphylococci. One use of the immunogenic compositions of the invention is to prevent nosocomial infections by inoculating a subject prior to undergoing procedures in a hospital or other environment having an increased risk of infection.

A. Immunoassays

The present invention includes the implementation of serological assays to evaluate whether and to what extent an immune response is induced or evoked by compositions of the invention. There are many types of immunoassays that can be implemented. Immunoassays encompassed by the present invention include, but are not limited to, those described in U.S. Pat. No. 4,367,110 (double monoclonal antibody sandwich assay) and U.S. Pat. No. 4,452,901

(western blot). Other assays include immunoprecipitation of labeled ligands and immunocytochemistry, both in vitro and in vivo.

Immunoassays generally are binding assays. Certain preferred immunoassays are the various types of enzyme linked immunosorbent assays (ELISAs) and radioimmunoassays (MA) known in the art. Immunohistochemical detection using tissue sections is also particularly useful. In one example, antibodies or antigens are immobilized on a selected surface, such as a well in a polystyrene microtiter plate, dipstick, or column support. Then, a test composition suspected of containing the desired antigen or antibody, such as a clinical sample, is added to the wells. After binding and washing to remove non specifically bound immune complexes, the bound antigen or antibody may be detected. Detection is generally achieved by the addition of another antibody, specific for the desired antigen or antibody, that is linked to a detectable label. This type of ELISA is known as a "sandwich ELISA." Detection also may be achieved by the addition of a second antibody specific for the desired antigen, followed by the addition of a third antibody that has binding affinity for the second antibody, with the third antibody being linked to a detectable label.

Competition ELISAs are also possible implementations in which test samples compete for binding with known amounts of labeled antigens or antibodies. The amount of reactive species in the unknown sample is determined by mixing the sample with the known labeled species before or during incubation with coated wells. The presence of reactive species in the sample acts to reduce the amount of labeled species available for binding to the well and thus reduces the ultimate signal. Irrespective of the format employed, ELISAs have certain features in common, such as coating, incubating or binding, washing to remove non specifically bound species, and detecting the bound immune complexes.

Antigen or antibodies may also be linked to a solid support, such as in the form of plate, beads, dipstick, membrane, or column matrix, and the sample to be analyzed is applied to the immobilized antigen or antibody. In coating a plate with either antigen or antibody, one will generally incubate the wells of the plate with a solution of the antigen or antibody, either overnight or for a specified period. The wells of the plate will then be washed to remove incompletely-adsorbed material. Any remaining available surfaces of the wells are then "coated" with a nonspecific protein that is antigenically neutral with regard to the test antisera. These include bovine serum albumin (BSA), casein, and solutions of milk powder. The coating allows for blocking of nonspecific adsorption sites on the immobilizing surface and thus reduces the background caused by nonspecific binding of antisera onto the surface.

B. Diagnosis of Bacterial Infection

In addition to the use of proteins, polypeptides, and/or peptides, as well as antibodies binding these polypeptides, proteins, and/or peptides, to treat or prevent infection as described above, the present invention contemplates the use of these polypeptides, proteins, peptides, and/or antibodies in a variety of ways, including the detection of the presence of Staphylococci to diagnose an infection, whether in a patient or on medical equipment which may also become infected. In accordance with the invention, a preferred method of detecting the presence of infections involves the steps of obtaining a sample suspected of being infected by one or more staphylococcal bacteria species or strains, such as a sample taken from an individual, for example, from one's blood, saliva, tissues, bone, muscle, cartilage, or skin. Following isolation of the sample, diagnostic assays utilizing the polypeptides, proteins, peptides, and/or antibodies of the present invention may be carried out to detect the presence of staphylococci, and such assay techniques for determining such presence in a sample are well known to those skilled in the art and include methods such as radioimmunoassay, western blot analysis and ELISA assays. In general, in accordance with the invention, a method of diagnosing an infection is contemplated wherein a sample suspected of being infected with staphylococci has added to it the polypeptide, protein, peptide, antibody, or monoclonal antibody in accordance with the present invention, and staphylococci are indicated by antibody binding to the polypeptides, proteins, and/or peptides, or polypeptides, proteins, and/or peptides binding to the antibodies in the sample.

Accordingly, antibodies in accordance with the invention may be used for the prevention of infection from staphylococcal bacteria (i.e., passive immunization), for the treatment of an ongoing infection, or for use as research tools. The term "antibodies" as used herein includes monoclonal, polyclonal, chimeric, single chain, bispecific, simianized, and humanized or primatized antibodies as well as Fab fragments, such as those fragments which maintain the binding specificity of the antibodies, including the products of an Fab immunoglobulin expression library. Accordingly, the invention contemplates the use of single chains such as the variable heavy and light chains of the antibodies. Generation of any of these types of antibodies or antibody fragments is well known to those skilled in the art. Specific examples of the generation of an antibody to a bacterial protein can be found in U.S. Patent Application Pub. No. 20030153022, which is incorporated herein by reference in its entirety.

Any of the above described polypeptides, proteins, peptides, and/or antibodies may be labeled directly with a detectable label for identification and quantification of staphylococcal bacteria. Labels for use in immunoassays are generally known to those skilled in the art and include enzymes, radioisotopes, and fluorescent, luminescent and chromogenic substances, including colored particles such as colloidal gold or latex beads. Suitable immunoassays include enzyme-linked immunosorbent assays (ELISA).

C. Protective Immunity

In some embodiments of the invention, proteinaceous compositions confer protective immunity to a subject. Protective immunity refers to a body's ability to mount a specific immune response that protects the subject from developing a particular disease or condition that involves the agent against which there is an immune response. An immunogenically effective amount is capable of conferring protective immunity to the subject.

As used herein in the specification and in the claims section that follows, the term polypeptide or peptide refer to a stretch of amino acids covalently linked there amongst via peptide bonds. Different polypeptides have different functionalities according to the present invention. While according to one aspect, a polypeptide is derived from an immunogen designed to induce an active immune response in a recipient, according to another aspect of the invention, a polypeptide is derived from an antibody which results following the elicitation of an active immune response in, for example, an animal, and which can serve to induce a passive immune response in the recipient. In both cases, however, the polypeptide is encoded by a polynucleotide according to any possible codon usage.

As used herein the phrase "immune response" or its equivalent "immunological response" refers to the development of a humoral (antibody mediated), cellular (mediated by antigen-specific T cells or their secretion products) or both humoral and cellular response directed against a protein, peptide, carbohydrate, or polypeptide of the invention in a recipient patient. Such a response can be an active response induced by administration of immunogen or a passive response induced by administration of antibody, antibody containing material, or primed T-cells. A cellular immune response is elicited by the presentation of polypeptide epitopes in association with Class I or Class II MHC molecules, to activate antigen-specific CD4 (+) T helper cells and/or CD8 (+) cytotoxic T cells. The response may also involve activation of monocytes, macrophages, NK cells, basophils, dendritic cells, astrocytes, microglia cells, eosinophils or other components of innate immunity. As used herein "active immunity" refers to any immunity conferred upon a subject by administration of an antigen.

As used herein "passive immunity" refers to any immunity conferred upon a subject without administration of an antigen to the subject. "Passive immunity" therefore includes, but is not limited to, administration of activated immune effectors including cellular mediators or protein mediators (e.g., monoclonal and/or polyclonal antibodies) of an immune response. A monoclonal or polyclonal antibody composition may be used in passive immunization for the prevention or treatment of infection by organisms that carry the antigen recognized by the antibody. An antibody composition may include antibodies that bind to a variety of antigens that may in turn be associated with various organisms. The antibody component can be a polyclonal antiserum. In certain aspects the antibody or antibodies are affinity purified from an animal or second subject that has been challenged with an antigen(s). Alternatively, an antibody mixture may be used, which is a mixture of monoclonal and/or polyclonal antibodies to antigens present in the same, related, or different microbes or organisms, such as gram-positive bacteria, gram-negative bacteria, including but not limited to *Staphylococcus* bacteria.

Passive immunity may be imparted to a patient or subject by administering to the patient immunoglobulins (Ig) and/or other immune factors obtained from a donor or other non-patient source having a known immunoreactivity. In other aspects, an antigenic composition of the present invention can be administered to a subject who then acts as a source or donor for globulin, produced in response to challenge with the antigenic composition ("hyperimmune globulin"), that contains antibodies directed against *Staphylococcus* or other organism. A subject thus treated would donate plasma from which hyperimmune globulin would then be obtained, via conventional plasma-fractionation methodology, and administered to another subject in order to impart resistance against or to treat *Staphylococcus* infection. Hyperimmune globulins according to the invention are particularly useful for immune-compromised individuals, for individuals undergoing invasive procedures or where time does not permit the individual to produce their own antibodies in response to vaccination. See U.S. Pat. Nos. 6,936,258, 6,770,278, 6,756,361, 5,548,066, 5,512,282, 4,338,298, and 4,748,018, each of which is incorporated herein by reference in its entirety, for exemplary methods and compositions related to passive immunity.

For purposes of this specification and the accompanying claims the terms "epitope" and "antigenic determinant" are used interchangeably to refer to a site on an antigen to which B and/or T cells respond or recognize. B-cell epitopes can be formed both from contiguous amino acids or noncontiguous amino acids juxtaposed by tertiary folding of a protein. Epitopes formed from contiguous amino acids are typically retained on exposure to denaturing solvents whereas epitopes formed by tertiary folding are typically lost on treatment with denaturing solvents. An epitope typically includes at least 3, and more usually, at least 5 or 8-10 amino acids in a unique spatial conformation. Methods of determining spatial conformation of epitopes include, for example, x-ray crystallography and 2-dimensional nuclear magnetic resonance. See, e.g., Epitope Mapping Protocols (1996). Antibodies that recognize the same epitope can be identified in a simple immunoassay showing the ability of one antibody to block the binding of another antibody to a target antigen. T-cells recognize continuous epitopes of about nine amino acids for CD8 cells or about 13-15 amino acids for CD4 cells. T cells that recognize the epitope can be identified by in vitro assays that measure antigen-dependent proliferation, as determined by $^3$H-thymidine incorporation by primed T cells in response to an epitope (Burke et al., 1994), by antigen-dependent killing (cytotoxic T lymphocyte assay, Tigges et al., 1996) or by cytokine secretion.

The presence of a cell-mediated immunological response can be determined by proliferation assays (CD4 (+) T cells) or CTL (cytotoxic T lymphocyte) assays. The relative contributions of humoral and cellular responses to the protective or therapeutic effect of an immunogen can be distinguished by separately isolating IgG and T-cells from an immunized syngeneic animal and measuring protective or therapeutic effect in a second subject.

As used herein and in the claims, the terms "antibody" or "immunoglobulin" are used interchangeably and refer to any of several classes of structurally related proteins that function as part of the immune response of an animal or recipient, which proteins include IgG, IgD, IgE, IgA, IgM and related proteins.

Under normal physiological conditions antibodies are found in plasma and other body fluids and in the membrane of certain cells and are produced by lymphocytes of the type denoted B cells or their functional equivalent. Antibodies of the IgG class are made up of four polypeptide chains linked together by disulfide bonds. The four chains of intact IgG molecules are two identical heavy chains referred to as H-chains and two identical light chains referred to as L-chains.

In order to produce polyclonal antibodies, a host, such as a rabbit or goat, is immunized with the antigen or antigen fragment, generally with an adjuvant and, if necessary, coupled to a carrier. Antibodies to the antigen are subsequently collected from the sera of the host. The polyclonal antibody can be affinity purified against the antigen rendering it monospecific.

Monoclonal antibodies can be produced by hyperimmunization of an appropriate donor with the antigen or ex-vivo by use of primary cultures of splenic cells or cell lines derived from spleen (Anavi, 1998; Huston et al., 1991; Johnson et al., 1991; Mernaugh et al., 1995).

As used herein and in the claims, the phrase "an immunological portion of an antibody" includes a Fab fragment of an antibody, a Fv fragment of an antibody, a heavy chain of an antibody, a light chain of an antibody, a heterodimer consisting of a heavy chain and a light chain of an antibody, a variable fragment of a light chain of an antibody, a variable fragment of a heavy chain of an antibody, and a single chain variant of an antibody, which is also known as scFv. In addition, the term includes chimeric immunoglobulins which are the expression products of fused genes derived from different species, one of the species can be a human, in which case a chimeric immunoglobulin is said to be humanized. Typically, an immunological portion of an antibody competes with the intact antibody from which it was derived for specific binding to an antigen.

Optionally, an antibody or preferably an immunological portion of an antibody, can be chemically conjugated to, or expressed as, a fusion protein with other proteins. For purposes of this specification and the accompanying claims, all such fused proteins are included in the definition of antibodies or an immunological portion of an antibody.

As used herein the terms "immunogenic agent" or "immunogen" or "antigen" are used interchangeably to describe a molecule capable of inducing an immunological response against itself on administration to a recipient, either alone, in conjunction with an adjuvant, or presented on a display vehicle.

D. Treatment Methods

A method of the present invention includes treatment for a disease or condition caused by a *Staphylococcus* pathogen. An immunogenic polypeptide of the invention can be given to induce an immune response in a person infected with *Staphylococcus* or suspected of having been exposed to *Staphylococcus*. Methods may be employed with respect to individuals who have tested positive for exposure to *Staphylococcus* or who are deemed to be at risk for infection based on possible exposure.

In particular, the invention encompasses a method of treatment for staphylococcal infection, particularly hospital acquired nosocomial infections. The immunogenic compositions and vaccines of the invention are particularly advantageous to use in cases of elective surgery. Such patients will know the date of surgery in advance and could be inoculated in advance. The immunogenic compositions and vaccines of the invention are also advantageous to use to inoculate health care workers.

In some embodiments, the treatment is administered in the presence of adjuvants or carriers or other staphylococcal antigens. Furthermore, in some examples, treatment comprises administration of other agents commonly used against bacterial infection, such as one or more antibiotics.

The use of peptides for vaccination can require, but not necessarily, conjugation of the peptide to an immunogenic carrier protein, such as hepatitis B surface antigen, keyhole limpet hemocyanin, or bovine serum albumin. Methods for performing this conjugation are well known in the art.

V. VACCINE AND OTHER PHARMACEUTICAL COMPOSITIONS AND ADMINISTRATION

A. Vaccines

The present invention includes methods for preventing or ameliorating staphylococcal infections, particularly hospital acquired nosocomial infections. As such, the invention contemplates vaccines for use in both active and passive immunization embodiments. Immunogenic compositions, proposed to be suitable for use as a vaccine, may be prepared from immunogenic SpA polypeptide(s), such as a SpA domain D variant, or immunogenic coagulases. In other embodiments SpA or coagulases can be used in combination with other secreted virulence proteins, surface proteins or immunogenic fragments thereof. In certain aspects, antigenic material is extensively dialyzed to remove undesired small molecular weight molecules and/or lyophilized for more ready formulation into a desired vehicle.

Other options for a protein/peptide-based vaccine involve introducing nucleic acids encoding the antigen(s) as DNA vaccines. In this regard, recent reports described construction of recombinant vaccinia viruses expressing either 10 contiguous minimal CTL epitopes (Thomson, 1996) or a combination of B cell, cytotoxic T-lymphocyte (CTL), and T-helper (Th) epitopes from several microbes (An, 1997), and successful use of such constructs to immunize mice for priming protective immune responses. Thus, there is ample evidence in the literature for successful utilization of peptides, peptide-pulsed antigen presenting cells (APCs), and peptide-encoding constructs for efficient in vivo priming of protective immune responses. The use of nucleic acid sequences as vaccines is exemplified in U.S. Pat. Nos. 5,958,895 and 5,620,896.

The preparation of vaccines that contain polypeptide or peptide sequence(s) as active ingredients is generally well understood in the art, as exemplified by U.S. Pat. Nos. 4,608,251; 4,601,903; 4,599,231; 4,599,230; 4,596,792; and 4,578,770, all of which are incorporated herein by reference. Typically, such vaccines are prepared as injectables either as liquid solutions or suspensions: solid forms suitable for solution in or suspension in liquid prior to injection may also be prepared. The preparation may also be emulsified. The active immunogenic ingredient is often mixed with excipients that are pharmaceutically acceptable and compatible with the active ingredient. Suitable excipients are, for example, water, saline, dextrose, glycerol, ethanol, or the like and combinations thereof. In addition, if desired, the vaccine may contain amounts of auxiliary substances such as wetting or emulsifying agents, pH buffering agents, or adjuvants that enhance the effectiveness of the vaccines. In specific embodiments, vaccines are formulated with a combination of substances, as described in U.S. Pat. Nos. 6,793,923 and 6,733,754, which are incorporated herein by reference.

Vaccines may be conventionally administered parenterally, by injection, for example, either subcutaneously or intramuscularly. Additional formulations which are suitable for other modes of administration include suppositories and, in some cases, oral formulations. For suppositories, traditional binders and carriers may include, for example, polyalkalene glycols or triglycerides: such suppositories may be formed from mixtures containing the active ingredient in the range of about 0.5% to about 10%, preferably about 1% to about 2%. Oral formulations include such normally employed excipients as, for example, pharmaceutical grades of mannitol, lactose, starch, magnesium stearate, sodium saccharine, cellulose, magnesium carbonate and the like. These compositions take the form of solutions, suspensions, tablets, pills, capsules, sustained release formulations or powders and contain about 10% to about 95% of active ingredient, preferably about 25% to about 70%.

The polypeptides and polypeptide-encoding DNA constructs may be formulated into a vaccine as neutral or salt forms. Pharmaceutically-acceptable salts include the acid addition salts (formed with the free amino groups of the peptide) and those that are formed with inorganic acids such as, for example, hydrochloric or phosphoric acids, or such organic acids as acetic, oxalic, tartaric, mandelic, and the like.

Typically, vaccines are administered in a manner compatible with the dosage formulation, and in such amount as will be therapeutically effective and immunogenic. The quantity to be administered depends on the subject to be treated, including the capacity of the individual's immune system to synthesize antibodies and the degree of protection desired. Precise amounts of active ingredient required to be administered depend on the judgment of the practitioner. However, suitable dosage ranges are of the order of several hundred micrograms of active ingredient per vaccination. Suitable regimes for initial administration and booster shots are also variable, but are typified by an initial administration followed by subsequent inoculations or other administrations.

The manner of application may be varied widely. Any of the conventional methods for administration of a vaccine are applicable. These are believed to include oral application within a solid physiologically acceptable base or in a physiologically acceptable dispersion, parenterally, by injection and the like. The dosage of the vaccine will depend on the route of administration and will vary according to the size and health of the subject.

In certain instances, it will be desirable to have multiple administrations of the vaccine, e.g., 2, 3, 4, 5, 6 or more administrations. The vaccinations can be at 1, 2, 3, 4, 5, 6, 7, 8, to 5, 6, 7, 8, 9, 10, 11, 12 twelve week intervals, including all ranges there between. Periodic boosters at intervals of 1-5 years will be desirable to maintain protective levels of the antibodies. The course of the immunization may be followed by assays for antibodies against the antigens, as described in U.S. Pat. Nos. 3,791,932; 4,174,384 and 3,949,064.

1. Carriers

A given composition may vary in its immunogenicity. It is often necessary therefore to boost the host immune system, as may be achieved by coupling a peptide or polypeptide to a carrier. Exemplary and preferred carriers are keyhole limpet hemocyanin (KLH) and bovine serum albumin (BSA). Other albumins such as ovalbumin, mouse serum albumin, or rabbit serum albumin can also be used as carriers. Means for conjugating a polypeptide to a carrier protein are well known in the art and include glutaraldehyde, m-maleimidobencoyl-N-hydroxysuccinimide ester, carbodiimyde, and bis-biazotized benzidine.

2. Adjuvants

The immunogenicity of polypeptide or peptide compositions can be enhanced by the use of non-specific stimulators of the immune response, known as adjuvants. Suitable adjuvants include all acceptable immunostimulatory compounds, such as cytokines, toxins, or synthetic compositions. A number of adjuvants can be used to enhance an antibody response against a variant SpA polypeptide or coagulase, or any other bacterial protein or combination contemplated herein. Adjuvants can (1) trap the antigen in the body to cause a slow release; (2) attract cells involved in the immune response to the site of administration; (3) induce proliferation or activation of immune system cells; or (4) improve the spread of the antigen throughout the subject's body.

Adjuvants include, but are not limited to, oil-in-water emulsions, water-in-oil emulsions, mineral salts, polynucleotides, and natural substances. Specific adjuvants that may be used include IL-1, IL-2, IL-4, IL-7, IL-12, γ-interferon, GMCSP, BCG, aluminum salts, such as aluminum hydroxide or other aluminum compound, MDP compounds, such as thur-MDP and nor-MDP, CGP (MTP-PE), lipid A, and monophosphoryl lipid A (MPL). RIBI, which contains three components extracted from bacteria, MPL, trehalose dimycolate (TDM), and cell wall skeleton (CWS) in a 2% squalene/Tween 80 emulsion. MHC antigens may even be used. Others adjuvants or methods are exemplified in U.S. Pat. Nos. 6,814,971, 5,084,269, 6,656,462, each of which is incorporated herein by reference).

In some embodiments, the adjuvant comprises an immunostimulator. Such immunostimulators may include, but are not limited to stimulators of pattern recognition receptors, such as Toll-like receptors, RIG-1 and NOD-like receptors (NLR), mineral salts, such as alum, alum combined with monphosphoryl lipid (MPL) A of Enterobacteria, such as *Escherichia coli, Salmonella minnesota, Salmonella typhimurium*, or *Shigella flexneri* or specifically with MPL® (A504), MPL A of above-mentioned bacteria separately, saponins, such as QS-21, Quil-A, ISCOMs, ISCOMATRIX, emulsions such as MF59, Montanide, ISA 51 and ISA 720, AS02 (QS21+squalene+MPL.), liposomes and liposomal formulations such as AS01, synthesized or specifically prepared microparticles and microcarriers such as bacteria-derived outer membrane vesicles (OMV) of *N. gonorrheae, Chlamydia trachomatis* and others, or chitosan particles, depot-forming agents, such as Pluronic block co-polymers, specifically modified or prepared peptides, such as muramyl dipeptide, aminoalkyl glucosaminide 4-phosphates, such as RC529, or proteins, such as bacterial toxoids or toxin fragments.

Various methods of achieving adjuvant affect for the vaccine includes use of agents such as aluminum hydroxide or phosphate (alum), commonly used as about 0.05 to about 0.1% solution in phosphate buffered saline, admixture with synthetic polymers of sugars (Carbopol®) used as an about 0.25% solution, aggregation of the protein in the vaccine by heat treatment with temperatures ranging between about 70° to about 101° C. for a 30-second to 2-minute period, respectively. Aggregation by reactivating with pepsin-treated (Fab) antibodies to albumin; mixture with bacterial cells (e.g., *C. parvum*), endotoxins or lipopolysaccharide components of Gram-negative bacteria; emulsion in physiologically acceptable oil vehicles (e.g., mannide monooleate (Aracel A)); or emulsion with a 20% solution of a perfluorocarbon (Fluosol-DA®) used as a block substitute may also be employed to produce an adjuvant effect.

Examples of and often preferred adjuvants include complete Freund's adjuvant (a non-specific stimulator of the immune response containing killed *Mycobacterium tuberculosis*), incomplete Freund's adjuvants, and aluminum hydroxide.

In some aspects, it is preferred that the adjuvant be selected to be a preferential inducer of either a Th1 or a Th2 type of response. High levels of Th1-type cytokines tend to favor the induction of cell mediated immune responses to a given antigen, while high levels of Th2-type cytokines tend to favor the induction of humoral immune responses to the antigen.

The distinction of Th1 and Th2-type immune response is not absolute. In reality an individual will support an immune response which is described as being predominantly Th1 or predominantly Th2. However, it is often convenient to consider the families of cytokines in terms of that described in murine CD4+ T cell clones by Mosmann and Coffman (Mosmann, and Coffman, 1989). Traditionally, Th1-type responses are associated with the production of the INF-γ and IL-2 cytokines by T-lymphocytes. Other cytokines often directly associated with the induction of Th1-type immune responses are not produced by T-cells, such as IL-12. In contrast, Th2-type responses are associated with the secretion of IL-4, IL-5, IL-6, IL-10.

In addition to adjuvants, it may be desirable to co-administer biologic response modifiers (BRM) to enhance immune responses. BRMs have been shown to upregulate T cell immunity or downregulate suppresser cell activity. Such BRMs include, but are not limited to, Cimetidine (CIM; 1200 mg/d) (Smith/Kline, P A); or low-dose Cyclophosphamide (CYP; 300 mg/m$^2$) (Johnson/Mead, N J) and cytokines such as y-interferon, IL-2, or IL-12 or genes encoding proteins involved in immune helper functions, such as B-7.

B. Lipid Components and Moieties

In certain embodiments, the present invention concerns compositions comprising one or more lipids associated with a nucleic acid or a polypeptide/peptide. A lipid is a substance that is insoluble in water and extractable with an organic solvent. Compounds other than those specifically described herein are understood by one of skill in the art as lipids, and are encompassed by the compositions and methods of the present invention. A lipid component and a non-lipid may be attached to one another, either covalently or non-covalently.

A lipid may be a naturally occurring lipid or a synthetic lipid. However, a lipid is usually a biological substance. Biological lipids are well known in the art, and include for example, neutral fats, phospholipids, phosphoglycerides, steroids, terpenes, lysolipids, glycosphingolipids, glucolipids, sulphatides, lipids with ether and ester-linked fatty acids and polymerizable lipids, and combinations thereof.

A nucleic acid molecule or a polypeptide/peptide, associated with a lipid may be dispersed in a solution containing a lipid, dissolved with a lipid, emulsified with a lipid, mixed with a lipid, combined with a lipid, covalently bonded to a lipid, contained as a suspension in a lipid or otherwise associated with a lipid. A lipid or lipid-poxvirus-associated composition of the present invention is not limited to any particular structure. For example, they may also simply be interspersed in a solution, possibly forming aggregates which are not uniform in either size or shape. In another example, they may be present in a bilayer structure, as micelles, or with a "collapsed" structure. In another non-limiting example, a lipofectamine(Gibco BRL)-poxvirus or Superfect (Qiagen)-poxvirus complex is also contemplated.

In certain embodiments, a composition may comprise about 1%, about 2%, about 3%, about 4% about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, about 41%, about 42%, about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, or any range therebetween, of a particular lipid, lipid type, or non-lipid component such as an adjuvant, antigen, peptide, polypeptide, sugar, nucleic acid or other material disclosed herein or as would be known to one of skill in the art. In a non-limiting example, a composition may comprise about 10% to about 20% neutral lipids, and about 33% to about 34% of a cerebroside, and about 1% cholesterol. In another non-limiting example, a liposome may comprise about 4% to about 12% terpenes, wherein about 1% of the micelle is specifically lycopene, leaving about 3% to about 11% of the liposome as comprising other terpenes; and about 10% to about 35% phosphatidyl choline, and about 1% of a non-lipid component. Thus, it is contemplated that compositions of the present invention may comprise any of the lipids, lipid types or other components in any combination or percentage range.

C. Combination Therapy

The compositions and related methods of the present invention, particularly administration of a secreted virulence factor or surface protein, including a variant SpA polypeptide or peptide, and/or other bacterial peptides or proteins to a patient/subject, may also be used in combination with the administration of traditional therapies. These include, but are not limited to, the administration of antibiotics such as streptomycin, ciprofloxacin, doxycycline, gentamycin, chloramphenicol, trimethoprim, sulfamethoxazole, ampicillin, tetracycline or various combinations of antibiotics.

In one aspect, it is contemplated that a polypeptide vaccine and/or therapy is used in conjunction with antibacterial treatment. Alternatively, the therapy may precede or follow the other agent treatment by intervals ranging from minutes to weeks. In embodiments where the other agents and/or a proteins or polynucleotides are administered separately, one would generally ensure that a significant period of time did not expire between the time of each delivery, such that the agent and antigenic composition would still be able to exert an advantageously combined effect on the subject. In such instances, it is contemplated that one may administer both modalities within about 12-24 h of each other or within about 6-12 h of each other. In some situations, it may be desirable to extend the time period for administration significantly, where several days (2, 3, 4, 5, 6 or 7) to several weeks (1, 2, 3, 4, 5, 6, 7 or 8) lapse between the respective administrations.

Various combinations may be employed, for example antibiotic therapy is "A" and the immunogenic molecule given as part of an immune therapy regime, such as an antigen, is "B":

A/B/A B/A/B B/B/A A/A/B A/B/B B/A/A A/B/B/B B/A/B/B

B/B/B/A B/B/A/B A/A/B/B A/B/A/B A/B/B/A B/B/A/A B/A/B/A B/A/A/B A/A/A/B B/A/A/A A/B/A/A A/A/B/A

Administration of the immunogenic compositions of the present invention to a patient/subject will follow general protocols for the administration of such compounds, taking into account the toxicity, if any, of the SpA composition, or other compositions described herein. It is expected that the treatment cycles would be repeated as necessary. It also is contemplated that various standard therapies, such as hydration, may be applied in combination with the described therapy.

D. General Pharmaceutical Compositions

In some embodiments, pharmaceutical compositions are administered to a subject. Different aspects of the present invention involve administering an effective amount of a composition to a subject. In some embodiments of the present invention, staphylococcal antigens, members of the Ess pathway, including polypeptides or peptides of the Esa or Esx class, and/or members of sortase substrates may be administered to the patient to protect against infection by one or more *Staphylococcus* pathogens. Alternatively, an expression vector encoding one or more such polypeptides or peptides may be given to a patient as a preventative treatment. Additionally, such compounds can be administered in combination with an antibiotic or an antibacterial. Such compositions will generally be dissolved or dispersed in a pharmaceutically acceptable carrier or aqueous medium.

In addition to the compounds formulated for parenteral administration, such as those for intravenous or intramuscular injection, other pharmaceutically acceptable forms include, e.g., tablets or other solids for oral administration; time release capsules; and any other form currently used, including creams, lotions, mouthwashes, inhalants and the like.

The active compounds of the present invention can be formulated for parenteral administration, e.g., formulated for injection via the intravenous, intramuscular, sub-cutaneous, or even intraperitoneal routes. The preparation of an aqueous composition that contains a compound or compounds that increase the expression of an WIC class I molecule will be known to those of skill in the art in light of the present disclosure. Typically, such compositions can be prepared as injectables, either as liquid solutions or suspensions; solid forms suitable for use to prepare solutions or suspensions upon the addition of a liquid prior to injection can also be prepared; and, the preparations can also be emulsified.

Solutions of the active compounds as free base or pharmacologically acceptable salts can be prepared in water suitably mixed with a surfactant, such as hydroxypropylcellulose. Dispersions can also be prepared in glycerol, liquid polyethylene glycols, and mixtures thereof and in oils. Under ordinary conditions of storage and use, these preparations contain a preservative to prevent the growth of microorganisms.

The pharmaceutical forms suitable for injectable use include sterile aqueous solutions or dispersions; formulations including sesame oil, peanut oil, or aqueous propylene glycol; and sterile powders for the extemporaneous preparation of sterile injectable solutions or dispersions. In all cases the form must be sterile and must be fluid to the extent that it may be easily injected. It also should be stable under the conditions of manufacture and storage and must be preserved against the contaminating action of microorganisms, such as bacteria and fungi.

The proteinaceous compositions may be formulated into a neutral or salt form. Pharmaceutically acceptable salts, include the acid addition salts (formed with the free amino groups of the protein) and which are formed with inorganic acids such as, for example, hydrochloric or phosphoric acids, or such organic acids as acetic, oxalic, tartaric, mandelic, and the like. Salts formed with the free carboxyl groups can also be derived from inorganic bases such as, for example, sodium, potassium, ammonium, calcium, or ferric hydroxides, and such organic bases as isopropylamine, trimethylamine, histidine, procaine and the like.

The carrier also can be a solvent or dispersion medium containing, for example, water, ethanol, polyol (for example, glycerol, propylene glycol, and liquid polyethylene glycol, and the like), suitable mixtures thereof, and vegetable oils. The proper fluidity can be maintained, for example, by the use of a coating, such as lecithin, by the maintenance of the required particle size in the case of dispersion, and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

Sterile injectable solutions are prepared by incorporating the active compounds in the required amount in the appropriate solvent with various of the other ingredients enumerated above, as required, followed by filtered sterilization. Generally, dispersions are prepared by incorporating the various sterilized active ingredients into a sterile vehicle which contains the basic dispersion medium and the required other ingredients from those enumerated above. In the case of sterile powders for the preparation of sterile injectable solutions, the preferred methods of preparation are vacuum-drying and freeze-drying techniques, which yield a powder of the active ingredient, plus any additional desired ingredient from a previously sterile-filtered solution thereof.

Administration of the compositions according to the present invention will typically be via any common route. This includes, but is not limited to oral, nasal, or buccal administration. Alternatively, administration may be by orthotopic, intradermal, subcutaneous, intramuscular, intraperitoneal, intranasal, or intravenous injection. In certain embodiments, a vaccine composition may be inhaled (e.g., U.S. Pat. No. 6,651,655, which is specifically incorporated by reference). Such compositions would normally be administered as pharmaceutically acceptable compositions that include physiologically acceptable carriers, buffers or other excipients. As used herein, the term "pharmaceutically acceptable" refers to those compounds, materials, compositions, and/or dosage forms which are, within the scope of sound medical judgment, suitable for contact with the tissues of human beings and animals without excessive toxicity, irritation, allergic response, or other problem complications commensurate with a reasonable benefit/risk ratio. The term "pharmaceutically acceptable carrier," means a pharmaceutically acceptable material, composition or vehicle, such as a liquid or solid filler, diluent, excipient, solvent or encapsulating material, involved in carrying or transporting a chemical agent.

For parenteral administration in an aqueous solution, for example, the solution should be suitably buffered, if necessary, and the liquid diluent first rendered isotonic with sufficient saline or glucose. These particular aqueous solutions are especially suitable for intravenous, intramuscular, subcutaneous, and intraperitoneal administration. In this connection, sterile aqueous media which can be employed will be known to those of skill in the art in light of the present disclosure. For example, one dosage could be dissolved in isotonic NaCl solution and either added to hypodermoclysis fluid or injected at the proposed site of infusion, (see for example, Remington's Pharmaceutical Sciences, 1990). Some variation in dosage will necessarily occur depending on the condition of the subject. The person responsible for administration will, in any event, determine the appropriate dose for the individual subject.

An effective amount of therapeutic or prophylactic composition is determined based on the intended goal. The term "unit dose" or "dosage" refers to physically discrete units suitable for use in a subject, each unit containing a predetermined quantity of the composition calculated to produce the desired responses discussed above in association with its administration, i.e., the appropriate route and regimen. The quantity to be administered, both according to number of treatments and unit dose, depends on the protection desired.

Precise amounts of the composition also depend on the judgment of the practitioner and are peculiar to each individual. Factors affecting dose include physical and clinical state of the subject, route of administration, intended goal of treatment (alleviation of symptoms versus cure), and potency, stability, and toxicity of the particular composition.

Upon formulation, solutions will be administered in a manner compatible with the dosage formulation and in such amount as is therapeutically or prophylactically effective. The formulations are easily administered in a variety of dosage forms, such as the type of injectable solutions described above.

E. In Vitro, Ex Vivo, or In Vivo Administration

As used herein, the term in vitro administration refers to manipulations performed on cells removed from or outside of a subject, including, but not limited to cells in culture. The term ex vivo administration refers to cells which have been manipulated in vitro, and are subsequently administered to a subject. The term in vivo administration includes all manipulations performed within a subject.

In certain aspects of the present invention, the compositions may be administered either in vitro, ex vivo, or in vivo. In certain in vitro embodiments, autologous B-lymphocyte cell lines are incubated with a virus vector of the instant invention for 24 to 48 hours or with a variant SpA and/or cogaulase and/or any other composition described herein for two hours. The transduced cells can then be used for in vitro analysis, or alternatively for ex vivo administration. U.S. Pat. Nos. 4,690,915 and 5,199,942, both incorporated herein by reference, disclose methods for ex vivo manipulation of blood mononuclear cells and bone marrow cells for use in therapeutic applications.

F. Antibodies and Passive Immunization

Another aspect of the invention is a method of preparing an immunoglobulin for use in prevention or treatment of staphylococcal infection comprising the steps of immunizing a recipient or donor with the vaccine of the invention and isolating immunoglobulin from the recipient or donor. An immunoglobulin prepared by this method is a further aspect of the invention. A pharmaceutical composition comprising the immunoglobulin of the invention and a pharmaceutically acceptable carrier is a further aspect of the invention which could be used in the manufacture of a medicament for the treatment or prevention of staphylococcal disease. A method for treatment or prevention of staphylococcal infection comprising a step of administering to a patient an effective amount of the pharmaceutical preparation of the invention is a further aspect of the invention.

Inocula for polyclonal antibody production are typically prepared by dispersing the antigenic composition in a physiologically tolerable diluent such as saline or other adjuvants suitable for human use to form an aqueous composition. An immunostimulatory amount of inoculum is administered to a mammal and the inoculated mammal is then maintained for a time sufficient for the antigenic composition to induce protective antibodies.

The antibodies can be isolated to the extent desired by well known techniques such as affinity chromatography (Harlow and Lane, 1988). Antibodies can include antiserum preparations from a variety of commonly used animals, e.g. goats, primates, donkeys, swine, horses, guinea pigs, rats or man.

An immunoglobulin produced in accordance with the present invention can include whole antibodies, antibody fragments or subfragments. Antibodies can be whole immunoglobulins of any class (e.g., IgG, IgM, IgA, IgD or IgE), chimeric antibodies or hybrid antibodies with dual specificity to two or more antigens of the invention. They may also be fragments (e.g., F(ab')2, Fab', Fab, Fv and the like) including hybrid fragments. An immunoglobulin also includes natural, synthetic, or genetically engineered proteins that act like an antibody by binding to specific antigens to form a complex.

A vaccine of the present invention can be administered to a recipient who then acts as a source of immunoglobulin, produced in response to challenge from the specific vaccine. A subject thus treated would donate plasma from which hyperimmune globulin would be obtained via conventional plasma fractionation methodology. The hyperimmune globulin would be administered to another subject in order to impart resistance against or treat staphylococcal infection. Hyperimmune globulins of the invention are particularly useful for treatment or prevention of staphylococcal disease in infants, immune compromised individuals, or where treatment is required and there is no time for the individual to produce antibodies in response to vaccination.

An additional aspect of the invention is a pharmaceutical composition comprising two of more monoclonal antibodies (or fragments thereof; preferably human or humanised) reactive against at least two constituents of the immunogenic composition of the invention, which could be used to treat or prevent infection by Gram positive bacteria, preferably staphylococci, more preferably *S. aureus* or *S. epidermidis*. Such pharmaceutical compositions comprise monoclonal antibodies that can be whole immunoglobulins of any class, chimeric antibodies, or hybrid antibodies with specificity to two or more antigens of the invention. They may also be fragments (e.g., F(ab')2, Fab', Fab, Fv and the like) including hybrid fragments.

Methods of making monoclonal antibodies are well known in the art and can include the fusion of splenocytes with myeloma cells (Kohler and Milstein, 1975; Harlow and Lane, 1988). Alternatively, monoclonal Fv fragments can be obtained by screening a suitable phage display library (Vaughan et al., 1998). Monoclonal antibodies may be humanized or part humanized by known methods.

VI. EXAMPLES

The following examples are given for the purpose of illustrating various embodiments of the invention and are not meant to limit the present invention in any fashion. One skilled in the art will appreciate readily that the present invention is well adapted to carry out the objects and obtain the ends and advantages mentioned, as well as those objects, ends and advantages inherent herein. The present examples, along with the methods described herein are presently representative of preferred embodiments, are exemplary, and are not intended as limitations on the scope of the invention. Changes therein and other uses which are encompassed within the spirit of the invention as defined by the scope of the claims will occur to those skilled in the art.

Example 1 Staphylococcal Protein a Contributes to Persistent Colonization of Mice with *Staphylococcus aureus*

*Staphylococcus aureus* persistently colonizes the nasopharynx of about a third of the human population, thereby promoting community- and hospital-acquired infections. Antibiotics are currently used for decolonization of individuals at increased risk of infection. However, the efficacy of antibiotics is limited by recolonization and selection for drug-resistant strains. Nasal colonization triggers IgG responses against staphylococcal surface antigens, however these antibodies cannot prevent subsequent colonization or disease. This example describes S. aureus WU1, a multi-locus sequence type ST88 isolate, that persistently colonizes the nasopharynx of mice. It is reported here that staphylococcal protein A (SpA) is required for persistence of S. aureus WU1 in the nasopharynx. Compared to animals colonized by wild-type S. aureus, mice colonized with the Δspa variant mount increased IgG responses against staphylococcal colonization determinants. Immunization of mice with a non-toxigenic SpA variant, which cannot crosslink B cell receptors and divert antibody responses, elicits protein A-neutralizing antibodies that promote IgG responses against colonizing S. aureus and diminish pathogen persistence.

A. Results

1. *Staphylococcus aureus* WU1.

An outbreak of preputial gland infections of male C57BL/6 mice was observed in an animal breeding colony. Samples were collected from preputial gland adenitis (PGA) and from the nasopharynx of male and female C75BL/6J mice and analyzed by growth on mannitol-salt agar (MSA) and Baird-Parker agar (BPA). Multi-locus sequence typing and spa genotyping revealed that animals had been colonized with S. aureus ST88 spa genotype t186, which was also responsible for PGA in male mice. S. aureus CC88 with spa genotype t186 have been reported before as stably colonizing isolates from laboratory mice in the United States (37). Other spa genotypes include t325, t448, t690, t755, t786, t2085, t2815, t5562, t11285 and t12341 (37). The New Zealand JSNZ isolate carries the distinct spa genotype t729 (37). Nonetheless, both S. aureus JSNZ and WU1 share the type 8 capsular polysaccharide genes and lack the mecA gene as well as mobile-genetic element (MGE) encoded T cell superantigens (37). Further, the hlb-converting phage that expresses human-specific immune evasion cluster 1 (IEC1) genes sak (staphylokinase), chp (CHIPS, chemotaxis inhibitory protein of S. aureus) and scn (SCIN-A, staphylococcal complement inhibitor A) is absent in the genome of WU1 resulting in an intact α-hemolysin encoding gene (hlb)(38). Of note, the WU1 encoded IEC2 carries the scn homologue scb/scc (SCIN-B/-C) along with hla (α-hemolysin) and ssl12-14 (staphylococcal superantigen-like 12-14) (39). Unlike other CC88 isolates that stably colonize mice (37), the genome of WU1 harbors the blaZ gene. When analyzed for genes encoding sortase-anchored surface proteins, it was observed that S. aureus WU1 carries genes for determinants previously associated with nasal colonization, including ClfB, IsdA, SdrC, SdrD, and SasG (TABLE 1).

TABLE 1

Conservation of protein products of select open reading frames in the genomes of S. aureus WU1, JSNZ and Newman

| Protein | Amino acid identity (%) WU1 gene product | |
|---|---|---|
| | JSNZ | Newman |
| SpA | 99 | 98 |
| ClfA | 100 | 93 |
| ClfB | 100 | 96 |
| FnBPA | 100 | 82 |
| FnBPB | 87 | 87 |
| IsdA | 100 | 100 |
| IsdB | 99 | 98 |
| SdrC | 100 | 100 |
| SdrD | 95 | 95 |
| SdrE | 100 | 98 |
| EsxA | 100 | 100 |
| EsxB | 100 | 100 |
| SasA | 100 | 99 |
| SasD | 100 | 99 |
| SasF | 100 | 98 |
| SasI | 99 | 100 |
| SasG | 100 | 69 |
| SasK | 100 | 93 [a] |
| Coa | 98 | 98 |
| vWbp | 100 | 71 |
| Hla | 78 | 99 |
| SCIN | 100 | 45 [b] |
| Eap | 100 | 99 |
| Efb | 100 | 99 |
| Ebh | 99 | 98 |
| TarS | 100 | 98 |

[a] Compared to the S. aureus 04-02981 strain
[b] Compared to the S. aureus USA300 strain S. aureus abscess formation has been linked to determinants of bacterial agglutination with fibrin (40, 41). Agglutination requires two S. aureus secreted products that activate host prothrombin to convert fibrinogen into fibrin: coagulase (Coa) and von Willebrand factor binding protein (vWbp) (40). Clumping factor A (ClfA) binds fibrinogen and coats staphylococci with coagulase-generated fibrin fibrils, thereby interfering with S. aureus uptake and killing by host phagocytes (41, 42). The clfA gene is identical in S. aureus WU1 and JSNZ yet displays allele-specific differences with clfA from S. aureus Newman (TABLE 1), a CC8 human clinical isolate that is used routinely for laboratory challenge experiments with mice (43). The observed differences in clfA are however clade specific, as they can be found in CC88 strains isolated either from human or from murine hosts (data not shown). The coa gene products of S. aureus WU1, JSNZ and Newman are virtually identical (TABLE 1). In contrast, the product of the vwb gene of S. aureus WU1 and JSNZ differs significantly from S. aureus Newman with the greatest sequence variation in the prothrombin-binding D1 and D2 domains (FIG. 1A) and were not recognized by polyclonal antibodies raised against Newman vWbp (FIG. 1B). Secreted vWbp from the two CC88 strains could be recognized by a serum that had been raised against the conserved C-terminal domain of vWbp from strain USA300 (FIG. 1C). In contrast to S. aureus Newman, which secretes large amounts of Coa and rapidly agglutinates human and mouse plasma, S. aureus WU1 and JSNZ secrete less Coa and agglutinate mouse plasma more readily than human plasma as compared to strain Newman (FIG. 1B,D,E). The coagulase activity of S. aureus Newman is dependent on coa and vwb expression, as the corresponding Δcoa, Δvwb and Δcoa Δvwb mutants displayed agglutination defects in mouse and human plasma (FIG. 1D,E). Taken together, these data suggest that the ST88 allele of the vwb gene in S. aureus WU1 and JSNZ may promote efficient prothrombin-mediated coagulation and fibrin agglutination in mouse plasma, which may support the pathogenesis of invasive diseases such as PGA.

2. S. aureus WU1 Persistently Colonizes the Nasopharynx of Mice.

To analyze S. aureus WU1 for its ability to colonize mice, cohorts (n=10) of female C57BL/6 animals were analyzed by spreading pharyngeal swabs and fecal material on BPA. Naïve mice lacking bacterial growth on BPA were anesthetized and inoculated by pipetting 10 µl suspensions of $1 \times 10^8$ CFU S. aureus WU1 in phosphate-buffered saline (PBS) into the right nostril. Animals were analyzed for colonization by swabbing the oropharynx in weekly intervals, i.e. 7, 14, 21, 28, 35, and 42 days following inoculation. Swabs were spread on BPA, incubated for colony formation and enumerated (FIG. 2A). Even without prior antibiotic treatment or antibiotic selection, S. aureus WU1 colonized experimental animals with a load ranging from 1.2-2.9 $\log_{10}$ CFU per swab over 42 days (FIG. 2A). To validate persistent colonization with S. aureus WU1, colonies obtained after 42 days were analyzed by MLST and spa genotyping. The data showed that mice were still colonized with ST88 spa t186, indicating that S. aureus WU1 persistently colonizes the nasopharynx of C57BL/6 mice. As a control, mock PBS inoculation of cohorts of C57BL/6J animals in separate cages that were maintained in the same animal facility room and the same cage racks as S. aureus WU1 colonized animals did not lead to staphylococcal colonization of the nasopharynx (FIG. 2A). Day 42 stool samples from mice were homogenized in PBS and plated on mannitol salt agar (MSA) for CFU enumeration (FIG. 2B). Stool samples of S. aureus WU1 colonized mice harbored 5.1-7.3 log 10 CFU g-1 feces, indicating that the gastrointestinal (GI) tract was also colonized with the S. aureus WU1 strain. As a control, mock (PBS) inoculated mice did not harbor S. aureus in their stool samples (FIG. 2B).

S. aureus WU1 colonization triggers serum IgG response in mice. Earlier work generated the S. aureus antigen matrix, which is comprised of 25 conserved secreted proteins. Each of the 25 recombinant affinity-tagged proteins was purified and immobilized on membrane filter (44). To measure host immune responses during colonization, naïve or S. aureus WU1 colonized animals were bled 15 days after inoculation and serum IgG responses were analyzed by incubation with the S. aureus antigen matrix. IgG binding was detected with IRDye 680-conjugated goat anti-mouse IgG (LI-COR) and quantified by infrared imaging. This experiment demonstrated that S. aureus WU1 colonization led to increases in serum IgG directed against the sortase-anchored surface proteins ClfA, ClfB, IsdA, and IsdB and to the giant extracellular matrix bind protein (Ebh), a cell size and peptidoglycan synthesis determinant of S. aureus (45) (TABLE 2).

TABLE 2

Serum IgG responses in C57BL/6J mice colonized with S. aureus WU1 or its Δspa variant

|  |  | WU1 (colonized) | | WU1Δspa (colonized) | | WU1Δspa (cleared) | |
|---|---|---|---|---|---|---|---|
|  | Antigens | Fold change[b] | p-value[c] (vs. naïve) | Fold change[b] | p-value[c] (vs. WU1 colonized) | Fold change[b] | p-value[c] (vs. WU1Δspa colonized) |
| Cell wall anchored surface protein | SpA$_{KKAA}$ | 1.3 ± 0.08 | n.s | 1.1 ± 0.06 | n.s. | 1.1 ± 0.49 | n.s. |
|  | ClfA | 5.3 ± 2.77 | <0.0001 | 4.3 ± 0.83 | n.s. | 3.5 ± 1.69 | n.s. |
|  | ClfB | 4.8 ± 0.72 | 0.001 | 3.9 ± 1.28 | n.s. | 17.4 ± 4.70 | <0.0001 |
|  | Ebh | 3.7 ± 0.50 | 0.0454 | 2.8 ± 0.62 | n.s. | 3.9 ± 1.56 | n.s. |
|  | FnbpA | 1.9 ± 0.89 | n.s. | 1.3 ± 0.79 | n.s. | 2.6 ± 0.96 | n.s. |
|  | FnbpB | 2.6 ± 1.33 | n.s. | 2.3 ± 0.85 | n.s. | 4.3 ± 0.96 | n.s. |
|  | IsdA | 4.5 ± 0.84 | 0.0036 | 2.1 ± 0.22 | n.s. | 13.0 ± 0.44 | <0.0001 |
|  | IsdB | 5.2 ± 1.43 | 0.0002 | 2.7 ± 0.83 | n.s. | 2.8 ± 1.18 | n.s. |
|  | SdrC | 1.1 ± 0.14 | n.s. | 1.5 ± 0.45 | n.s. | 1.7 ± 0.69 | n.s. |
|  | SdrD | 1.5 ± 1.08 | n.s. | 1.0 ± 0.25 | n.s. | 1.2 ± 0.35 | n.s. |
|  | SdrE | 1.8 ± 0.52 | n.s. | 2.9 ± 0.65 | n.s. | 1.4 ± 0.60 | n.s. |
|  | SasA | 3.0 ± 1.33 | n.s. | 1.1 ± 0.44 | n.s. | 3.3 ± 1.14 | n.s. |
|  | SasB | 5.1 ± 2.22 | n.s. | 1.0 ± 0.34 | n.s. | 5.7 ± 4.42 | n.s. |
|  | SasD | 2.7 ± 1.47 | n.s. | 0.7 ± 0.23 | n.s. | 1.3 ± 0.59 | n.s. |
|  | SasF | 1.2 ± 0.61 | n.s. | 0.9 ± 0.63 | n.s. | 1.2 ± 0.32 | n.s. |
|  | SasG | 2.1 ± 0.24 | n.s. | 1.2 ± 0.47 | n.s. | 10.3 ± 1.19 | <0.0001 |
|  | SasI | 1.4 ± 0.75 | n.s. | 1.2 ± 0.08 | n.s. | 1.4 ± 0.53 | n.s. |
|  | SasK | 2.5 ± 0.26 | n.s. | 1.3 ± 0.30 | n.s. | 1.7 ± 1.09 | n.s. |
| Secreted protein | Coa | 2.7 ± 0.29 | n.s. | 1.2 ± 0.45 | n.s. | 1.5 ± 0.45 | n.s. |
|  | vWbp | 2.0 ± 0.97 | n.s. | 1.4 ± 0.59 | n.s. | 1.7 ± 0.89 | n.s. |
|  | Hla | 1.8 ± 0.65 | n.s. | 1.2 ± 0.46 | n.s. | 1.2 ± 0.34 | n.s. |
|  | SCIN | 4.3 ± 1.23 | 0.0071 | 2.8 ± 1.80 | n.s. | 1.4 ± 0.49 | n.s. |
|  | Eap | 1.3 ± 0.20 | n.s. | 0.8 ± 0.97 | n.s. | 1.2 ± 0.31 | n.s. |
|  | Efb | 2.9 ± 1.68 | n.s. | 2.6 ± 1.63 | n.s. | 1.6 ± 0.52 | n.s. |
|  | EsxA | 2.6 ± 1.73 | n.s. | 1.6 ± 1.00 | n.s. | 2.6 ± 0.35 | n.s. |
|  | EsxB | 2.8 ± 0.28 | n.s. | 1.6 ± 0.19 | n.s. | 1.9 ± 0.21 | n.s. |

[a]Cohorts of C57BL/6J mice were inoculated intra-nasally with $10^8$ CFU of indicated S. aureus strains. 15 days following inoculation, animals were bled and serum samples were analyzed for antibody responses to staphylococcal antigens.
[b]Fold changes of were calculated by dividing the average signal intensities of inoculated mouse group by the average signal intensities of naïve mouse group. Data are presented in means ± standard deviation.
[c]p-values were calculated using Two-way ANOVA with Tukey multiple comparison tests. n.s. = not significant 3. S. aureus WU1 Requires Staphylococcal Protein a for Persistent Colonization.

Similar to S. aureus Newman SpA, the spa gene product of S. aureus WU1 is comprised of five IgBDs and carries a single amino acid substitution within the 278-residue domain. Immunoblotting experiments revealed that S. aureus strains Newman and WU1 produced similar amounts of SpA (FIG. 3A). Using allelic recombination, the inventors generated the Δspa mutant of S. aureus WU1. As measured by immunoblotting, SpA production was abolished in the Δspa mutant and this defect was restored by plasmid-borne expression of wild-type spa (pSpA)(FIG. 3A). Immunoblotting with antibodies against sortase A (SrtA) was used as a loading control (FIG. 3A). When inoculated into the right nostril of mice and analyzed for colonization by oropharyngeal swab on day 7, the Δspa mutant initially colonized C57BL/6J animals in a manner similar to wild-type strain WU1 (FIG. 3B). However, at later time points, particularly on day 35 and 42, the Δspa mutant colonized fewer animals than wild-type strain WU1 (FIG. 3B). During bacterial growth, S. aureus releases SpA-linked to peptidoglycan fragments into the surrounding milieu (46). In a mouse model of intravenous S. aureus challenge, released SpA activates B cell proliferation and enhanced secretion of VH3 idiotype IgM and IgG molecules (33). However, expanded VH3 idiotype IgG do not recognize staphylococcal antigens (33). The molecular basis for this B cell superantigen activity is based on SpA-mediated crosslinking of VH3 idiotype B cell receptors, which triggers B cell proliferation in a CD4 T helper cell and RIPK2 kinase dependent manner (33, 47). Animals infected with Δspa mutant staphylococci lack VH3 idiotypic immunoglobulin expansion and exhibit increased abundance of pathogen-specific IgG, thereby triggering immune responses that are protective against subsequent S. aureus infection (48). It was then wondered whether colonization with the Δspa mutant of WU1 was associated with altered serum IgG responses. Sera from animals that had been colonized for 15 days were analyzed for IgG binding to components of the S. aureus antigen matrix (TABLE 2). This experiment revealed increases in antibodies against ClfB, IsdA and SasG in animals that subsequently decolonized, but not in animals that remained colonized with the Δspa mutant (TABLE 2). Taken together, these data suggest that nasopharyngeal colonization of C57BL/6 mice with Δspa mutant staphylococci is associated with increased IgG responses against key colonization determinants, which appears to promote removal of Δspa mutant S. aureus from the nasopharynx.

4. Protein A-Neutralizing Antibodies Affect Persistent Colonization with S. aureus.

Immunization of mice with wild-type protein A does not elicit IgG serum antibodies that bind and neutralize the capacity of its five IgBDs to bind either the Fcγ domain of IgG molecules or the variant heavy chain of VH3 idiotype immunoglobulin (44). $SpA_{KKAA}$ is a variant with 20 amino acid substitutions throughout the five IgBDs of SpA that abolish Fcγ binding and also diminish association with VH3 idiotype immunoglobulin (44). Nevertheless, $SpA_{KKAA}$ retains the overall α-helical content and antigen structure of protein A. As a result, immunization of mice with adjuvanted $SpA_{KKAA}$ elicits high-titer protein A neutralizing IgG (44). These antibodies block the anti-opsonic and B cell superantigen activities of protein A during S. aureus infection, broadly enhancing IgG responses against staphylococcal antigens and promoting the development of protective immunity (44). To test whether or not protein A-neutralizing antibodies affect S. aureus colonization, C57BL/6 mice were immunized with adjuvanted $SpA_{KKAA}$ or with adjuvant alone. Compared to mock immunized animals, $SpA_{KKAA}$ treated animals elicited high titer protein A neutralizing antibodies (TABLE 3). When inoculated with S. aureus WU1, both mock and $SpA_{KKAA}$ immunized animals were initially colonized in a similar manner, as oropharyngeal swabs revealed average colonizing loads that were not significantly different on days 7 and 14 following inoculation (FIG. 4). However, beginning on day 21, $SpA_{KKAA}$ immunized mice were more frequently decolonized than mock-immunized animals (FIG. 4). When examined for serum IgG responses and compared naïve mice, S. aureus WU1 colonization in mock treated animals led to antibody responses against ClfB, IsdA, IsdB, SasD and SasF (TABLE 3). In animals that maintained S. aureus WU1 colonization, $SpA_{KKAA}$ immunization led to antibody responses against ClfA, Coa, vWBP, and Hla (TABLE 3). As compared to $SpA_{KKAA}$ vaccinated C57BL/6J mice, animals that subsequently decolonized exhibited elevated serum IgG against ClfA, ClfB, fibronectin binding proteins A (FnBPA) and B (FnBPB), IsdB, Coa, and SasG (TABLE 3). Together these data indicate that $SpA_{KKAA}$ vaccination elicits enhanced serum IgG responses in mice that had been colonized with S. aureus. Further, $SpA_{KKAA}$ vaccine induced antibodies against many different staphylococcal antigens, including known colonization factors (CHB, IsdA and SasG). Together, these $SpA_{KKAA}$ vaccine induced IgG responses against colonizing staphylococci appear to promote decolonization of the nasopharynx.

TABLE 3

Impact of $SpA_{KKAA}$ immunization on serum IgG responses in S. aureus WU1 colonized C57BL/6 mice

|  |  | $SpA_{KKAA}$ immunized (colonized) | | $SpA_{KKAA}$ immunized (cleared) | | PBS mock immunized (colonized) | |
|---|---|---|---|---|---|---|---|
|  | Antigens | Fold change [b] | p-value [d] (vs. PBS mock) | Fold change [b] | p-value [d] (vs. $SpA_{KKAA}$ immunized colonized) | Fold change [c] | p-value [d] (vs. naïve) |
| Cell wall anchored surface protein | $SpA_{KKAA}$ | 121.3 ± 64.98 | <0.0001 | 126.3 ± 13.35 | <0.0001 | 0.9 ± 0.16 | n.s. |
|  | ClfA | 3.8 ± 0.49 | <0.0001 | 5.7 ± 2.28 | 0.0069 | 1.3 ± 0.65 | n.s. |
|  | ClfB | 1.1 ± 0.28 | n.s. | 14.8 ± 1.12 | <0.0001 | 4.3 ± 1.49 | <0.0001 |
|  | Ebh | 1.0 ± 0.15 | n.s. | 1.3 ± 0.57 | n.s. | 1.3 ± 0.43 | n.s. |
|  | FnbpA | 1.1 ± 0.34 | n.s. | 6.4 ± 1.86 | <0.0001 | 1.1 ± 0.29 | n.s. |
|  | FnbpB | 1.5 ± 0.33 | n.s. | 10.6 ± 1.0 | <0.0001 | 1.2 ± 0.72 | n.s. |
|  | IsdA | 1.8 ± 0.46 | n.s. | 2.8 ± 0.59 | n.s. | 2.0 ± 0.43 | n.s. |
|  | IsdB | 1.7 ± 0.37 | n.s. | 5.8 ± 2.75 | <0.0001 | 2.1 ± 0.96 | n.s. |
|  | SdrC | 1.4 ± 0.67 | n.s. | 1.5 ± 0.61 | n.s. | 1.2 ± 0.45 | n.s. |
|  | SdrD | 1.1 ± 0.39 | n.s. | 1.5 ± 0.36 | n.s. | 1.2 ± 0.23 | n.s. |
|  | SdrE | 1.2 ± 0.36 | n.s. | 1.8 ± 0.94 | n.s. | 1.2 ± 0.22 | n.s. |
|  | SasA | 1.8 ± 0.36 | n.s. | 1.6 ± 0.28 | n.s. | 0.8 ± 0.80 | n.s. |

TABLE 3-continued

Impact of SpA$_{KKAA}$ immunization on serum IgG responses in S. aureus WU1 colonized C57BL/6 mice

|  | Antigens | SpA$_{KKAA}$ immunized (colonized) | | SpA$_{KKAA}$ immunized (cleared) | | PBS mock immunized (colonized) | |
|---|---|---|---|---|---|---|---|
|  |  | Fold change [b] | p-value [d] (vs. PBS mock) | Fold change [b] | p-value [d] (vs. SpA$_{KKAA}$ immunized colonized) | Fold change [c] | p-value [d] (vs. naïve |
|  | SasB | 1.9 ± 0.90 | n.s. | 1.1 ± 0.42 | n.s. | 1.0 ± 0.24 | n.s. |
|  | SasD | 1.3 ± 0.46 | n.s. | 1.0 ± 0.44 | n.s. | 2.4 ± 0.53 | 0.0023 |
|  | SasF | 2.4 ± 0.34 | n.s. | 1.7 ± 0.55 | n.s. | 2.6 ± 1.59 | 0.004 |
|  | SasG | 0.9 ± 0.15 | n.s. | 5.5 ± 1.04 | <0.0001 | 1.1 ± 0.32 | n.s. |
|  | SasI | 2.1 ± 0.46 | n.s. | 1.8 ± 0.02 | n.s. | 1.3 ± 0.22 | n.s. |
|  | SasK | 2.3 ± 0.62 | n.s. | 2.7 ± 0.38 | n.s. | 1.1 ± 0.02 | n.s. |
| Secreted protein | Coa | 3.0 ± 1.31 | 0.0049 | 5.8 ± 0.87 | <0.0001 | 1.2 ± 0.43 | n.s. |
|  | vWbp | 5.7 ± 1.34 | <0.0001 | 6.6 ± 2.82 | n.s. | 1.4 ± 0.65 | n.s. |
|  | Hla | 2.9 ± 0.08 | 0.0070 | 3.6 ± 0.36 | n.s. | 1.1 ± 0.58 | n.s. |
|  | SCIN | 2.1 ± 0.77 | n.s. | 1.4 ± 0.21 | n.s. | 1.0 ± 0.37 | n.s. |
|  | Eap | 1.7 ± 0.38 | n.s. | 1.1 ± 0.22 | n.s. | 0.9 ± 0.23 | n.s. |
|  | Efb | 1.5 ± 0.47 | n.s. | 1.49 ± 0.25 | n.s. | 0.98 ± 0.27 | n.s. |
|  | EsxA | 2.4 ± 0.65 | n.s. | 3.22 ± 1.81 | n.s. | 0.82 ± 0.26 | n.s. |
|  | EsxB | 2.5 ± 0.35 | n.s. | 3.75 ± 1.08 | n.s. | 1.46 ± 0.25 | n.s. | a. Cohorts of C57BL/6J mice were immunized with 50 µg of recombinant SpA$_{KKAA}$ emulsified with CFA or PBS-mock in CFA, and on day 11 boosted with 50 µg of recombinant SpA$_{KKAA}$ emulsified with IFA or PBS-mock in IFA. On day 24, the mice were inoculated intra-nasally with $10^8$ CFU of indicated S. aureus strains and were swabbed in the throat weekly to enumerate the bacterial load. 15 days following inoculation, animals were bled and serum samples were analyzed for antibody responses to staphylococcal antigens.
[b] Fold changes of were calculated by dividing the average signal intensities of SpA$_{KKAA}$-immunized group by the average signal intensities of PBS mock-immunized group. Data are presented in means ± standard deviation.

Figure 5:
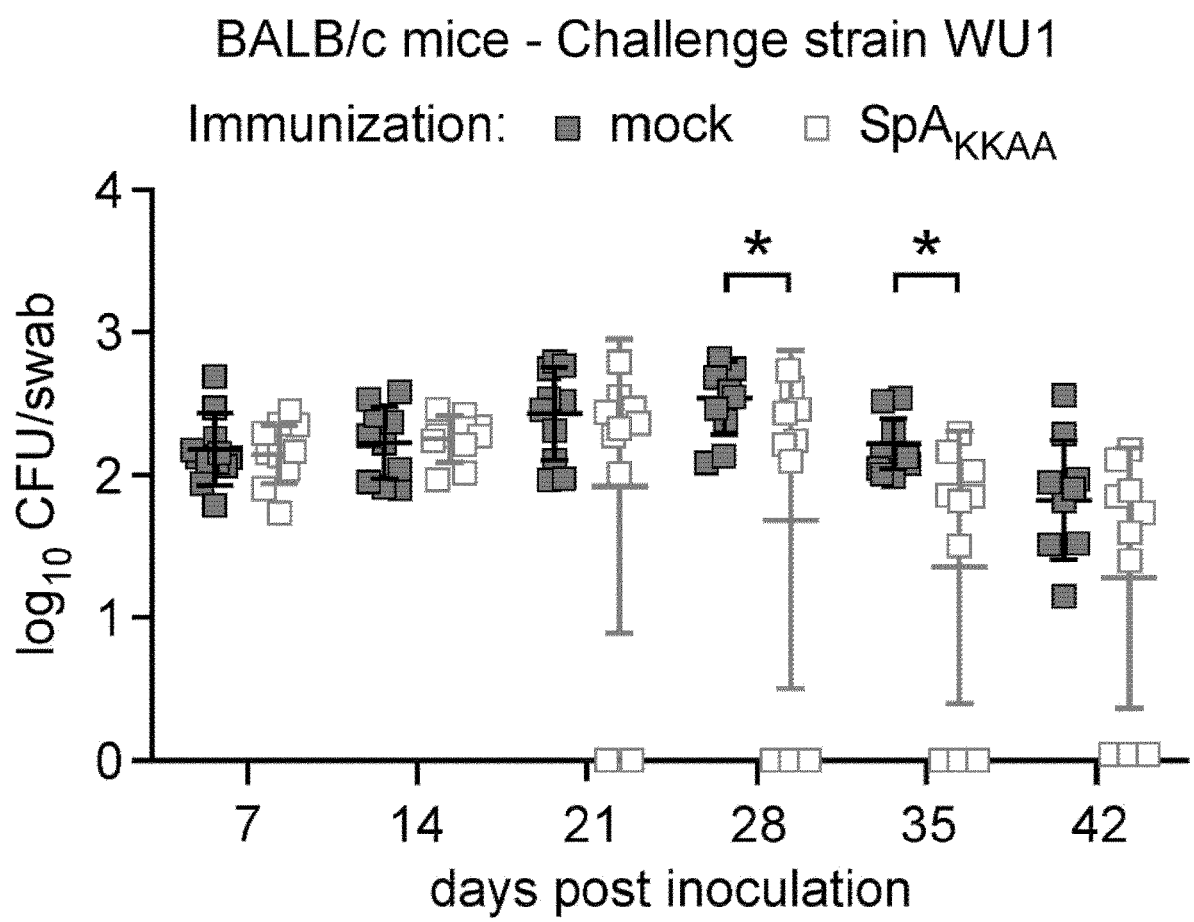
FIG. 5. Immunization of BALB/c mice with SpA$_{KKAA}$ promotes decolonization of *S. aureus* WU1. BALB/c mice were immunized with 50 µg of purified recombinant SpA$_{KKAA}$ emulsified with CFA or PBS-mock in CFA, and boosted after 11 days with 50 µg of recombinant SpA$_{KKAA}$ emulsified with IFA or PBS-mock in IFA. On day 0 of the colonization experiment, cohorts BALB/c mice (n=10) mice were inoculated intra-nasally with $1\times10^8$ CFU of *S. aureus* WU1. The oropharynx of animals was swabbed in weekly intervals to enumerate the bacterial load. Each dot indicates the number of CFU per mouse. The median and standard deviation for each group of animals on a given day are indicated by the horizontal line and error bar. Bacterial colonization data sets were analyzed with two-way ANOVA and Sidak multiple comparison tests; statistically significant differences (*p<0.05; p<0.01; **p<0.0001) between groups of animals are indicated by asterisks.

S. aureus WU1 colonization of BALB/c mice. To test whether S. aureus WU1 colonization was restricted to C57BL/6 mice, the inventors inoculated cohorts (n=20) of naïve BALB/c mice with 1×10$^8$ CFU S. aureus WU1 into the right nostril and measured nasopharyngeal colonization with swab cultures. Similar to C57BL/6 mice, S. aureus WU1 persistently colonized BALB/c mice (FIG. 5). Immunization of BALB/c mice with SpA$_{KKAA}$ did not affect the initial colonization with S. aureus WU1. However, when compared to mock immunized animals, vaccination with SpA$_{KKAA}$ promoted decolonization of BALB/c mice (FIG. 5).

5. SpA$_{KKAA}$ Vaccine Affects Mouse Colonization with S. aureus JSNZ.

Figure 6:
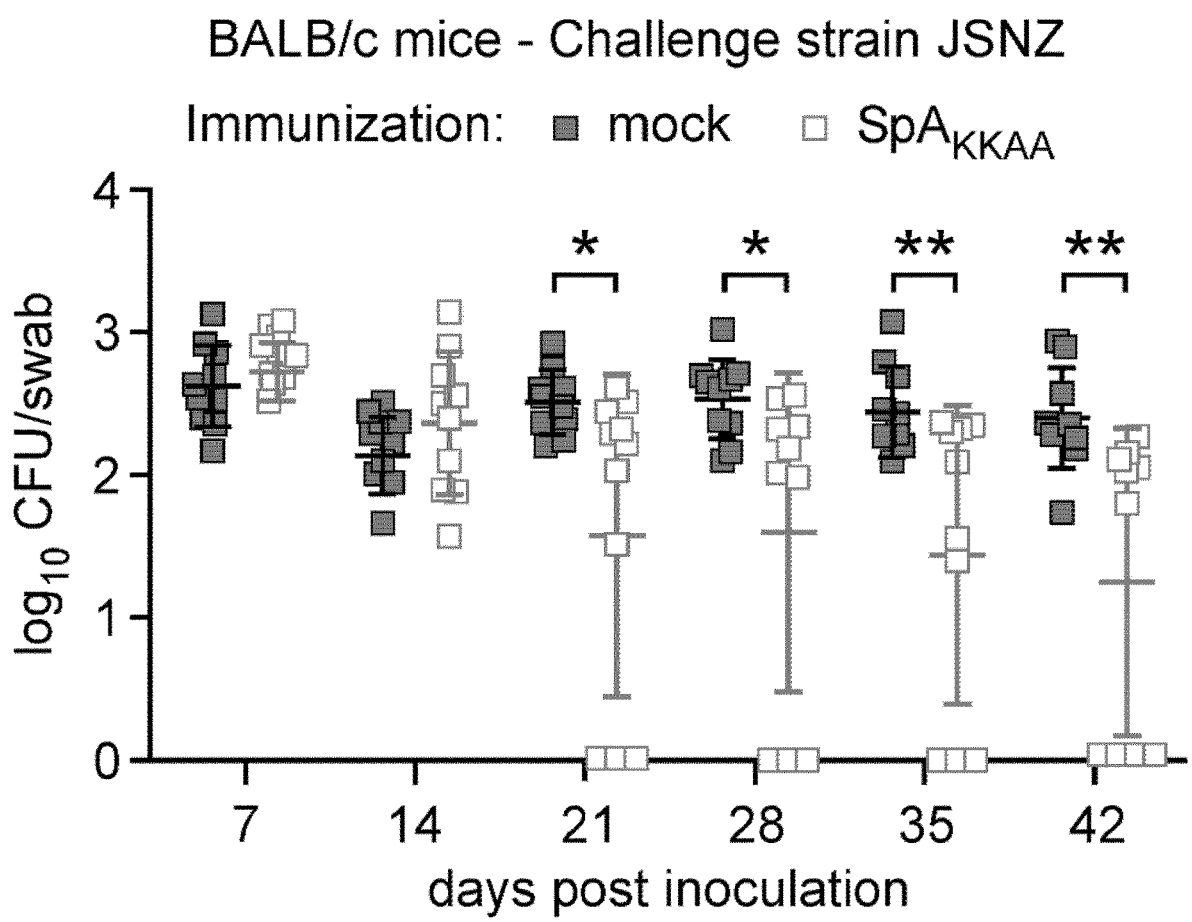
FIG. 6 Immunization of BALB/c mice with SpA$_{KKAA}$ promotes *S. aureus* JSNZ clearance from the nasopharynx. BALB/c mice were immunized with 50 µg of purified recombinant SpA$_{KKAA}$ emulsified with CFA or PBS-mock in CFA, and boosted after 11 days with 50 µg of recombinant SpA$_{KKAA}$ emulsified with IFA or PBS-mock in IFA. On day 0 of the colonization experiment, cohorts of BALB/c mice (n=10) mice were inoculated intra-nasally with $1\times10^8$ CFU of *S. aureus* JSNZ. The oropharynx of animals was swabbed in weekly intervals to enumerate the bacterial load. Each dot indicates the number of CFU per mouse. The median and standard deviation for each group of animals on a given day are indicated by the horizontal line and error bar. Bacterial colonization data sets were analyzed with two-way ANOVA with Sidak multiple comparison tests; statistically significant differences (*p<0.05; **p<0.01) between the two groups of animals are indicated by asterisks.
Figure 8A:
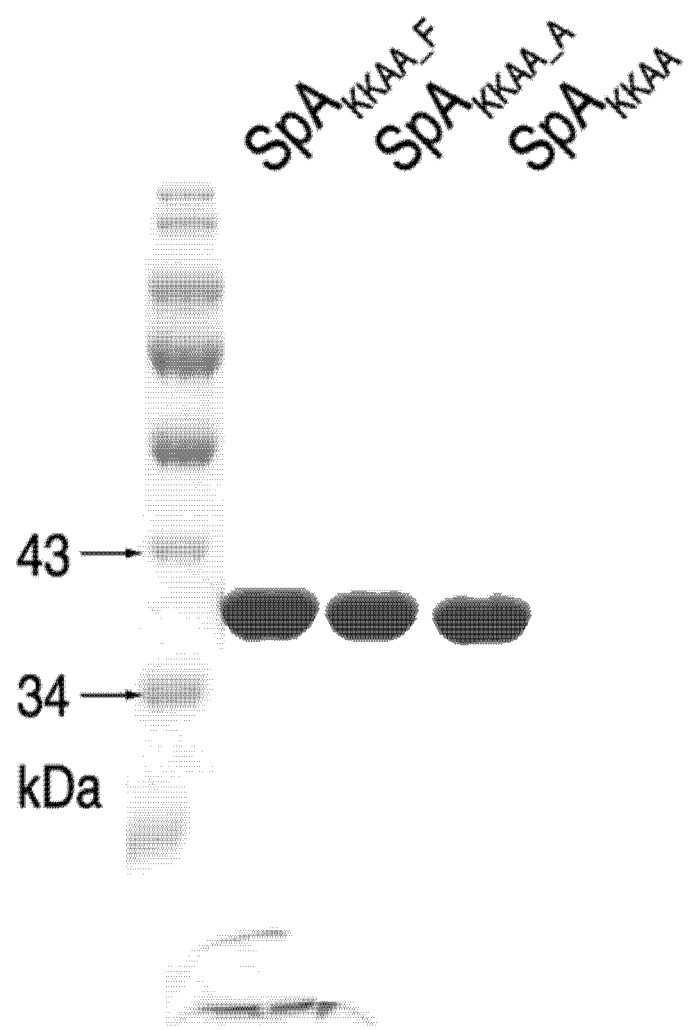
FIG. 8A-B. Binding assays. A: Western blot of the SpA variants. B: ELISAs of the variants to the indicated molecules.
Figure 8B:
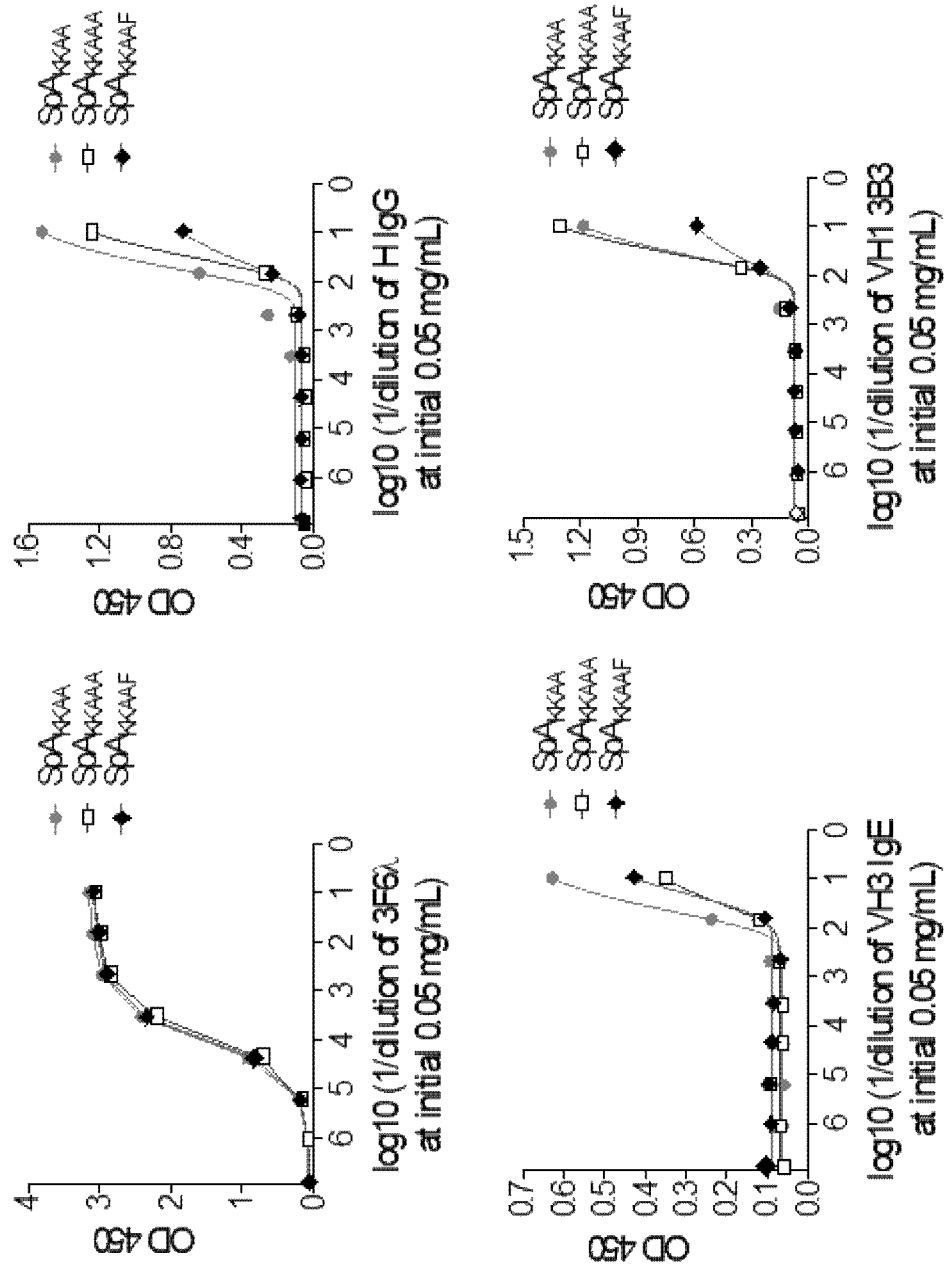
Figure 11:
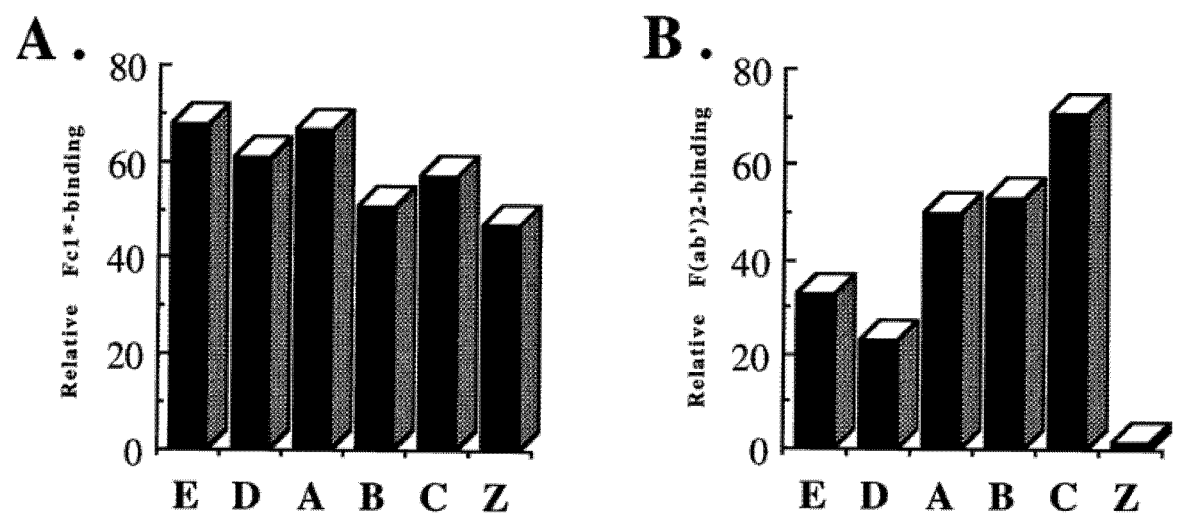
Figure 12A:
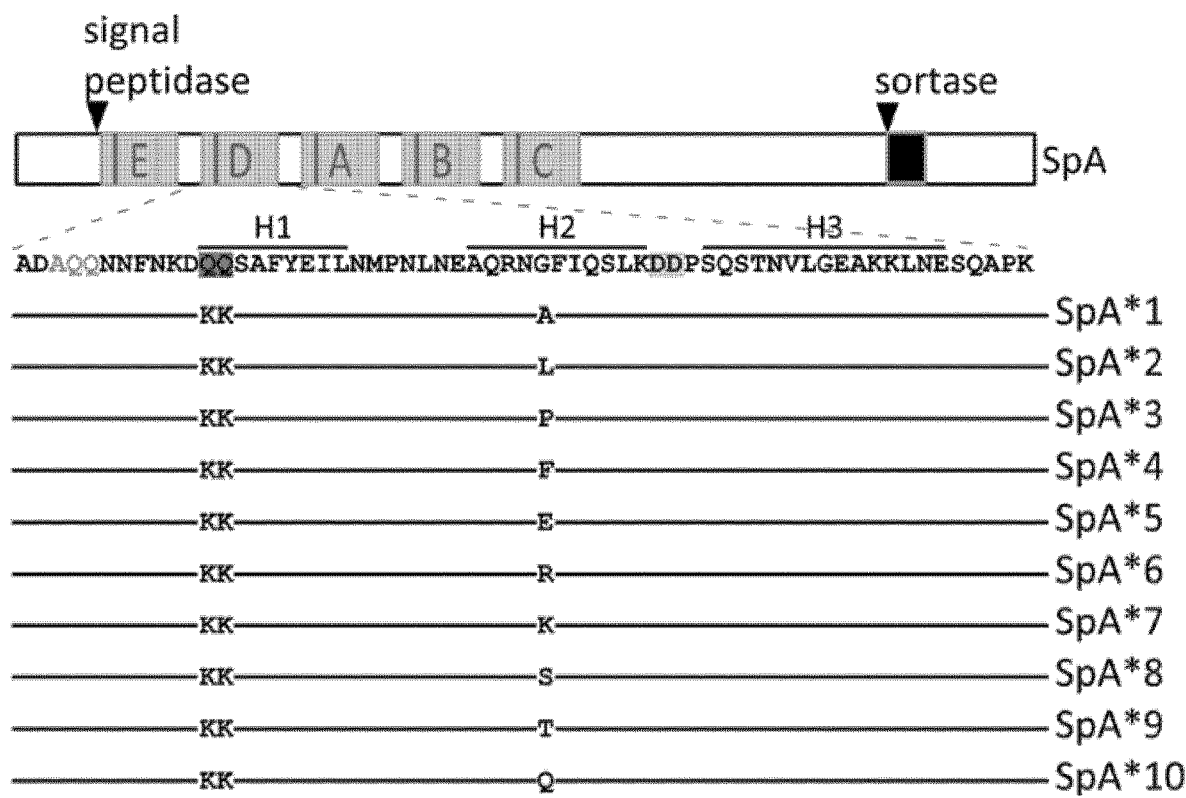
Figure 12B:
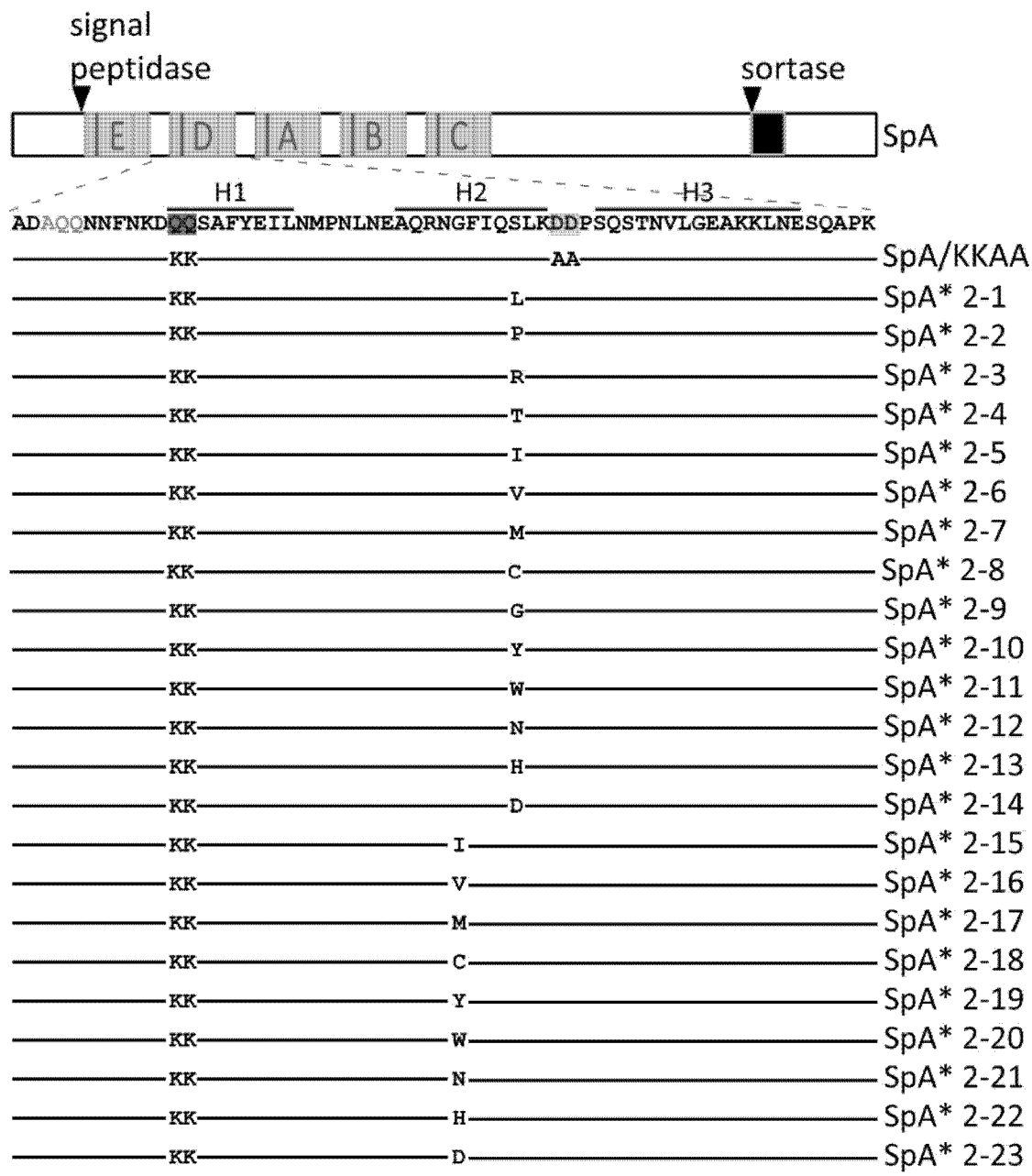
Figure 13:
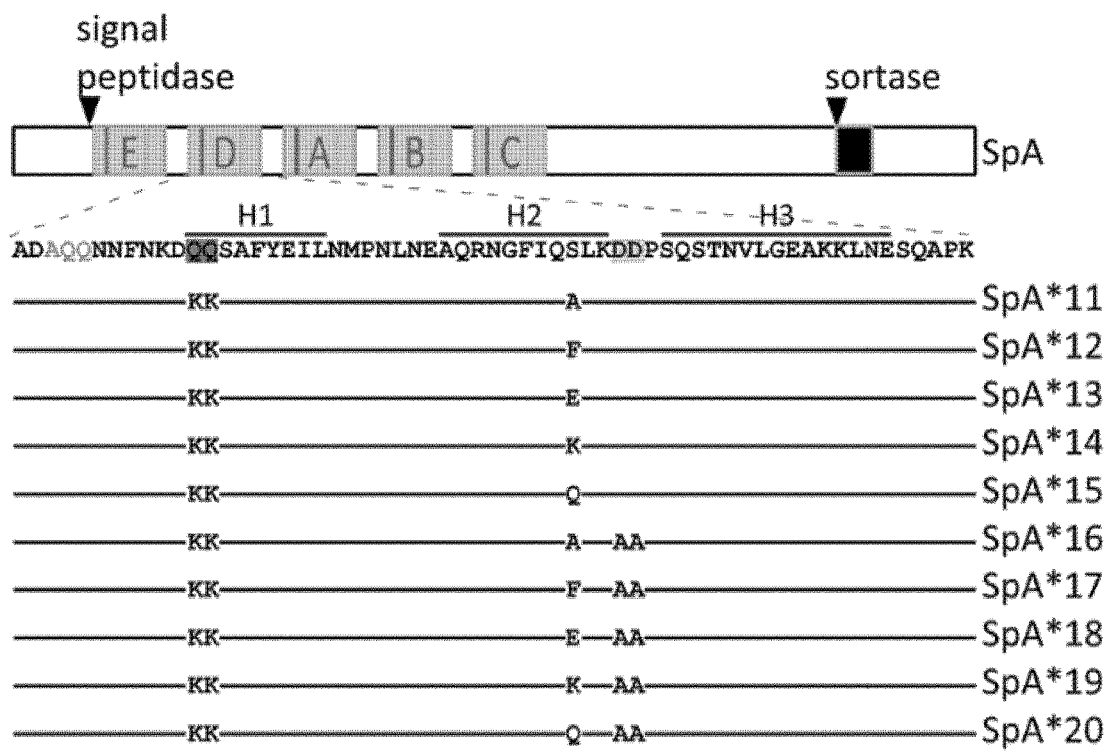
Figure 14:
Figure 15:
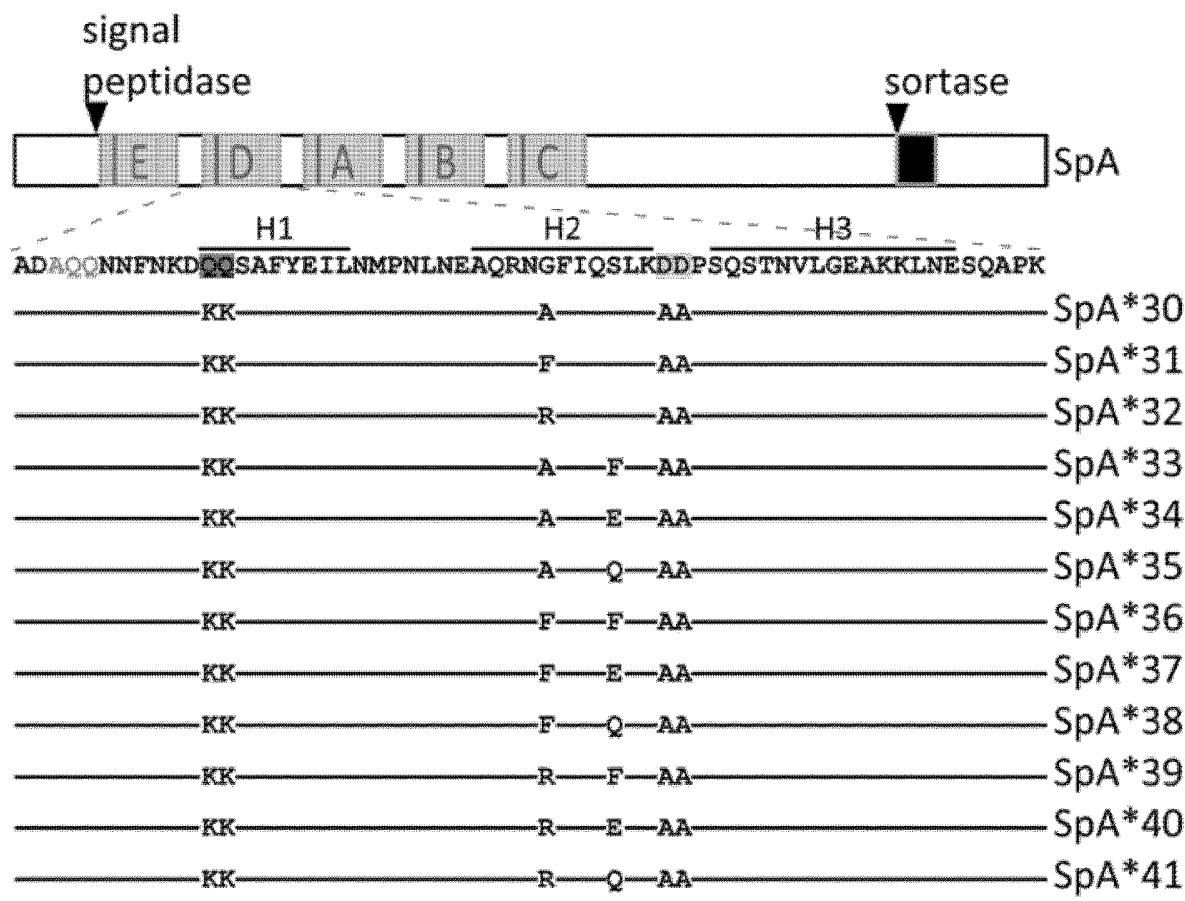

It was then wondered whether or not protein A-neutralizing antibodies affect also mouse colonization with S. aureus JSNZ. Unlike strains Newman and WU1, the spa gene product of S. aureus JSNZ comprises only four IgBDs (37). Earlier work demonstrated that SpA variants with four IgBDs are associated with diminished B cell superantigen activity, as compared to the five IgBDs generally associated with S. aureus colonization of the human nasopharynx (33). When inoculated into the right nostril of anesthetized mice, S. aureus JSNZ effectively colonized the nasopharynx of BALB/c mice over 42 days (FIG. 6). SpA$_{KKAA}$ vaccination did not affect initial colonization with S. aureus JSNZ. However, as compared to mock immunized mice, BALB/c mice with serum neutralizing protein A antibodies more frequently decolonized S. aureus JSNZ starting on day 21 (FIG. 6). Together these data suggest that S. aureus JSNZ also requires protein A-mediated B cell superantigen activity for persistent colonization of mice.

B. Materials and Methods

1. Media and Bacterial Growth Conditions.

S. aureus strains were propagated in tryptic soy broth (TSB) or on tryptic soy agar (TSA) at 37° C. For experiments investigating mouse nasopharyngeal colonization, throat swab samples were grown on Baird-Parker agar at 37° C. as indicated. For experiments investigating S. aureus GI tract colonization, stool samples were grown on Mannitol Salt agar at 37° C. as indicated. Escherichia coli strains DH5a and BL21 (DE3) were grown in Luria broth (LB) or agar at 37° C. Ampicillin (100 µg/ml for E. coli) and chloramphenicol (10 µg/ml for S. aureus) were used for plasmid selection.

2. S. aureus Genotyping.

S. aureus isolate WU1 was obtained from the nasopharynx and preputial gland abscess lesions of mice in the inventors' animal facility. Mouse S. aureus strain JSNZ was provided by Dr. Siouxsie Wiles (36). Staphylococcal genomic DNA was isolated with the Wizard Genomic DNA Purification Kit (Promega). Spa genotyping and multilocus sequence typing (MLST) were performed as previously described (85). Briefly, for spa typing, the genomic DNA of S. aureus strain WU1 was PCR amplified with primers 1095F (5'AGACGATCCTTCGGTGAGC3') and 1517R (5'GCTTTTGCAATGTCATTTACTG3')(86). The PCR product was purified with the Nucleospin Gel and PCR Clean-up kit, sequenced with primers 1095F and 1517R, and analyzed with the Ridom software. For MLST typing, the genomic DNA of S. aureus strain WU1 was PCR amplified with primers arc-up (5'TTGATTCACCAGCGCGTAT-TGTC3'), arc-dn (5'AGGTATCTGCTTCAATCAGCG3'), aro-up (5'ATCGGAAATCCTATTTCACATTC3'), arc-dn (5'GGTGTTGTATTAATAACGATATC3'), glp-up (5'CTAGGAACTGCAATCTTAATCC3'), glp-dn (5'TGGTAAAATCGCATGTCCAATTC3'), gmk-up (5'ATCGTTTTATCGGGACCATC3'), gmk-dn (5'TCAT-TAACTACAACGTAATCGTA3'), pta-up (5'GT-TAAAATCGTATTACCTGAAGG3'), pta-dn (5'GACCCTTTTGTTGAAAAGCTTAA3'), tpi-up (5'TCGTTCATTCTGAACGTCGTGA3'), tpi-dn (5'TTTGCACCTTCTAACAATTGTAC3'), yqi-up (5'CAG-CATACAGGACACCTATTGGC3') and yqi-dn (5'CGTT-GAGGAATCGATACTGGAAC3') (see for example: saureus.mlst.net/misc/info.asp). The PCR product was purified with the Nucleospin Gel and PCR Clean-up kit, PCR amplified and sequenced and analyzed with the on-line software (see, for example: saures.mlst.net/). Whole genome sequence files for S. aureus strain JSNZ were provided by Dr. Silva Holtfreter. Truseq DNA-seq library preparation Illumina MiSeq sequencing were performed with the genomic DNA of S. aureus WU1 by the Environmental Sample Preparation and Sequencing Facility at Argonne National Laboratory. Sequence were analyzed using the Geneious software.

3. S. aureus Mutants.

Allelic recombination with the plasmid pKOR1 was used to delete the spa gene of S. aureus WU1 (87). To construct the Δspa mutant, two 1-kb DNA fragment upstream and downstream of the spa gene were amplified from the chromosome of S. aureus WU1 with primers ext1F ext1F (5' GGGGACCACTTTGTACAAGAAAGCTGGGTCATT-TAAGAAGATTGTTTCAGATTTA TG 3'), ext1R (5' ATTTGTAAAGTCATCATAATATAACGAATTATGTAT-TGCAATACTAAAATC 3'), ext2F (5' CGTCGCGAAC-TATAATAAAAACAAACAATACACAACGATAGATATC 3'), and ext2R (5' GGGGACAAGTTTGTA-CAAAAAAGCAGGCAACGAACGCCTAAAGAAAT-TGTCTTT GC 3'). The two flanking regions were fused together in a subsequent PCR, and final PCR product was cloned into pKOR1 using the BP Clonase II kit (Invitrogen). The resulting plasmid were consecutively transferred into E. coli DH5a, S. aureus strain RN4220, and finally S. aureus strain WU1 and temperature shifted to 40° C., blocking replication of plasmids and promoting their insertion into the chromosome (87). Growth at 30° C. was used to promote allelic replacement. Mutations in the spa genes were verified by DNA sequencing of PCR amplification products.

4. Agglutination Assay.

Agglutination assays were performed as previously described (88). Briefly, Overnight cultures of S. aureus strains were diluted 1:100 in fresh TSB and grown at 37° C. for 6 hours. Bacteria from 1 ml culture (normalized to $OD_{600}$ 4.0) was incubated with SYTO 9 (1:500) (Invitrogen) for 15 min, washed twice with 1 ml PBS, and suspended in 1 ml PBS. Bacteria were mixed 1:1 with citrate-treated human plasma or mouse plasma on glass microscope slides and incubated for 30 min. Samples were viewed and images were captured on an IX81 live cell total internal reflection fluorescence microscope using a 20× objective (Olympus). At least 10 images were acquired for each sample. The areas of agglutination complexes in each image were measured and quantified using ImageJ software.

5. Immunoblotting.

Overnight cultures of S. aureus strains were diluted 1:100 into fresh TSB (with chloramphenicol in the presence of plasmids) and grown at 37° C. to $OD_{600}$ 0.5-1.0. Cells from 1 ml culture were centrifuged, suspended in PBS and incubated with 20 μg/ml lysostaphin (AMBI) at 37° C. for 1 h. Proteins in the whole cell lysate were precipitated with 10% trichloracetic acid and 10 μg deoxycholic acid, washed with ice-cold acetone, air-dried, suspended in 100 μl 0.5 M Tris HCl (pH 6.8) and 100 μl SDS-PAGE sample buffer [100 mM Tris HCl (pH 6.8), 4% SDS, 0.2% bromophenol blue, 200 mM dithiothreitol] and boiled for 10 min. Proteins were separated on 12% SDS-PAGE and electrotransferred to PVDF membrane. PVDF membranes were blocked with 5% milk in Tris Buffered Saline with Tween-20 (TBST) [20 mM Tris HCl (pH 7.6), 137 mM NaCl, 0.1% Tween-20]. Mouse anti-ClfA 2A12.12 monoclonal antibody (1:2,000 dilution) and horseradish peroxidase (HRP)-conjugated anti-mouse IgG (Cell Signaling, 1:10,000 dilution) were used to detect ClfA. Rabbit anti-Coa polyclonal antibody (1:1,000 dilution) and HRP-conjugated anti-rabbit IgG (1:10,000 dilution) were used to detect Coa. Two different rabbit anti-vWbp polyclonal antibodies (1:1,000 dilution), which recognize full length vWbp from S. aureus Newman or the C terminal domain of vWbp, respectively, and HRP-conjugated anti-rabbit IgG (1:10,000 dilution) were used to detect vWbp. HRP-conjugated human IgM in TBST (1:10,000 dilution) was used to detect SpA. Rabbit anti-SrtA polyclonal antibodies (1:10,000 dilution) and HRP-conjugated anti-rabbit IgG (1:10,000 dilution) were used to detect SrtA. Antibody-stained membranes were washed with TBST and incubated with SuperSignal West Pico Chemiluminescent Substrate (Thermo Scientific) and developed onto Amersham Hyperfilm ECL high performance chemiluminescence films (GE Healthcare).

6. Purification of Recombinant Proteins.

E. coli BL21(DE3) harboring pET15b+ plasmids for the expression of His-tagged $SpA_{KKAA}$, as well as 24 staphylococcal antigens (ClfA, CHB, FnBPA, FnBPB, IsdA, IsdB, SasA, SasB, SasD, SasF, SasG, SasI, SasK, SdrC, SdrD, SdrE, EsxA, EsxB, SCIN, Eap, Efb, Hla, Coa, vWbp, and Ebh), was grown overnight, diluted 1:100 in fresh medium, and grown at 37° C. to ~$OD_{600}$ of 0.5. Cultures were induced with 1 mM isopropyl-β-d-thiogalactopyranoside and grown for an additional 3 h. Cells were pelleted, re-suspended in column buffer (50 mM Tris-HCl [pH 7.5], 150 mM NaCl), and disrupted with a French pressure cell at 14,000 lb/in². Lysates were cleared of membrane and insoluble components by ultracentrifugation at 40,000×g. Cleared lysates were subjected to Ni-NTA affinity chromatography, and proteins were eluted in column buffer containing successively higher concentrations of imidazole (100 to 500 mM). Eluates were dialyzed with PBS, and the protein purity was verified by Coomassie-stained SDS-PAGE. Protein concentrations were determined by bicinchoninic acid assay (Thermo Scientific).

7. Mouse Nasopharyngeal Colonization.

Overnight cultures of S. aureus strains WU1 and its Δspa mutant were diluted 1:100 into fresh TSB and grown for 2 h at 37° C. Cells were centrifuged, washed and suspended in PBS. Seven-week-old female BALB/c, C57BL/6J or B6.129S2-Ighm$^{tm1Cgn}$/J mice (The Jackson Laboratory) were anesthetized by intraperitoneal injection with 100 mg/ml ketamine and 20 mg/ml xylazine per kilogram of body weight. 1×10⁸ CFU of S. aureus (in 10 μl volume) were pipetted into the right nostril of each mouse. On day 7, 14, 21, 28, 35, and 42 following inoculation, the oropharynx of mice was swabbed, and swab samples spread on Baird-Parker agar and incubated for bacterial enumeration. On day 15 following the inoculation, the mice were bled via periorbital vein puncture to obtain sera for antibody response analyses using the staphylococcal antigen matrix. On day 42 following inoculation, stool samples were collected and homogenized in PBS. The homogenates were plated on Mannitol Salt agar and incubated for bacterial enumeration. All mouse experiments were performed in accordance with the institutional guidelines following experimental protocol review and approval by the Institutional Biosafety Committee (IBC) and the Institutional Animal Care and Use Committee (IACUC) at the University of Chicago. Animals experiments were repeated at least once to ensure reproducibility of the data.

8. Active Immunization.

Four-week-old mice were immunized by subcutaneous injection with 50 μg of $SpA_{KKAA}$ emulsified in complete Freund's adjuvant (CFA; Difco) and boosted with 50 µg of the same antigen emulsified in incomplete Freund's adjuvant (IFA) 11 days following the initial immunization. On day 21, immunized mice were bled via periorbital vein puncture to obtain sera for ELISA. On day 24, the mice were inoculated intranasally with $1\times10^8$ CFU of *S. aureus* strains WU1 or JSNZ and monitored for nasopharyngeal colonization.

9. Staphylococcal Antigen Matrix.

Nitrocellulose membranes were blotted with 2 µg affinity-purified staphylococcal antigens. Membranes were blocked with 5% degranulated milk, incubated with diluted mouse sera (1:10,000 dilution) and IRDye 680-conjugated goat anti-mouse IgG (LI-COR). Signal intensities were quantified using the Odyssey infrared imaging system (LI-COR).

10. Statistical Analysis.

Two-way ANOVA with Sidak multiple comparison tests (GraphPad Software) was performed to analyze the statistical significance of nasopharyngeal colonization, ELISA, and antigen matrix data.

Example 2 Staphylococcal Protein A Variants

The following assays can be used to evaluate SpA variants described herein for their efficacy in the methods and compositions of the disclosure.

A. Assays

Vaccine protection in murine abscess, murine lethal infection, and murine pneumonia models. Three animal models have been established for the study of *S. aureus* infectious disease. These models can be used here to examine the level of protective immunity provided via the generation of Protein A specific antibodies.

Murine abscess—BALB/c mice (24-day-old female, 8-10 mice per group, Charles River Laboratories, Wilmington, MA) can be immunized by intramuscular injection into the hind leg with purified protein (Chang et al., 2003; Schneewind et al., 1992). Purified SpA and/or SpA variant can be administered on days 0 (emulsified 1:1 with complete Freund's adjuvant) and 11 (emulsified 1:1 with incomplete Freund's adjuvant). Blood samples can be drawn by retroorbital bleeding on days 0, 11, and 20. Sera can be examined by ELISA for IgG titers for specific binding activity of the variant. Immunized animals can be challenged on day 21 by retroorbital injection of 100 μl of *S. aureus* Newman or *S. aureus* USA300 suspension ($1\times10^7$ cfu). For this, overnight cultures of *S. aureus* Newman can be diluted 1:100 into fresh tryptic soy broth and grown for 3 h at 37° C. Staphylococci can be centrifuged, washed twice, and diluted in PBS to yield an A600 of 0.4 ($1\times10^8$ cfu per ml). Dilutions can be verified experimentally by agar plating and colony formation. Mice can be anesthetized by intraperitoneal injection of 80-120 mg of ketamine and 3-6 mg of xylazine per kilogram of body weight and infected by retroorbital injection. On day 5 or 15 following challenge, mice can be euthanized by compressed $CO_2$ inhalation. Kidneys can be removed and homogenized in 1% Triton X-100. Aliquots can be diluted and plated on agar medium for triplicate determination of cfu. For histology, kidney tissue can be incubated at room temperature in 10% formalin for 24 h. Tissues can be embedded in paraffin, thin-sectioned, stained with hematoxylinleosin, and examined by microscopy.

Murine lethal infection—BALB/c mice (24-day-old female, 8-10 mice per group, Charles River Laboratories, Wilmington, MA) can be immunized by intramuscular injection into the hind leg with purified SpA or SpA variant. Vaccine can be administered on days 0 (emulsified 1:1 with complete Freund's adjuvant) and 11 (emulsified 1:1 with incomplete Freund's adjuvant). Blood samples can be drawn by retroorbital bleeding on days 0, 11, and 20. Sera are examined by ELISA for IgG titers with specific binding activity of the variant. Immunized animals can be challenged on day 21 by retroorbital injection of 100 μl of *S. aureus* Newman or *S. aureus* USA300 suspension ($15\times10^7$ cfu). For this, overnight cultures of *S. aureus* Newman can be diluted 1:100 into fresh tryptic soy broth and grown for 3 h at 37° C. Staphylococci can be centrifuged, washed twice, diluted in PBS to yield an A600 of 0.4 ($1\times10^8$ cfu per ml) and concentrated. Dilutions can be verified experimentally by agar plating and colony formation. Mice can be anesthetized by intraperitoneal injection of 80-120 mg of ketamine and 3-6 mg of xylazine per kilogram of body weight. Immunized animals can be challenged on day 21 by intraperitoneal inject with $2\times10^{10}$ cfu of *S. aureus* Newman or 3-$10\times10^9$ cfu of clinical *S. aureus* isolates. Animals can be monitored for 14 days, and lethal disease can be recorded.

Murine pneumonia model—*S. aureus* strains Newman or USA300 (LAC) can be grown at 37° C. in tryptic soy broth/agar to $OD_{660}$ 0.5. 50-ml culture aliquots can be centrifuged, washed in PBS, and suspended in 750 μl PBS for mortality studies (3-$4\times10^8$ CFU per 30-μl volume), or 1,250 μl PBS ($2\times10^8$ CFU per 30-μl volume) for bacterial load and histopathology experiments. For lung infection, 7-wk-old C57BL/6J mice (The Jackson Laboratory) can be anesthetized before inoculation of 30 μl of *S. aureus* suspension into the left are. Animals can be placed into the cage in a supine position for recovery and observed for 14 days. For active immunization, 4-wk-old mice can receive 20 μg SpA variant in CFA on day 0 via the i.m. route, followed by a boost with 20 μg of variant in incomplete Freund's adjuvant (IFA) on day 10. Animals can be challenged with *S. aureus* on day 21. Sera can be collected before immunization and on day 20 to assess specific antibody production. For passive immunization studies, 7-wk-old mice can receive 100 μl of either NRS (normal rabbit serum) or SpA-variant-specific rabbit antisera via i.p. injection 24 h before challenge. To assess the pathological correlates of pneumonia, infected animals can be killed via forced $CO_2$ inhalation before removal of both lungs. The right lung can be homogenized for enumeration of lung bacterial load. The left lung can be placed in 1% formalin and paraffin embedded, thin sectioned, stained with hematoxylin-eosin, and analyzed by microscopy.

Rabbit antibodies—Purified SpA variant can be used as an immunogen for the production of rabbit antisera. Protein can be emulsified with CFA for injection at day 0, followed by booster injections with protein emulsified with IFA on days 21 and 42. Rabbit antibody titers can be determined by ELISA. Purified antibodies can be obtained by affinity chromatography of rabbit serum on SpA variant sepharose. The concentration of eluted antibodies can be measured by absorbance at A280 and specific antibody titers can be determined by ELISA.

Active immunization with SpA-variants.—To determine vaccine efficacy, animals can be actively immunized with purified SpA variant. As a control, animals can be immunized with adjuvant alone. Antibody titers against Protein A preparations can be determined using SpA variant as antigens. Using infectious disease models described above, any reduction in bacterial load (murine abscess and pneumonia), histopathology evidence of staphylococcal disease (murine abscess and pneumonia) and protection from lethal disease (murine lethal challenge and pneumonia) can be measured.

Passive immunization with affinity purified rabbit polyclonal antibodies generated against SpA-variants. To determine protective immunity of Protein A specific rabbit antibodies, mice are passively immunized with purified SpA variant derived rabbit antibodies. Both of these antibody preparations are purified by affinity chromatography using immobilized SpA variant. As a control, animals are passively immunized with rV10 antibodies (a plague protective antigen that has no impact on the outcome of staphylococcal infections). Antibody titers against all Protein A preparations are determined using SpA variant as an antigen. Using the infectious disease models described above, the reduction in bacterial load (murine abscess and pneumonia), histopathology evidence of staphylococcal disease (murine abscess and pneumonia), and the protection from lethal disease (murine lethal challenge and pneumonia) can be measured.

Bacterial strains and growth. *Staphylococcus aureus* strains Newman and USA300 can be grown in tryptic soy broth (TSB) at 37° C. *Escherichia coli* strains DH5a and BL21 (DE3) can be grown in Luria-Bertani (LB) broth with 100 µg ml$^{-1}$ ampicillin at 37° C.

Rabbit Antibodies. The SpA variants can be made according to standard recombinant technology or synthesis protocols, and purified antigen can be covalently linked to HiTrap NHS-activated HP columns (GE Healthcare). Antigen-matrix can be used for affinity chromatography of 10-20 ml of rabbit serum at 4° C. Charged matrix can be washed with 50 column volumes of PBS, antibodies eluted with elution buffer (1 M glycine, pH 2.5, 0.5 M NaCl) and immediately neutralized with 1M Tris-HCl, pH 8.5. Purified antibodies can be dialyzed overnight against PBS at 4° C.

F(ab)$_2$ fragments. Affinity purified antibodies can be mixed with 3 mg of pepsin at 37° C. for 30 minutes. The reaction can be quenched with 1 M Tris-HCl, pH 8.5 and F(ab)2 fragments can be affinity purified with specific antigen-conjugated HiTrap NETS-activated HP columns. Purified antibodies can be dialyzed overnight against PBS at 4° C., loaded onto SDS-PAGE gel and visualized with Coomassie Blue staining.

Active and passive immunization. BALB/c mice (3 week old, female, Charles River Laboratories) can be immunized with 50 µg protein emulsified in Complete Freund's Adjuvant (Difco) by intramuscular injection. For booster immunizations, proteins can be emulsified in Incomplete Freund's Adjuvant and injected 11 days following the initial immunization. On day 20 following immunization, 5 mice can be bled to obtain sera for specific antibody titers by enzyme-linked immunosorbent assay (ELISA).

Affinity purified antibodies in PBS can be injected at a concentration 5 mg kg$^{-1}$ of experimental animal weight into the peritoneal cavity of BALB/c mice (6 week old, female, Charles River Laboratories) 24 hours prior to challenge with *S. aureus*. Animal blood can be collected via periorbital vein puncture. Blood cells can be removed with heparinized micro-hematocrit capillary tubes (Fisher) and Z-gel serum separation micro tubes (Sarstedt) can be used to collect and measure antigen specific antibody titers by ELISA.

Mouse renal abscess. Overnight cultures of *S. aureus* Newman or USA300 (LAC) can be diluted 1:100 into fresh TSB and grown for 2 hours at 37° C. Staphylococci can be sedimented, washed and suspended PBS at OD$_{600}$ of 0.4 (~1×10$^8$ CFU ml$^{-1}$). Inocula can be quantified by spreading sample aliquots on TSA and enumerating colonies formed. BALB/c mice (6 week old, female, Charles River Laboratories) can be anesthetized via intraperitoneal injection with 100 mg ml$^{-1}$ ketamine and 20 mg ml$^{-1}$ xylazine per kilogram of body weight. Mice can be infected by retro-orbital injection with 1×10$^7$ CFU of *S. aureus* Newman or 5×10$^6$ CFU of *S. aureus* USA300. On day 4 following challenge, mice can be killed by CO$_2$ inhalation. Both kidneys can be removed, and the staphylococcal load in one organ can be analyzed by homogenizing renal tissue with PBS, 1% Triton X-100. Serial dilutions of homogenate were spread on TSA and incubated for colony formation. The remaining organ can be examined by histopathology. Briefly, kidneys can be fixed in 10% formalin for 24 hours at room temperature. Tissues can be embedded in paraffin, thin-sectioned, stained with hematoxylin-eosin, and inspected by light microscopy to enumerate abscess lesions. All mouse experiments can be performed in accordance with the institutional guidelines following experimental protocol review and approval by the Institutional Biosafety Committee (IBC) and the Institutional Animal Care and Use Committee (IACUC) at the University of Chicago.

Protein A binding. For human IgG binding, Ni-NTA affinity columns can be pre-charged with 200 µg of purified proteins (SpA variants) in column buffer. After washing, 200 µl g of human IgG (Sigma) can be loaded onto the column. Protein samples can be collected from washes and elutions and subjected to SDS-PAGE gel electrophoresis, followed by Coomassie Blue staining. Purified proteins (SpA variants) can be coated onto MaxiSorp ELISA plates (NUNC) in 0.1M carbonate buffer (pH 9.5) at 1 µg ml$^{-1}$ concentration overnight at 4° C. Plates can next be blocked with 5% whole milk followed by incubation with serial dilutions of peroxidase-conjugated human IgG, Fc or F(ab)2 fragments for one hour. Plates can be washed and developed using OptEIA ELISA reagents (BD). Reactions can be quenched with 1 M phosphoric acid and A$_{450}$ readings were used to calculate half maximal titer and percent binding.

von Willebrand Factor (vWF) binding assays. Purified proteins (SpA variants) can be coated and blocked as described above. Plates can be incubated with human vWF at 1 µl g ml$^{-1}$ concentration for two hours, then washed and blocked with human IgG for another hour. After washing, plates can be incubated with serial dilution of peroxidase-conjugated antibody directed against human vWF for one hour. Plates can be washed and developed using OptEIA ELISA reagents (BD). Reactions can be quenched with 1 M phosphoric acid and A$_{450}$ readings can be used to calculate half maximal titer and percent binding. For inhibition assays, plates can be incubated with affinity purified F(ab)2 fragments specific for a SpA-variant at 10 µg ml$^{-1}$ concentration for one hour prior to ligand binding assays.

Splenocyte apoptosis. Affinity purified proteins (150 µg of SpA variant) can be injected into the peritoneal cavity of BALB/c mice (6 week old, female, Charles River Laboratories). Four hours following injection, animals were killed by CO$_2$ inhalation. Their spleens can be removed and homogenized. Cell debris can be removed using cell strainer and suspended cells can be transferred to ACK lysis buffer (0.15 M NH$_4$Cl, 10 mM KHCO$_3$, 0.1 mM EDTA) to lyse red blood cells. White blood cells can be sedimented by centrifugation, suspended in PBS and stained with 1:250 diluted R-PE conjugated anti-CD19 monoclonal antibody (Invitrogen) on ice and in the dark for one hour. Cells can be washed with 1% FBS and fixed with 4% formalin overnight at 4° C. The following day, cells can be diluted in PBS and analyzed by flow cytometry. The remaining organ can be examined for histopathology. Briefly, spleens can be fixed in 10% formalin for 24 hours at room temperature. Tissues can be embedded in paraffin, thin-sectioned, stained with the Apoptosis detection kit (Millipore), and inspected by light microscopy.

Antibody quantification. Sera can be collected from healthy human volunteers or BALB/c mice that had been either infected with *S. aureus* Newman or USA300 for 30 days or that had been immunized with an SpA variant as described above. Human/mouse IgG (Jackson Immunology Laboratory), SpA variant, and CRM197 can be blotted onto nitrocellulose membrane. Membranes can be blocked with 5% whole milk, followed by incubation with either human or mouse sera. IRDye 700DX conjugated affinity purified anti-human/mouse IgG (Rockland) can be used to quantify signal intensities using the Odyssey™ infrared imaging system (Li-cor). Experiments with blood from human volunteers involved protocols that were reviewed, approved and performed under regulatory supervision of The University of Chicago's Institutional Review Board (IRB).

Statistical Analysis. Two tailed Student's t tests can be performed to analyze the statistical significance of renal abscess, ELISA, and B cell superantigen data.

Using these assays, the variants described herein (e.g. those shown in FIGS. 12-15) can be tested. Further assays can be performed, such as a SPR analysis to determine the binding affinities of new SpA variants with human VH3-IgG and human VH3-IgE compared to SpA, SpA/KKAA as well as SpA/KKAA/F (SpA*31) controls. The manufacturability (the yield of purified SpA* variants/gram of *E. coli* cell paste) can also be tested. CD spectroscopy can be performed to test the α-helical content in comparison with SpA and SpA/KKAA. Protein stability during purification and storage at variable temperature (4, 25 and 37 C for 1-7 days) can also be determined.

Figure 16:
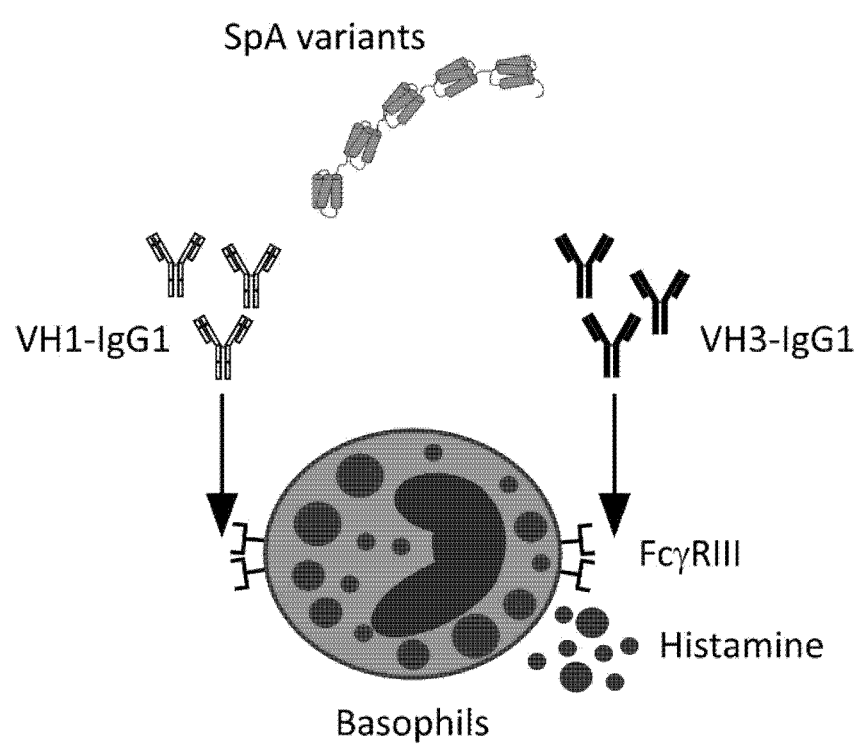

To test for drug safety and efficacy, a basil histamine release assay may be performed (FIG. 16). This test is known in the art (see, for example, Kowal, K. et al., 2005. Allergy and Asthma Proc. Vol. 26, No. 6). Briefly, human serum and/or basophils can be incubated for 60 min. at 37° C. Histamine release can be measured from stimulated (by addition of SpA variants) and unstimulated cells and the results can expressed as histamine release in percentage of the total histamine content. In some aspects, a histamine release >16.5% is a positive test result in both children and adult patients.

Example 3 Spa Vaccine Variants with Improved Safety

B. Results

1. Amino Acid Substitutions at $Gly^{29}$ of SpA Vaccine Candidates

The inventors sought to experimentally identify amino acid substitutions at position $Gly^{29}$ of the SpA-IgBDs that cause the greatest reduction in affinity between human IgG and SpA, i.e. five IgBDs (EDABC) carrying also the amino acid substitutions $Gln^{9,10}$ Lys, which disrupt the interaction between SpA and Fcγ (48). Towards this goal, the inventors constructed nineteen different plasmids encoding N-terminally polyhistidine-tagged $SpA_{Q9,10K/G29X}$, where X is any one of the 19 natural amino acids (except glycine) provided by the genetic code. $SpA_{Q9,10K/G29X}$ proteins were purified via affinity chromatography on Ni-NTA resin, eluted, dialyzed, concentration determined via the BCA assay and bound at equal concentration (250 nM) to Bio-Rad ProteOn HTGchip. Each chip was subjected to surface plasmon resonance experiments with serial dilutions of human IgG or PBS control. The association of human IgG with SpA vaccine candidates loaded on the chip were recorded and data transformed to derive the association constants for each protein (Table 4). As control, the inventors quantified the association constants of wild-type SpA ($K_A$ 1.081×10$^8$ M$^{-1}$) and $SpA_{KKAA}$ for human IgG ($K_A$ 5.022×10$^5$ M$^{-1}$). For $SpA_{Q9,10K/G29X}$ proteins, four amino acid substitutions at $Gly^{29}$ caused a significant increase in the association constant: $Gly^{29}$Ser ($K_A$ 9.398×10$^5$ M$^{-1}$), $Gly^{29}$Lys ($K_a$ 9.738× 10$^5$ M$^{-1}$), $Gly^{29}$Ile ($K_A$ 10.070×10$^5$ M$^{-1}$) and $Gly^{29}$Ala ($K_A$ 11.310×10$^5$ M$^{-1}$), suggesting that these variants bound more tightly to the $V_H$3-variant heavy chains of human IgG than $SpA_{KKAA}$ (Table 4). The observations for $SpA_{Q9,10K/G29A}$ were surprising to us. The $Gly^{29}$Ala substitution in the ZZZZ construct for commercial antibody purification (MabSelectSure™) diminishes binding to $V_H$3-IgG (150), whereas $Gly^{29}$Ala in the context of $Gln^{9,10}$Lys within SpA-IgBDs may promote a modest increase the affinity for $V_H$3-IgG. As compared with $SpA_{KKAA}$, ten amino acid substitutions at $Gly^{29}$ did not cause a significant difference in the association constant with: $Gly^{29}$Thr, $Gly^{29}$Leu, $Gly^{29}$Glu, $Gly^{29}$Pro, $Gly^{29}$Phe, $Gly^{29}$Met, $Gly^{29}$Val, $Gly^{29}$Trp, $Gly^{29}$Asp, $Gly^{29}$Arg, $Gly^{29}$Asn, and $Gly^{29}$Tyr (Table 4). Another three amino acid substitutions at $Gly^{29}$ reduced the association constant: $Gly^{29}$His ($K_a$ 1.435×10$^5$ M$^{-1}$), $Gly^{29}$Cys ($K_a$ 1.743×10$^5$M$^{-1}$), and $Gly^{29}$Gln ($K_a$ 2.057×10$^5$ M$^{-1}$) to human IgG as compared to $SpA_{KKAA}$ (Table 4). Thus, amino acid substitutions at $Gly^{29}$ do not exert a universal effect on the binding of SpA-IgBDs to human IgG. Some amino acid substitutions at $Gly^{29}$ increase the affinity between human IgG and $SpA_{Q9,10K/G29X}$, whereas others are either neutral (exert no significant effect) or diminish the affinity.

2. Amino Acid Substitutions at Ser33 of SpA Vaccine Candidates

To identify amino acid substitutions at position $Ser^{33}$ of the SpA-IgBDs that cause the greatest reduction in affinity between human IgG and SpA, the inventors constructed nineteen different plasmids encoding N-terminally polyhistidine-tagged $SpA_{Q9,10K/S33X}$, where X is any one of the 19 natural amino acids (except serine) provided by the genetic code. $SpA_{Q9,10K/S33X}$ proteins were purified via affinity chromatography on Ni-NTA resin, eluted, dialyzed, concentration determined via the BCA assay and bound at equal concentration (250 nM) to Bio-Rad ProteOn HTG chip. Each chip was subjected to surface plasmon resonance experiments with serial dilutions of human IgG and PBS control. The association of human IgG with SpA vaccine candidates loaded on the chip were recorded and data transformed to derive association constants for each protein (Table 5). Two amino acid substitutions at $Ser^{33}$ caused an increase in affinity for human IgG: $Ser^{33}$Gly ($K_A$ 11.180×10$^5$ M$^{-1}$) and $Ser^{33}$Ala ($K_A$ 10.540×10$^5$ M$^{-1}$), indicating that these variants exhibit greater affinity for human IgG than $SpA_{KKAA}$ (presumably due to increased affinity for $V_H$3-variant heavy chains) (Table 5). Fourteen amino acid substitutions at $Ser^{33}$ did not cause a significant difference in the association constant: $Ser^{33}$Tyr, $Ser^{33}$Leu, $Ser^{33}$Trp, $Ser^{33}$Val, $Ser^{33}$His, $Ser^{33}$Asn, $Ser^{33}$Met, $Ser^{33}$Arg, $Ser^{33}$Asp, $Ser^{33}$Phe, $Ser^{33}$Gln, $Ser^{33}$Pro, $Ser^{33}$Cys and $Ser^{33}$Lys (Table 5). Three amino acid substitutions at $Ser^{33}$ decreased the affinity for human IgG and $SpA_{Q9,10K/S33X}$: $Ser^{33}$Thr ($K_A$ 0.386×10$^5$ M$^{-1}$), $Ser^{33}$Glu ($K_A$ 0.496×10$^5$ M$^{-1}$), and $Ser^{33}$Ile ($K_A$ 1.840×10$^5$ M$^{-1}$) (Table 5). Thus, some amino acid substitutions at $Ser^{33}$ increase the affinity between human IgG and $SpA_{Q9,10K/S33X}$, whereas others are either neutral (exert no significant effect) or diminish the association with human IgG. Of those that diminish the affinity between human IgG, $Ser^{33}$Glu and $Ser^{33}$Thr, exhibit the largest reduction in the association constant (Table 5).

3. Combining Amino Acid Substitutions at Gly29, Ser33 and Asp36,37 in SpA Vaccine Candidates As compared to a single amino acid substitution at Ser$^{33}$, do combinations of amino acid substitutions at positions Gly$^{29}$, Ser$^{33}$ or Asp$^{36,37}$ of the IgBDs cause further affinity reductions for human IgG or do multiple substitutions exert paradoxical effects that can also increase the affinity between the two proteins? To address this question, the inventors compared the association constants of three proteins with amino acid substitutions at Ser$^{33}$: SpA$_{Q9,10K/S33E}$ (decreased affinity), SpA$_{Q9,10K/S33E}$ (affinity unaffected), and SpA$_{Q9,10K/S33Q}$ (affinity unaffected)—with those carrying additional amino acid substitutions at Gly$^{29}$ and/or Asp$^{36,37}$ (Table 6). For SpA$_{Q9,10K/S33E}$ (K$_A$ 0.496×10$^5$ M$^{-1}$), no additional effect was observed with added substitutions Gly$^{29}$Ala (K$_A$ 1.265×10$^5$ M$^{-1}$), Gly$^{29}$Phe (K$_A$ 1.575×10$^5$ M$^{-1}$), Asp$^{36,37}$Ala (K$_A$ 0.568×10$^5$ M$^{-1}$), Gly$^{29}$Ala/Asp$^{36,37}$Ala (K$_A$ 1.892×10$^5$ M$^{-1}$) or Gly$^{29}$Arg (K$_A$ 4.840×10$^5$ M$^{-1}$). However, combining Asp$^{36,37}$Ala with either Gly$^{29}$Phe (K$_A$ 14.850×10$^5$ M$^{-1}$) or Gly$^{29}$Arg (K$_A$ 10.240×10$^5$ M$^{-1}$) increased the affinity of SpA$_{Q9,10K/S33E}$ for human IgG (Table 6). When analyzed for SpA$_{Q9,10K/S33F}$ (K$_A$ 3.902×10$^5$ M$^{-1}$), whose association constant is not significantly different from that of SpA$_{KKAA}$, the inventors observed similar effects. None of the substitutions altered the affinity of SpA$_{Q9,10K/S33F}$ for human IgG except when Asp$^{36,37}$Ala was combined with either Gly$^{29}$Phe (SpA$_{Q9,10K/S33Q/D36,37A/Gly29F}$ K$_A$ 12.470×10$^5$ M$^{-1}$) which here again increased the affinity of the parent vaccine for human IgG (Table 6). Thus, combining amino acid substitutions at Gly$^{29}$, Ser$^{33}$ and Asp$^{36,37}$ of the SpA-IgBDs does not predictably reduce the affinity for human IgG. In each case, the affinity of a recombinant SpA vaccine candidate needs to be experimentally determined.

SpA-KR is a variant of SpA$_{KKAA}$ with two additional amino acid substitutions in the E domain of the IgBD, which carries a six residue N-terminal extension with the amino acid sequence ADAQQN (International Patent Application WO 2015/144653 AI). The inventors—Fabio Bagnoli, Luigi Fiaschi and Maria Scarselli (Glaxo-SmithKline INC.)—speculated that the two glutamine (QQ) residues in the hexapeptide extension of the E domain of SpA$_{KKAA}$ may constitute an additional binding site for human IgG without specifying where these residues may bind to immunoglobulin, i.e. Fcγ or V$_H$3-heavy chains, or providing experimental proof for such binding. When analyzed for its affinity to human IgG, the association constant of SpA-KR (K$_A$ 5.464×10$^5$ M$^{-1}$) was not significantly different from that of SpA$_{KKAA}$, suggesting that SpA-KR may also exhibit cross-linking activity for V$_H$3-IgG (Table 6). SpA$_{RRVV}$ is a SpA vaccine variant that is described in the patent application EP3101027A1 (OLYMVAX INC.). Similar to SpA$_{KKAA}$, SpA$_{RRVV}$ harbors amino acid substitutions at Gln$^{9,10}$ and Asp$^{36,37}$ of each of the five IgBDs of SpA, albeit that the substitutions replace Gln$^{9,10}$ with arginine (Arg or R) and Asp$^{36,37}$ with valine (Val or V). When analyzed for its affinity to human IgG, the association constant of SpA$_{RRVV}$ (K$_A$ 5.609×10$^5$ M$^{-1}$) was similar to that of SpA$_{KKAA}$, suggesting that SpA$_{RRVV}$ may also exhibit crosslinking activity for V$_H$3-IgG (Table 6).

4. Crosslinking Activity of SpA Vaccine Variants for VH3-Idiotypic and Fab Fragments of Human IgG A key safety issue for the clinical development of SpA vaccines is the lack of crosslinking activity with V$_H$3-idiotypic IgE and IgG on the surface of basophils and mast cells, which otherwise triggers histamine release and anaphylaxis (140, 142, 145). To quantify the V$_H$3-crosslinking activity of SpA vaccine candidates, the inventors used purified human IgG (54% V$_H$3 idiotypic variant heavy chains) that had been cleaved with papain and V$_H$3-clonal Fab fragments purified using affinity chromatography on SpA$_{KK}$ (75) (Table 7). When examined using Surface Plasmon Resonance (SPR) for affinity measurements with SpA and its variants, the IgBDs of wild-type protein A (SpA) exhibited potent crosslinking activity (K$_A$ 1.44×10$^7$ M$^{-1}$, Table 7). The affinity for V$_H$3-Fab was diminished for SpA$_{KKAA}$ (K$_A$ 8.27×10$^4$ M$^{-1}$), and SpA-KR (K$_A$ 6.42×10$^4$ M$^{-1}$) albeit that both variants retained significant crosslinking activity when compared to SpA$_{Q9,10K/S33E}$ (K$_A$ 41.24 M$^{-1}$) and SpA$_{Q9,10K/S33T}$ (K$_A$ 43.55 M$^{-1}$) (Table 7). SpA$_{Q9,10K/S33E}$ and SpA$_{Q9,10K/S33T}$ exhibited similar binding properties as PBS control (i.e. values obtained when no ligand was added). Thus, amino acid substitutions Ser$^{33}$Glu and Ser$^{33}$Thr eliminate V$_H$3-IgE and V$_H$3-IgG crosslinking activities in the vaccine candidates SpA$_{Q9,10K/S33E}$ and SpA$_{Q9,10K/S33T}$, respectively.

5. Fcγ-Binding Activity of SpA Vaccine Variants

Deisenhofer solved the crystal structure of the SpA B domain (IgBD-B) bound to human Fcγ and identified the interface between the two molecules (154). Four hydrogen bonds promote interactions between SpA (B domain numbering, FIG. 20B) and Fcγ: Gln$^9$ (IgG Ser$^{254}$), Gln$^{10}$ (IgG Gln$^{311}$), Asn$^{11}$ (IgG Asn$^{434}$) and Tyr$^{14}$ (IgG Leu$^{432}$)(54). These B domain residues are conserved in all five IgBDs (FIG. 20), implying a universal mechanism of Fcγ binding (43). Earlier work showed that substitution of Gln$^{9,10}$ Lys in IgBD-D or in all five IgBDs of SpA diminishes SpA$_{KK}$ (SpA$_{Q9,10K}$) binding to human, mouse and guinea pig IgG Fcγ (76, 43). As the newly engineered SpA vaccine variants, SpA$_{Q9,10K/S33E}$ and SpA$_{Q9,10K/S33T}$, retain the Gln$^{9,10}$ Lys amino acid substitutions in their five IgBDs, the inventors surmised that these variants should also exhibit significant defects in binding to human Fcγ. To validate this conjecture, the inventors used purified human IgG that had been cleaved with papain and the resulting Fcγ fragments purified (Table 8). When examined using a Bio-Layer Interferometer (BLI) for affinity measurements with SpA and its variants, the IgBDs of wild-type protein A exhibited high affinity for Fcγ (K$_A$ 5.17×10$^7$ M$^{-1}$). The Fcγ-binding activity was abolished for SpA$_{KKAA}$ (K$_A$ 32.68 M$^{-1}$), SpA-KR (K$_A$ 39.12 M$^{-1}$), SpA$_{Q9,10K/S33E}$ (K$_A$ 32.68 M$^{-1}$) and SpA$_{Q9,10K/S33T}$ (K$_A$ 39.91 M$^{-1}$), respectively. Thus, the Ser$^{33}$Glu and Ser$^{33}$Thr substitutions do not perturb the effects of the Gln$^{9,10}$Lys on Fcγ-binding in helix 1 of SpA$_{Q9,10K/S33E}$ and SpA$_{Q9,10K/S33T}$ (Table 8).

6. Mouse Model for Anaphylactic Activity of SpA Vaccine Candidates

Clinical and experimental studies have shown that vascular hyperpermeability is the hallmark of anaphylaxis (155, 156). Activated mast cells or basophils release vasoactive mediators, including histamine and platelet-activating factor, which induce the anaphylactic response of vascular hyperpermeability by causing vasodilation and endothelial barrier disruption (156). These events can be measured in a mouse model of anaphylactic vascular hyperpermeability as the extravasation of an intravenously administered dye, Evans Blue, at experimental sites (ear tissue) primed 24-hour prior via intradermal injection of 2 μg human V$_H$3-idiotypic IgG (157). The vascular leakage of Evans Blue into ear tissue is subsequently quantified (ng dye/mg tissue) in cohorts of five animals, means and standard deviation (SD) calculated, and data analyzed for statically significant differences. The plasma of wild-type C57BL/6 mice contains only 5-10% of immunoglobulin with V$_H$3- idiotypic variant heavy chains (48). For this reason, mice, unlike guinea pigs (20-30% $V_H3$-idiotypic variant heavy chains), are resistant to SpA-induced anaphylactic shock (140). The inventors therefore chose µMT mice for their study; these animals lack functional IgM B cell receptors, arrest B cell development at the pre-B cell stage, and cannot produce plasma IgG (158). µMT mice were used as recipients for the intradermal injection of 2 µg human $V_H3$-idiotypic IgG into ear tissue. After 24 hours, 200 µg SpA, SpA vaccine variants or buffer control (PBS) were injected intravenously into mice. Five minutes following SpA treatment, 2% Evans Blue solution was injected intravenously into mice to assess vascular permeability in ear tissues. After 30 min, animals were euthanized, ear tissue excised, dried and extracted with formamide for spectrophotometric quantification of the dye. Compared with PBS control [34.73 (±) 8.474 ng Evans Blue/mg ear tissue], SpA treatment caused anaphylactic vascular hyperpermeability, releasing 124.9 ng/mg (±26.54 ng/mg) Evans Blue (PBS vs. SpA, P<0.0001) (FIG. 22). In animal cohorts pretreated by intradermal injection with human $V_H3$-IgG, intravenous administration of $SpA_{KKAA}$ also caused vascular hyperpermeability [70.31 ng/mg (±23.04 ng/mg); PBS vs. $SpA_{KKAA}$, P<0.01], albeit at a lower level than wild-type SpA (SpA vs. $SpA_{KKAA}$, P<0.0001) (FIG. 22). In contrast, intravenous administration of 200 µg $SpA_{Q9,10K/S33E}$ [38.57 ng/mg (±15.07 ng/mg); $SpA_{Q9,10K/S33E}$ vs. PBS, not significant] or $SpA_{Q9,10K/S33T}$ [41.43 ng/mg (±13.15 ng/mg); $SpA_{Q9,10K/S33T}$ vs. PBS, not significant] did not elicit vascular hyperpermeability at sites treated with $V_H3$-idiotypic human IgG in µMT mice (FIG. 22). As a comparison, the SpA-KR vaccine candidate elicited anaphylactic vascular hyperpermeability similar to that of $SpA_{KKAA}$ (FIG. 22). Thus, unlike SpA and $SpA_{KKAA}$, which trigger vascular hyperpermeability by crosslinking $V_H3$-idiotypic IgG bound to activating FcεRI on mast cells and basophils or FcγR on other effector cells, $SpA_{Q9,10K/S33E}$ and $SpA_{Q9,10K/S33T}$ cannot crosslink $V_H3$-idiotypic IgG to promote anaphylactic reactions in µMT mice at sites pretreated with $V_H3$-idiotypic human IgG.

7. SpA Vaccine Candidate Crosslinking of $V_H3$-IgE

Basophils and mast cells are two main effector cells of anaphylaxis responses and secrete proinflammatory mediators upon antigen-mediated cross-linking of IgE onto their FcεRI surface receptors. S. aureus Cowan I strain that expresses SpA in abundance or soluble purified SpA can activate basophils to induce histamine release. This stimulating effect is dependent on the Fab binding activity of protein A (145). To study the potential crosslinking effect of SpA vaccine candidates with circulating IgE or IgG bound on the surface of basophils, vaccine variants purified in PBS were added to freshly drawn human blood anti-coagulated with EDTA for 30 min. Wild-type SpA was used as a positive control. PBS was used as the negative control. Cells were stained with anti-CD123, anti-CD203c, anti-HLA-DR (removal of dendritic cells and monocytes) and anti-CD63. Basophils were identified by gating for $SSC^{low}CD203c^+/CD123^+/HLA-DR^-$ cells. CD123 basophil activation was expressed as a proportion of CD63, and corrected for negative and positive controls. Compared with PBS control (4.39% activated basophil), SpA or $SpA_{KKAA}$ treatments caused significant increases of $CD63^+$ activated basophil population, 32.05% (PBS vs. SpA, P<0.0001) and 10.66% (PBS vs. $SpA_{KKAA}$, P<0.01), respectively (Table 9). In contrast to $SpA_{KKAA}$, $SpA_{Q9,10K/S33E}$ [5.38%; $SpA_{Q9,10K/S33T}$ vs. $SpA_{KKAA}$, P<0.05] or $SpA_{Q9,10K/S33T}$ [4.57%; $SpA_{Q9,10K/S33T}$ vs. $SpA_{KKAA}$, P<0.01] were unable to activate basophils and behaved similar to PBS control (Table 9). In this assay, SpA-KR [8.15%] and $SpA_{RRVV}$ [10.16%] vaccine candidates showed similar basophil activation as $SpA_{KKAA}$. Thus, $SpA_{Q9,10K/S33E}$ and $SpA_{Q9,10K/S33T}$ cannot crosslink circulating IgE in blood and cannot sensitize basophils by binding the high affinity receptors FcεRI. Unlike $SpA_{Q9,10K/S33E}$ and $SpA_{Q9,10K/S33}$, the $SpA_{KKAA}$, SpA-KR and $SpA_{RRVV}$ vaccine candidates retain significant activity for IgE-crosslinking which initiate an unwanted systemic anaphylaxis reaction.

Mast cell functional response was measured by antigen-triggered β-hexosaminidase and histamine release. The human mast cell line LAD2 was used for this assay. Mast cells ($2 \times 10^5$ cells/ml) were sensitized following overnight incubation with 100 ng/ml $V_H3$ IgE prior to stimulation with SpA vaccine variants (10 µg) for 30 min and β-hexosaminidase (FIG. 23A) or histamine release (FIG. 23B) were measured. Incubation with wild-type SpA induced about 35% of β-hexosaminidase release. $SpA_{KKAA}$ and SpA-KR vaccines caused 10.32% and 9.87% of β-hexosaminidase release, respectively, with no significant difference (SpA-KR vs. $SpA_{KKAA}$, not significant). These reductions are significant when compared to SpA wild-type (SpA vs. $SpA_{KKAA}$, P<0.0001; SpA vs. SpA-KR, P<0.0001). Yet, $SpA_{KKAA}$ and SpA-KR vaccines retain β-hexosaminidase releasing activity above negative control levels ($SpA_{KKAA}$ vs. PBS, P<0.0001; SpA-KR vs. PBS, P<0.0001) (FIG. 23A). In comparison, $SpA_{Q9,10K/S33E}$ [6.46%; $SpA_{Q9,10K/S33E}$ vs. $SpA_{KKAA}$, P<0.01] and $SpA_{Q9,10K/S33T}$ [4.43%; $SpA_{Q9,10K/S33T}$ vs. $SpA_{KKAA}$, P<0.0001] caused significantly less β-hexosaminidase release as compared to $SpA_{KKAA}$. $SpA_{Q9,10K/S33E}$ and $SpA_{Q9,10K/S33T}$ exhibited similar β-hexosaminidase release as the PBS control (FIG. 23A).

Similar results were obtained when assessing histamine release (FIG. 23B). SpA stimulated the highest level of histamine release; $SpA_{KKAA}$ and SpA-KR vaccines retained histamine release activity above PBS control levels, and both $SpA_{Q9,10K/S33E}$ and $SpA_{Q9,10K/S33T}$ behaved like the negative control PBS [SpA vs. PBS, or $SpA_{KKAA}$, or SpA-KR, or $SpA_{Q9,10K/S33E}$, or $SpA_{Q9,10K/S33T}$, P<0.0001; $SpA_{KKAA}$ VS SpA-KR or $SpA_{Q9,10K/S33E}$, not significant; $SpA_{KKAA}$ vs. $SpA_{Q9,10K/S33T}$ or PBS, P<0.05; $SpA_{Q9,10K/S33T}$ vs. SpA-KR, P<0.01].

In conclusion, $SpA_{Q9,10K/S33E}$ and $SpA_{Q9,10K/S33T}$ have lost the ability to activate mast cells sensitized with $V_H3$-idiotypic IgE, and represent vaccine candidates with a safety profile appropriate for human clinical testing.

8. Immunogenicity and Efficacy of SpA Vaccine Candidates in the S. aureus Colonization Model Compared to cohorts of C57BL/6 mice that were immunized with adjuvant alone (mock), immunization with $SpA_{KKAA}$ or $SpA_{Q9,10K/S33E}$ or $SpA_{Q9,10K/S33T}$ generated SpA-neutralizing antibodies (FIG. 25A). As expected, $SpA_{KKAA}$ immunization induced decolonization of S. aureus WU1 from the nasopharynx and gastrointestinal tract of C57BL/6 mice beginning 21 days following intranasal colonization (FIG. 24AB-C). Further, in decolonized mice, $SpA_{KKAA}$ immunization was associated with increased pathogen-specific IgG (including anti-CHB, anti-IsdA, anti-IsdB, anti-SasG) antibodies that are associated with S. aureus decolonization [(102) and data not shown]. Similar results were observed following immunization of C57BL/6 mice with $SpA_{Q9,10K/S33E}$. As compared to mock control, $SpA_{Q9,10K/S33E}$ vaccination promoted S. aureus WU1 decolonization from the nasopharynx and gastrointestinal tract of C57BL/6 mice similarly to $SpA_{KKAA}$ vaccination (FIG. 24BC). In decolonized mice, $SpA_{Q9,10K/S33E}$ vaccination was associated with increased pathogen-specific IgG (including anti-CHB, anti-IsdA, anti-IsdB, anti-SasG; data not shown). Compared with SpA$_{KKAA}$ immunized animals, SpA$_{Q9,10K/S33E}$ vaccination elicited similar levels of *S. aureus* decolonization, suggesting that the two vaccines exhibit similar protective efficacy in the mouse colonization model. SpA$_{Q9,10K/S33T}$ vaccination elicited similar levels of *S. aureus* decolonization as SpA$_{KKAA}$ and SpA$_{Q9,10K/S33E}$ vaccination (data not shown). When cohorts of animals were immunized on the same days with SpA$_{KKAA}$ or SpA$_{Q9,10K/S33E}$ or SpA$_{Q9,10K/S33T}$, approximately 50% of the animals became decolonized in the nasopharynx and gastrointestinal tract while all the animals receiving adjuvant alone (mock) remained colonized (FIG. 24DE). This data further demonstrate that all three candidate vaccines perform similarly in the colonization model of *S. aureus*.

9. Efficacy of SpA Vaccine Candidates in a Mouse Model for *S. aureus* Bloodstream Infection Earlier work demonstrated that immunization of BALB/C mice with SpA$_{KKAA}$ elicited SpA-specific antibodies that protected animals against intravenous MRSA USA300 LAC bloodstream challenge and the ensuing formation of abscess lesions in renal tissues (43). As compared to mock (adjuvant alone) immunized mice, immunization with SpA$_{KKAA}$, SpA$_{Q9,10K/S33E}$ or SpA$_{Q9,10K/S33T}$ elicited significantly high-titer antibodies against SpA$_{KKAA}$, against SpA$_{Q9,10K/S33E}$ or against SpA$_{Q9,10K/S33T}$ (FIG. 25A). SpA-specific antibody titers induced by SpA$_{KKAA}$ immunization in BALB/c mice were significantly higher when analyzed by ELISA for SpA$_{KKAA}$ than analyzed for SpA$_{Q9,10K/S33E}$ or SpA$_{Q9,10K/S33T}$ (SpA$_{KKAA}$ vs. SpA$_{Q9,10K/S33E}$, P<0.0001; SpA$_{KKAA}$ vs. SpA$_{Q9,10K/S33T}$, P<0.0001). In a similar way, SpA-specific antibody titers induced by SpA$_{Q9,10K/S33E}$ immunization in BALB/c mice were significantly higher when analyzed by ELISA for SpA$_{Q9,10K/S33E}$ than analyzed for SpA$_{KKAA}$ or SpA$_{Q9,10K/S33T}$ (SpA$_{KKAA}$ vs. SpA$_{Q9,10K/S33E}$, P<0.001; SpA$_{Q9,10K/S33E}$ vs. SpA$_{Q9,10K/S33T}$, P<0.05) while SpA-specific antibody titers induced by SpA$_{Q9,10K/S33T}$ immunization in BALB/c mice were significantly higher when analyzed by ELISA for SpA$_{Q9,10K/S33T}$ than analyzed for SpA$_{KKAA}$ or SpA$_{Q9,10K/S33E}$ (SpA$_{KKAA}$ vs. SpA$_{Q9,10K/S33T}$, P<0.05; SpA$_{Q9,10K/S33E}$ vs. SpA$_{Q9,10K/S33T}$, P<0.05) (FIG. 25A). These results suggest that some but not all of the epitopes of antibodies produced by SpA$_{Q9,10K/S33E}$ and SpA$_{Q9,10K/S33T}$ vaccination in BALB/c mice are different from that produced by SpA$_{KKAA}$ vaccination and vice versa. As reported earlier (43), compared to mock-immunized mice, SpA$_{KKAA}$ vaccination reduced the bacterial load of MRSA USA300 LAC and the number of abscess lesions in BALB/c mice (FIG. 25B; P<0.0001). SpA$_{Q9,10K/S33E}$ and SpA$_{Q9,10K/S33T}$ vaccination generated similar protection against MRSA USA300 LAC bloodstream infection compared to SpA$_{KKAA}$ vaccination. Compared to mock-immunized animals, SpA$_{Q9,10K/S33E}$ and SpA$_{Q9,10K/S33T}$ immunization reduced the bacterial load and the number of abscess lesions in BALB/c mice (FIG. 25C; P<0.0001). Thus, SpA$_{Q9,10K/S33E}$ and SpA$_{Q9,10K/S33T}$ vaccination elicits similar protection against MRSA USA300 LAC bloodstream infection and associated abscess formation in mice as previously reported for the SpA$_{KKAA}$ vaccine candidate (43)

10. Binding of SpA Vaccine Candidates to SpA-Neutralizing Monoclonal Antibody 3F6

Mouse hybridoma monoclonal antibody (hMAb) 3F6 (IgG2a) was generated using splenocytes from $SpA_{KKAA}$-immunized BALB/c mice (84). The gene for hMAb 3F6 was sequenced and cloned into an expression vector for purification of recombinant rMAb 3F6 from HEK293 F cells (146). Both hMAb3F6 and rMAb 3F6 bind to the triple-helical fold of each of the five SpA IgBDs (E, D, A, B, and C) and neutralize their ability to bind human IgG or IgM (84, 146). Intravenous administration of hMAb3F6 or rMAb 3F6 at a dose of 5 mg/kg protects BALB/c mice against *S. aureus* bloodstream infection associated renal abscess formation and bacterial replication (bacterial load) (84, 146). Further, intravenous administration of rMAb 3F6 (5 mg/kg) into C57BL/6 mice induces *S. aureus* WU1 decolonization from the nasopharynx and gastrointestinal tract of pre-colonized animals (146). Here the inventors asked whether rMAb 3F6 binds $SpA_{Q9,10K/S33E}$ or $SpA_{Q9,10K/S33T}$ with similar affinity as $SpA_{KKAA}$, the cognate antigen from which the monoclonal antibody had been derived (84). When measured via ELISA with fixed concentrations of ligands and serial dilutions of rMAb 3F6, the inventors derived affinity constants of $SpA_{KKAA}$ ($K_a$ $1.51\times10^{10}$ $M^{-1}$) $SpA_{Q9,10K/S33E}$ ($K_a$ $1.42\times10^{10}$ $M^{-1}$) and $SpA_{Q9,10K/S33T}$ ($K_a$ $1.34\times10^{10}$ $M^{-1}$) for binding to SpA vaccine candidates (FIG. 26). These data suggest that the amino acid substitutions $Ser^{33}$Glu and $Ser^{33}$Thr do not affect binding of SpA-neutralizing rMAb 3F6. Further, the amino acid substitutions $Ser^{33}$Glu and $Ser^{33}$Thr do not destroy the protective SpA-epitope as defined by the binding of rMAb 3F6.

C. Discussion

The inventors show here that the *S. aureus* vaccine candidates—$SpA_{KKAA}$, and SpA-KR—retain significant binding to $V_H$3-idiotypic immunoglobulin when using F(ab)2 fragment of human IgG as ligand. When analyzed with human mast cells (LAD2 cells) coated with $V_H$3-IgG, $SpA_{KKAA}$ and SpA-KR trigger $V_H$3-Ig crosslinking, as measured by the release of (3-hexosaminidase and histamine (145). In a mouse model for anaphylactic vascular hyperpermeability, the biological effects of such histamine release were measurable as Evans Blue dye extravasation at anatomical sites of $V_H$3-IgG administration in μMT mice. Together these observations raise concerns about the safety of SpA vaccine candidates as potential activators of anaphylactic reactions in humans.

To address the concerns with SpA vaccines, the inventors engineered two new antigens, $SpA_{Q9,10K/S33E}$ and $SpA_{Q9,10K/S33T}$, with improved safety profiles. $SpA_{Q9,10K/S33E}$ and $SpA_{Q9,10K/S33T}$ lack affinity for $V_H$3-idiotypic immunoglobulins, show reduced or no activity toward histamine release from $V_H$3-IgE coated human mast cells and do not promote Evans Blue dye extravasation in response to $V_H$3-IgG injection in μMT mice. Immunization of BALB/c mice with $SpA_{Q9,10K/S33E}$ and $SpA_{Q9,10K/S33T}$ elicited similar levels of SpA-specific IgG responses as $SpA_{KKAA}$. When analyzed for vaccine efficacy in mouse models, vaccination with $SpA_{Q9,10K/S33E}$ or $SpA_{Q9,10K/S33T}$ afforded similar levels of protection against *S. aureus* colonization or invasive bloodstream infection as the $SpA_{KKAA}$ vaccine (43). Further, the amino acid substitutions $Ser^{33}$Glu and $Ser^{33}$Thr do not perturb the protective IgBD epitopes that are defined by the *S. aureus* colonization- and invasive disease-protective monoclonal antibody 3F6 (84, 146). Based on these observations, the inventors hypothesize that the *S. aureus* vaccine candidates $SpA_{Q9,10K/S33E}$ and $SpA_{Q9,10K/S33T}$ may be suitable for development as clinical grade vaccines for clinical safety and efficacy testing against *S. aureus* colonization and invasive disease.

D. Materials and Methods

Bacterial strains and growth conditions. *S. aureus* strains USA300 (LAC) and WU1 were grown in tryptic soy broth (TSB) or tryptic soy agar (TSA) at 37° C. *Escherichia coli* strains DH5a and BL21(DE3) were grown at 37° C. in lysogeny broth (LB) medium with 100 µg/ml ampicillin and 1 mM isopropyl β-d-1-thiogalactopyranoside (IPTG) for the production of recombinant proteins.

Construction of SpA variants. The coding sequence of SpA variants was synthesized by Integrated DNA Technologies, Inc. The sequences and plasmid pET15b+ were digested by NdeI and BamHI, respectively. Then, the two digested products were ligated and transformed into *Escherichia coli* DH5a to generate the clones expressing N-terminal Hexahistidine(His6)-tagged recombinant proteins. Candidate clones were validated by DNA sequencing. The correct plasmids were transformed into *E. coli* BL21 (DE3) for production of SpA variant candidates.

Purification of proteins. Cultures of *E. coli* (2 liters) that had been grown in LB supplemented with ampicillin and IPTG to an absorbance at 600 nm (A600) of 2.0 were centrifuged (10,000×g for 10 minutes). Sedimented cells were suspended in Buffer A (50 mM Tris-HCl [pH 7.5], 150 mM NaCl), and the resulting suspensions were lysed in a French press at 14,000 lb/in2 (Thermo Spectronic, Rochester, NY). Unbroken cells were removed by centrifugation (5,000×g for 15 minutes), and the crude lysates subjected to ultracentrifugation (100,000×g for 1 hour at 4° C.). Soluble recombinant proteins were subjected via gravity flow to chromatography on Ni-NTA agarose (QIAGEN) with a packed volume of 1 ml preequilibrated with Buffer A. The columns were washed with 20 bed volumes of Buffer A, 20 bed volumes of Buffer A containing 10 mM imidazole and eluted with 6 ml of Buffer A containing 500 mM imidazole. Aliquots of the eluted fractions were mixed with equal volumes of sample buffer and separated on 15% sodium dodecyl sulfate-polyacrylamide gel electrophoresis (SDS-PAGE) gels. Recombinant proteins were dialyzed against phosphate-buffered saline (PBS) and their concentrations determined with the bicinchoninic acid assay (Pierce). For immunization studies in animals and for incubation with cell lines, recombinant protein preparations were subjected to the Endotoxin Removal Spin Columns (Pierce) to eliminate contaminating LPS. Sample purity was tested with Toxin-Sensor™ Chromogenic LAL Endotoxin Assay Kit (Genscript).

Purification of antibodies. To purify VH3 IgG, human plasma (20 ml) prepared using whole human blood was subjected to affinity chromatography over Protein G Resin (Genscript) to remove human IgM, IgD and IgA. Immunoglobulins eluted from Protein G Resin were subjected to a second affinity chromatography, SpA-coupled resin to enrich for VH3 IgG [SpA$_{KK}$ cannot bind the Fcγ domain of IgG (48)]. Protein G Resin and SpA-coupled resin were washed with 20-column volumes of PBS and bound proteins eluted with 0.1M glycine pH 3.0, neutralized with 1 M Tris-HCl, pH 8.5, and dialyzed against PBS overnight. For VH3 IgE purification, the human cell line HEK 293F was used for transient expression of pVITRO1-Transtuzumab-IgE-κ. Cells were grown in DMEM/HIGH GLUCOSE medium with 10% FCS, 2 mM glutamine, penicillin (5,000 U/ml) and streptomycin (100 µg/ml). Cells transfected with pVITRO1-Transtuzumab-IgE-κ using PEI were incubated at 37° C. in a 5% $CO_2$ atmosphere. For the stable expression of IgE, cells were cultivated in Freestyle 293 medium, for 7 days, and harvested at 12000×g for 20 minutes. The supernatant was purified over 2 ml Protein L Resin (Genscript). The resin was washed with 20-column volumes of PBS and bound VH3 IgE eluted with 0.1M glycine pH 3.0, neutralized with 1 M Tris-HCl, pH 8.5, and dialyzed against PBS overnight.

Surface Plasmon Resonance (SPR). SPR experiments shown in Tables 4,5,6,8 were performed on ProteOn™ XPR36 with ProteOn HTG chip. The running buffer was PBS with 0.05% Tween-20. The sensor-chip surfaces were activated with 2 mM nickel sulfate and regenerated with 300 mM EDTA, respectively. 500 nM of test articles (SpA wild type or variants) were immobilized at a flow rate of 25 µl/min. To measure interactions with wild type SpA, ligands (purified immunoglobulins) were used at concentrations of 500, 400, 300, 200 and 100 nM. To measure interactions with SpA variants, ligands were used at concentrations of 4, 3, 2, 1 and 0.5 µM. The association and dissociation rates were measured at a continuous flow rate of 30 µl/min and analyzed using the two-state reaction model. Associations constants were determined from three independent experiments.

Bio-layer Interferometry (BLI). The BLI experiment shown in Table 8 was performed using BLItz Bio-Layer Interferometer. Test candidates (25-50 nM) were immobilized onto Ni-NTA sensor for 120 seconds. The sensor was equilibrated with PBS for 80 seconds, dipped in solutions containing ligand at concentrations of 20, 15, 10, and 0 µM for 120 seconds (association phase) followed by 120 seconds in PBS (dissociation phase). The data was acquired using BLI Data acquisition software 9.0 (FortéBIO) and analyzed using the Data Analysis software 9.0.0.14 (FortéBIO). Reported association values were calculated from curves fitted model.

Enzyme-Linked Immunosorbent Assay (ELISA). Microtiter plates (NUNC MaxiSorp) were coated with purified antigens at 1 µg/ml (to measure antibody titers in test sera) or at 0.5 µg/ml (to measure interaction with 3F6 antibodies) in 0.1 M carbonate buffer (pH 9.5) at 4° C. overnight. Wells were blocked and incubated with test serum or 3F6 antibodies prior to incubation with horseradish peroxidase (HRP)—conjugated mouse or human IgG (1 µg/ml, Jackson ImmunoResearch). All plates were incubated with mouse HRP-conjugated secondary antibody specific (Fisher Scientific) and developed using OptEIA reagent (BD Biosciences). Half max titers were calculated with the GraphPad Prism software. The association constant was calculated from nonlinear regression (curve fit) model in the GraphPad Prism software. All experiments were performed in triplicate to calculate averages and standard error of the mean, and repeated for reproducibility.

Anaphylactic response in µMT mice. Mice with the µMT mutation were purchased from the Jackson Laboratory and bred at the University of Chicago. Cohorts of 5 six-week old female mice per group were sensitized by intradermal injection in the ear with VH3 IgG (2 µg in 20 µl of PBS) and 24 hours later, injected intravenously under anesthesia with ketamine-xylazine (100 mg-20 mg/kg) into the periorbital venous sinus of the right eye, with either PBS, SpA or its variants (200 µg in 100 µl PBS). Following 5 minutes stimulation with test article, animals were injected intravenously into the periorbital venous sinus of the left eye with 100 µl of 2% Evans blue. Animals were killed, ears dissected, dried, and extracted in formamide for 24 hours at 65° C. Evans blue extravasation in ear tissues (vascular permeability) was quantified by measuring absorbance at 620 nm.

Human basophil activation experiments. Blood (10 ml) was obtained from healthy donors and immediately mixed with 1 ml EDTA 0.1 M, pH7.5. SpA wild-type or vaccine candidate variants (1 µg) or PBS were added to 1-ml EDTA blood aliquots and samples were incubated for 1 hour at 37° C. with rotation. Sample aliquots were treated with RBC lysis buffer (Biolegend), centrifuged (350×g) and supernatants discarded. Cells in pellets were washed in cold PBS and re-suspended in PBS with 5% FBS for staining with anti-CD123-FITC, anti-HLA-DA-PerCP, anti-CD63-PE, and anti-CD203c-APC (Biolegend) in the dark at room temperature for 10 min. All stained samples were analyzed using BD LSRII 3-8 (BD Biosciences). Total basophil counts were obtained by gating from SSClow/CD203c+/CD123+/HLA-DR– cells and activated basophils were selected from the CD63+CD203c+ pool. Experiments were performed in triplicate and repeated at least three times using different healthy donors.

Mast cell degranulation. Human mast cells (LAD2) [kindly provided by Dr. Kirshenbaum from NIAID] were sensitized by incubating 2×105 cells with 100 ng VH3 IgE, overnight at 37° C. in a 5% CO2 atmosphere. Cells were harvested and washed twice with HEPES buffer containing 0.04% bovine serum albumin (BSA) to remove free IgE. Cells were suspended in the same buffer at the concentration of 2×105 cells/ml, and stimulated with SpA or test articles for 30 min before assaying for β-hexosaminidase and histamine release. Cells were sedimented and the spent medium was transferred to a fresh tube while cells in the pellet were lysed with 0.1% Triton X-100. β-hexosaminidase activity in the spent medium and the Triton X-100-lyzed cells, was measured by adding the colorimetric substrate pNAG (p-nitrophenyl-N-acetyl-β-D-glucosaminide obtained from Sigma; final concentration 3.5 mg/ml at pH 4.5) for 90 min. The reaction was quenched by addition of 0.4 M glycine pH 10.7 and absorbance at λ=405 nm recorded. The results were expressed as the percentage of β-hexosaminidase released in the spent medium over total (spent medium+Triton X-100 lyzed cells). Experiments were performed in triplicates and repeated at least three times. Histamine was measured using an Enzyme Immunoassay (SpiBio Bertin Pharma). Briefly, wells of a microtiter plate were coated with mouse anti-histamine antibody and incubated for 24 hours with tracer (acetylcholinesterase linked to histamine) mixed with an experimental extract. Plates were washed, and Ellman's Reagent (acetylcholinesterase substrate) was added to the wells. Product formation was detected by recording absorbance at 412 nm. Absorbance at 412 nm is proportional to the amount of tracer bound to the well and is inversely proportional to the amount of histamine present in the experimental extract. All samples were performed in duplicate.

Active immunization of mice. Animals BALB/c or C57BL/6J (3 week-old, female mice, 15 animals per group) were immunized with PBS, or 50 µg purified endotoxin-free protein $SpA_{KKAA}$ or $SpA_{Q9,10K/S33E}$ or $SpA_{Q9,10K/S33T}$ emulsified in 5:2:3 of antigen:CFA:IFA and boosted with 50 µg proteins emulsified in 1:1 of antigen:IFA 11 days following the first immunization. On day 20, mice were bled and serum were harvested to evaluate antibody titers to vaccine candidates by ELISA. On day 21, mice were either inoculated for nasopharyngeal colonization or infected by the intravenous injection of bacteria.

Mouse nasopharyngeal colonization. Overnight cultures of S. aureus strain WU1 were diluted 1:100 in fresh TSB and grown for 2 h at 37° C. as described (102). The cells were centrifuged, washed, and suspended in PBS. 10 immunized female C57BL/6J mice per group (Jackson Laboratory) were anesthetized by intraperitoneal injection with ketamine-xylazine (100 mg-20 mg/kg), and $1\times10^8$ CFU of S. aureus (in a 10-µl volume) was pipetted into the right nostril of each mouse. In weekly intervals following inoculation, the oropharynx of the mice was swabbed and stool samples were collected and homogenized in PBS. Swab samples and homogenates of stool samples were spread on mannitol salt agar (MSA) for bacterial enumeration. At the end of the experiment, the mice were bled via periorbital vein puncture to obtain sera for antibody response analyses using the staphylococcal antigen matrix as described (43). Briefly, nitrocellulose membranes were blotted with 2 µg affinity-purified staphylococcal antigens. The membranes were blocked with 5% degranulated milk and incubated with diluted mouse sera (1:10,000 dilution) and IRDye 680-conjugated goat anti-mouse IgG (Li-Cor). Signal intensities were quantified using the Odyssey infrared imaging system (Li-Cor). All animal experiments were performed in duplicate. Two-way analysis of variance (ANOVA) with Sidak multiple-comparison tests (GraphPad Software) was performed to analyze the statistical significance of nasopharyngeal and stool colonization, ELISA, and antigen matrix data.

Mouse renal abscess model. Overnight cultures of S. aureus USA300 (LAC) were diluted 1:100 into fresh TSB and grown for 2 h at 37° C. Staphylococci were sedimented, washed, and suspended in PBS. Inocula were quantified by spreading sample aliquots on TSA and enumerating the colonies that formed upon incubation. Groups of 15 BALB/c mice immunized with endotoxin-free protein $SpA_{KKAA}$ or $SpA_{Q9,10K/S33E}$ or $SpA_{Q9,10K/S33T}$ prepared in PBS or mock immunized (PBS control) were anesthetized and inoculated with $5\times10^6$ CFU of S. aureus USA300 (LAC) into the periorbital venous sinus of the right eye. On day 15 following challenge, mice were killed by $CO_2$ inhalation. Both kidneys were removed, and the staphylococcal load in one organ was analyzed by homogenizing renal tissue with PBS, 0.1% Triton X-100. Serial dilutions of homogenate were spread on TSA and incubated for colony formation. The remaining organ was examined by histopathology. Briefly, kidneys were fixed in 10% formalin for 24 h at room temperature. Tissues were embedded in paraffin, thin sectioned, stained with hematoxylin-eosin, and inspected by light microscopy to enumerate abscess lesions. All animal experiments were performed in duplicate and statistical analysis were calculated with t-tests (and nonparametric tests) of Graphpad Prism.

Ethics statement. Experiments with blood from human volunteers were performed with a protocol reviewed, approved, and supervised by the University of Chicago's Institutional Review Board (IRB). All mouse experiments were performed in accordance with the institutional guidelines following experimental protocol review and approval by the Institutional Biosafety Committee (IBC) and the Institutional Animal Care and Use Committee (IACUC) at the University of Chicago.

Statistical analyses. For FIGS. 22, 23, 25, and Tables 4-9, one-way ANOVA with post-test (Bonferroni's or Dunnett's Multiple Comparison Test) was used to derive statistical significance between the means of multiple groups. For FIG. 24, two-way analysis of variance (ANOVA) with Sidak multiple-comparison tests (GraphPad Software) was performed to analyze the statistical significance of mouse colonization and the staphylococcal antigen matrix data. All data were analyzed by Prism (GraphPad Software, Inc.), and P values less than 0.05 were deemed significant.

E. Tables

TABLE 4

Affinity measurements with wild-type SpA, SpA$_{KKAA}$ and SpA$_{Q9, 10K/G29X}$ vaccine candidates and human IgG[#].

| SpA$_{Q9, 10K/G29X}$[a] | K$_A$ (×10$^5$ M$^{-1}$) [b] | SD (×10$^5$) [c] | P value[d] |
|---|---|---|---|
| SpA$_{Q9, 10K/G29H}$ | 1.435 | 0.2799 | * |
| SpA$_{Q9, 10K/G29C}$ | 1.743 | 0.8619 | * |
| SpA$_{Q9, 10K/G29T}$ | 1.982 | 0.9146 | ns |
| SpA$_{Q9, 10K/G29Q}$ | 2.057 | 0.9600 | * |
| SpA$_{Q9, 10K/G29L}$ | 3.146 | 1.3860 | ns |
| SpA$_{Q9, 10K/G29E}$ | 3.182 | 1.5300 | ns |
| SpA$_{Q9, 10K/G29P}$ | 3.396 | 1.4410 | ns |
| SpA$_{Q9, 10K/G29F}$ | 3.460 | 1.5860 | ns |
| SpA$_{Q9, 10K/G29M}$ | 3.893 | 0.7868 | ns |
| SpA$_{Q9, 10K/G29V}$ | 4.350 | 1.0830 | ns |
| SpA$_{Q9, 10K/G29W}$ | 4.508 | 0.7448 | ns |
| SpA$_{Q9, 10K/G29D}$ | 5.478 | 1.0150 | ns |
| SpA$_{Q9, 10K/G29R}$ | 6.056 | 0.9814 | ns |
| SpA$_{Q9, 10K/G29N}$ | 6.231 | 0.7696 | ns |
| SpA$_{Q9, 10K/G29Y}$ | 8.367 | 3.326 | ns |
| SpA$_{Q9, 10K/G29S}$ | 9.398 | 4.298 | *** |
| SpA$_{Q9, 10K/G29K}$ | 9.738 | 2.345 | ** |
| SpA$_{Q9, 10K/G29I}$ | 10.070 | 4.398 | ** |
| SpA$_{Q9, 10K/G29A}$ | 11.310 | 3.119 | *** |
| SpA$_{KKAA}$ | 5.022 | 2.150 | |
| SpA | 1081 | 16.34 | |

[a]Test articles were immobilized on Bio-Rad ProteOn HTG Chip and subjected to Surface Plasmon Resonance measurements with increasing concentrations of human IgG and flowed over each channel of the chip. Data were analyzed from three independent experimental determinations.
[b] Data were used to derive the association constant (K$_A$) for each test article.
[c] Data were used to derive the Standard Deviation (SD) for each test article.
[d]Data were analyzed with One-way ANOVA with Dunnett's Multiple Comparison Test between each test article and SpA$_{KKAA}$.
Symbols: ns, not significant;
*, P < 0.05;
**, P < 0.01;
***, P < 0.001;
****, P < 0.0001.

TABLE 5

Affinity measurements with wild-type SpA, SpA$_{KKAA}$ and SpA$_{Q9, 10K/S33X}$ vaccine candidates and human IgG[#].

| SpA$_{Q9, 10K/S33X}$[a] | K$_A$ (×10$^5$ M$^{-1}$) [b] | SD (×10$^5$) [c] | P value[d] |
|---|---|---|---|
| SpA$_{Q9, 10K/S33E}$ | 0.496 | 0.0439 | ** |
| SpA$_{Q9, 10K/S33T}$ | 0.386 | 0.1218 | *** |
| SpA$_{Q9, 10K/S33Y}$ | 1.571 | 0.7497 | ns |
| SpA$_{Q9, 10K/S33I}$ | 1.840 | 1.1290 | * |
| SpA$_{Q9, 10K/S33L}$ | 2.051 | 0.7592 | ns |
| SpA$_{Q9, 10K/S33W}$ | 2.356 | 0.6373 | ns |
| SpA$_{Q9, 10K/S33V}$ | 2.471 | 1.2060 | ns |
| SpA$_{Q9, 10K/S33H}$ | 2.784 | 0.6087 | ns |
| SpA$_{Q9, 10K/S33N}$ | 3.066 | 1.0100 | ns |
| SpA$_{Q9, 10K/S33M}$ | 3.177 | 1.3750 | ns |
| SpA$_{Q9, 10K/S33R}$ | 3.463 | 1.7950 | ns |
| SpA$_{Q9, 10K/S33D}$ | 3.824 | 1.7100 | ns |
| SpA$_{Q9, 10K/S33F}$ | 3.902 | 1.8040 | ns |
| SpA$_{Q9, 10K/S33Q}$ | 4.068 | 2.8350 | ns |
| SpA$_{Q9, 10K/S33P}$ | 4.218 | 2.2560 | ns |
| SpA$_{Q9, 10K/S33C}$ | 4.577 | 0.6927 | ns |
| SpA$_{Q9, 10K/S33K}$ | 5.124 | 2.1810 | ns |
| SpA$_{Q9, 10K/S33A}$ | 10.540 | 5.0520 | *** |
| SpA$_{Q9, 10K/S33G}$ | 11.180 | 5.2040 | *** |
| SpA$_{KKAA}$ | 5.022 | 0.0439 | |
| SpA | 1081$^{-1}$ | 16.34 | |

[a]Test articles were immobilized on Bio-Rad ProteOn HTG Chip and subjected to Surface Plasmon Resonance measurements with increasing concentrations of human IgG and flowed over each channel of the chip. Data were analyzed from three independent experimental determinations.
[b] Data were used to derive the association constant (K$_A$) for each test article.
[c] Data were used to derive the Standard Deviation (SD) for each test article.
[d]Data were analyzed with One-way ANOVA with Dunnett's Multiple Comparison Test between each test article and SpA$_{KKAA}$.
Symbols: ns, not significant;
*, P < 0.05;
**, P < 0.01;
***, P < 0.001;
****, P < 0.0001.

TABLE 6

The association constant for binding to human IgG of SpA variants Q9, 10K/S33X or Q9, 10K/G29X in combination with other amino acid substitutions[#]

| Parent SpA variant[a] | K$_A$ (×10$^5$ M$^{-1}$)[b] | SD[c] | P value[d] | Parent SpA variant with additional substitutions[a] | K$_A$ (×10$^5$ M$^{-1}$)[b] | SD (×10$^5$ M$^{-1}$)[c] | P value[e] |
|---|---|---|---|---|---|---|---|
| SpA$_{Q9, 10K/S33E}$ | 0.496 | 0.044 | * | SpA$_{Q9, 10K/S33E/D36, 37A}$ | 0.568 | 0.1185 | ns |
| | | | | SpA$_{Q9, 10K/S33E/G29A}$ | 1.265 | 0.6947 | ns |
| | | | | SpA$_{Q9, 10K/S33E/D36, 37A/G29A}$ | 1.892 | 0.6793 | ns |
| | | | | SpA$_{Q9, 10K/S33E/G29F}$ | 1.575 | 0.4060 | ns |
| | | | | SpA$_{Q9, 10K/S33E/D36, 37A/G29F}$ | 14.850 | 13.480 | *** |
| | | | | SpA$_{Q9, 10K/S33E/G29R}$ | 4.840 | 1.1960 | ns |
| | | | | SpA$_{Q9, 10K/S33E/D36, 37A/G29R}$ | 10.240 | 5.2600 | * |
| SpA$_{Q9, 10K/S33Q}$ | 4.068 | 2.835 | ns | SpA$_{Q9, 10K/S33Q/D36, 37A}$ | 3.930 | 1.9290 | ns |
| | | | | SpA$_{Q9, 10K/S33Q/G29A}$ | 2.563 | 1.3670 | ns |
| | | | | SpA$_{Q9, 10K/S33Q/D36, 37A/G29A}$ | 4.893 | 3.8360 | ns |
| | | | | SpA$_{Q9, 10K/S33Q/G29F}$ | 1.275 | 0.7355 | ns |
| | | | | SpA$_{Q9, 10K/S33Q/D36, 37A/G29F}$ | 12.470 | 8.8810 | * |
| | | | | SpA$_{Q9, 10K/S33Q/G29R}$ | 2.333 | 0.4245 | ns |
| | | | | SpA$_{Q9, 10K/S33Q/D36, 37A/G29R}$ | 6.378 | 4.6820 | ns |

TABLE 6-continued

The association constant for binding to human IgG of SpA variants Q9, 10K/S33X
or Q9, 10K/G29X in combination with other amino acid substitutions#

| Parent SpA variant[a] | $K_A$ ($\times 10^5$ $M^{-1}$)[b] | SD[c] | P value[d] | Parent SpA variant with additional substitutions[a] | $K_A$ ($\times 10^5$ $M^{-1}$)[b] | SD ($\times 10^5$ $M^{-1}$)[c] | P value[e] |
|---|---|---|---|---|---|---|---|
| SpA$_{Q9, 10K/S33F}$ | 3.902 | 1.804 | ns | SpA$_{Q9, 10K/S33F/D36, 37A}$ | 3.634 | 2.6420 | ns |
| | | | | SpA$_{Q9, 10K/S33F/G29A}$ | 1.190 | 0.4299 | ns |
| | | | | SpA$_{Q9, 10K/S33F/D36, 37A/G29A}$ | insoluble | | |
| | | | | SpA$_{Q9, 10K/S33F/G29F}$ | 2.440 | 0.7657 | ns |
| | | | | SpA$_{Q9, 10K/S33F/D36, 37A/G29F}$ | insoluble | | |
| | | | | SpA$_{Q9, 10K/S33F/G29R}$ | 1.903 | 0.8693 | ns |
| | | | | SpA$_{Q9, 10K/S33F/D36, 37A/G29R}$ | 9.056 | 4.9730 | * |
| SpA$_{Q9, 10K/S33K}$ | 5.124 | 2.181 | ns | SpA$_{Q9, 10K/S33K/D36, 37A}$ | 8.048 | 4.1050 | ns |
| SpA$_{Q9, 10K/S33A}$ | 10.540 | 5.052 | *** | SpA$_{Q9, 10K/S33A/D36, 37A}$ | 18.830 | 18.320 | ns |
| SpA$_{Q9, 10K/G29F}$ | 3.460 | 1.586 | ns | SpA$_{Q9, 10K/G29F/D36, 37A}$ | 3.723 | 1.5100 | ns |
| SpA$_{Q9, 10K/G29R}$ | 6.056 | 0.981 | ns | SpA$_{Q9, 10K/G29R/D36, 37A}$ | 6.808 | 3.6840 | ns |
| SpA$_{Q9, 10K/G29A}$ | 11.310 | 3.119 | ** | SpA$_{Q9, 10K/G29A/D36, 37A}$ | 1.78 | 0.5098 | *** |
| SpA-KR | 5.464 | 0.767 | ns | | | | |
| SpA$_{RRVV}$ | 5.609 | 2.355 | ns | | | | |
| SpA$_{KKAA}$ | 5.022 | 2.150 | — | | | | |

[a]Test articles were immobilized on Bio-Rad ProteOn HTG Chip and subjected to Surface Plasmon Resonance measurements with increasing concentrations of human IgG and flowed over each Chip. Data were analyzed from three independent experimental determinations.
[b]Data were used to derive the association constant ($K_A$) for each test article.
[c]Data were used to derive the standard deviation (SD) for each test article.
[d, e]Data were analyzed with One-way ANOVA with Dunnett's Multiple Comparison Test between test article and SpA$_{KKAA}$[d] and between test article (column 5) and parent vaccine (column 1)[e]. Symbols: ns, not significant; *, $P < 0.05$; , $P < 0.01$; *, $P < 0.001$; ****, $P < 0.0001$.

TABLE 7

The association constant for binding of each combination mutation to F(ab)2 fragment of human IgG

| SpA variant[a] | $K_A$ ($M^{-1}$)[b] | SD[c] | P value[d] |
|---|---|---|---|
| SpA | $1.44 \times 10^7$ | $8.193 \times 10^6$ | — |
| SpA$_{KKAA}$ | $8.27 \times 10^4$ | $2.76 \times 10^4$ | — |
| SpA-KR | $6.42 \times 10^4$ | $3.80 \times 10^4$ | ns |
| SpA$_{Q9, 10K/S33E}$ | 41.24 | 5.386 | *** |
| SpA$_{Q9, 10K/S33T}$ | 43.55 | 5.737 | *** |

[a]Test articles were immobilized on Bio-Rad ProteOn HTGsensor and subjected to Surface Plasmon Resonance (SPR) with increasing concentrations of F(ab)2 fragment of human IgG. Data were analyzed from three independent experimental determinations.
[b]Data were used to derive the association constant ($K_A$) for each test article.
[c]Data were used to derive Standard Deviation (SD) for each test article.
[d]Data were analyzed with One-way ANOVA with Dunnett's Multiple Comparison Test between test article and SpA$_{KKAA}$.
Symbols: ns, not significant;
*, $P < 0.05$;
**, $P < 0.01$;
***, $P < 0.001$;
****, $P < 0.0001$.

TABLE 8

The association constant for binding of each combination mutation to Fcγ fragment of human IgG

| SpA variant[a] | $K_A$ ($M^{-1}$)[b] | SD[c] | P value[d] |
|---|---|---|---|
| SpA | $5.17 \times 10^7$ | $8.995 \times 10^6$ | — |
| SpA$_{KKAA}$ | 32.91 | 16.291 | — |
| SpA$_{Q9, 10K/S33E}$ | 32.68 | 16.414 | ns |
| SpA$_{Q9, 10K/S33T}$ | 39.91 | 17.081 | ns |
| SpA-KR | 39.12 | 13.348 | ns |

[a]Test articles were immobilized on Ni-NTA sensor and subjected to Bio-Layer Interferometry (BLI) with increasing concentrations of Fc fragment of human IgG. Data were analyzed from three independent experimental determinations.
[b]Data were used to derive the association constant ($K_A$) for each test article.
[c]Data were used to derive the Standard Deviation (SD) for each test article.
[d]Data were analyzed with One-way ANOVA with Dunnett's Multiple Comparison Test between test article and SpA$_{KKAA}$.
Symbols: ns, not significant;
*, $P < 0.05$;
**, $P < 0.01$;
***, $P < 0.001$;
****, $P < 0.0001$.

TABLE 9

Activation of human basophils by SpA and vaccine candidate variants

Table 9. Activation of human basophils by SpA and vaccine candidate variants

| SpA variant/PBS[a] | PBS | SpA | SpA$_{KKAA}$ | SpA$_{Q9, 10K/S33E}$ | SpA$_{Q9, 10K/S33T}$ | SpA-KR | SpA$_{RRVV}$ |
|---|---|---|---|---|---|---|---|
| % activated basophils | 4.39 ± 0.884 | 32.05 ± 0.919 | 10.66 ± 1.612 | 5.38 ± 0.318 | 4.57 ± 0.877 | 8.15 ± 1.018 | 10.16 ± 0.905 |
| P value vs. PBS[b] | — | **** | ** | ns | ns | ns | ** |
| P value vs. SpA$_{KKAA}$[c] | | **** | — | * | ** | ns | ns |

[a]Test articles were incubated with human basophils and data displayed as the percentage of activated basophils of the total basophil population (100%).
[b, c]One-way ANOVA with Bonferroni's Multiple Comparison Test was performed for statistical analysis that compare test article and PBS[b] or test article and SpA$_{KKAA}$[c]. Symbols: ns, not significant; *, $P < 0.05$; , $P < 0.01$; *, $P < 0.001$; ****, $P < 0.0001$.

REFERENCES

The following references, to the extent that they provide exemplary procedural or other details supplementary to those set forth herein, are specifically incorporated herein by reference.

U.S. Pat. No. 3,791,932
U.S. Pat. No. 3,949,064
U.S. Pat. No. 4,174,384
U.S. Pat. No. 4,338,298
U.S. Pat. No. 4,356,170
U.S. Pat. No. 4,367,110
U.S. Pat. No. 4,372,945
U.S. Pat. No. 4,452,901
U.S. Pat. No. 4,474,757
U.S. Pat. No. 4,554,101
U.S. Pat. No. 4,578,770
U.S. Pat. No. 4,596,792
U.S. Pat. No. 4,599,230
U.S. Pat. No. 4,599,231
U.S. Pat. No. 4,601,903
U.S. Pat. No. 4,608,251
U.S. Pat. No. 4,683,195
U.S. Pat. No. 4,683,202
U.S. Pat. No. 4,684,611
U.S. Pat. No. 4,690,915
U.S. Pat. No. 4,690,915
U.S. Pat. No. 4,748,018
U.S. Pat. No. 4,800,159
U.S. Pat. No. 4,879,236
U.S. Pat. No. 4,952,500
U.S. Pat. No. 5,084,269
U.S. Pat. No. 5,199,942
U.S. Pat. No. 5,221,605
U.S. Pat. No. 5,238,808
U.S. Pat. No. 5,302,523
U.S. Pat. No. 5,310,687
U.S. Pat. No. 5,322,783
U.S. Pat. No. 5,384,253
U.S. Pat. No. 5,464,765
U.S. Pat. No. 5,512,282
U.S. Pat. No. 5,512,282
U.S. Pat. No. 5,538,877
U.S. Pat. No. 5,538,880
U.S. Pat. No. 5,548,066
U.S. Pat. No. 5,550,318
U.S. Pat. No. 5,563,055
U.S. Pat. No. 5,580,859
U.S. Pat. No. 5,589,466
U.S. Pat. No. 5,591,616
U.S. Pat. No. 5,610,042
U.S. Pat. No. 5,620,896
U.S. Pat. No. 5,648,240
U.S. Pat. No. 5,656,610
U.S. Pat. No. 5,702,932
U.S. Pat. No. 5,736,524
U.S. Pat. No. 5,780,448
U.S. Pat. No. 5,789,215
U.S. Pat. No. 5,801,234
U.S. Pat. No. 5,840,846
U.S. Pat. No. 5,843,650
U.S. Pat. No. 5,846,709
U.S. Pat. No. 5,846,783
U.S. Pat. No. 5,849,497
U.S. Pat. No. 5,849,546
U.S. Pat. No. 5,849,547
U.S. Pat. No. 5,858,652
U.S. Pat. No. 5,866,366
U.S. Pat. No. 5,871,986
U.S. Pat. No. 5,916,776
U.S. Pat. No. 5,922,574
U.S. Pat. No. 5,925,565
U.S. Pat. No. 5,925,565
U.S. Pat. No. 5,928,905
U.S. Pat. No. 5,928,906
U.S. Pat. No. 5,932,451
U.S. Pat. No. 5,935,819
U.S. Pat. No. 5,935,825
U.S. Pat. No. 5,939,291
U.S. Pat. No. 5,942,391
U.S. Pat. No. 5,945,100
U.S. Pat. No. 5,958,895
U.S. Pat. No. 5,981,274
U.S. Pat. No. 5,994,624
U.S. Pat. No. 6,008,341
U.S. Pat. No. 6,288,214
U.S. Pat. No. 6,294,177
U.S. Pat. No. 6,651,655
U.S. Pat. No. 6,656,462
U.S. Pat. No. 6,733,754
U.S. Pat. No. 6,756,361
U.S. Pat. No. 6,770,278
U.S. Pat. No. 6,793,923
U.S. Pat. No. 6,814,971
U.S. Pat. No. 6,936,258
U.S. Patent Appln. 2002/0169288
U.S. Patent Appln. 2003/0153022
PCT Appln. PCT/US89/01025
PCT Appln. WO 00/02523
PCT Appln. WO 00/12132
PCT Appln. WO 00/12689
PCT Appln. WO 00/15238
PCT Appln. WO 01/34809
PCT Appln. WO 01/60852
PCT Appln. WO 01/98499
PCT Appln. WO 02/059148
PCT Appln. WO 02/094868
PCT Appln. WO 03/53462
PCT Appln. WO 04/43407
PCT Appln. WO 06/032472
PCT Appln. WO 06/032475
PCT Appln. WO 06/032500
PCT Appln. WO 07/113222
PCT Appln. WO 07/113223
PCT Appln. WO 94/09699
PCT Appln. WO 95/06128
PCT Appln. WO 95/08348
PCT Appln. WO 98/57994

1. Tong S Y, Davis J S, Eichenberger E, Holland T L, Fowler V G J. 2015. *Staphylococcus aureus* infections: epidemiology, pathophysiology, clinical manifestations, and management. Clin Microbiol Rev 28:603-661.
2. van Belkum A, Melles D C, Nouwen J, van Leeuwen W B, van Wamel W, Vos M C, Wertheim H F, Verbrugh H A. 2009. Co-evolutionary aspects of human colonisation and infection by *Staphylococcus aureus*. Infect Genet Evol 9:32-47.
3. Hanssen A M, Kindlund B, Stenklev N C, Furberg A S, Fismen S, Olsen R S, Johannessen M, Solid J U E. 2017. Locatization of *Staphylococcus aureus* in tissue from the nasal vestibule in healthy carriers. BMC Microbiol 17:89.

4. Mertz D, Frei R, Periat N, Zimmerli M, Battegay M, Flückiger U, Widmer A F. 2009. Exclusive *Staphylococcus aureus* throat carriage: at-risk populations. Arch Intern Med 169:172-178.

5. Boyce J M, Havill N L, Maria B. 2005. Frequency and possible infection control implications of gastrointestinal colonization with methicillin-resistant *Staphylococcus aureus*. J Clin Microbiol 43:5992-5995.

6. von Eiff C, Becker K, Machka K, Stammer H, Peters G. 2001. Nasal carriage as a source of *Staphylococcus aureus* bacteremia. N Engl J Med 344:11-16.

7. Wertheim H F, Melles D C, Vos M C, van Leeuwen W, van Belkum A, Verbrugh H A, Nouwen J L. 2005. The role of nasal carriage in *Staphylococcus aureus* infections. Lancet Infect Dis 5:751-762.

8. Buehlmann M, Frei R, Fenner L, Dangel M, Fluckiger U, Widmer A F. 2008. Highly effective regimen for decolonization of methicillin-resistant *Staphylococcus aureus* carriers. Infect Control Hosp Epidemiol 29:510-516.

9. Gilpin D F, Small S, Bakkshi S, Kearney M P, Cardwell C, Tunney M M. 2010. Efficacy of a standard methicillin-resistant *Staphylococcus aureus* decolonisation protocol in routine clinical practice. J Hosp Infect 75:93-98.

10. Acton D S, Plat-Sinnige M J, van Wamel W, de Groot N, van Belkum A. 2009. Intestinal carriage of *Staphylococcus aureus*: how does its frequency compare with that of nasal carriage and what is its clinical impact? Eur J Clin Microbiol Infect Dis 18:115-127.

11. Verkaik N J, Lebon A, de Vogel C P, Hooijkaas H, Verbrugh H A, Jaddoe V W, Hofman A, Moll H A, van Belkum A, van Wamel W J. 2010. Induction of antibodies by *Staphylococcus aureus* nasal colonization in young children. Clin Microbiol Infect 16:1312-1317.

12. Swierstra J, Debets S, de Vogel C, Lemmens-den Toom N, Verkaik N, Ramdani-Bouguessa N, Jonkman M F, van Dijl J M, Fahal A, van Belkum A, van Wamel W. 2015. IgG4 subclass-specific responses to *Staphylococcus aureus* antigens shed new light on host-pathogen interaction. Infect Immun 83:492-501.

13. Holtfreter S, Jursa-Kulesza J, Masiuk H, Verkaik N J, de Vogel C, Kolata J, Nowosiad M, Steil L, van Wamel W, van Belkum A, Volker U, Giedrys-Kalemba S, Broker B M. 2011. Antibody responses in furunculosis patients vaccinated with autologous formalin-killed *Staphylococcus aureus*. Eur J Clin Microbiol Infect Dis 30:707-717.

14. Kluytmans J, van Belkum A, Verbrugh H. 1997. Nasal carriage of *Staphylococcus aureus*: epidemiology, underlying mechanisms, and associated risks. Clin Microbiol Rev 10:505-520.

15. Weinstein H J. 1959. The relation between nasal-staphylococcal-carrier state and the incidence of postoperative complications. N Engl J Med 260:1303-1308.

16. Missiakas D, Schneewind O. 2016. *Staphylococcus aureus* vaccines: deviating from the carol. J Exp Med 231:1645-1653.

17. Corrigan R M, Miajlovic H, Foster T J. 2009. Surface proteins that promote adherence of *Staphylococcus aureus* to human desquamated nasal epithelial cells. BMC Microbiol 9:22.

18. Weidenmaier C, Kokai-Kun J F, Kristian S A, Chanturiya T, Kalbacher H, Gross M, Nicholson G, Neumeister B, Mond J J, Peschel A. 2004. Role of teichoic acids in *Staphylococcus aureus* nasal colonization, a major risk factor in nosocomial infections. Nat Med 10:243-245.

19. Kiser K B, Cantey-Kiser J M, Lee J C. 1999. Development and characterization of a *Staphylococcus aureus* nasal colonization model in mice. Infect Immun 67:5001-5006.

20. Weidenmaier C, Goerke C, Wolz C. 2012. *Staphylococcus aureus* determinants for nasal colonization. Trends Microbiol 20:243-250.

21. Mulcahy M E, Geoghegan J A, Monk I R, O'Keeffe K M, Walsh E J, Foster T J, McLoughlin R M. 2012. Nasal colonisation by *Staphylococcus aureus* depends upon clumping factor B binding to the squamous epithelial cell envelope protein loricrin. PLoS Pathog 8:e1003092.

22. Clarke S R, Wiltshire M D, Foster S J. 2004. IsdA of *Staphylococcus aureus* is a broad spectrum, iron-regulated adhesin. Mol Microbiol 51:1509-1519.

23. Mazmanian S K, Skaar E P, Gaspar A H, Humayun M, Gornicki P, Jelenska J, Joachmiak A, Missiakas D M, Schneewind O. 2003. Passage of heme-iron across the envelope of *Staphylococcus aureus*. Science 299:906-909.

24. Clarke S R, Foster S J. 2008. IsdA protects *Staphylococcus aureus* against the bactericidal protease activity of apolactoferrin. Infect Immun 76:1518-1526.

25. Conrady D G, Brescia C C, *Horii* K, Weiss A A, Hassett D J, Herr A B. 2008. A zinc-dependent adhesion molecule is responsible for intercellular adhesion in staphylococcal biofilms. Proc Nat Acad Sci USA 105:19455-19460.

26. Roche F M, Meehan M, Foster T J. 2003. The *Staphylococcus aureus* surface protein SasG and its homologues promote bacterial adherence to human desquamated nasal epithelial cells. Microbiology 149:2759-2767.

27. Baur S, Rautenberg M, Faulstich M, Grau T, Severin Y, Unger C, Hoffmann W H, Rudel T, Autenrieth I B, Weidenmaier C. 2014. A nasal epithelial receptor for *Staphylococcus aureus* WTA governs adhesion to epithelial cells and modulates nasal colonization. PLoS Pathog 10:e1004089.

28. Winstel V, Kühner P, Salomon F, Larsen J, Skov R, Hoffmann W, Peschel A, Weidenmaier C. 2015. Wall teichoic acid glycosylation governs *Staphylococcus aureus* nasal colonization. mBio 6:e00632-00615.

29. Forsgren A. 1970. Significance of protein A production by staphylococci. Infect Immun 2:672-673.

30. Burian M, Wolz C, Goerke C. 2010. Regulatory adaptation of *Staphylococcus aureus* during nasal colonization of humans. PLoS One 5:e10040.

31. Jenkins A, Diep B A, Mai T T, Vo N H, Warrener P, Suzich J, Stover C K, Sellman B R. 2015. Differential expression and roles of *Staphylococcus aureus* virulence determinants during colonization and disease. mBio 6:e02272-02214.

32. Votintseva A A, Fung R, Miller R R, Knox K, Godwin H, Wyllie D H, Bowden R, Crook D W, Walker A S. 2014. Prevalence of *Staphylococcus aureus* protein A (spa) mutants in the community and hospitals in Oxfordshire. BMC Microbiol 14:63.

33. Kim H K, Falugi F, Missiakas D, Schneewind O. 2016. Peptidoglycan-linked protein A promotes T-cell dependent antibody expansion during *Staphylococcus aureus* infection. Proc Natl Acad Sci USA 113:5718-5723.

34. Cole A L, Muthukrishnan G, Chong C, Beavis A, Eade C R, Wood M P, Deichen M G, Cole A M. 2016. Host innate inflammatory factors and staphylococcal protein A influence the duration of human *Staphylococcus aureus* nasal carriage. Mucosal Immunol EPub ahead of press.

35. Hong X, Qin J, Li T, Dai Y, Wang Y, Liu Q, He L, Lu H, Gao Q, Lin Y, Li M. 2016. Staphylococcal protein A promotes colonization and immune evasion of the epidemic healthcare-associated MRSA ST239. Front Microbiol 7:951.
36. Holtfreter S, Radcliff F J, Grumann D, Read H, Johnson S, Monecke S, Ritchie S, Clow F, Goerke C, Broker B M, Fraser J D, Wiles S. 2013. Characterization of a mouse-adapted *Staphylococcus aureus* strain. PLoS One 8:e71142.
37. Schulz D, Grumann D, Trübe P, Pritchett-Corning K, Johnson S, Reppschlager K, Gumz J, Sundaramoorthy N, Michalik S, Berg S, van den Brandt J, Fister R, Monecke S, Uy B, Schmidt F, Broker B M, Wiles S, Holtfreter S. 2017. Laboratory mice are frequently colonized with *Staphylococcus aureus* and mount a systemic immune response—note of caution for in vivo infection experiments. Front Cell Infect Microbiol 7:152.
38. van Wamel W J, Rooijakkers S H, Ruyken M, van Kessel K P, van Strijp J A. 2006. The innate immune modulators staphylococcal complement inhibitor and chemotaxis inhibitory protein of *Staphylococcus aureus* are located on b-hemolysin-converting bacteriophages. J Bacteriol 188:1310-1315.
39. Jongerius I, Kohl J, Pandey M K, Ruyken M, van Kessel K P M, van Strijp J A G, Rooijakkers S H M. 2007. Staphylococcal complement evasion by various convertase-blocking molecules. J Exp Med 204:2461-2471.
40. Cheng A G, McAdow M, Kim H K, Bae T, Missiakas D M, Schneewind O. 2010. Contribution of coagulases towards *Staphylococcus aureus* disease and protective immunity. PLoS Pathog 6:e1001036.
41. McAdow M, Kim H K, DeDenta A C, Hendrickx A P A, Schneewind O, Missiakas D M. 2011. Preventing *Staphylococcus aureus* sepsis through the inhibition of its agglutination in blood. PLoS Pathog 7:e1002307.
42. McDevitt D, Francois P, Vaudaux P, Foster T J. 1994. Molecular characterization of the clumping factor (fibrinogen receptor) of *Staphylococcus aureus*. Mol Microbiol 11:237-248.
43. Baba T, Bae T, Schneewind O, Takeuchi F, Hiramatsu K. 2007. Genome sequence of *Staphylococcus aureus* strain Newman and comparative analysis of staphylococcal genomes. J Bacteriol 190:300-310.
44. Kim H K, Cheng A G, Kim H-Y, Missiakas D M, Schneewind O. 2010. Non-toxigenic protein A vaccine for methicillin-resistant *Staphylococcus aureus* infections. J Exp Med 207:1863-1870.
45. Cheng A G, Missiakas D M, Schneewind O. 2014. The giant protein Ebh is a cross wall determinant of *Staphylococcus aureus* cell size and complement resistance. J Bacteriol 196:971-981.
46. Becker S, Frankel M B, Schneewind O, Missiakas D M. 2014. Release of protein A from the cell wall envelope of *Staphylococcus aureus*. Proc Natl Acad Sci USA 111: 1574-1579.
47. Goodyear C S, Silverman G J. 2004. Staphylococcal toxin induced preferential and prolonged in vivo deletion of innate-like B lymphocytes. Proc Natl Acad Sci USA 101:11392-11397.
48. Falugi F, Kim H K, Missiakas D M, Schneewind O. 2013. The role of protein A in the evasion of host adaptive immune responses by *Staphylococcus aureus* mBio 4:e00575-00513.
49. Hersh A L, Chambers H F, Maselli J H, Gonzales R. 2008. National trends in ambulatory visits and antibiotic prescribing for skin and soft-tissue infections. Arch Intern Med 168:1585-1591.
50. Pallin D J, Egan D J, Pelletier A J, Espinola J A, Hooper D C, Camargo C A, Jr. 2008. Increased U S emergency department visits for skin and soft tissue infections, and changes in antibiotic choices, during the emergence of community-associated methicillin-resistant *Staphylococcus aureus*. Ann Emerg Med 51:291-298.
51. Edelsberg J, Taneja C, Zervos M, Haque N, Moore C, Reyes K, Spalding J, Jiang J, Oster G. 2009. Trends in US hospital admissions for skin and soft tissue infections. Emerg Infect Dis 15:1516-1518.
52. Lipsky B A, Kollef M H, Miller L G, Sun X, Johannes R S, Tabak Y P. 2010. Predicting bacteremia among patients hospitalized for skin and skin-structure infections: derivation and validation of a risk score. Infect Control Hosp Epidemiol 31:828-837.
53. Carratala J, Rosón B, Fernandez-Sabé N, Shaw E, del Rio O, Rivera A, Gudiol F. 2003. Factors associated with complications and mortality in adult patients hospitalized for infectious cellulitis. Eur J Clin Microbiol Infect Dis 22:151-157.
54. Lucero C A, Hageman J, Zell E R, Bulens S, Nadle J, Petit S, Gershman K, Ray S, Harrison L H, Lynfield R, Dumyati G, Townes J M, Schaffner W, Fridkin S K. 2009. Evaluating the potential public health impact of a *Staphylococcus aureus* vaccine through use of population-based surveillance for invasive methicillin-resistant S. aureus disease in the United States. Vaccine 27:5061-5068.
55. Spellberg B, Daum R S. 2012. Development of a vaccine against *Staphylococcus aureus*. Semin Immunopathol 34:335-348.
56. Creech C B, Al-Zubeidi D N, Fritz S A. 2015. Prevention of recurrent staphylococcal skin infections. Infect Dis Clin North Am 29:429-464.
57. Fowler Jr. VG, Kong L K, Corey G R, Gottlieb G S, McClelland R S, Sexton D J, Gesty-Palmer D, Harrell L J. 1999. Recurrent *Staphylococcus aureus* bacteremia: pulsed-field gel electrophoresis findings in 29 patients. J Infect Dis 179:1157-1161.
58. Wertheim H F, Vos M C, Ott A, van Belkum A, Voss A, Kluytmans J A, van Keulen P H, Vandenbroucke-Grauls C M, Meester M H, Verbrugh H A. 2004. Risk and outcome of nosocomial *Staphylococcus aureus* bacteraemia in nasal carriers versus non-carriers. Lancet 364:703-705.
59. Shinefield H, Black S, Fattom A, Horwith G, Rasgon S, Ordonez J, Yeoh H, Law D, Robbins J B, Schneerson R, Muenz L, Fuller S, Johnson J, Fireman B, Alcorn H, Naso R. 2002. Use of a *Staphylococcus aureus* conjugate vaccine in patients receiving hemodialysis. N Engl J Med 346:491-496.
60. Fowler V G, Allen K B, Moreira E D, Moustafa M, Isgro F, Boucher H W, Corey G R, Carmeli Y, Betts R, Hartzel J S, Chan I S, McNeely T B, Kartsonis N A, Guris D, Onorato M T, Smugar S S, DiNubile M J, Sobanjo-ter Meulen A. 2013. Effect of an investigational vaccine for preventing *Staphylococcus aureus* infections after cardiothoracic surgery: a randomized trial. JAMA 309:1368-1378.
61. Fattom A I, Horwith G, Fuller S, Propst M, Naso R. 2004. Development of StaphVAX, a polysaccharide conjugate vaccine against S. aureus infection: from the lab bench to phase III clinical trials. Vaccine 22:880-887.
62. Creech C B, Johnson B G, Alsentzer A R, Hohenboken M, Edwards K M, Talbot T R. 2009. Vaccination as infection control: a pilot study to determine the impact of *Staphylococcus aureus* vaccination on nasal carriage. Vaccine 28:256-260.

63. Gotschlich E C, Goldschneider I, Artenstein M S. 1969. Human immunity to the meningococcus. V. The effect of immunization with meningococcal group C polysaccharide on the carrier state. J Exp Med 129:1385-1395.
64. Goldschneider I, Gotschlich E C, Artenstein M S. 1969. Human immunity to the meningococcus. I. The role of humoral antibodies. J Exp Med 129:1307-1326.
65. Goldschneider I, Gotschlich E C, Artenstein M S. 1969. Human immunity to the meningococcus. II. Development of natural immunity. J Exp Med 129:1327-1348.
66. Kim H K, Thammavongsa V, Schneewind O, Missiakas D. 2012. Recurrent infections and immune evasion strategies of *Staphylococcus aureus*. Curr Opin Microbiol 15:92-99.
67. Thammavongsa V, Kim H K, Missiakas D M, Schneewind O. 2015. Staphylococcal manipulation of host immune responses. Nat Rev Microbiol 13:529-543.
68. DeDent A C, McAdow M, Schneewind O. 2007. Distribution of protein A on the surface of *Staphylococcus aureus*. J Bacteriol 189:4473-4484.
69. Sjoquist J, Movitz J, Johansson I-B, Hjelm H. 1972. Localization of protein A in the bacteria. Eur J Biochem 30:190-194.
70. Schneewind O, Fowler A, Faull K F. 1995. Structure of the cell wall anchor of surface proteins in *Staphylococcus aureus*. Science 268:103-106.
71. Forsgren A. 1968. Protein A from *Staphylococcus aureus*. VI. Reaction with subunits from guinea pig γ1- and γ2-globulin. J Immunol 100:927-930.
72. Forsgren A, Quie P G. 1974. Effects of staphylococcal protein A on heat labile opsonins. J Immunol 112:1177-1180.
73. Goodyear C S, Silverman G J. 2003. Death by a B cell superantigen: In vivo VH-targeted apoptotic supraclonal B cell deletion by a staphylococcal toxin. J Exp Med 197:1125-1139.
74. Silverman G J, Goodyear C S. 2006. Confounding B-cell defences: lessons from a staphylococcal superantigen. Nat Rev Immunol 6:465-475.
75. Pauli N T, Kim H K, Falugi F, Huang M, Dulac J, Dunand C H, Zheng N Y, Kaur K, Andrews S, Huang Y, Dedent A, Frank K, Charnot-Katsikas A, Schneewind O, Wilson P C. 2014. *Staphylococcus aureus* infection induces protein A-mediated immune evasion in humans. J Exp Med 211:2331-2339.
76. Kim H K, Falugi F, Thomer L, Missiakas D M, Schneewind O. 2015. Protein A suppresses immune responses during *Staphylococcus aureus* bloodstream infection in guinea pigs. mBio 6:e02369-02314.
77. Mazmanian S K, Liu G, Jensen E R, Lenoy E, Schneewind O. 2000. *Staphylococcus aureus* mutants defective in the display of surface proteins and in the pathogenesis of animal infections. Proc Natl Acad Sci USA 97:5510-5515.
78. Schaffer A C, Solinga R M, Cocchiaro J, Portoles M, Kiser K B, Risley A, Randall S M, Valtulina V, Speziale P, Walsh E, Foster T, Lee J C. 2006. Immunization with *Staphylococcus aureus* clumping factor B, a major determinant in nasal carriage, reduces nasal colonization in a murine model. Infect Immun 74:2145-2153.
79. Walsh E J, O'Brien L M, Liang X, Hook M, Foster T J. 2004. Clumping factor B, a fibrinogen-binding MSCRAMM (microbial surface components recognizing adhesive matrix molecules) adhesin of *Staphylococcus aureus*, also binds to the tail region of type I cytokeratin 10. J Biol Chem 279:50691-50699.
80. Ni Eidhin D, Perkins S, Francois P, Vaudaux P, Hook M, Foster T J. 1998. Clumping factor B (ClfB), a new surface-located fibrinogen-binding adhesin of *Staphylococcus aureus*. Mol Microbiol 30:245-257.
81. Clarke S R, Brummell K J, Horsburgh M J, McDowell P W, Mohamad S A, Stapleton M R, Acevedo J, Read R C, Day N P, Peacock S J, Mond J J, Kokai-Kun J F, Foster S J. 2006. Identification of in vivo-expressed antigens of *Staphylococcus aureus* and their use in vaccinations for protection against nasal carriage. J Infect Dis 193:1098-1108.
82. Viana D, Blanco J, Tormo-Mas M A, Selva L, Guinane C M, Baselga R, Corpa J M, Lasa I, Novick R P, Fitzgerald J R, Penadés JR. 2010. Adaptation of *Staphylococcus aureus* to ruminant and equine hosts involves SaPI-carried variants of von Willebrand factor-binding protein. Mol Microbiol 77:1583-1594.
83. Cheng A G, DeDent A C, Schneewind O, Missiakas D M. 2011. A play in four acts: *Staphylococcus aureus* abscess formation. Trends Microbiol 19:225-232.
84. Kim H K, Emolo C, DeDent A C, Falugi F, Missiakas D M, Schneewind O. 2012. Protein A-specific monoclonal antibodies and the prevention of *Staphylococcus aureus* disease in mice. Infect Immun 80:3460-3470.
85. DeLeo F R, Chambers H F. 2009. Waves of resistance: *Staphylococcus aureus* in the antibiotic era. Nat Rev Microbiol 7:629-641.
86. Harmsen D, Claus H, Witte W, Rothganger J, Claus H, Turnwald D, Vogel U. 2003. Typing of methicillin-resistant *Staphylococcus aureus* in a university hospital setting by using novel software for spa repeat determination and database management. J Clin Microbiol 41:5442-5448.
87. Bae T, Schneewind O. 2005. Allelic replacement in *Staphylococcus aureus* with inducible counter-selection. Plasmid 55:58-63.
88. Thomer L, Becker S, Emolo C, Quach A, Kim H K, Rauch S, Anderson M, Leblanc J F, Schneewind O, Faull K F, Missiakas D. 2014. N-acetylglucosaminylation of serine-aspartate repeat proteins promotes *Staphylococcus aureus* bloodstream infection. J Biol Chem 289:3478-3486.
99. Prevaes S M, van Wamel W J, de Vogel C P, Veenhoven R H, van Gils E J, van Belkum A, Sanders E A, Bogaert D. 2012. Nasopharyngeal colonization elicits antibody responses to staphylococcal and pneumococcal proteins that are not associated with a reduced risk of subsequent carriage. Infect Immun 80:2186-2193.
100. Lowy F D. 1998. *Staphylococcus aureus* infections. New Engl J Med 339:520-532.
101. Harrison K J. 1963. Clinical trial of coagulase and alpha-hemolysin toxoids in chronic furunculosis. Br Med J 2:149-152.
102. Sun Y, Emolo C E, Holtfreter S, Wiles S, Kreiswirth B, Missiakas D, Schneewind O. 2018. Staphylococcal protein A is required for persistent colonization of mice with *Staphylococcus aureus*. J Bacteriol 200:e00735-17.
103. Mazmanian S K, Ton-That H, Schneewind O. 2001. Sortase-catalyzed anchoring of surface proteins to the cell wall of *Staphylococcus aureus*. Mol Microbiol 40:1049-1057.
104. DeDent A C, McAdow M, Schneewind O. 2007. Distribution of protein A on the surface of *Staphylococcus aureus*. J Bacteriol 189:4473-4484.
105. Schneewind O, Model P, Fischetti V A. 1992. Sorting of protein A to the staphylococcal cell wall. Cell 70:267-281.

106. Mazmanian S K, Liu G, Ton-That H, Schneewind O. 1999. *Staphylococcus aureus* sortase, an enzyme that anchors surface proteins to the cell wall. Science 285: 760-763.
107. Ton-That H, Liu G, Mazmanian S K, Faull K F, Schneewind O. 1999. Purification and characterization of sortase, the transpeptidase that cleaves surface proteins of *Staphylococcus aureus* at the LPXTG motif. Proc Natl Acad Sci USA 96:12424-12429.
108. Yu W, Missiakas D, Schneewind O. 2018. Septal secretion of protein A in *Staphylococcus aureus* requires SecA and lipoteichoic acid synthesis. Elife 7:e34092.
109. Perry A M, Ton-That H, Mazmanian S K, Schneewind O. 2002. Anchoring of surface proteins to the cell wall of *Staphylococcus aureus*. III. Lipid I I is an in vivo peptidoglycan substrate for sortase-catalyzed surface protein anchoring. J Biol Chem 277:16241-16248.
110. Frankel M B, Hendrickx A P, Missiakas D M, Schneewind O. 2011. LytN, a murein hydrolase in the cross-wall compartment of *Staphylococcus aureus*, is involved in proper bacterial growth and envelope assembly. J Biol Chem 286:32593-32605.
111. Frankel M B, Schneewind O. 2012. Determinants of murein hydrolase targeting to cross-wall of *Staphylococcus aureus* peptidoglycan. J Biol Chem 287:10460-10471.
112. Forsgren A, Sjoquist J. 1966. Protein A from *S. aureus*. I. Pseudo-immune reaction with human gamma-globulin. J Immunol 97:822-827.
113. van Loghem E, Frangione B, Recht B, Franklin E C. 1982. Staphylococcal protein A and human IgG subclasses and allotypes. Scand J Immunol 15:275-278.
114. Duhamel R C, Schur P H, Brendel K, Meezan E. 1979. pH gradient elution of human IgG1, IgG2 and IgG4 from protein A-sepharose. J Immunol Meth 31:211.
115. Kronvall G, Williams R C, Jr. 1969. Differences in anti-protein A activity among IgG subgroups. J Immunol 103:828.
116. Skvaril F. 1976. The question of specificity in binding human IgG subclasses to protein A-sepharose. Immunochemistry 13:871.
117. Forsgren A, Nordstrom K. 1974. Protein A from *Staphylococcus aureus*: the biological significance of its interaction with IgG. Ann N Y Acad Sci 236:252-266.
118. Sasso E H, Silverman G J, Mannik M. 1989. Human IgM molecules that bind staphylococcal protein A contain VHIII H chains. J Immunol 142:2778-2783.
119. Brunda M J, Minden P, Grey H M. 1979. Heterogeneity of binding human IgA subclasses to protein A. J Immunol 123:1457.
120. Grov A. 1975. Antigenicity of human IgM in relation to interaction with staphylococcal protein A. Acta path microbiol scand Sect C 83:325.
121. Grov A. 1976. Human colostral IgA interacting with staphylococcal protein A. Acta path microbiol scand Sect C 84:71.
122. van Kamp G J. 1979. J. Immunol. Meth. IgA contamination of IgG prepared on a protein A column 27:301.
123. Lind I, Harboe M, Foiling I. 1975. Protein A reactivity of two distinct groups of human monoclonal IgM. Scand J Immunol 4:843.
124. van Loghem E, Natvig J B, Matsumoto H. 1970. Genetic markers of immunoglobulins in Japanese families. Inheritance of associated markers belonging to one IgA and three IgG subclasses. Ann Human Genet Lond 33:351.
125. van Loghem E, Salimonu L, Williams A I O, Osunkoya B O, Boyd A M, de Lange G, Nijenhuis L E. 1978. Immunoglobulin alloytpes in African populations. Gm-Am haplotypes in a Nigerian population. J Immunogenet 5:143.
126. Patrick C C, Virella G, Koistinen J, Fudenberg H H. 1977. Differential binding of IgA proteins of different subclasses and allotypes to staphylococcal protein A. Z Immunitaetsforsch 153:466.
127. Hillson J L, Karr N S, Opplinger I R, Mannik M, Sasso E H. 1993. The structural basis of germline-encoded VH3 immunoglobulin binding to staphylococcal protein A. J Exp Med 178:331-336.
128. Roben P W, Salem A N, Silverman G J. 1995. VH3 family antibodies bind domain D of staphylococcal protein A. J Immunol 154:6437-6445.
129. Randen I, Potter K N, Li Y, Thompson K M, Pascual V, Førre O, Natvig J B, Capra J D. 1993. Complementarity-determining region 2 is implicated in the binding of staphylococcal protein A to human immunoglobulin VHIII variable regions. Eur J Immunol 23:2682-2686.
130. Ljungberg U K, Jansson B, Niss U, Nilsson R, Sandberg B E, Nilsson B. 1993. The interaction between different domains of staphylococcal protein A and human polyclonal IgG, IgA, IgM and F(ab')2: separation of affinity from specificity. Mol Immunol 30:1279-1285.
131. Inganas M, Johansson S G, Bennich H H. 1980. Interaction of human polyclonal IgE and IgG from different species with protein A from *Staphylococcus aureus*: demonstration of protein-A-reactive sites located in the Fab'2 fragment of human IgG. Scand J Immunol 12:23-31.
132. Inganas M. 1981. Comparison of mechanisms of interaction between protein A from *Staphylococcus aureus* and human monoclonal IgG, IgA and IgM in relation to the classical FC gamma and the alternative F(ab')2 epsilon protein A interactions. Scand J Immunol 13:343-352.
133. Romagnani S, Giudizi M, Biagiotti R, Almerigogna F, Maggi E, Del Prete G, Ricci M. 1981. Surface immunoglobulins are involved in the interaction of protein A with human B cells and in the triggering of B cell proliferation induced by protein A-containing *Staphylococcus aureus*. J Immunol 127:1307-1313.
134. Vidal M A, Bernabeu C, Conde F P. 1982. Binding of human immunoglobulin M to *Staphylococcus aureus* bearing protein A. Immunol Lett 4:311-315.
135. Lindmark R, Thorén-Tolling K, Sjoquist J. 1983. Binding of immunoglobulins to protein A and immunoglobulin levels in mammalian sera. J Immunol Meth 62:1-13.
136. Peterson P K, Verhoef J, Sabath L D, Quie P G. 1977. Effect of protein A on staphylococcal opsonization. Infect Immun 15:760-764.
137. Laky M, Sjoquist J, Moraru I, Ghetie V. 1985. Mutual inhibition of the binding of Clq and protein A to rabbit IgG immune complexes. Mol Immunol 22:1297-1302.
138. Graille M, Stura E A, Corper A L, Sutton B J, Taussig M J, Charbonnier J B, Silverman G J. 2000. Crystal structure of a *Staphylococcus aureus* protein A domain complexed with the Fab fragment of a human IgM antibody: structural basis for recognition of B-cell receptors and superantigen activity. Proc Nat Acad Sci USA 97:5399-5404.
139. Forsgren A, Svedjelund A, Wigzell H. 1976. Lymphocyte stimulation by protein A of *Staphylococcus aureus*. Eur J Immunol 6:207-213.
140. Gutafson G T, Stalenheim G, Forsgren A, Sjoquist J. 1968. Protein A from *Staphylococcus aureus* IV. Produc- 141. Gustafson G T, Sjoquist J, Stalenheim G. 1967. Protein A from *Staphylococcus aureus*. II. Arthus-like reaction produced in rabbits by interaction of protein A and human gamma-globulin. J Immunol 98:1178-1181.
142. Anderson A L, Sporici R, Lambris J, Larosa D, Levinson Al. 2006. Pathogenesis of B-cell superantigen-induced immune complex-mediated inflammation. Infect Immun 74:1196-1203.
143. Ballow C, Leh A, Slentz-Kesler K, Yan J, Haughey D, Bernton E. 2013. Safety, pharmacokinetic, immunogenicity, and pharmacodynamic responses in healthy volunteers following a single intravenous injection of purified staphylococcal protein A. J Clin Pharmacol 53:909-918.
144. Goldwater R, Garner R, Zamfirov V, Haughey D, Bernton E. 2007. PK/PD relationships in a sequential, escalating, single-dose study of PRTX-100, a highly purified staphylococcal protein A. J Clin Pharmacol 47:1204.
145. Marone G, Tamburini M, Giudizi M G, Biagiotti R, Almerigogna F, Romagnani S. 1987. Mechanism of activation of human basophils by *Staphylococcus aureus* Cowan 1. Infect Immun 55:803-809.
146. Chen X, Sun Y, Missiakas D, Schneewind O. 2018. *Staphylococcus aureus* decolonization of mice with monoclonal antibody neutralizing protein A. J Infect Dis in press.
147. Minakuchi K, Murata D, Okubo Y, Nakano Y, Yoshida S. 2013. Remarkable alkaline stability of an engineered protein A as immunoglobulin affinity ligand: C domain having only one amino acid substitution. Protein Sci 22:1230-1238.
148. Jansson B, Uhlén M, Nygren P A. 1998. All individual domains of staphylococcal protein A show Fab binding. FEMS Immunol Med Microbiol 20:69-78.
149. Yoshida S, Murata D, Taira S, Iguchi K, Takano M, Nakano Y, Minakuchi K. 2012. Rational design and engineering of protein A to obtain the controlled elution profile in monoclonal antibody purification. Chem-Bio Informatics Journal 12:1-13.
150. Nilsson B, Moks T, Jansson B, Abrahmsén L, Elmblad A, Holmgren E, Henrichson C, Jones T A, Uhlén M. 1987. A synthetic IgG-binding domain based on staphylococcal protein A. Protein Eng 1:107-113.
151. Gulich S, Uhlen M, Hober S. 2000. Protein engineering of an IgG-binding domain allows milder elution conditions during affinity chromatography. J Biotechnol 76:233-244.
152. Ghose S, Allen M, Hubbard B, Brooks C P, Cramer S M. 2005. Antibody variable region interactions with proteinA: implications for the development of generic purification processes. Biotechnol Bioengin 92:665-673.
153. Svensson H G, Hoogenboom H R, Sjobring U. 1998. Protein L A, a novel hybrid protein with unique single-chain Fv antibody and Fab-binding properties. Eur J Biochem 258:890-896.
154. Deisenhofer J. 1981. Crystallographic refinement and atomic models of a human Fc fragment and its complex with fragment B of protein A from *Staphylococcus aureus* at 2.9- and 2.8-A resolution. Biochemistry 20:2361-2370.
155. Fisher M M. 1986. Clinical observations on the pathophysiology and treatment of anaphylactic cardiovascular collapse. Anaesth Intensive Care 14:17-21.
156. Korhonen H, Fisslthaler B, Moers A, Wirth A, Habermehl D, Wieland T, Schatz G, Wettschureck N, Fleming I, Offermanns S. 2009. Anaphylactic shock depends on endothelial Gq/G11. J Exp Med 206:411-420.
157. Nakamura Y, Oscherwitz J, Cease K B, Munoz-Planillo R, Hasegawa M, McGavin M J, Otto M, Inohara N, Nunez G. 2013. *Staphylococcus* δ-toxin promotes allergic skin disease by inducing mass cell degranulation. Nature 503 review:397-401.
158. Kitamura D, Roes J, Kühn R, Rajewsky K. 1991. A B cell-deficient mouse by targeted disruption of the membrane exon of the immunoglobulin mu chain gene. Nature 350:423-426.

The invention claimed is:

1. An isolated polypeptide comprising a variant Protein A (SpA) having (i) lysine substitutions for glutamine residues in each of domains A-E corresponding to positions 9 and 10 in domain D and (ii) glutamate substitutions in each of domains A-E corresponding to position 33 in domain D, wherein the polypeptide does not, relative to a negative control, detectably crosslink IgG and IgE in blood or activate basophils or mast cells.

2. The isolated polypeptide of claim 1, wherein the $K_A$ binding affinity for variable heavy 3 (VH3) from human IgG is reduced as compared to a SpA variant consisting of lysine substitutions for glutamine residues in each of domains A-E corresponding to position 9 and 10 in domain D and alanine substitutions for aspartic acid in domains A-E corresponding to position 36 and 37 of domain D (SpA$_{KKAA}$).

3. The isolated polypeptide of claim 1, wherein the isolated polypeptide has a K$_A$ binding affinity for VH3 from human IgG that is reduced by at least 2-fold as compared to SpA$_{KKAA}$.

4. The isolated polypeptide of claim 1, wherein the isolated polypeptide has a K$_A$ binding affinity for VH3 from human IgG is less than 1×105 M-1.

5. The isolated polypeptide of claim 1, wherein the SpA variant does not have substitutions in any of the domains A-E corresponding to positions 36 and 37 in domain D.

6. The isolated polypeptide of claim 1, wherein the only substitutions in the SpA variant are (i) and (ii).

7. The isolated polypeptide of claim 1, wherein the isolated polypeptide consists of the SpA variant.

8. A composition comprising the isolated polypeptide of claim 1, wherein the composition contains less than 1% by weight of the total protein amount a protein other than the isolated polypeptide.

9. A method for treating a staphylococcal infection in a subject comprising providing to a subject having, suspected of having or at risk of developing a staphylococcal infection an effective amount of the polypeptide of claim 1.

* * * * *